(12) United States Patent
Schnee et al.

(10) Patent No.: US 7,077,319 B2
(45) Date of Patent: Jul. 18, 2006

(54) IMAGING ENGINE EMPLOYING PLANAR LIGHT ILLUMINATION AND LINEAR IMAGING

(75) Inventors: Michael D. Schnee, Aston, PA (US); Xiaoxun Zhu, Marlton, NJ (US); C. Harry Knowles, Moorestown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 463 days.

(21) Appl. No.: 10/186,268

(22) Filed: Jun. 27, 2002

(65) Prior Publication Data

US 2003/0091244 A1 May 15, 2003

Related U.S. Application Data

(63) Continuation-in-part of application No. 09/990,585, filed on Nov. 21, 2001, and a continuation-in-part of application No. 09/999,687, filed on Oct. 31, 2001, and a continuation-in-part of application No. 09/954,477, filed on Sep. 17, 2001, now Pat. No. 6,736,321, and a continuation-in-part of application No. 09/883,130, filed on Jun. 15, 2001, now Pat. No. 6,830,189, and a continuation-in-part of application No. 09/781,665, filed on Feb. 12, 2001, now Pat. No. 6,742,707, and a continuation-in-part of application No. 09/780,027, filed on Feb. 9, 2001, now Pat. No. 6,629,641, and a continuation-in-part of application No. 09/721,885, filed on Nov. 24, 2000, now Pat. No. 6,631,842.

(51) Int. Cl.
*G06K 7/10* (2006.01)

(52) U.S. Cl. .............................. 235/462.1; 235/462.25; 235/472.01

(58) Field of Classification Search ... 235/462.01–462.47, 235/235/235/235/235/235/ 235/235/235/235/472.01, 472.02, 472.03, 235/454, 455, 494, 470
See application file for complete search history.

(56) References Cited

U.S. PATENT DOCUMENTS 3,901,597 A 8/1975 White (Continued)

FOREIGN PATENT DOCUMENTS

WO WO 99/21252 4/1999

(Continued)

OTHER PUBLICATIONS

Web–Based Product Brochure on Model 120 LIVAAR Short Wave IR Gated Camera Specification, by Intevac Corporation, Santa Clara CA, Sep. 2001, pp. 1–2.

(Continued)

*Primary Examiner*—Thien M. Le
(74) *Attorney, Agent, or Firm*—Thomas J. Perkowski, Esq., P.C.

(57) ABSTRACT

An imaging engine includes a plurality of linear imaging arrays, image formation optics, one or more illumination module and supporting circuitry that are embodied within a modular engine housing. The plurality of linear imaging arrays and image formation optics are mounted on an optical bench and provide field of views corresponding to the plurality of linear image arrays. The one illumination module produces planar light illumination that substantially overlaps the field of views corresponding to the plurality of linear imaging arrays. The imaging engine can compensate for aspect ratio distortions that result from variations in velocity of engine with respect to target object(s). The engine can adjust the optical power level and/or illumination time period for the illumination that overlaps one or more of the FOVs of the linear imaging arrays of the engine for speckle reduction/constant white levels. The engine also supports image velocity estimation, aspect ratio compensation, jitter estimation and compensation, bar code detection, OCR, and image lift operations.

31 Claims, 99 Drawing Sheets

U.S. PATENT DOCUMENTS

| | | | |
|---|---|---|---|
| 4,427,286 | A | 1/1984 | Bosse |
| 4,687,325 | A | 8/1987 | Corby, Jr. |
| 4,826,299 | A | 5/1989 | Powell |
| 4,900,907 | A | 2/1990 | Matusima et al. |
| 4,961,195 | A | 10/1990 | Skupsky et al. |
| 4,979,815 | A | 12/1990 | Tsikos |
| 5,038,024 | A | 8/1991 | Chadima, Jr. et al. |
| 5,063,460 | A | 11/1991 | Mutze et al. |
| 5,136,145 | A | 8/1992 | Karney |
| 5,192,856 | A | 3/1993 | Schaham |
| 5,212,390 | A | 5/1993 | LeBeau et al. |
| 5,258,605 | A | 11/1993 | Metlitsky et al. |
| 5,296,690 | A | 3/1994 | Chandler et al. |
| 5,319,181 | A | 6/1994 | Naoi et al. |
| 5,319,185 | A | 6/1994 | Obata |
| 5,378,883 | A | 1/1995 | Batterman et al. |
| 5,450,291 | A | 9/1995 | Kumagai |
| RE35,148 | E | 1/1996 | Lizzi et al. |
| 5,532,467 | A | 7/1996 | Roustaei |
| 5,545,886 | A | 8/1996 | Metlitsky et al. |
| 5,591,955 | A | 1/1997 | Laser |
| 5,615,003 | A | 3/1997 | Hermary et al. |
| 5,621,203 | A | 5/1997 | Swartz et al. |
| 5,635,699 | A * | 6/1997 | Cherry et al. .......... 235/462.41 |
| 5,672,858 | A | 9/1997 | Li et al. |
| 5,710,417 | A | 1/1998 | Joseph et al. |
| 5,747,796 | A | 5/1998 | Heard et al. |
| 5,786,582 | A | 7/1998 | Roustaei et al. |
| 5,825,803 | A | 10/1998 | Labranche et al. |
| 5,841,889 | A | 11/1998 | Seyed-Bolorforosh |
| 5,914,477 | A | 6/1999 | Wang |
| 5,986,745 | A | 11/1999 | Hermary et al. |
| 5,988,506 | A | 11/1999 | Schaham et al. |
| RE36,528 | E | 1/2000 | Roustaei |
| 6,081,381 | A | 6/2000 | Shalapenok et al. |
| 6,128,049 | A | 10/2000 | Butterworth |
| 6,142,376 | A * | 11/2000 | Cherry et al. .......... 235/462.14 |
| 6,159,153 | A | 12/2000 | Dubberstein et al. |
| 6,166,770 | A | 12/2000 | Yasuda |
| 6,184,981 | B1 | 2/2001 | Hasson et al. |
| 6,191,887 | B1 | 2/2001 | Michaloski et al. |
| 6,223,988 | B1 | 5/2001 | Batterman et al. |
| 6,230,975 | B1 | 5/2001 | Colley et al. |
| 6,321,988 | B1 * | 11/2001 | Merchant et al. ...... 235/462.12 |
| 6,572,017 | B1 * | 6/2003 | Stoner .................... 235/462.12 |
| 6,609,660 | B1 * | 8/2003 | Stoner .................... 235/462.22 |
| 6,628,445 | B1 | 9/2003 | Chaleff et al. |
| 6,634,554 | B1 * | 10/2003 | Merchant ............... 235/462.23 |
| 2003/0089779 | A1 * | 5/2003 | Giordano et al. ........... 235/454 |
| 2003/0091244 | A1 * | 5/2003 | Schnee et al. .............. 382/321 |
| 2003/0098352 | A1 * | 5/2003 | Schnee et al. ......... 235/472.01 |
| 2003/0250927 | | 8/2003 | Tsikos et al. |
| 2003/0189098 | A1 | 10/2003 | Tsikos et al. |
| 2003/0218070 | A1 | 11/2003 | Tsikos et al. |

FOREIGN PATENT DOCUMENTS

| | | |
|---|---|---|
| WO | WO 99/31531 | 6/1999 |
| WO | WO 99/49787 | 10/1999 |
| WO | WO 99/60443 | 11/1999 |
| WO | WO 99/64916 | 12/1999 |
| WO | WO 99/64980 | 12/1999 |
| WO | WO 00/43822 | 7/2000 |
| WO | WO 00/62114 | 10/2000 |
| WO | WO 00/65401 | 11/2000 |
| WO | WO 01/71419 A2 | 9/2001 |
| WO | WO 01/72028 A1 | 9/2001 |

OTHER PUBLICATIONS

Web–based presentation entitled "New Livar Imagery" by Intevac Corporation, Santa Clara CA, http://www.intevac.com/livar imagery/livar—imagery.hmtl. 2001, pp. 1–9.

Web–based presentation entitled "New Livar Imagery" by Intevac Corporation, Santa Clara CA, http://www.intevac-.com/livar_imagery/livar—imagery.hmtl. 2001, pp. 1–9.

Web–based brochure for Intevac Photonics Division Products–Laser Illuminated Viewing and Ranging (LIVAR) System, Intevac, Inc., http://www.intevac.com/photonics/products.html, 2001, pp. 1–5.

Web–based publication entitled "Planar Etalon Theory" by TecOptics, www.tecoptics.com/etalons/theory.html, 2001, pp. 1–2.

Web–based publication entitled "Introduction: Etalons" by TecOptics, http://www.tecoptics.com/etalons/index.htm, 2001, 1 page.

Web–based publication entitled "Types of Planar Etalons" by TecOptics, http://www.tecoptics.com/etalons/types.htm, 2001, pp. 1–3.

Web–based brochure entitled "High–Speed, Repetitively Pulsed Ruby Laser Light Source" by Physical Sciences Inc., http://www.psicvorp.com/html/prod/lasillum.htm, 2001, pp. 1–4.

Web–based brochure entitled "Collimated Laser Diode Arrays" by INO, Inc., http://www.ino.ge.ca/en/syst et compo/cida.asp, 2001, pp. 1–2.

Product Brochure for the Lasiris™ SNF Laser by StockerYale, Salem NH, 2001, pp. 1–4.

Academic publication entitled "Nonlinear Electro–Optic Effect and Kerr Shutter" by Jagat Shakya and Mim lai Nakarmi, Dept. of Physics, Kansas State Univ., Apr. 2001, pp. 1–14.

Product Brochure for the AV3700 High Speed CCD Bar Code Reader by Accu–Sort Corporation, 2001, pp. 1–2.

Chapter 4 entitled "Speckle Reduction" by T.S. McKechnie, Topics in Applied Physics vol. 9 –Laser Speckle and Related Phenomena, Editor J.C. Dainty, Springer–Verlag, 1984, pp. 123–170.

Product brochure for DALSA IT–PA Image Sensors, by Dalsa, Inc., 2001 pp. 1–14.

Web–based brochure for the Optical Shutter by Optron Systems Inc., http://members.bellatlantic.net/–optron3/shutter.htm#TypicalApplications, 2001, pp. 1–4.

Product Specification for "KAF–4202 SERIES Full–Frame CCD Image Sensor Performance Specification" by Eastman Kodak Company, Rochester NY, Jun. 29, 2000, pp. 1–15.

User Manual for the Piranha CT–P4, CL–P4 High Speed Line Scan Camera by Dalsa, Inc., 2000, pp. 1–30.

Scientific publication entitled "Speckle Reduction in Laser Projections with Ultrasonic Waves" by Wang et al., Opt. Eng. 39(6) 1659–1664 Jun. 2000, vol. 39, No. 6.

Scientific publication entitled "Principles of Parametric Temporal Imaging –Part 1: System Configurations" by Bennett et al., IEEE Journal of Quantum Electronics, vol. 36, No. 4, Apr. 2000, vol. 36, No. 4, pp. 430–437.

Product brochure for Sony ICX085AL 2/3–inch Progressive Scan CCD Image Sensor with Square Pixel for B/W Cameras, by Sony Corporation, 2000, pp. 1–20.

Web–based slide show entitled "Speckle Noise and Laser Scanning Systems" by Kresic–Juric et al., www.ima.umn.edu/industrial/99–2000/kresic/sid001.htm, 2000, pp. 1–25.

Product brochure for "ML1XX6 Series for Optical Information Systems" by Mitsubishi Electric, Dec. 1999, pp. 1–4.

Scientific publication entitled "High-speed visualization, a powerful diagnostic tool for microactuators –retrospect and prospect" by Krehl et al., Microsystem Technologie 5, Springer-Verlag 1999, pp. 113–132.

Scientific publication entitled "Laser triangualtion: fundamental uncertainty in distance measurement" by Dorsch et al., Applied Optics, vol. 33(7), Mar. 1994, pp. 442–450.

Web-based publication entitled "3-D Sensing" by Papadoupoulos, http://perso.club-internet.fr/dpo/numeerisation 3d, 1995, pp. 1–12.

Nec Press Release entitled "NEC Develops Highly Stable, Ultra-short Pulse Semiconductor Laser for Ultra-high Capacity Optical Communications" by NEC Corporation, Jan. 11, 1999, pages 1–3.

Scientific publication entitled "The Use of Diode Laser Collimators for Targeting 3-D Objects" by Clarke et al., Dept. Engineering/City Univ./London, 1994, pp. 47–54.

Scientific publication entitled "Speckle Reduction by Virtual Spatial Coherence" by Freischlad et al., SPIE vol. 1755 Interferomerty: Techniques and Analysis (1992), pp. 38–43.

U.S. Appl. No. 60/190,273, filed May 29, 2001, Thomas J. Brobst.

\* cited by examiner

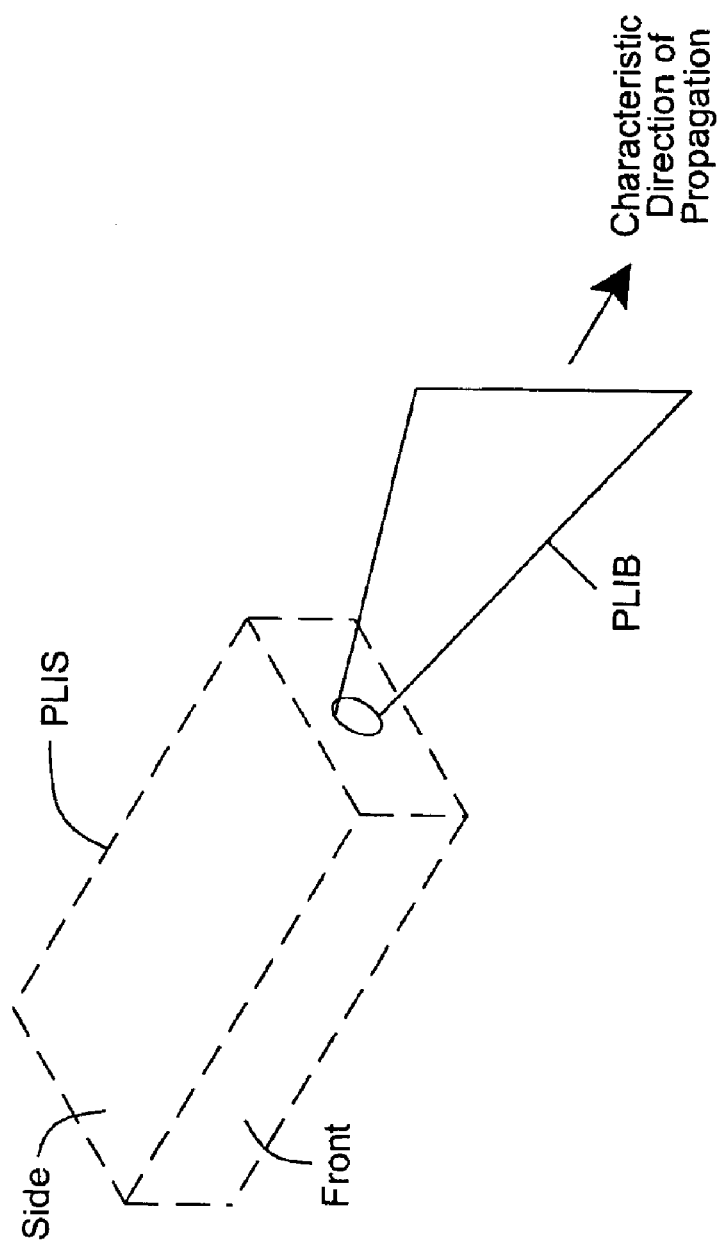
FIG. 2F1

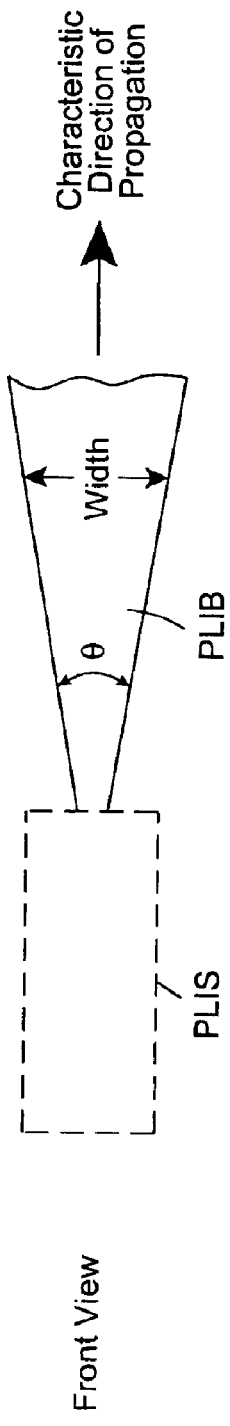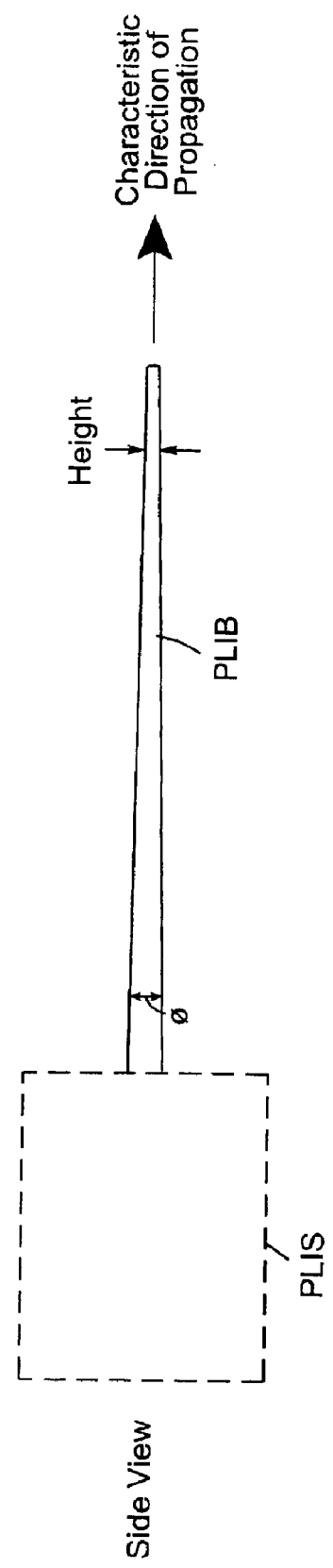
FIG. 2F2
FIG. 2F3

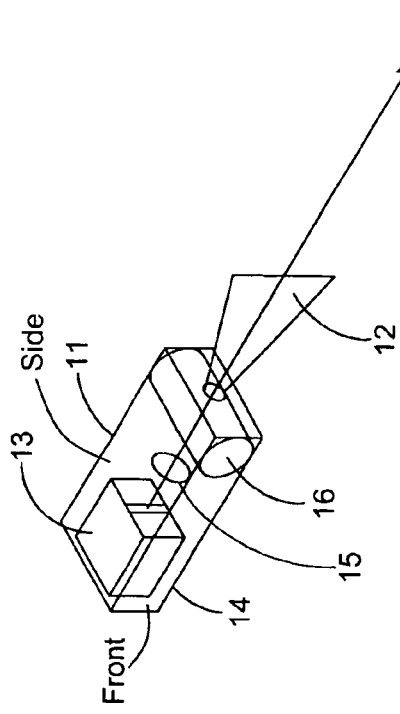
FIG. 2G1
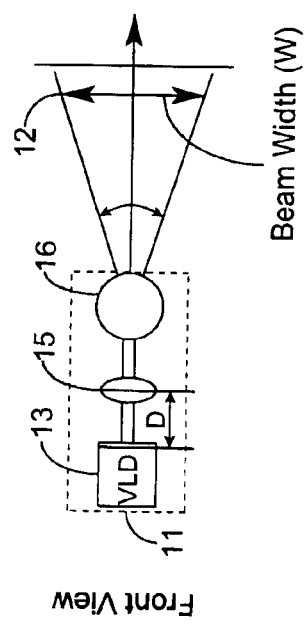
FIG. 2G2
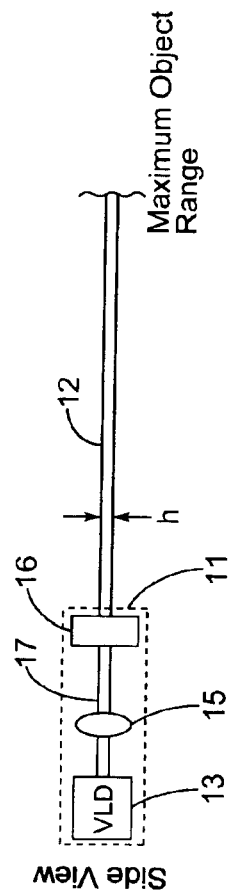
FIG. 2G3

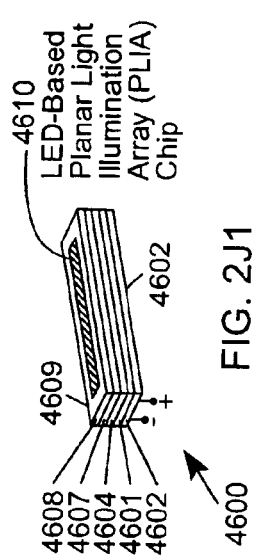
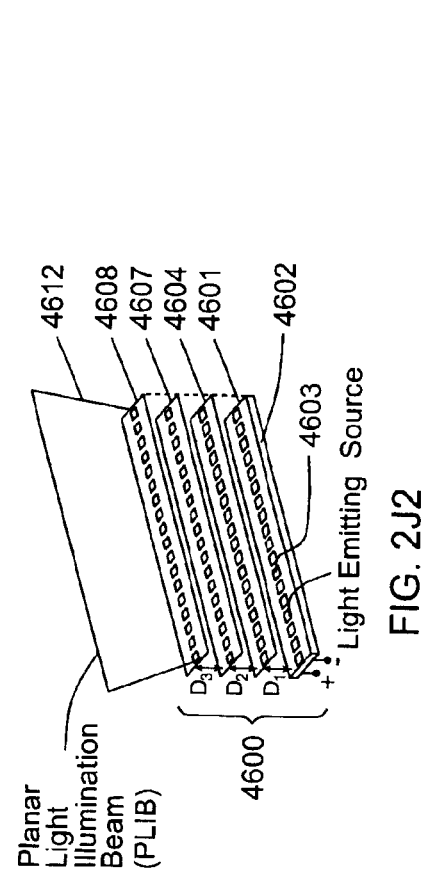
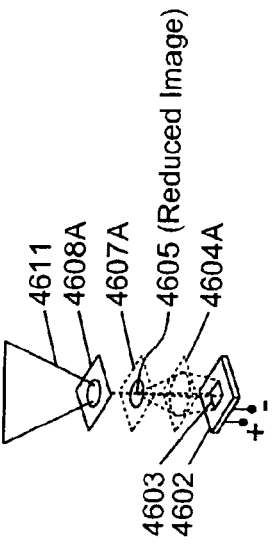
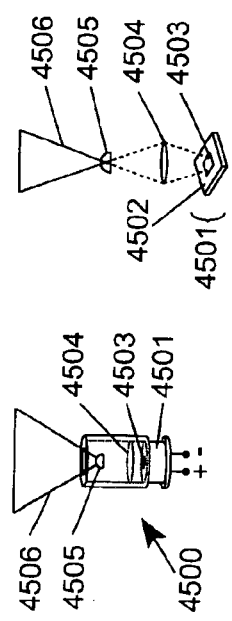
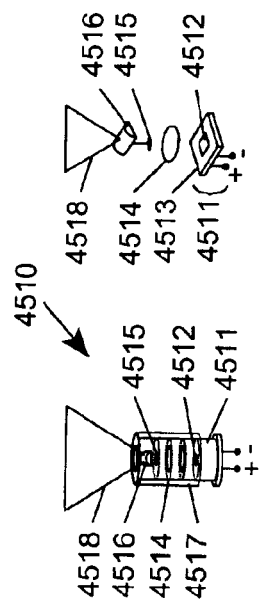

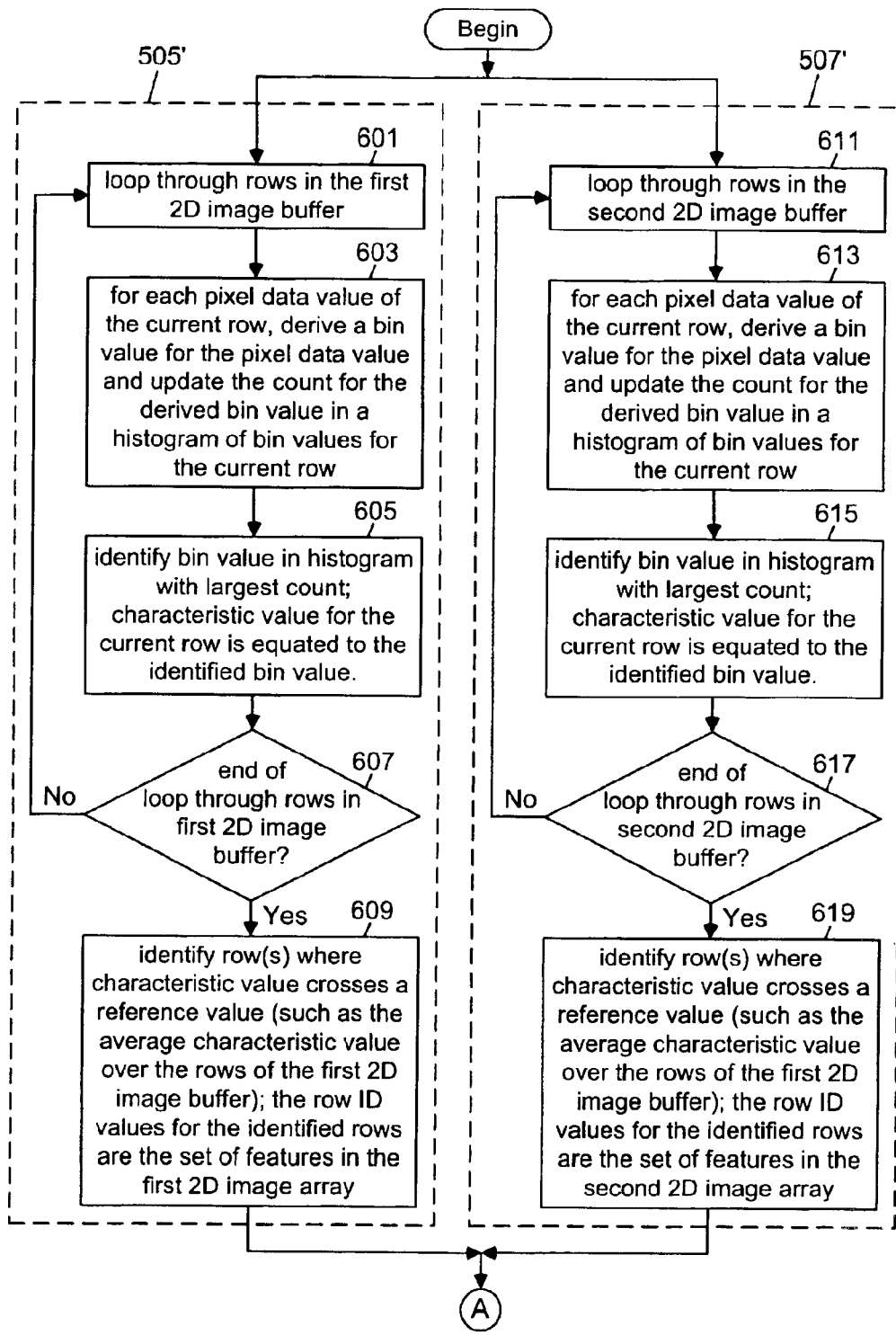
FIG. 6A1

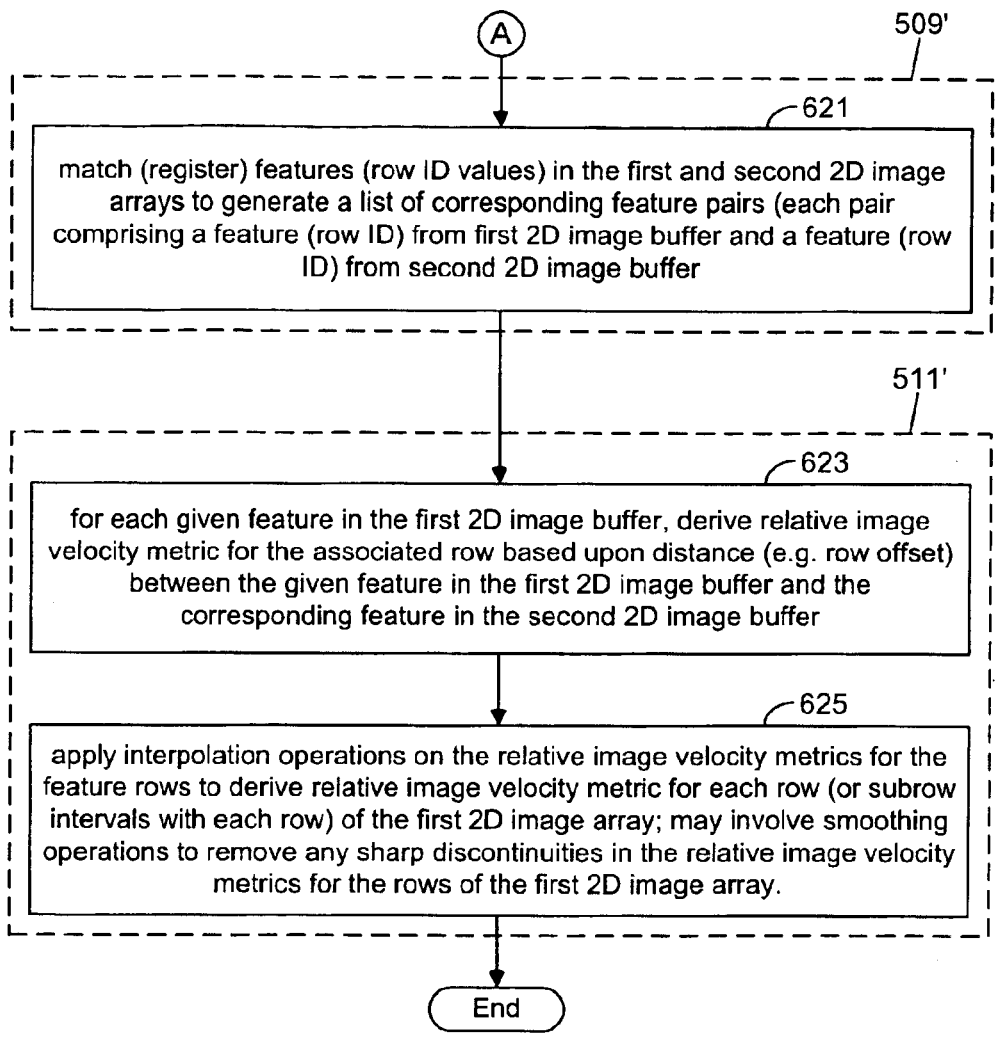
FIG. 6A2

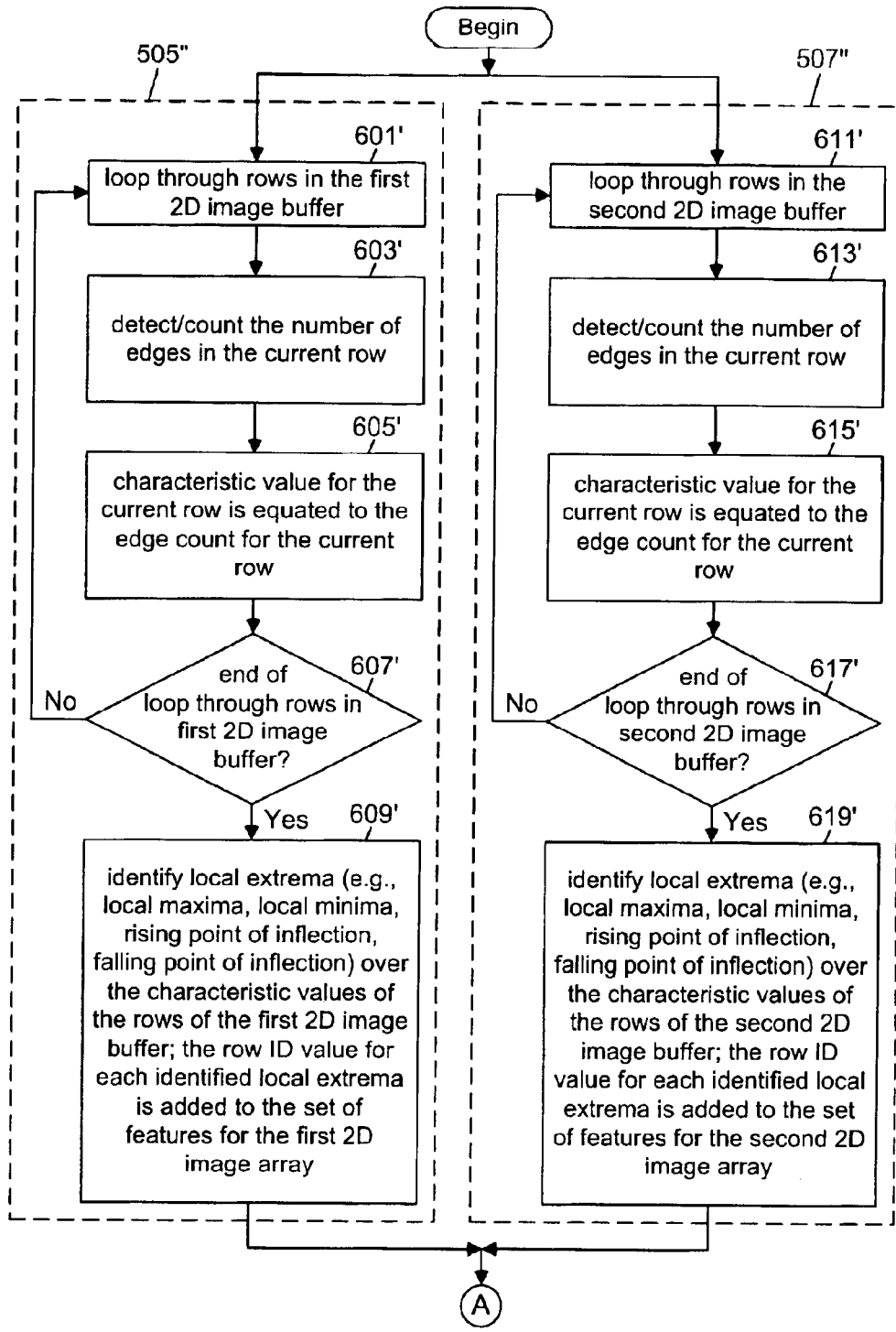
FIG. 6B1A

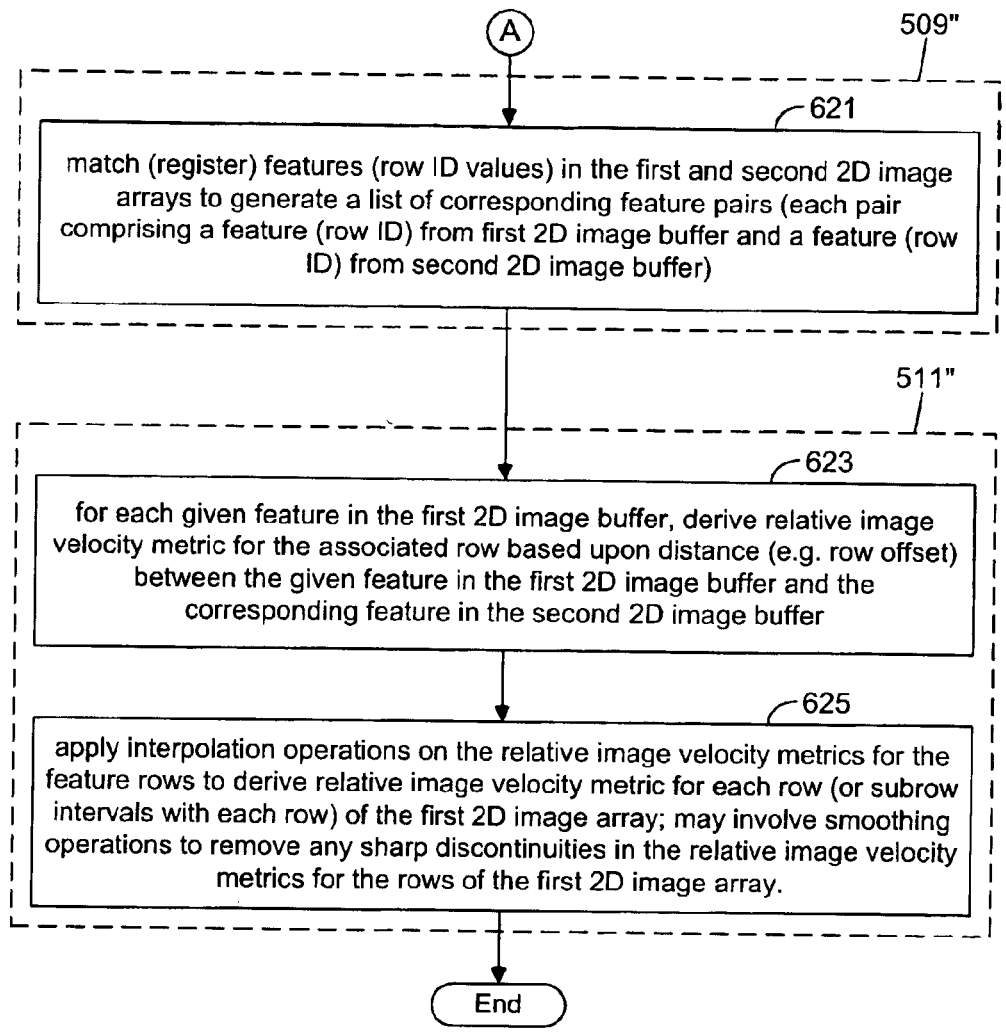
FIG. 6B1B

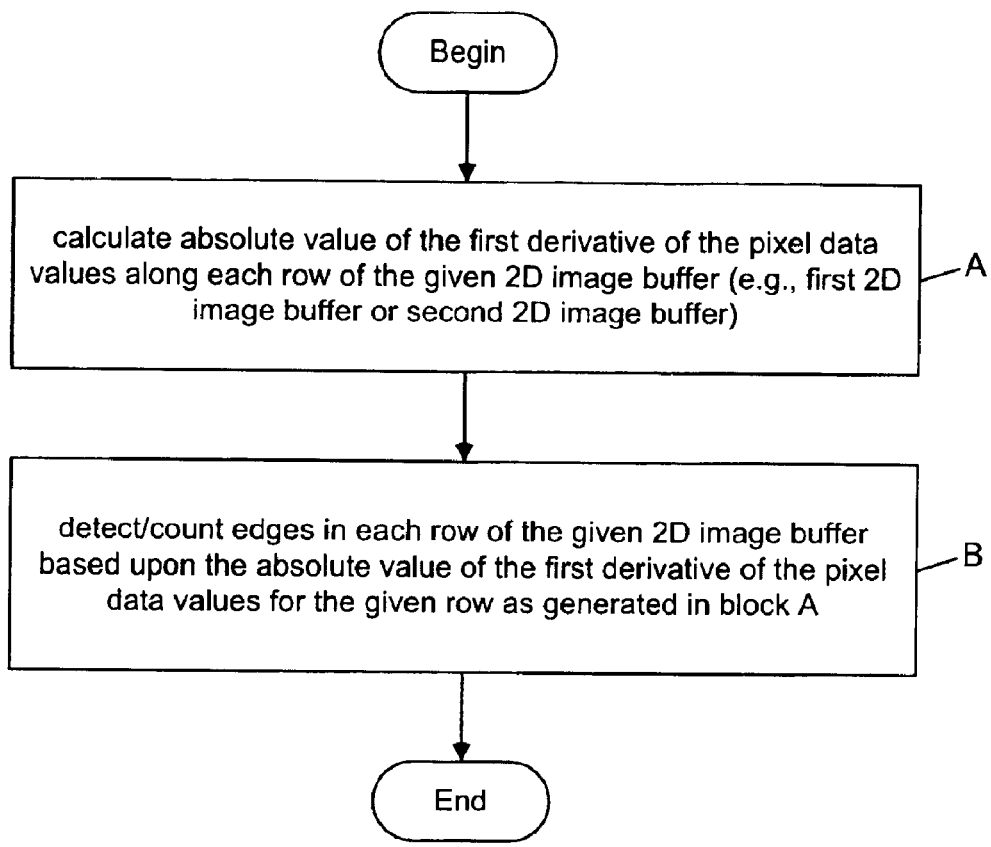
FIG. 6B2

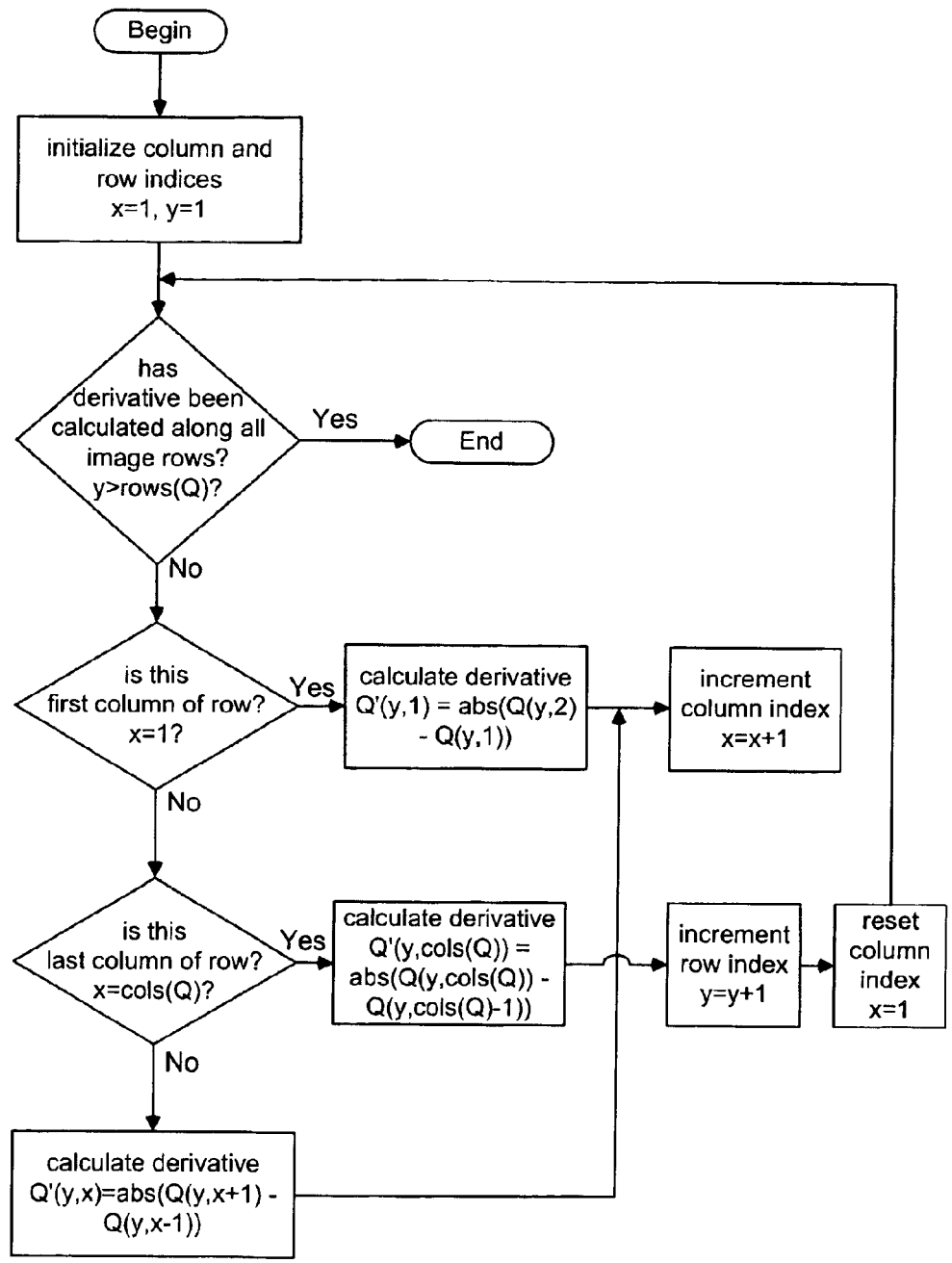
FIG. 6B3

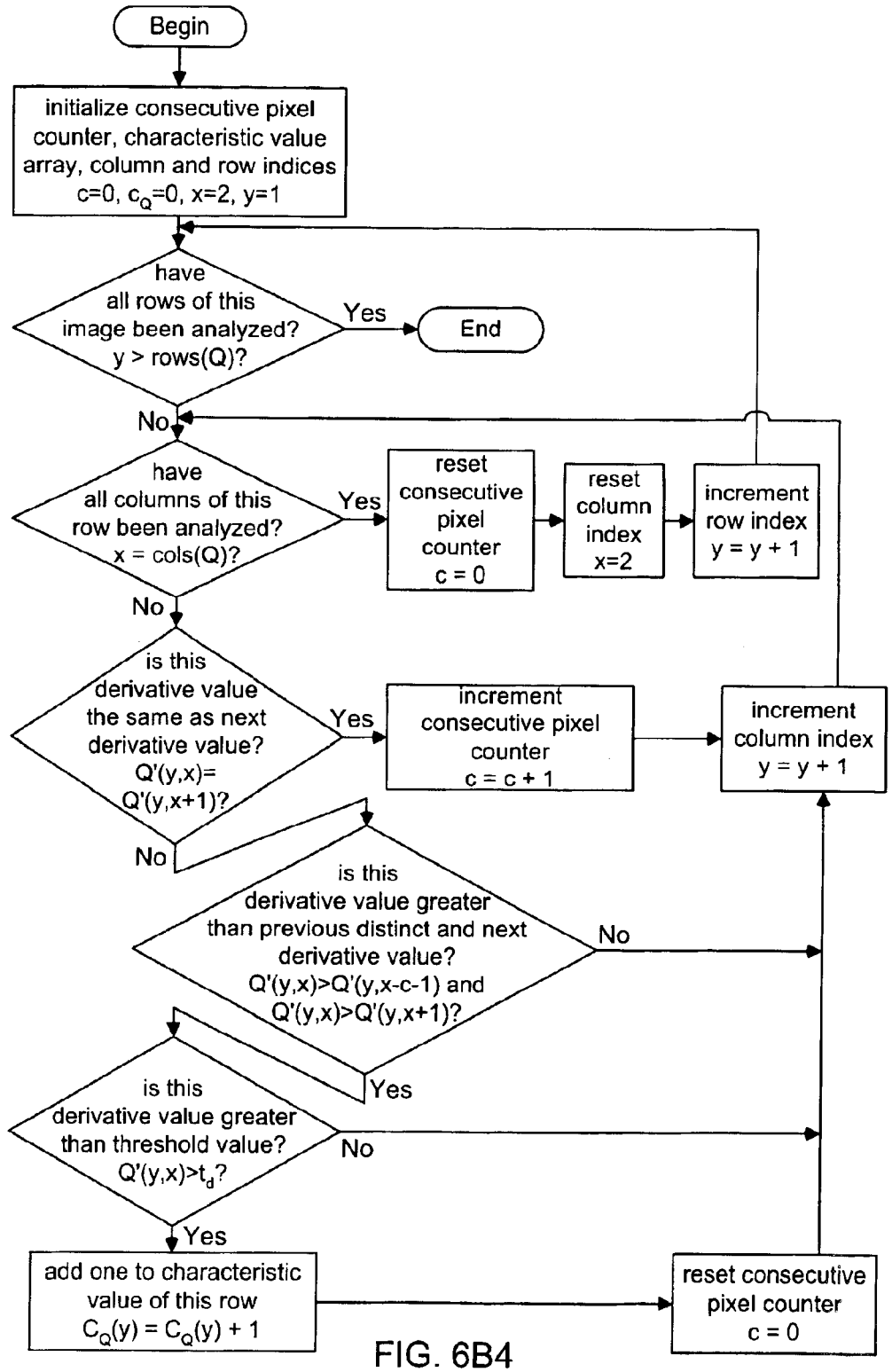
FIG. 6B4

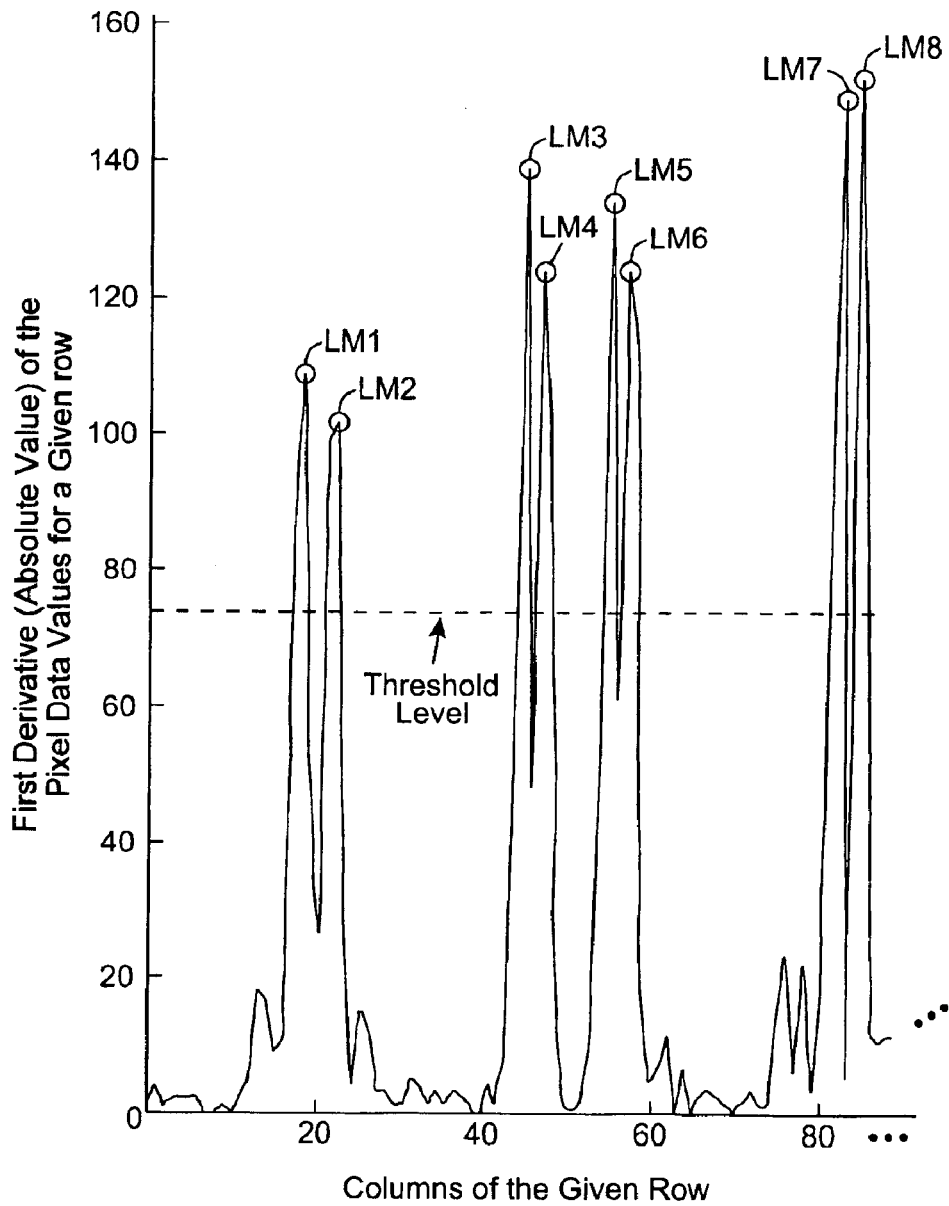
FIG. 6B5

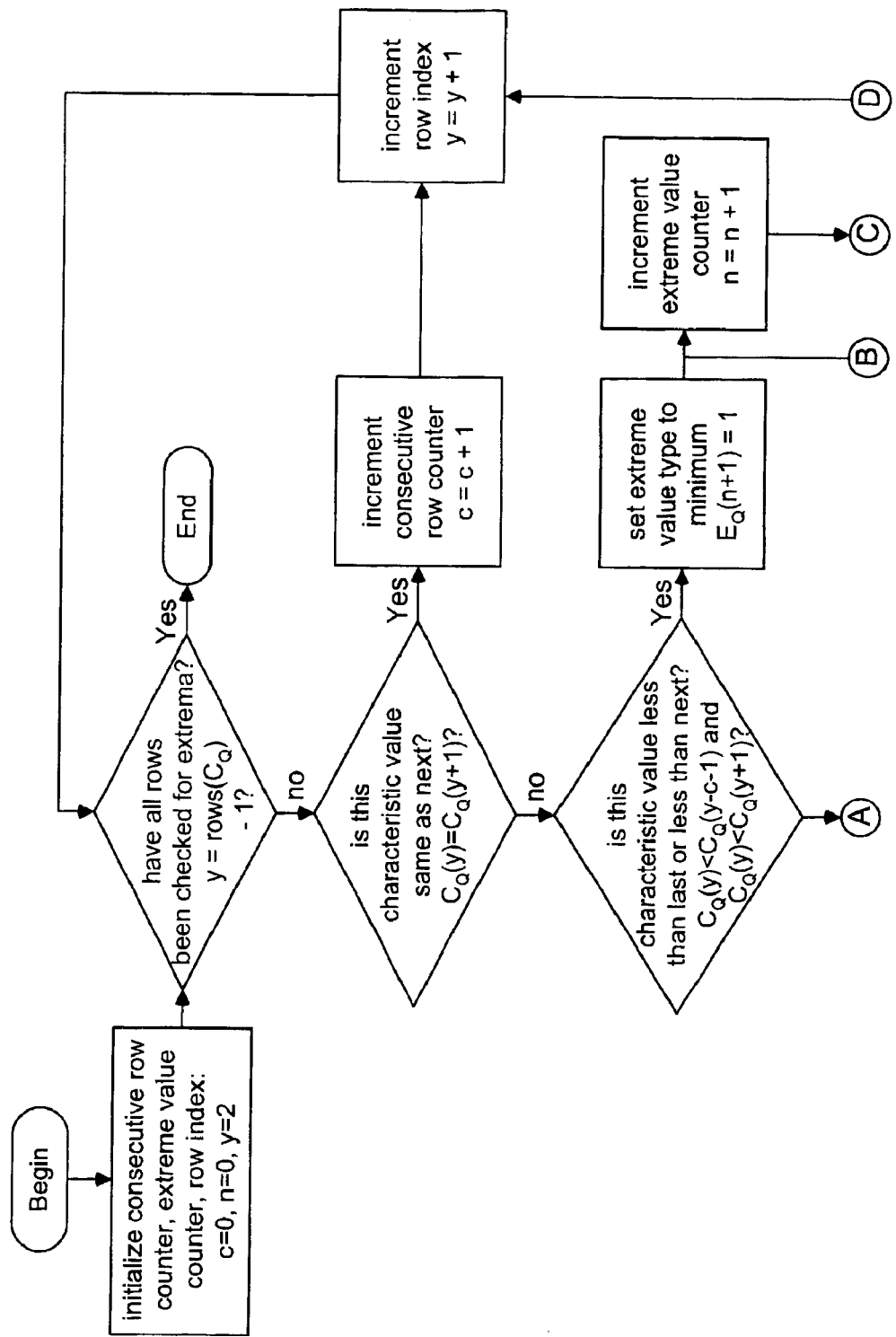
FIG. 6B6A

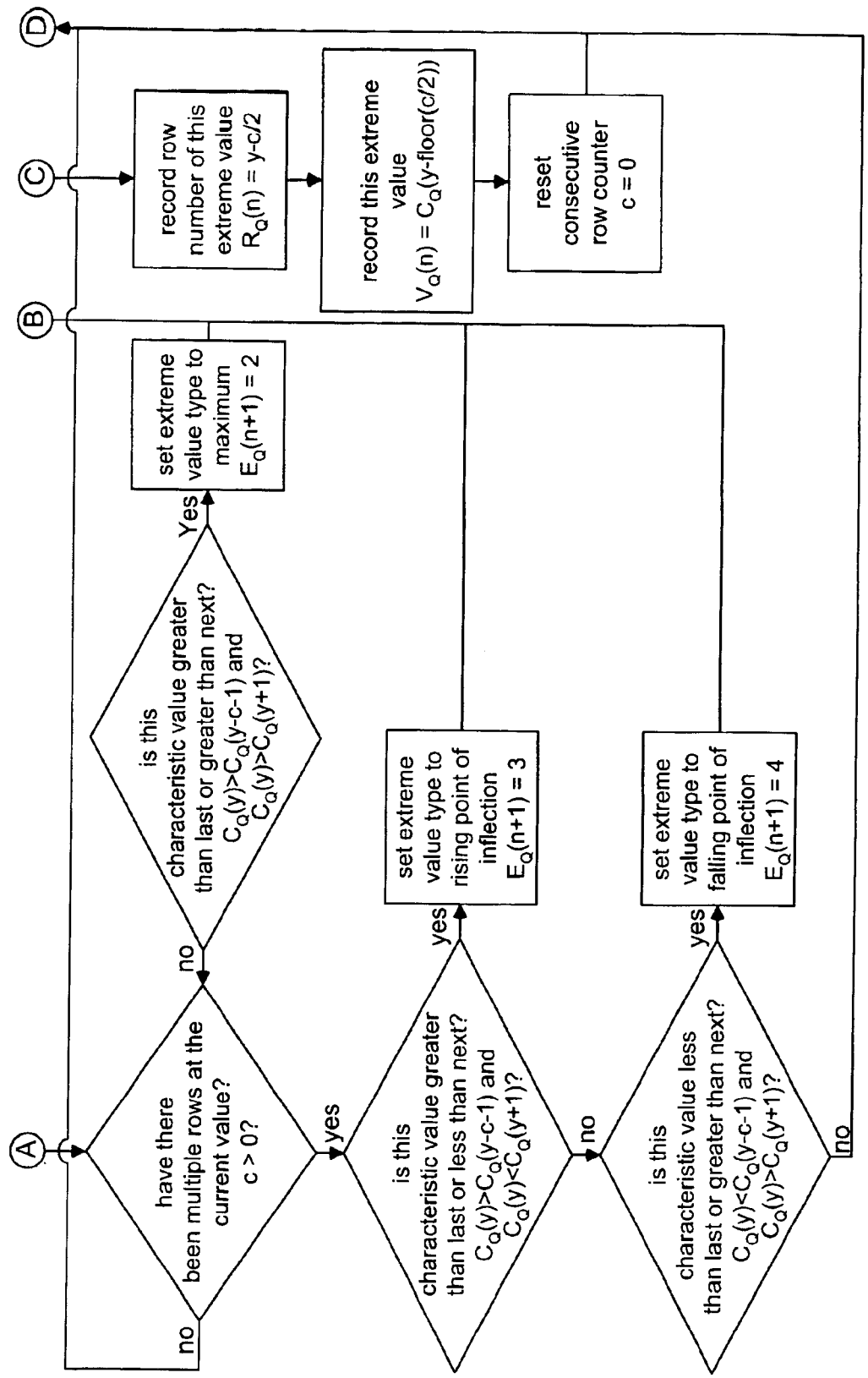
FIG. 6B6B

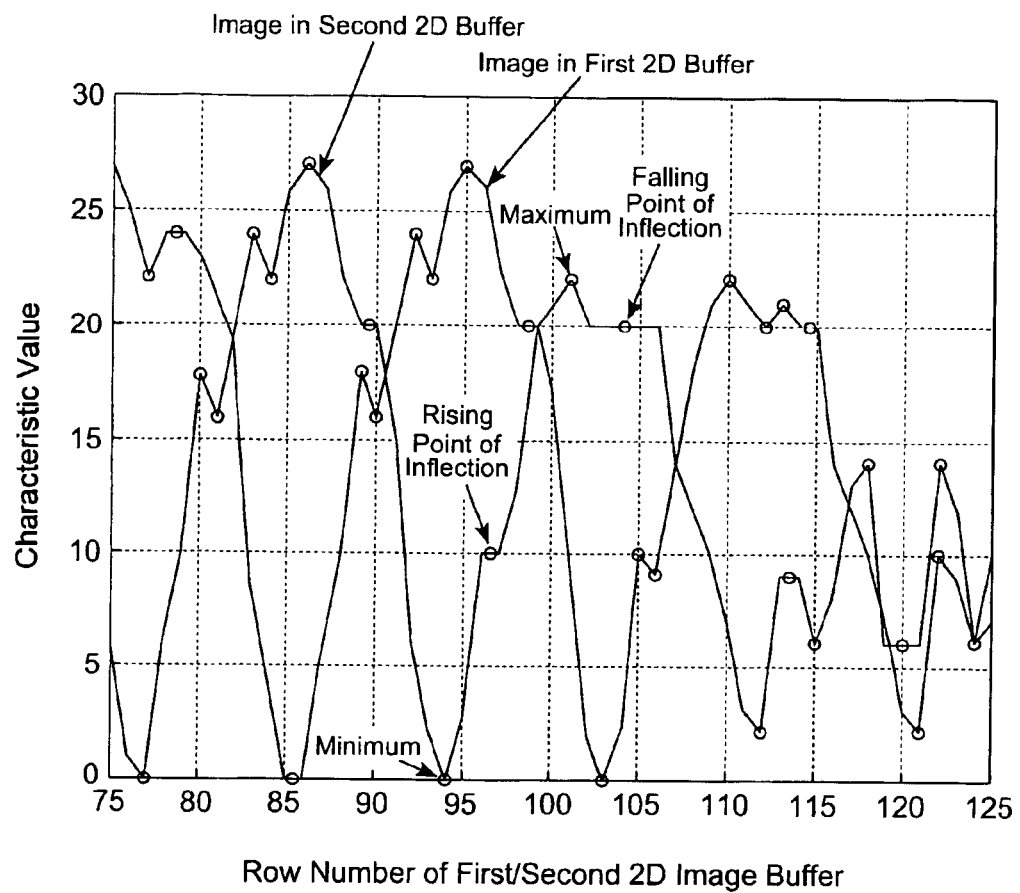
FIG. 6B7

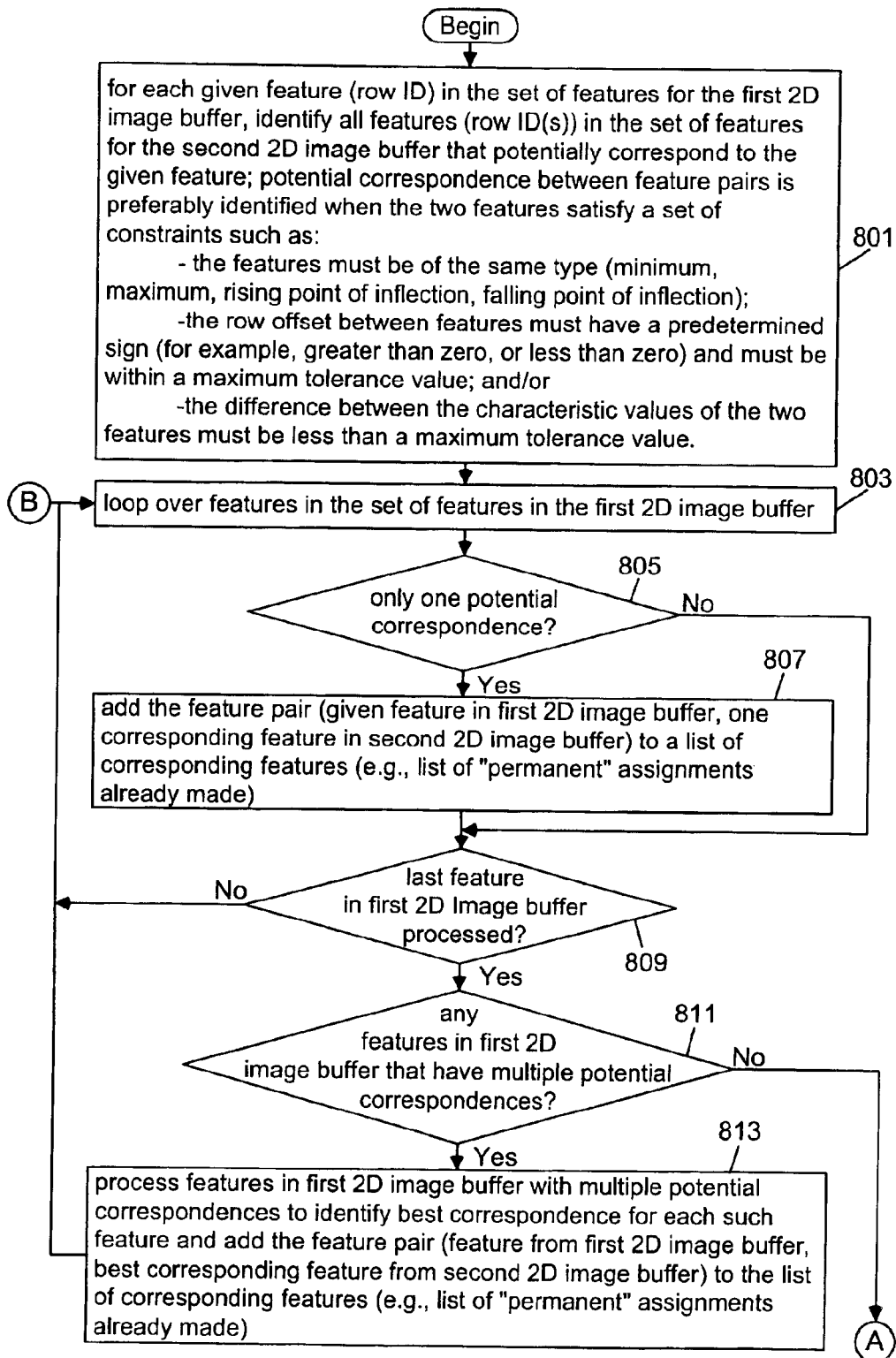
FIG. 6B8(i)

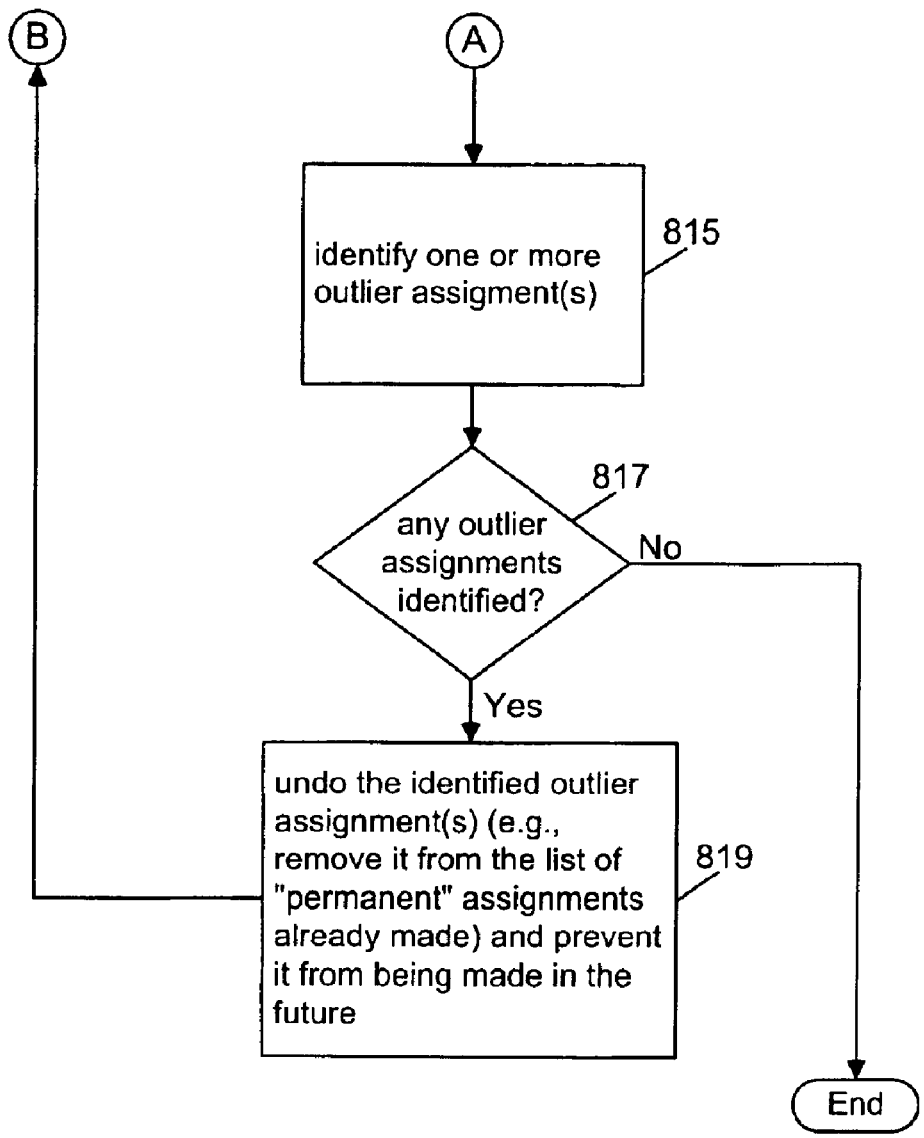
FIG. 6B8(ii)

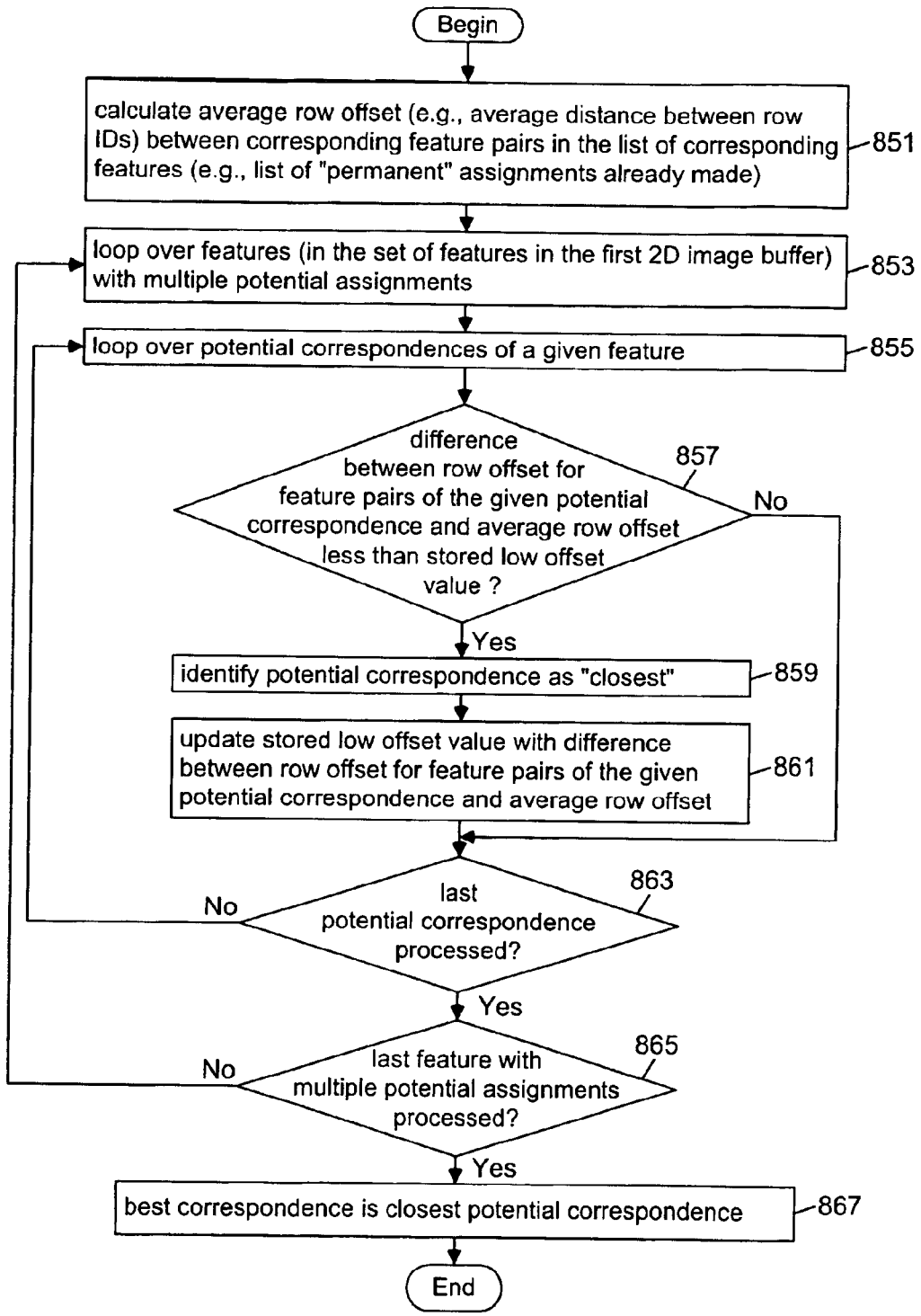
FIG. 6B9

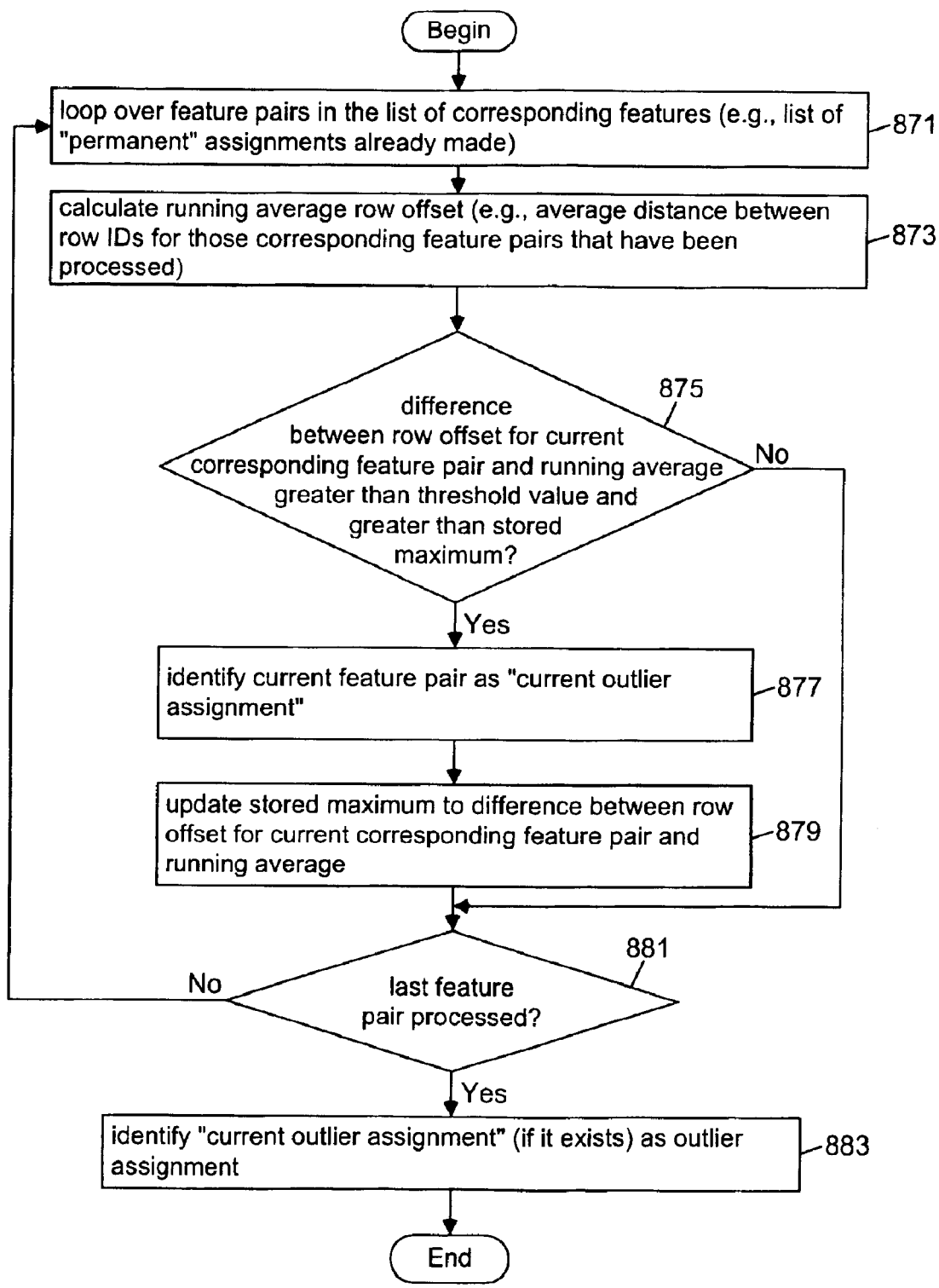
FIG. 6B10

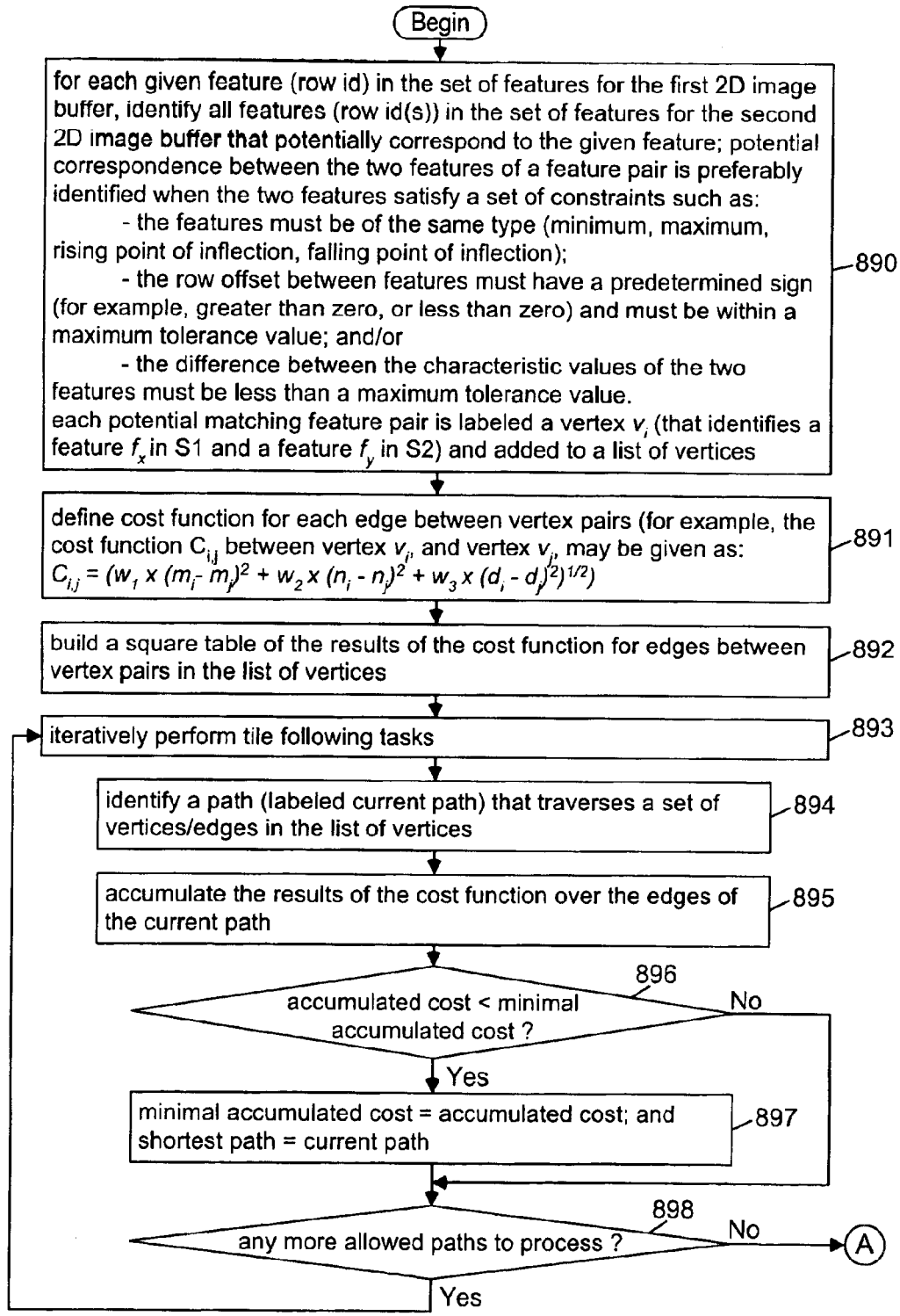
FIG. 6B11(i)

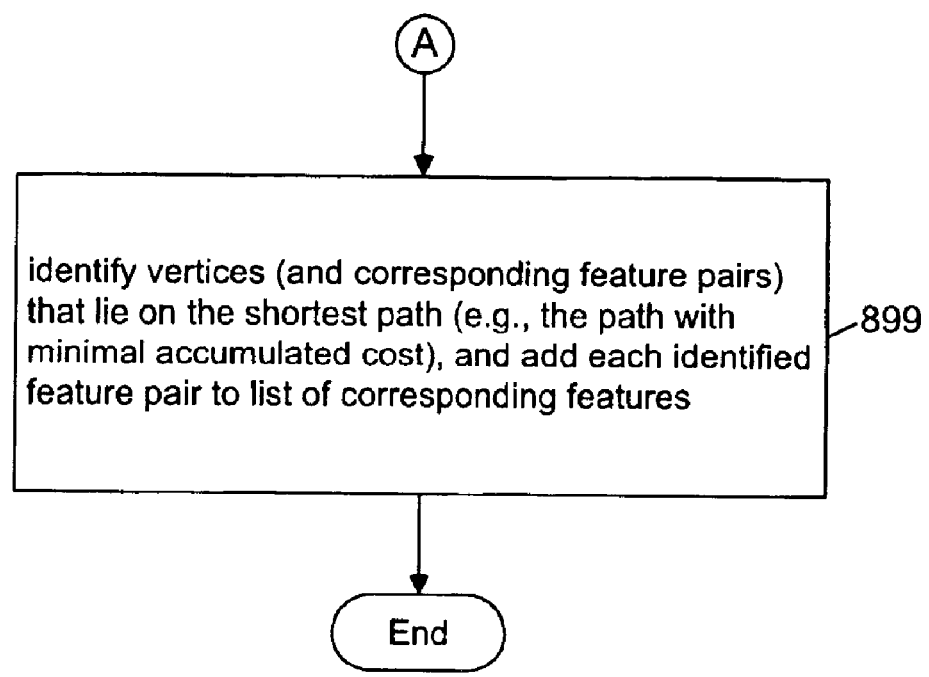
FIG. 6B11(ii)

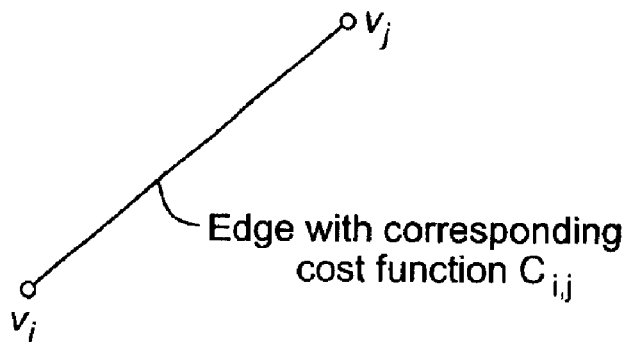
FIG. 6B11(iii)
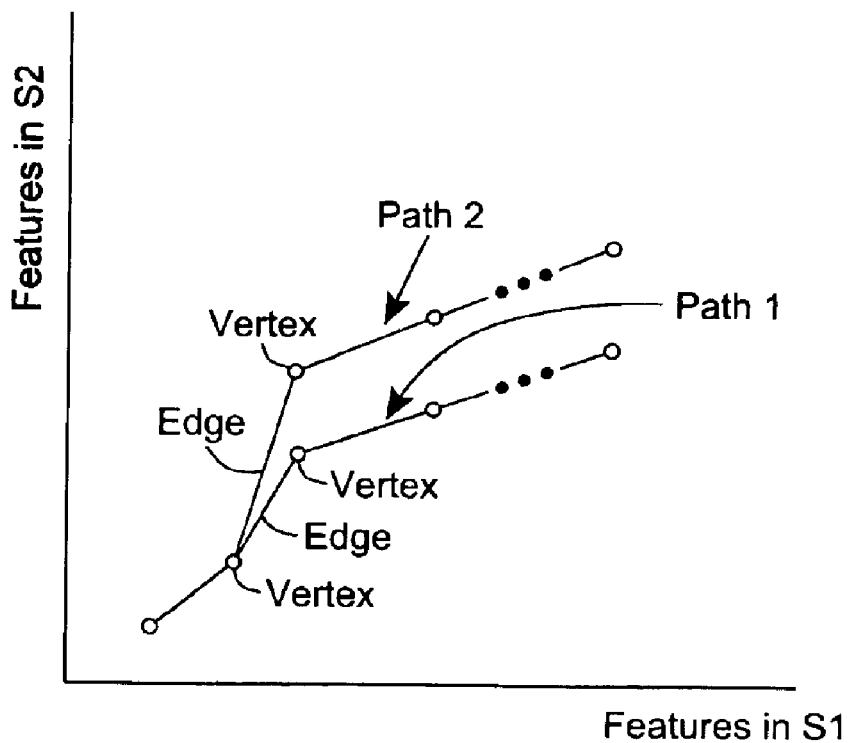
FIG. 6B11(iv)

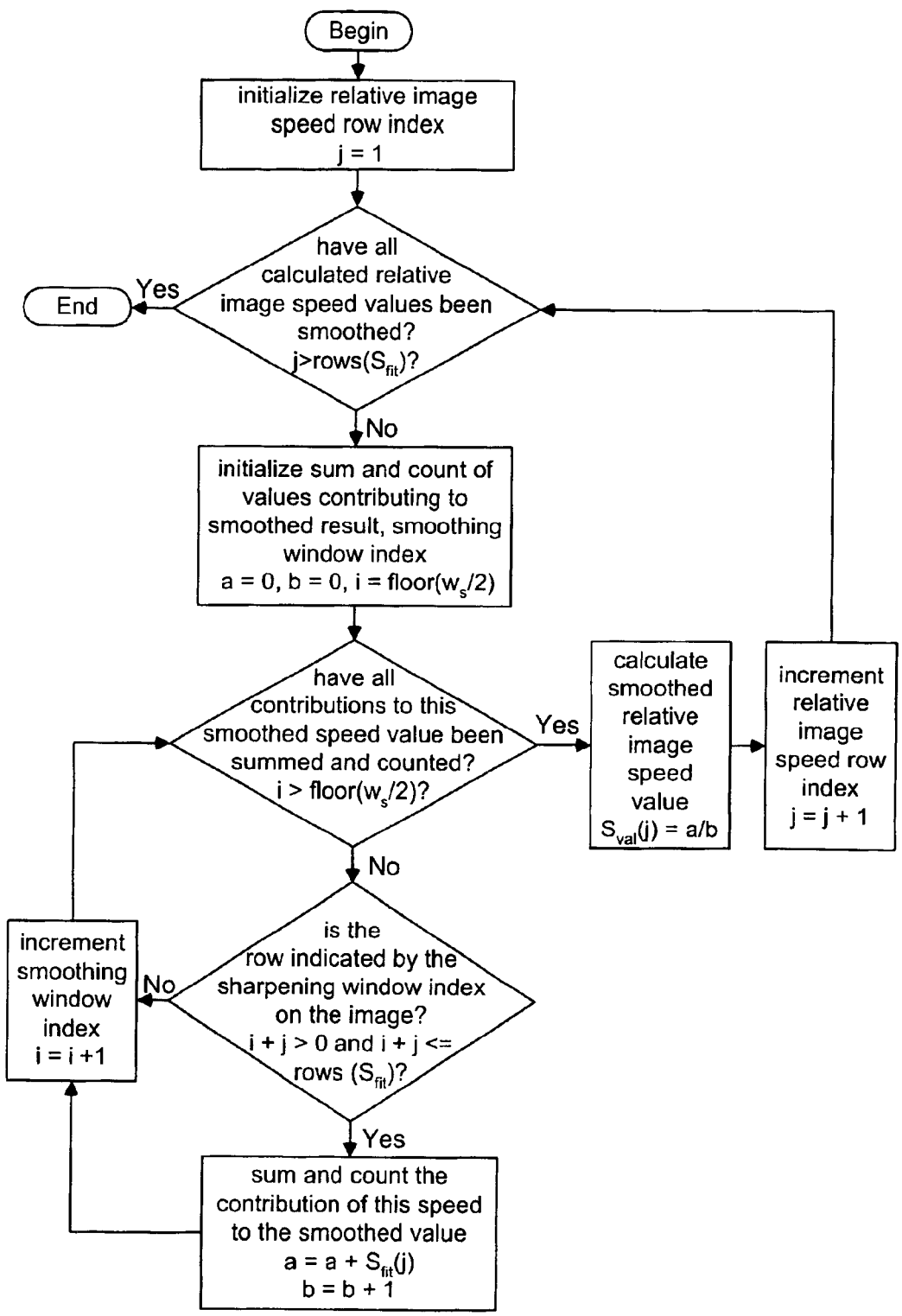
FIG. 6B12

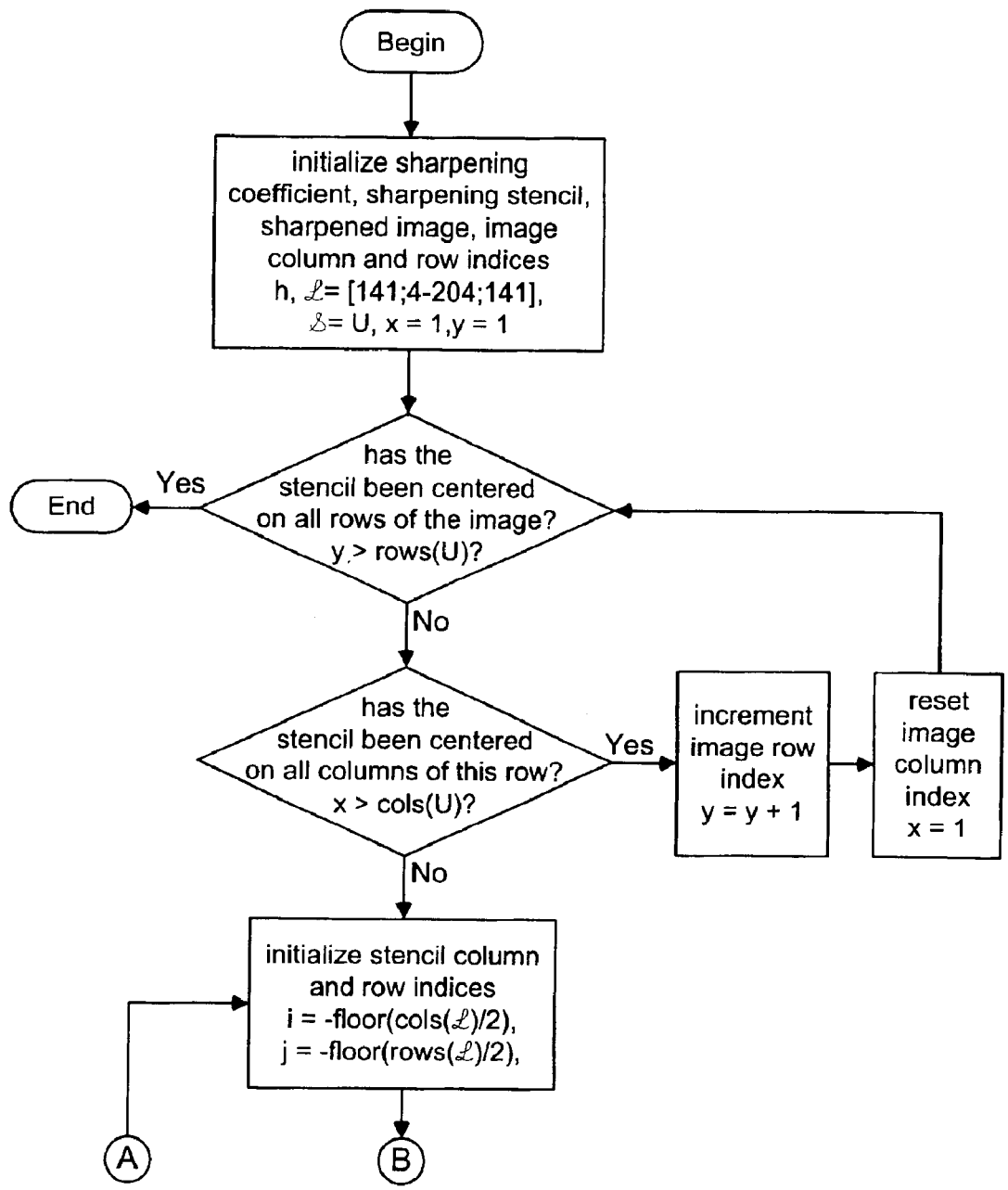
FIG. 7D1

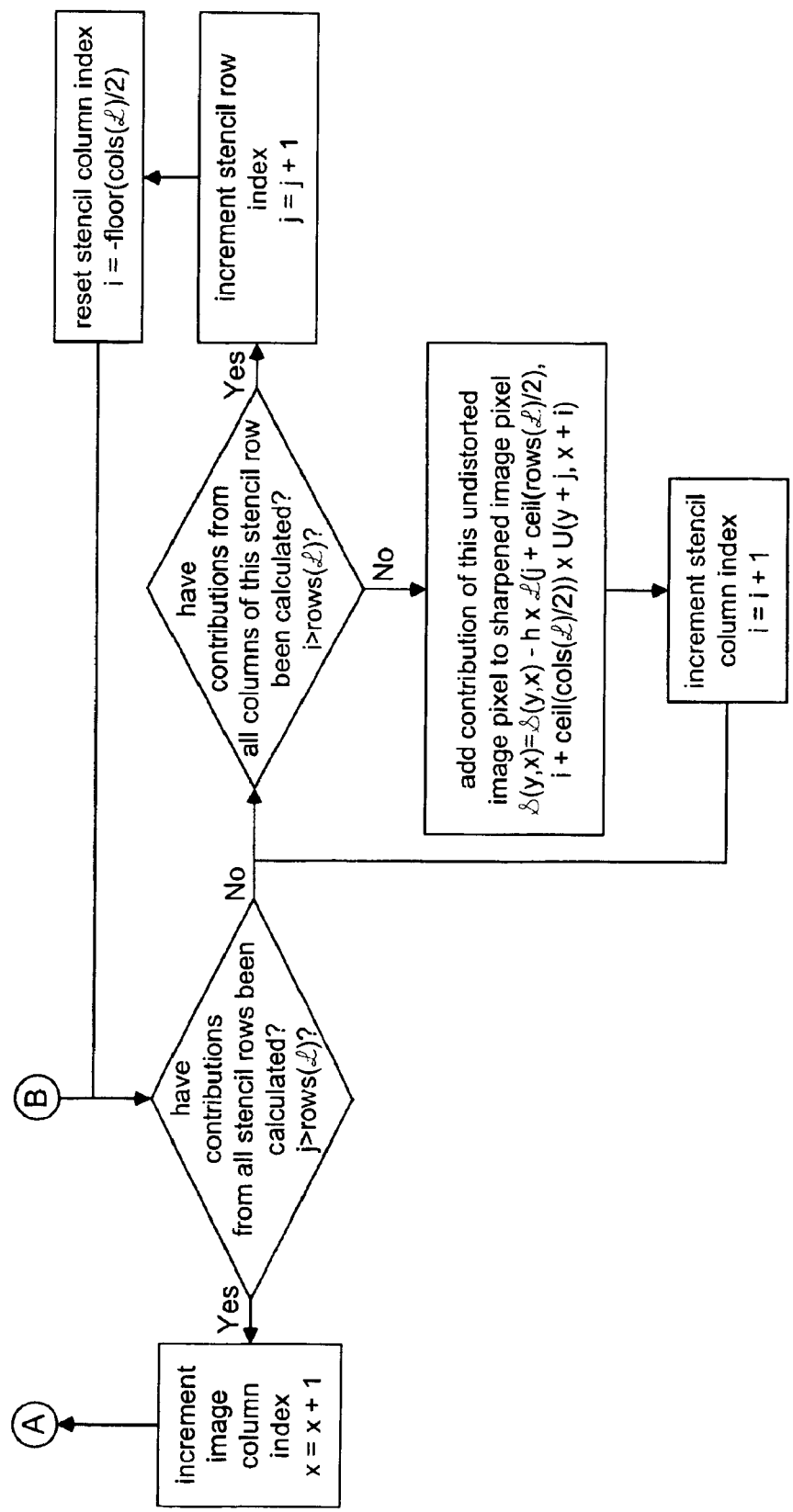
FIG. 7D2

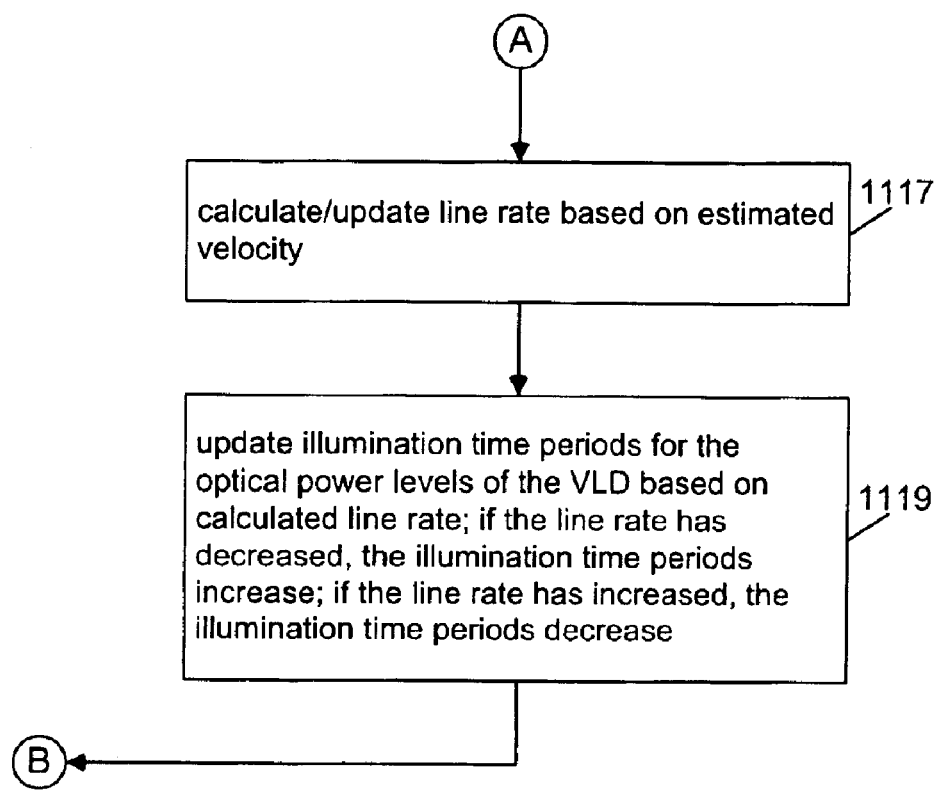
FIG. 11E(ii)

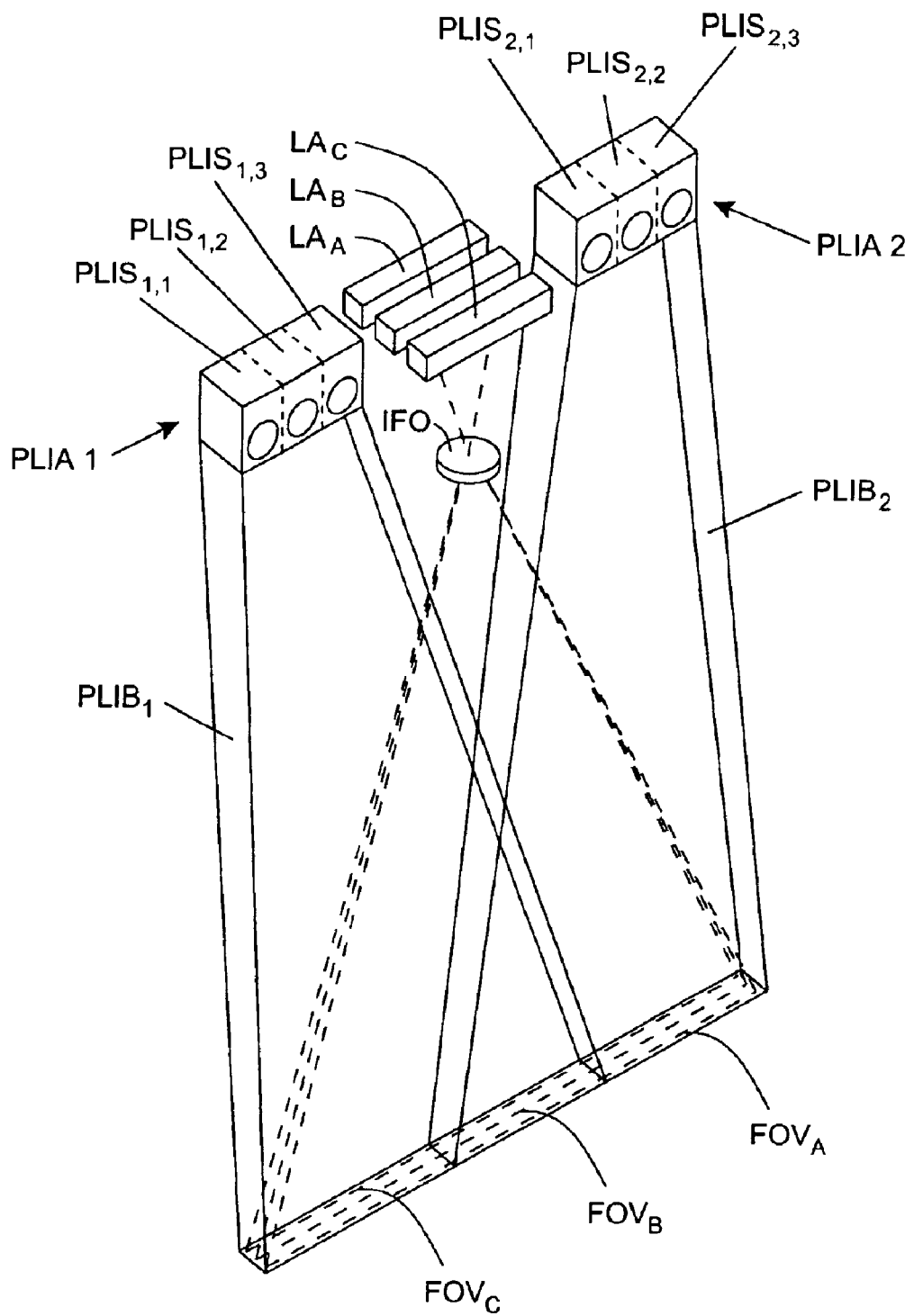
FIG. 13A1

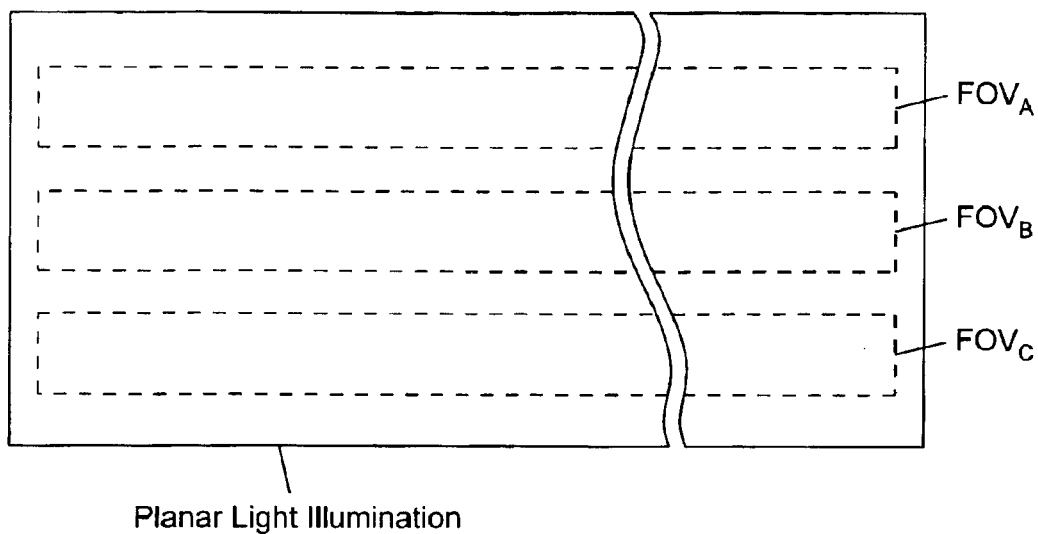
FIG. 13A2
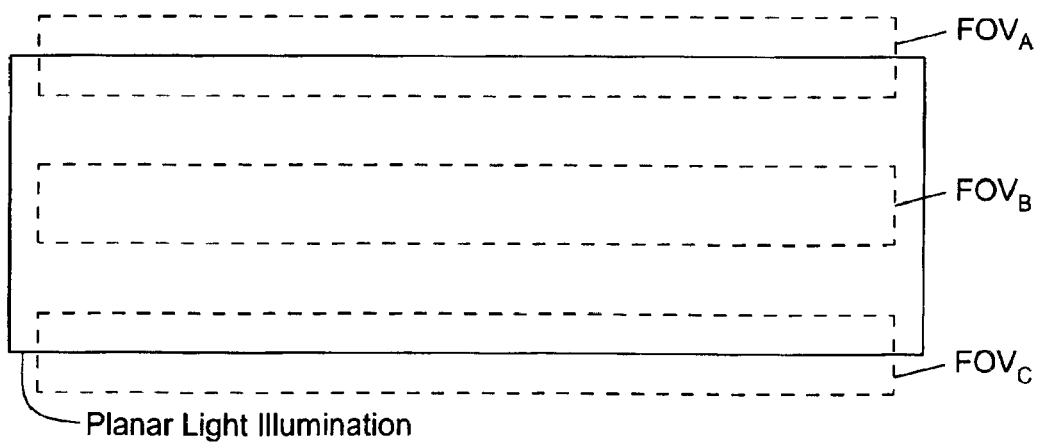
FIG. 13A3

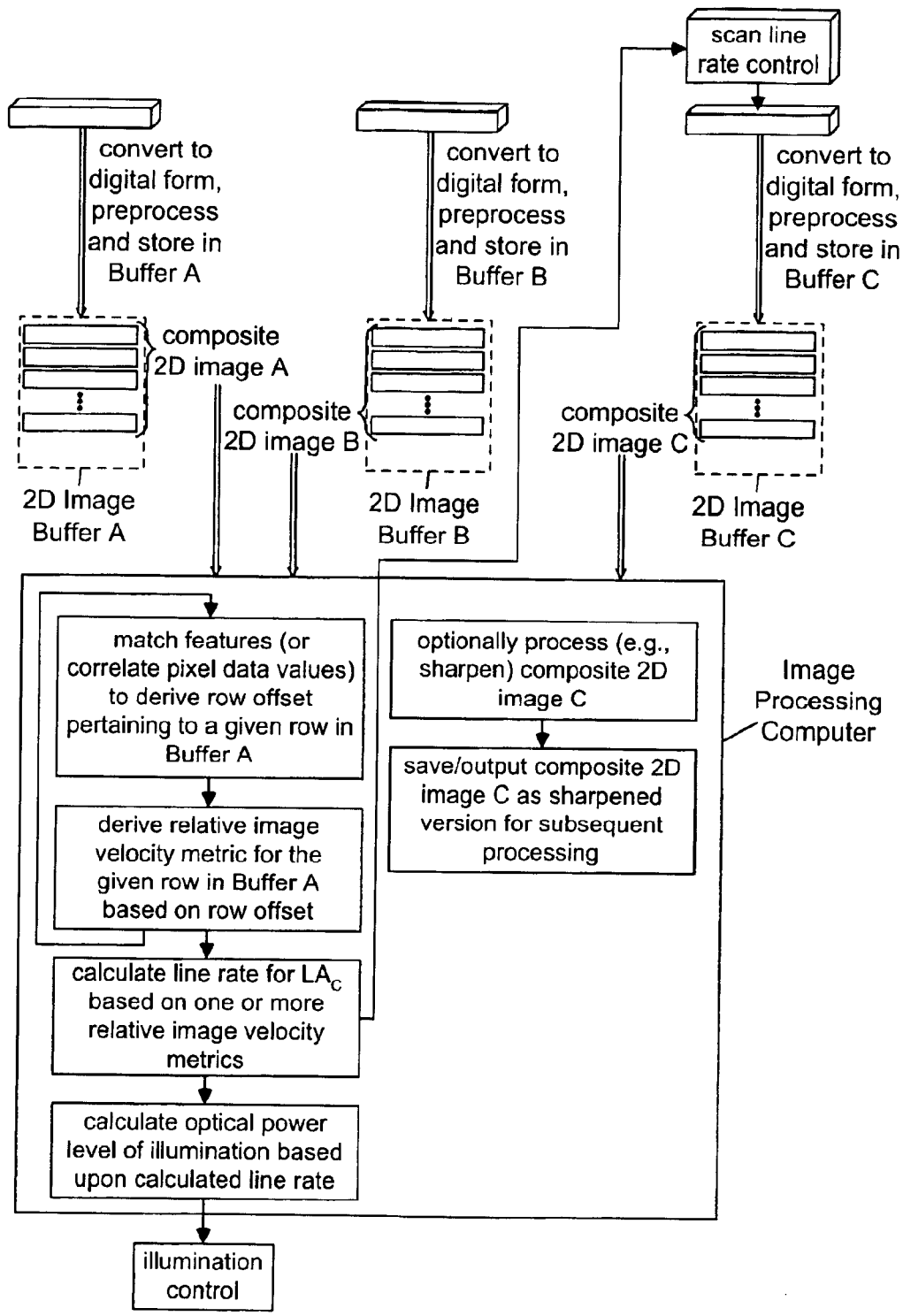
FIG. 13A4

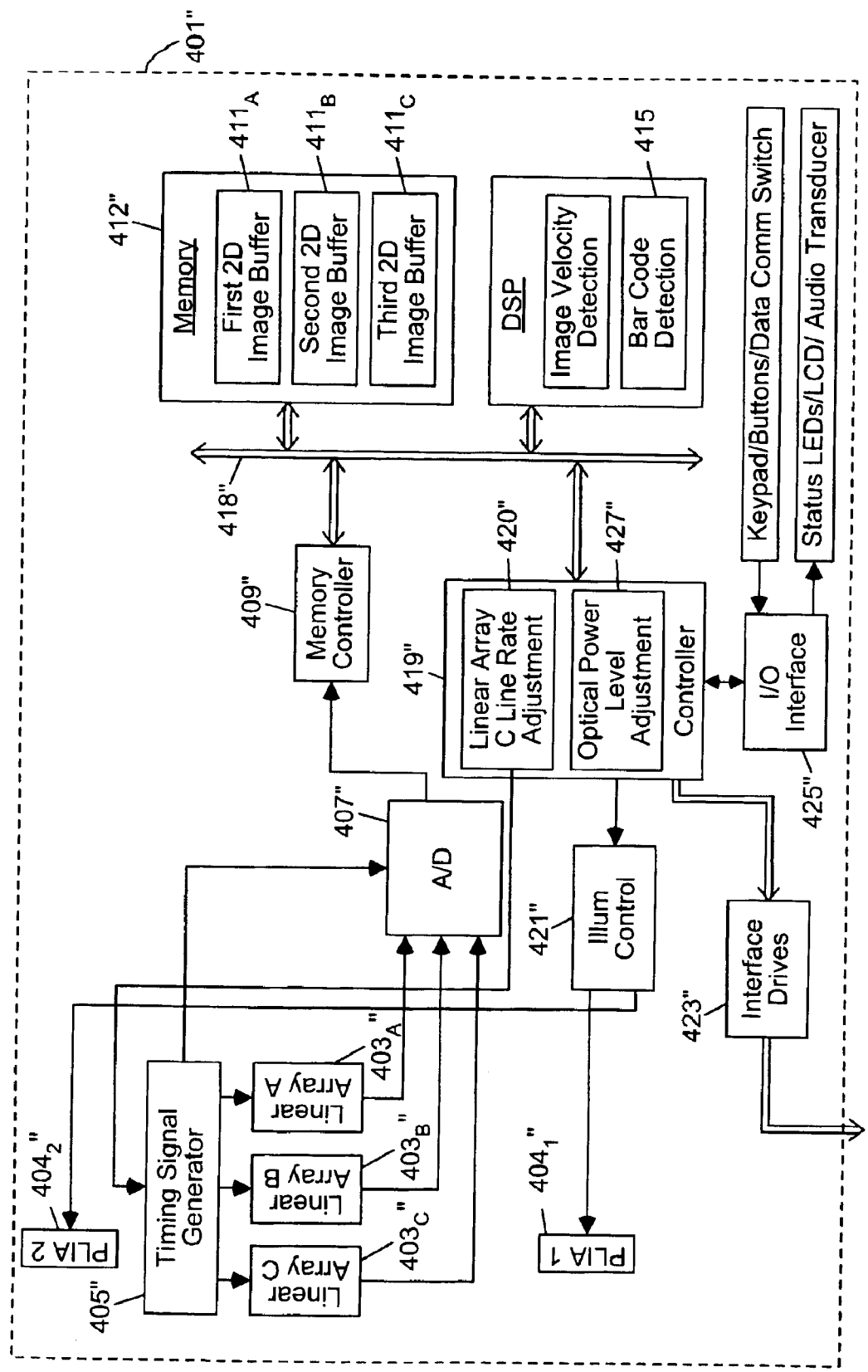
FIG. 13B1

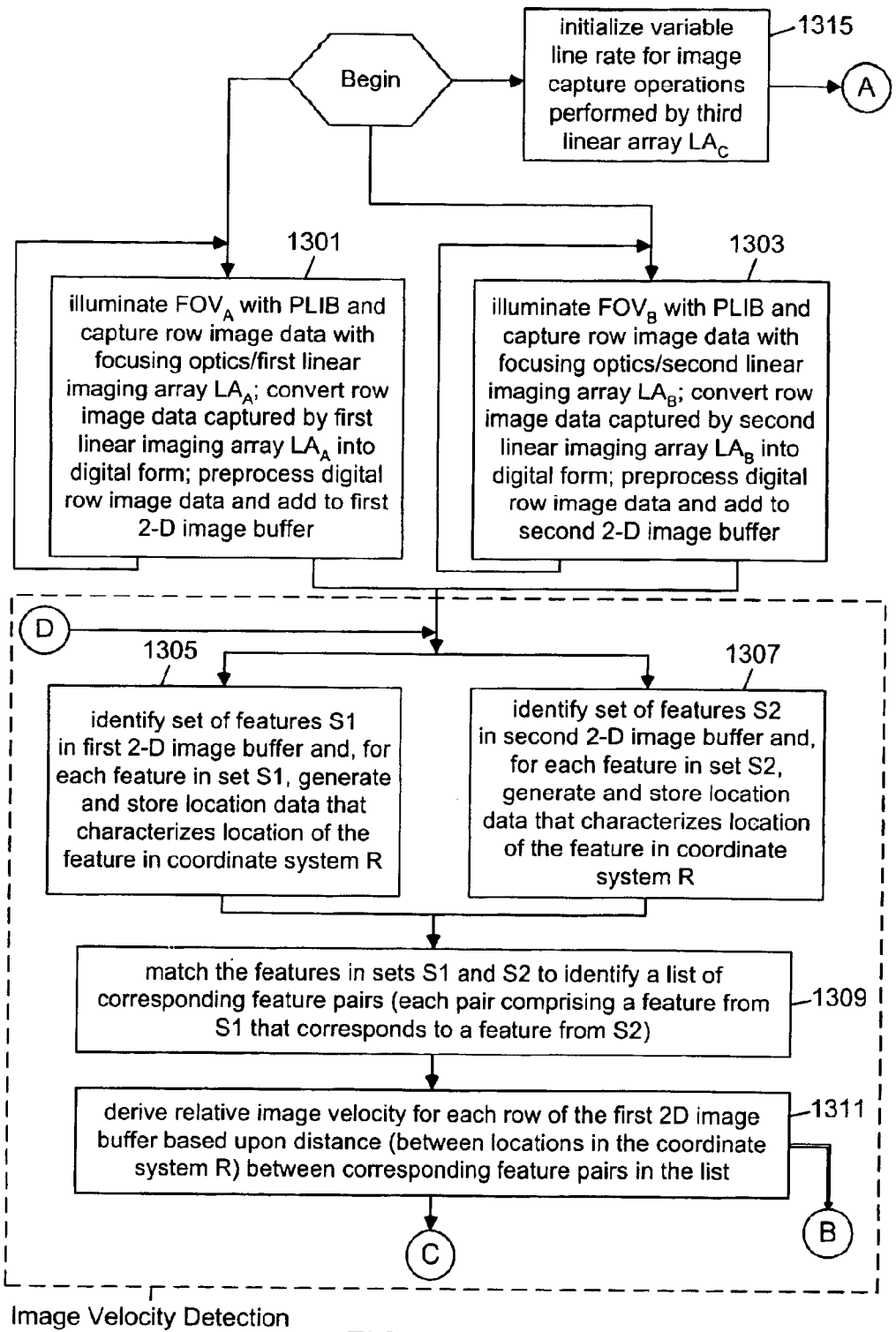
FIG. 13B2A

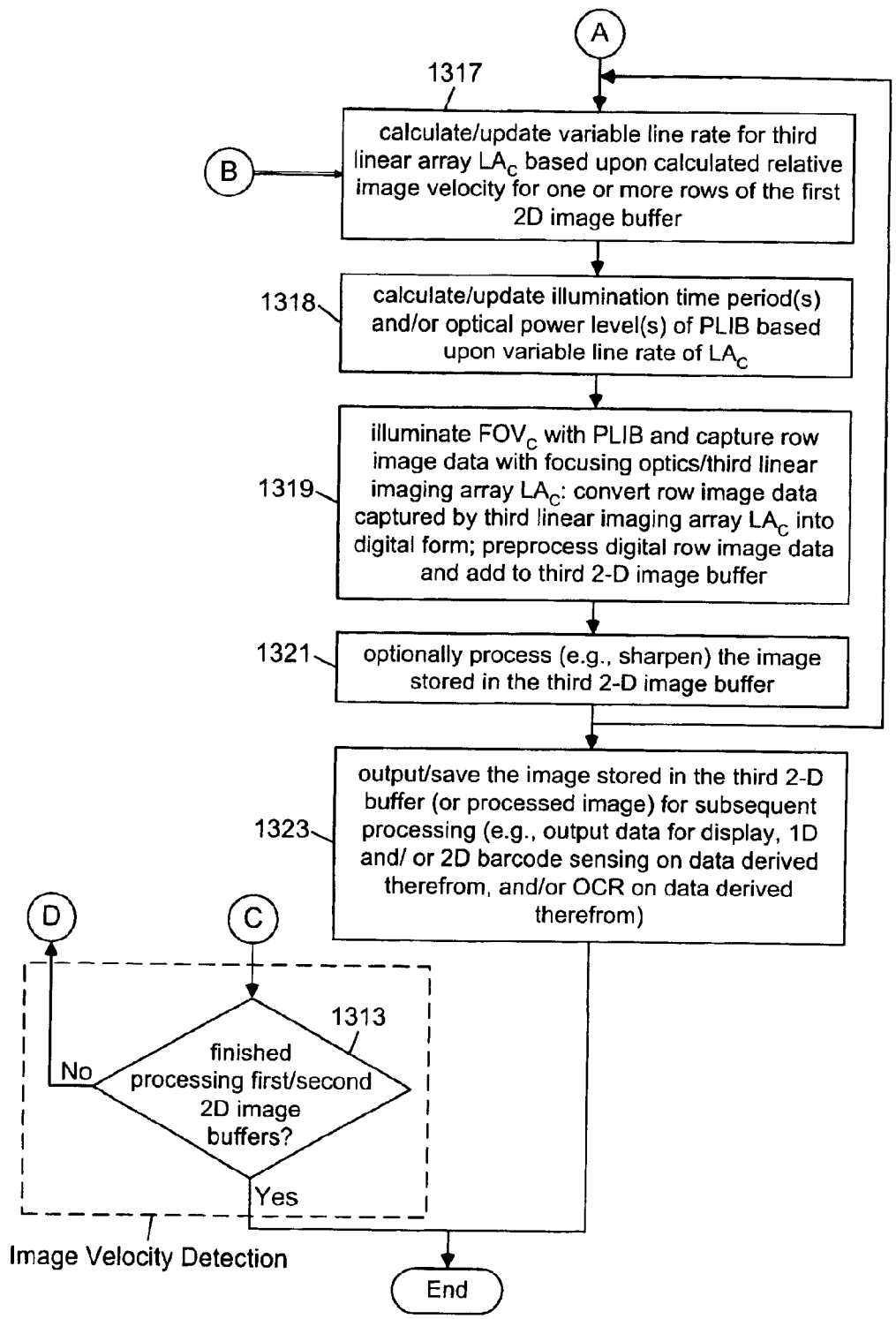
FIG. 13B2B

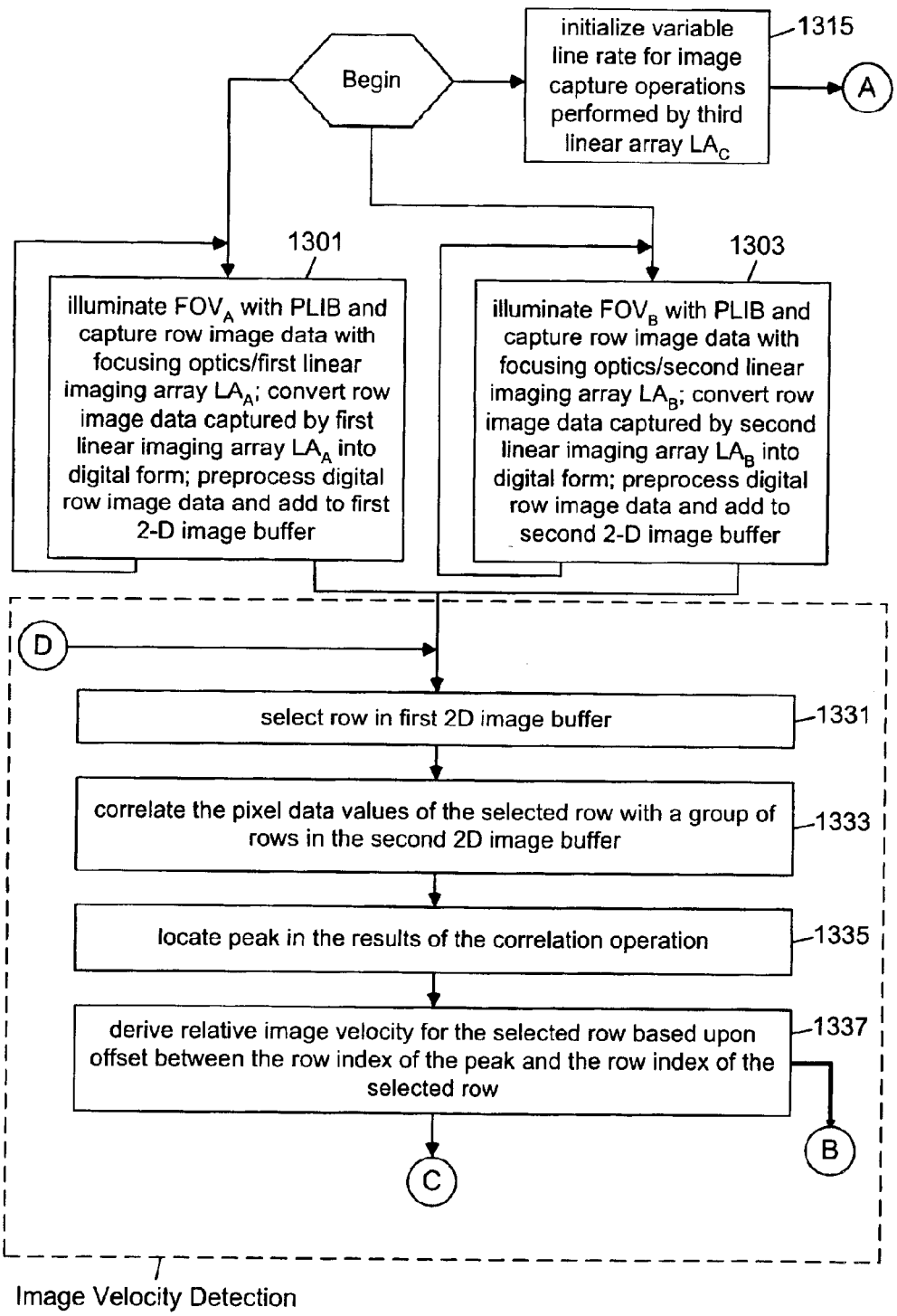
FIG. 13B3A

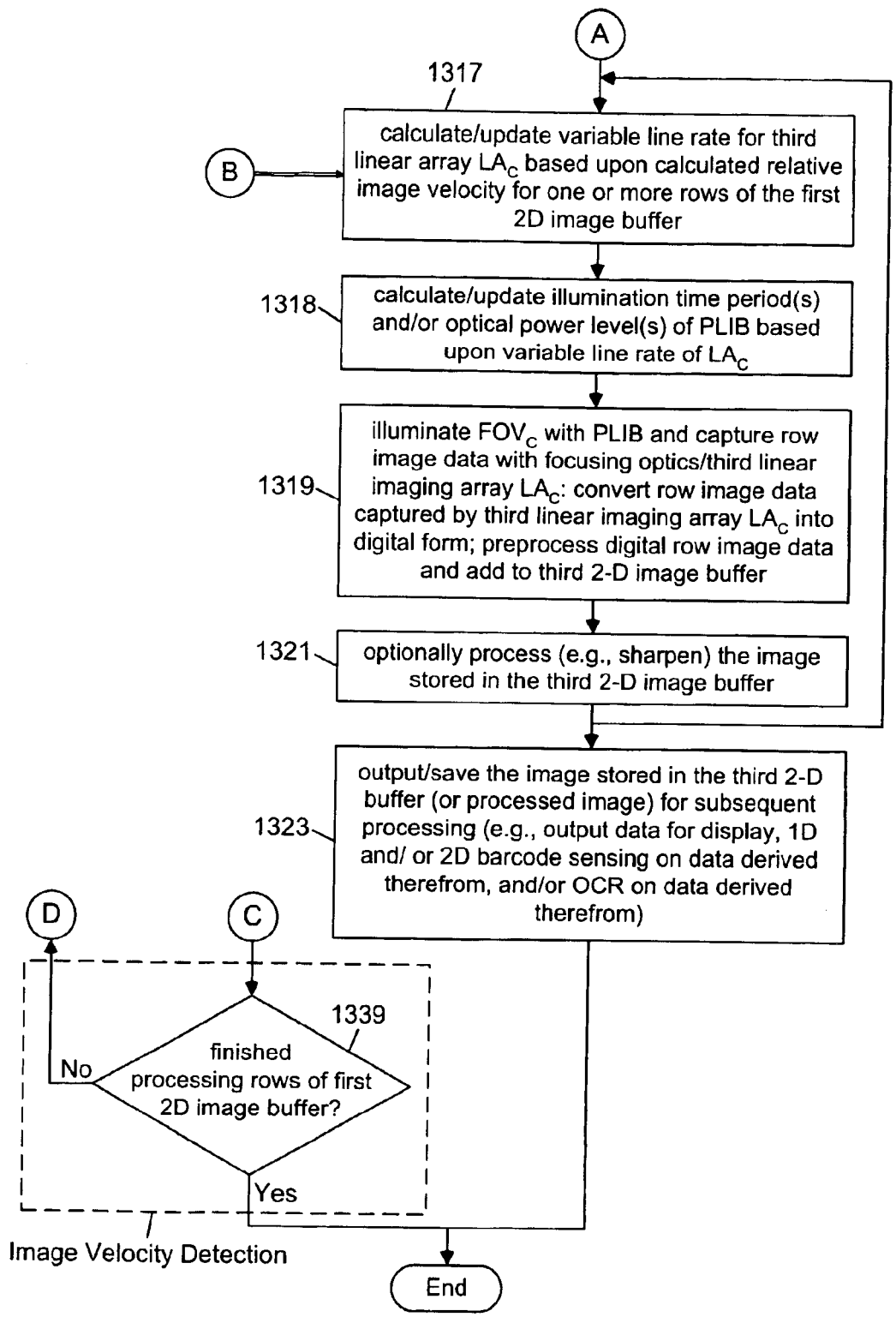
FIG. 13B3B

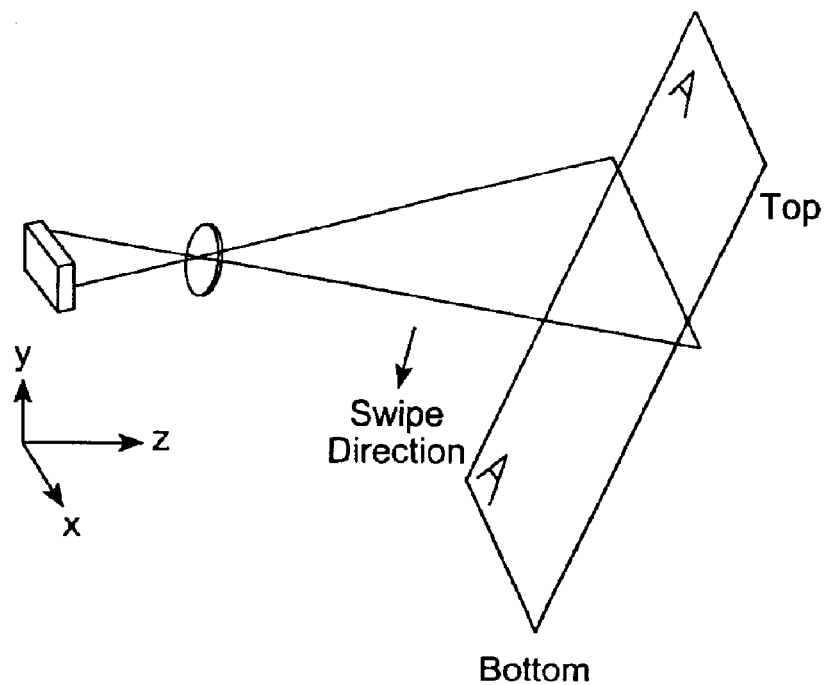
FIG. 14A1
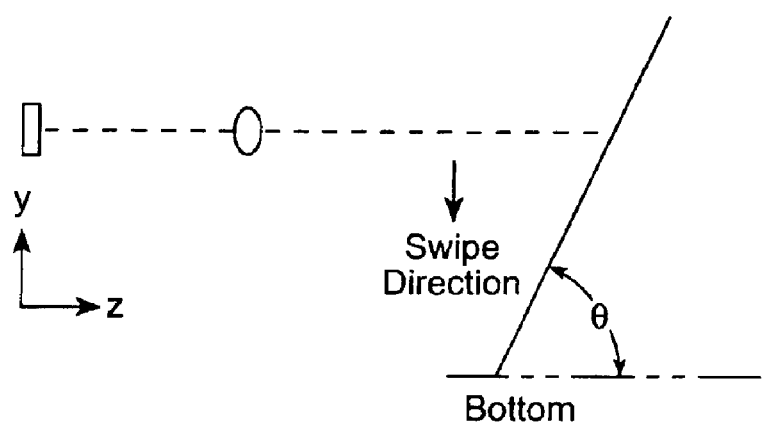
FIG. 14A2

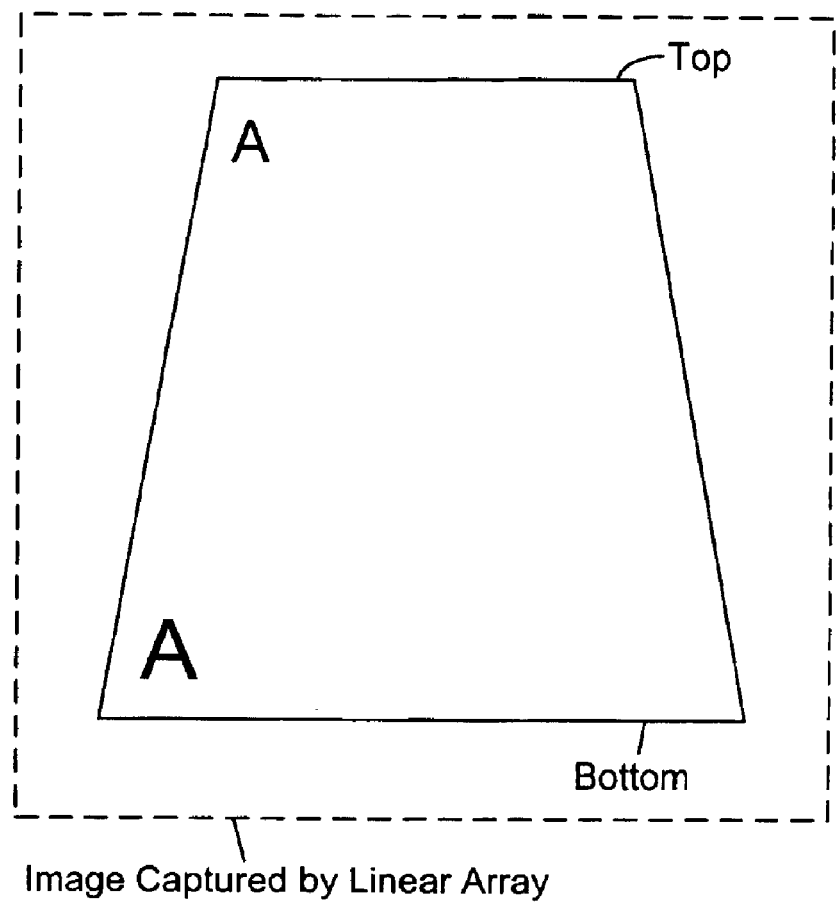
FIG. 14A3
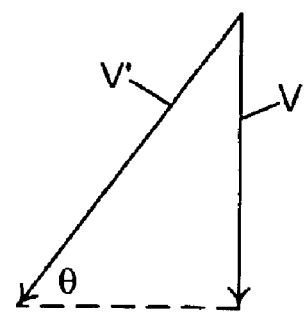
FIG. 14A4

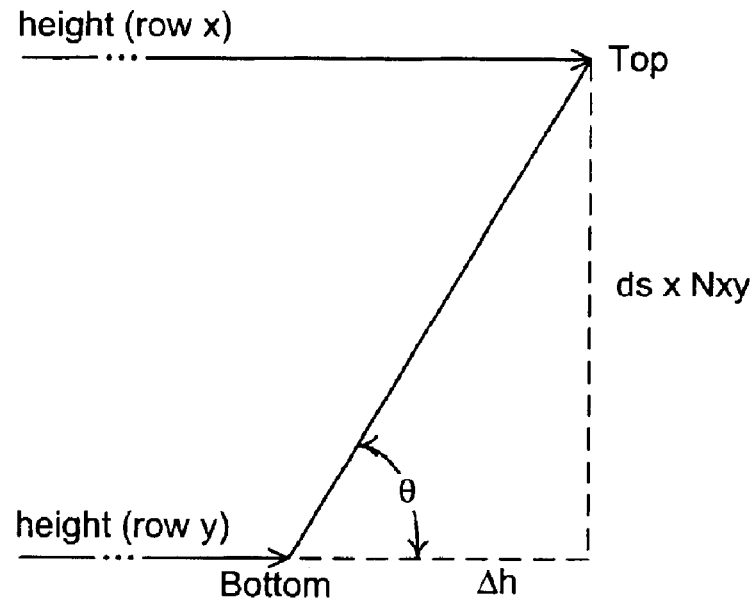
$$\sin\theta = \left(\frac{ds \times Nxy}{\sqrt{(\Delta h)^2 + (ds \times Nxy)^2}}\right)$$
$$V'(\text{row } i) = V(\text{row } i) \times \sin\theta$$
$$V'(\text{row } i) = V(\text{row } i) \times \left(\frac{ds \times Nxy}{\sqrt{(\Delta h)^2 + (ds \times Nxy)^2}}\right)$$
Global θ
FIG. 14A5(1)

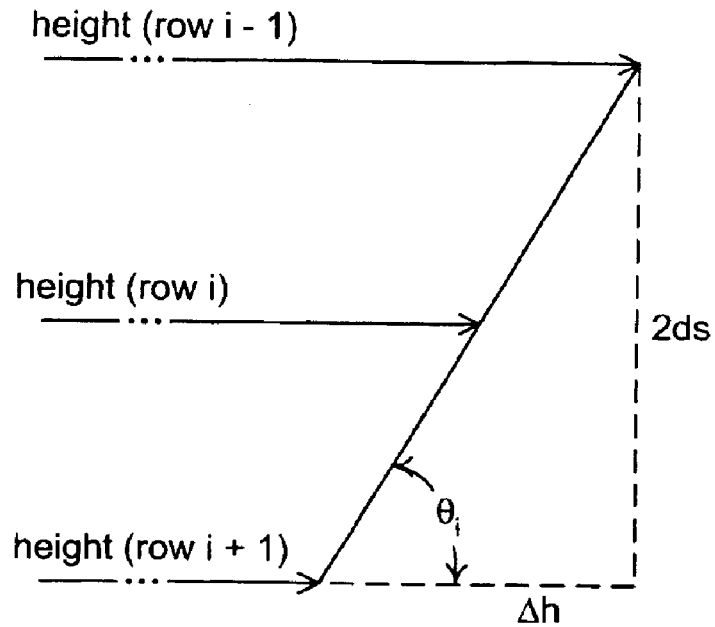
$$\sin \theta_i = \left( \frac{2ds}{\sqrt{(\Delta h)^2 + (2ds)^2}} \right)$$
$$V'(\text{row } i) = V(\text{row } i) \times \sin \theta_i$$
$$V'(\text{row } i) = V(\text{row } i) \times \left( \frac{2ds}{\sqrt{(\Delta h)^2 + (2ds)^2}} \right)$$
Local $\theta$
FIG. 14A5(2)

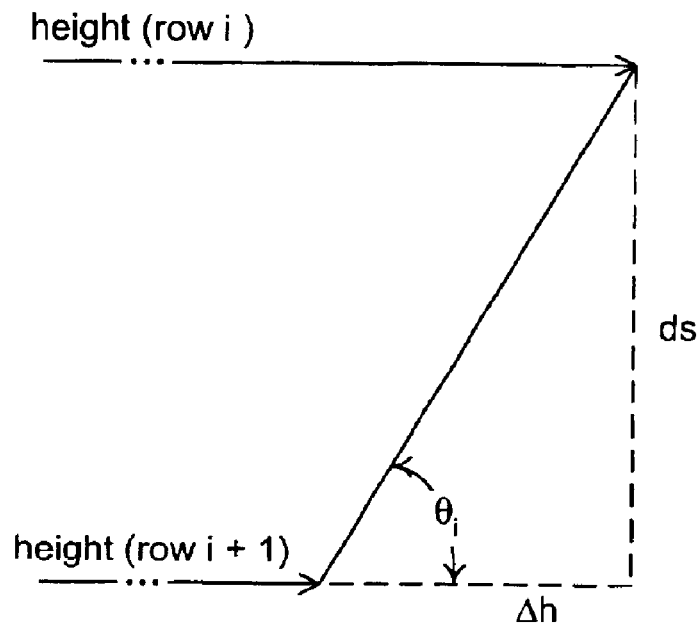
$$\sin \theta_i = \left( \frac{ds}{\sqrt{(\Delta h)^2 + (ds)^2}} \right)$$
$V'(\text{row } i) = V(\text{row } i) \times \sin \theta_i$
$$V'(\text{row } i) = V(\text{row } i) \times \left( \frac{ds}{\sqrt{(\Delta h)^2 + (ds)^2}} \right)$$
Local θ
FIG. 14A5(3)

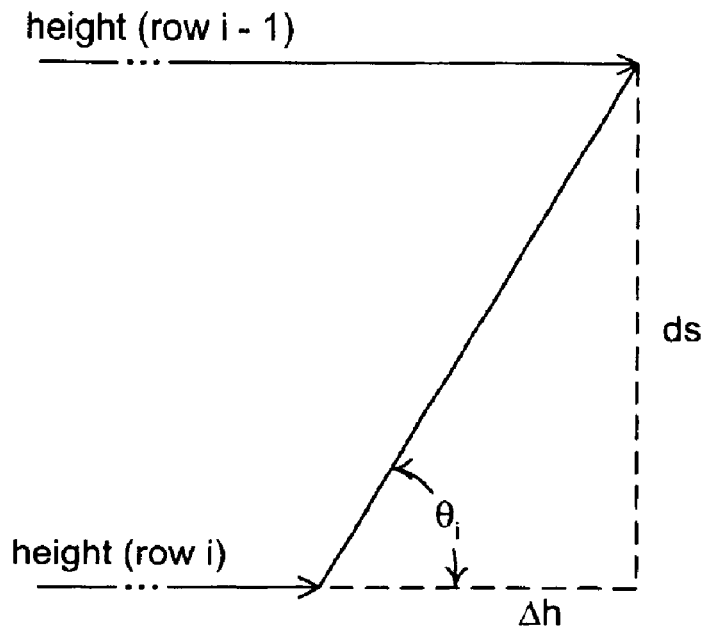
$$\sin \theta_i = \left( \frac{ds}{\sqrt{(\Delta h)^2 + (ds)^2}} \right)$$
$$V'(\text{row } i) = V(\text{row } i) \times \sin \theta_i$$
$$V'(\text{row } i) = V(\text{row } i) \times \left( \frac{ds}{\sqrt{(\Delta h)^2 + (ds)^2}} \right)$$
Local θ
FIG. 14A5(4)

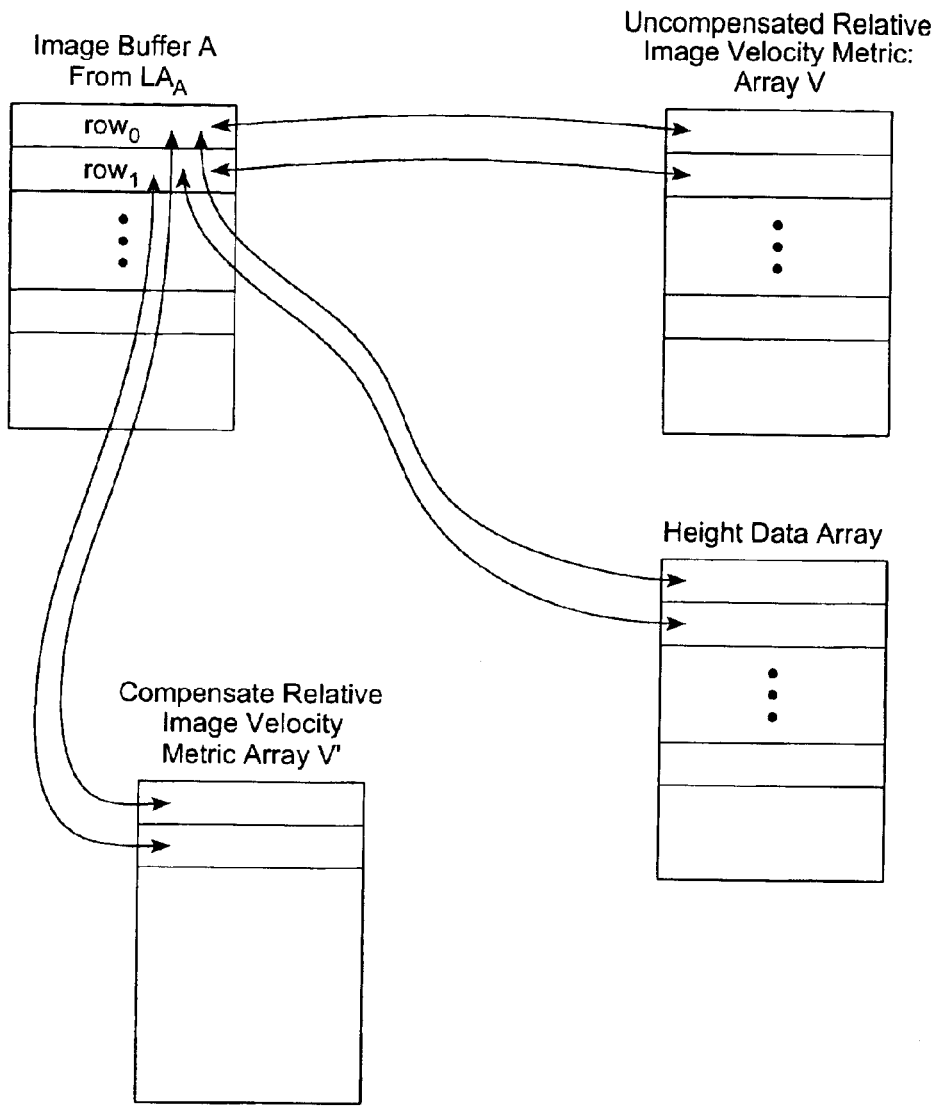
Where: $V'(A_i)$ = compensated relative image velocity for row i in image buffer A
$V'(A_i) = V(A_i) \times \sin\theta_i$
FIG. 14A6

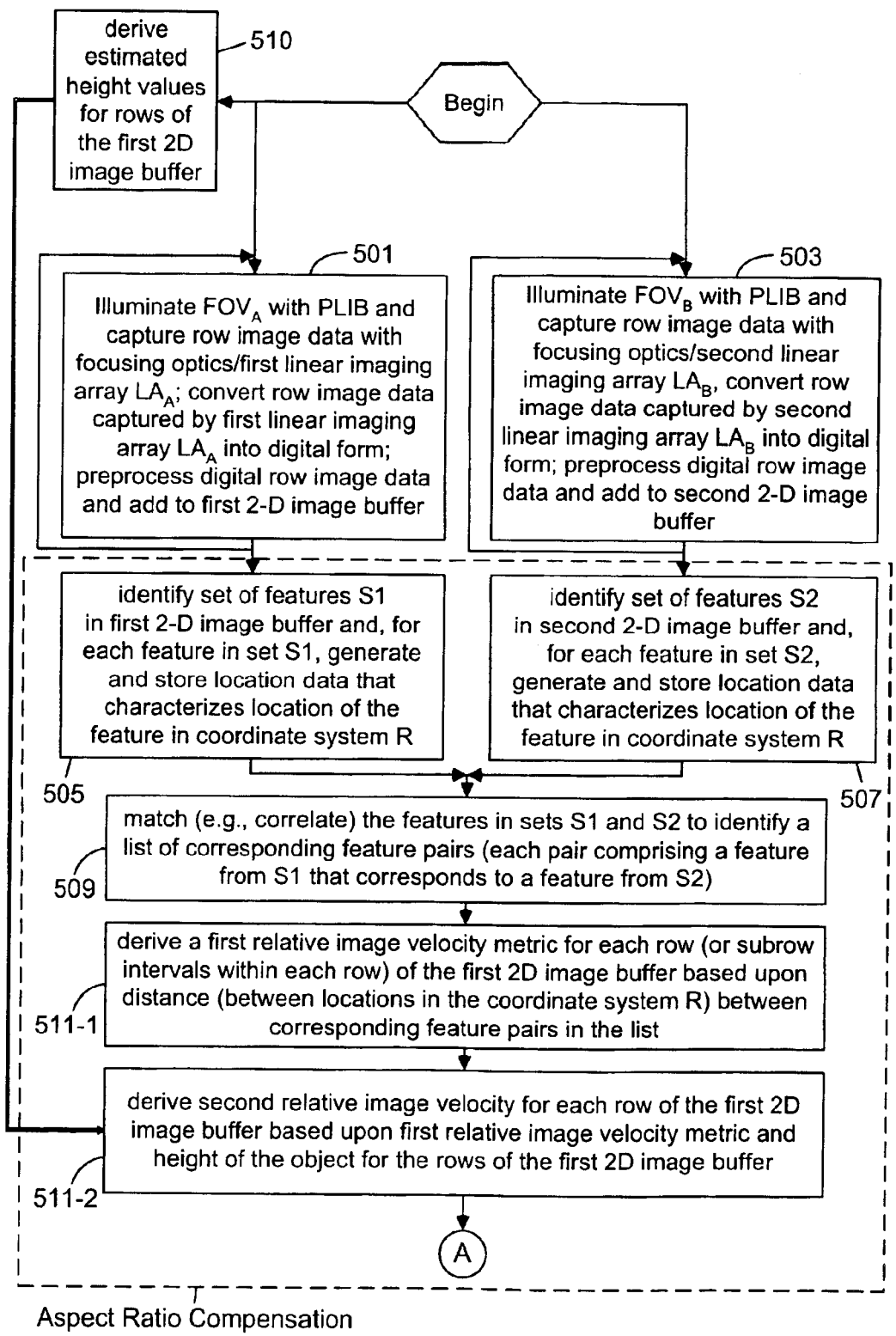
FIG. 14A7A

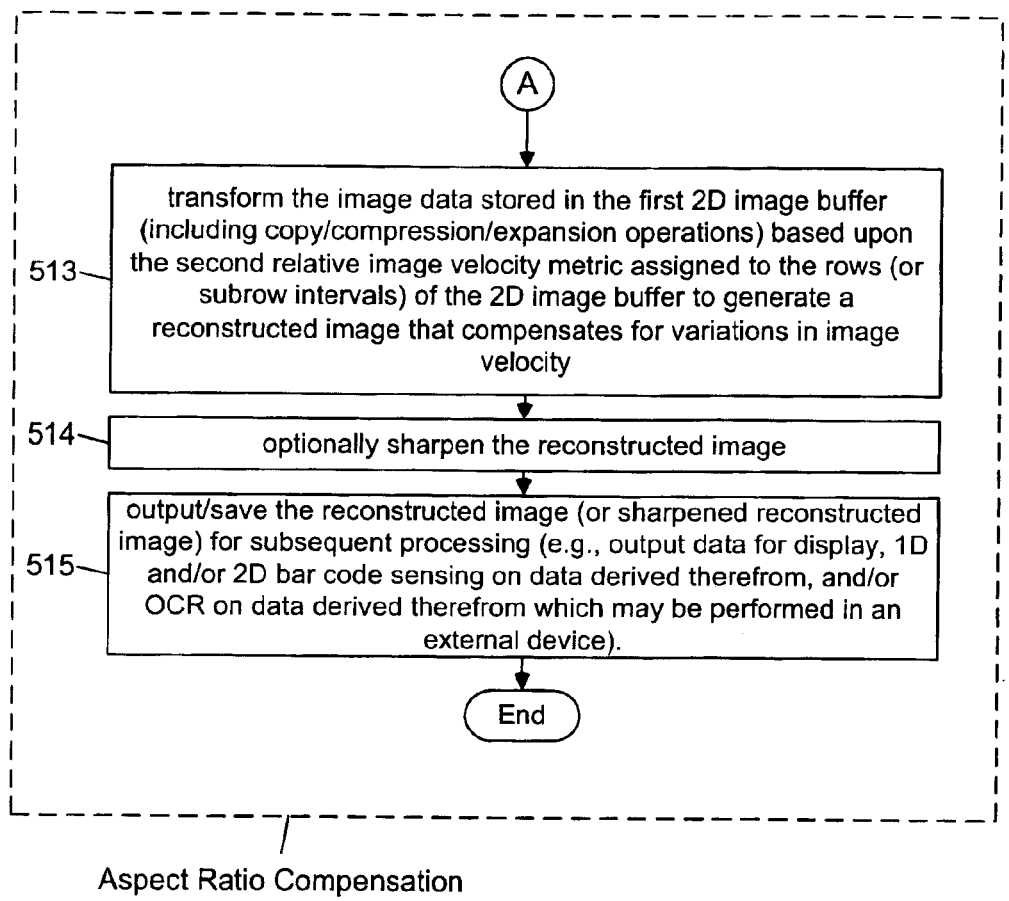
FIG. 14A7B

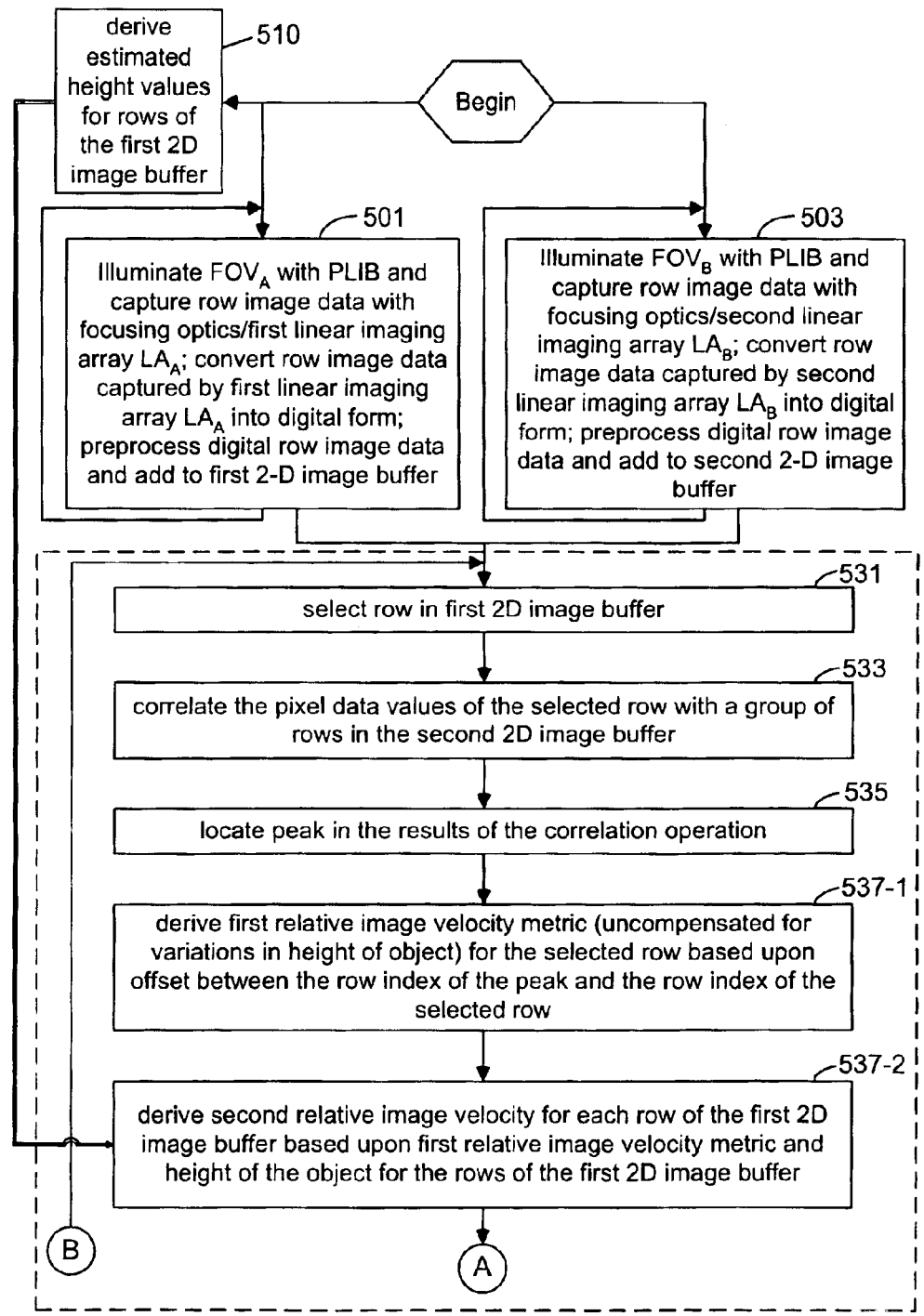
FIG. 14A8A

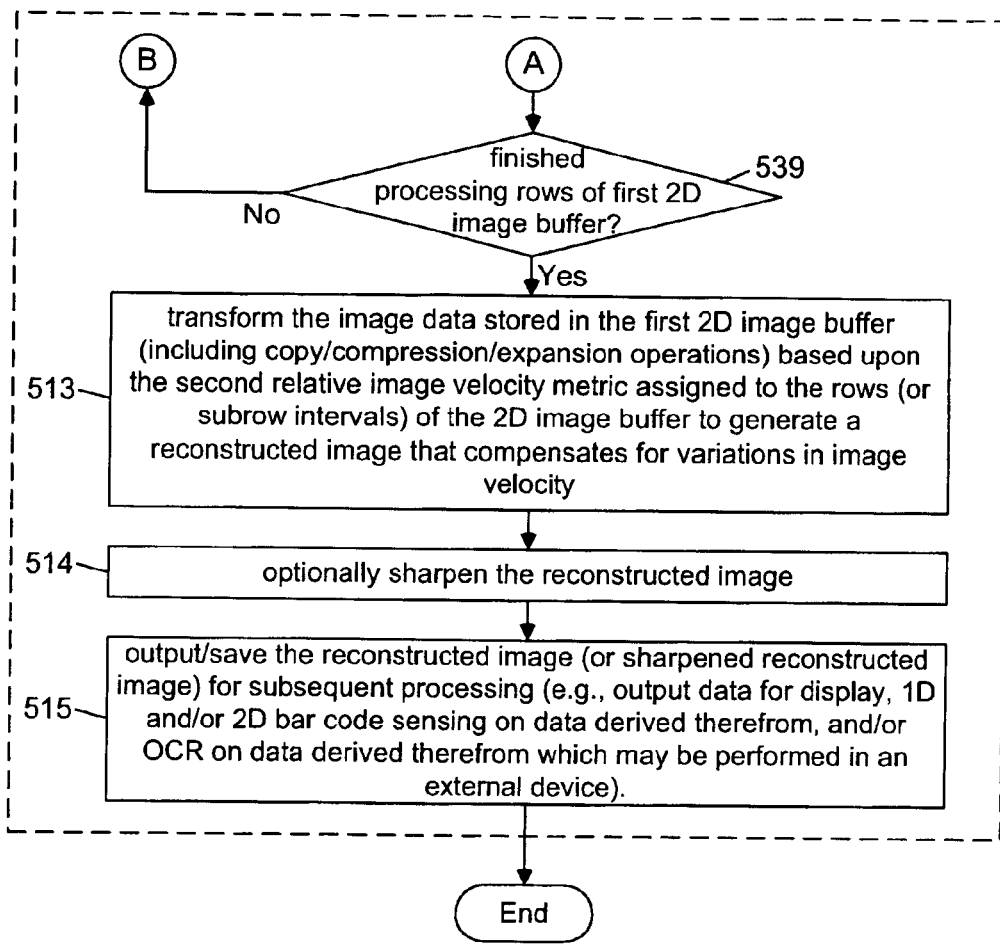
FIG. 14A8B

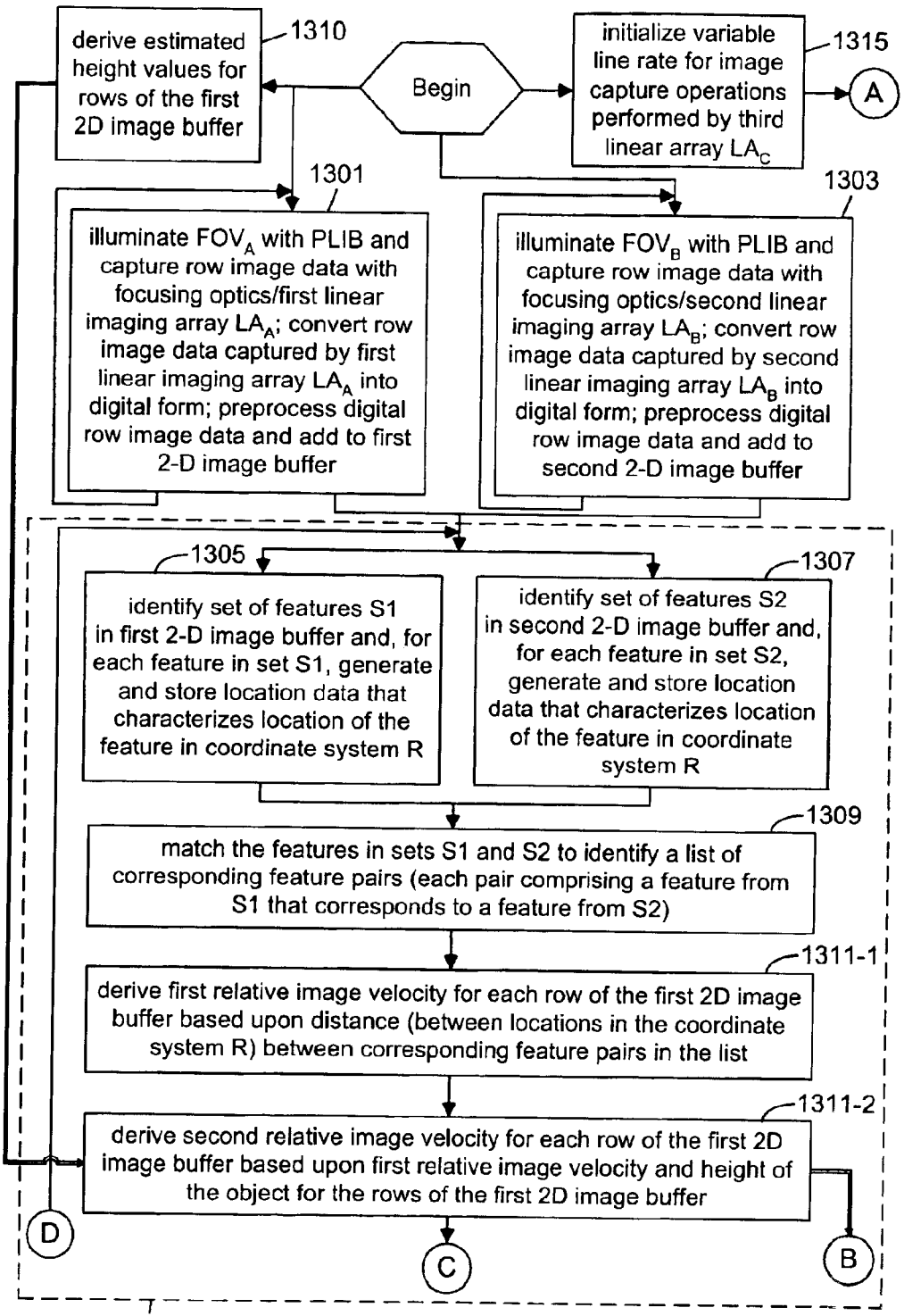
FIG. 14A9A

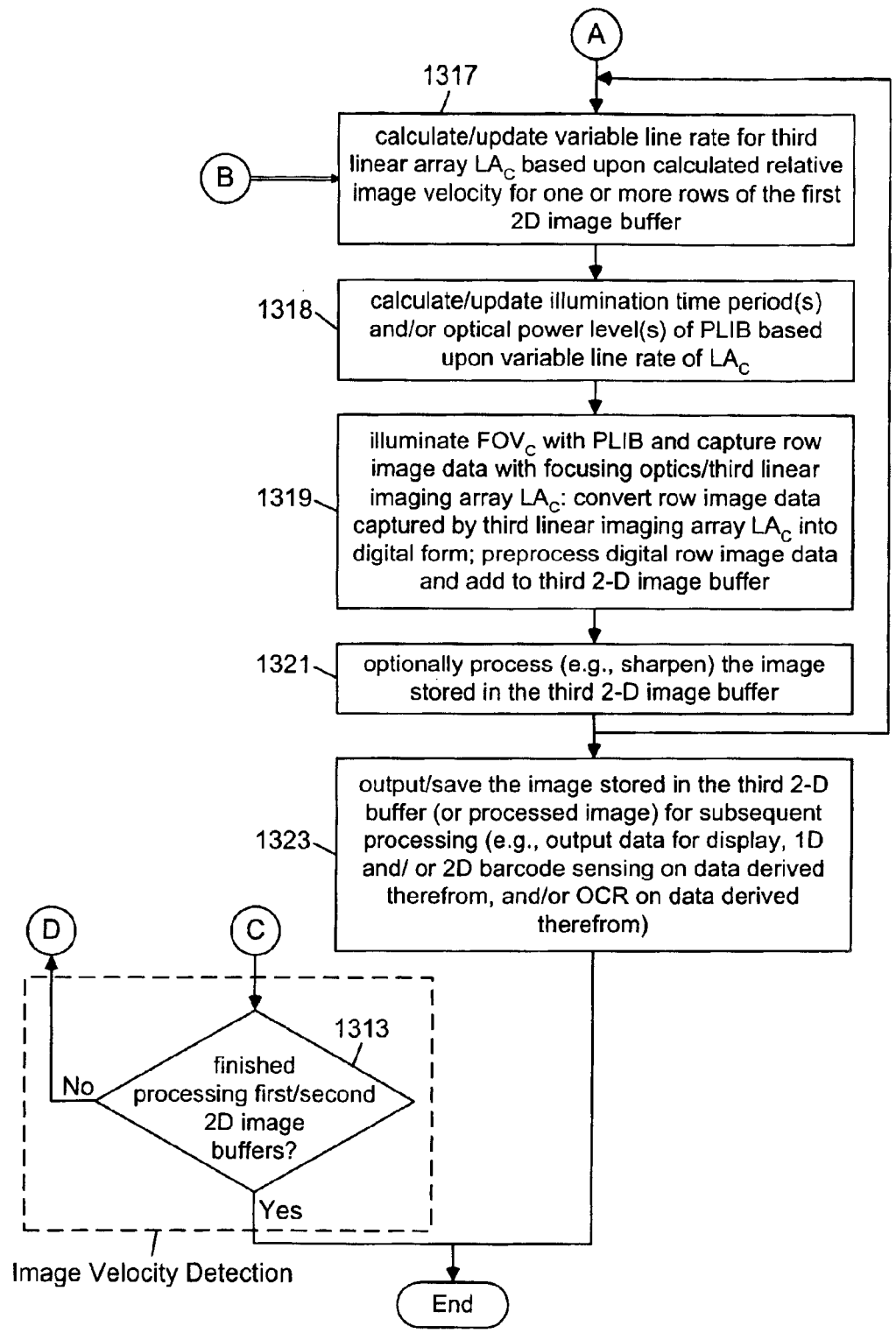
FIG. 14A9B

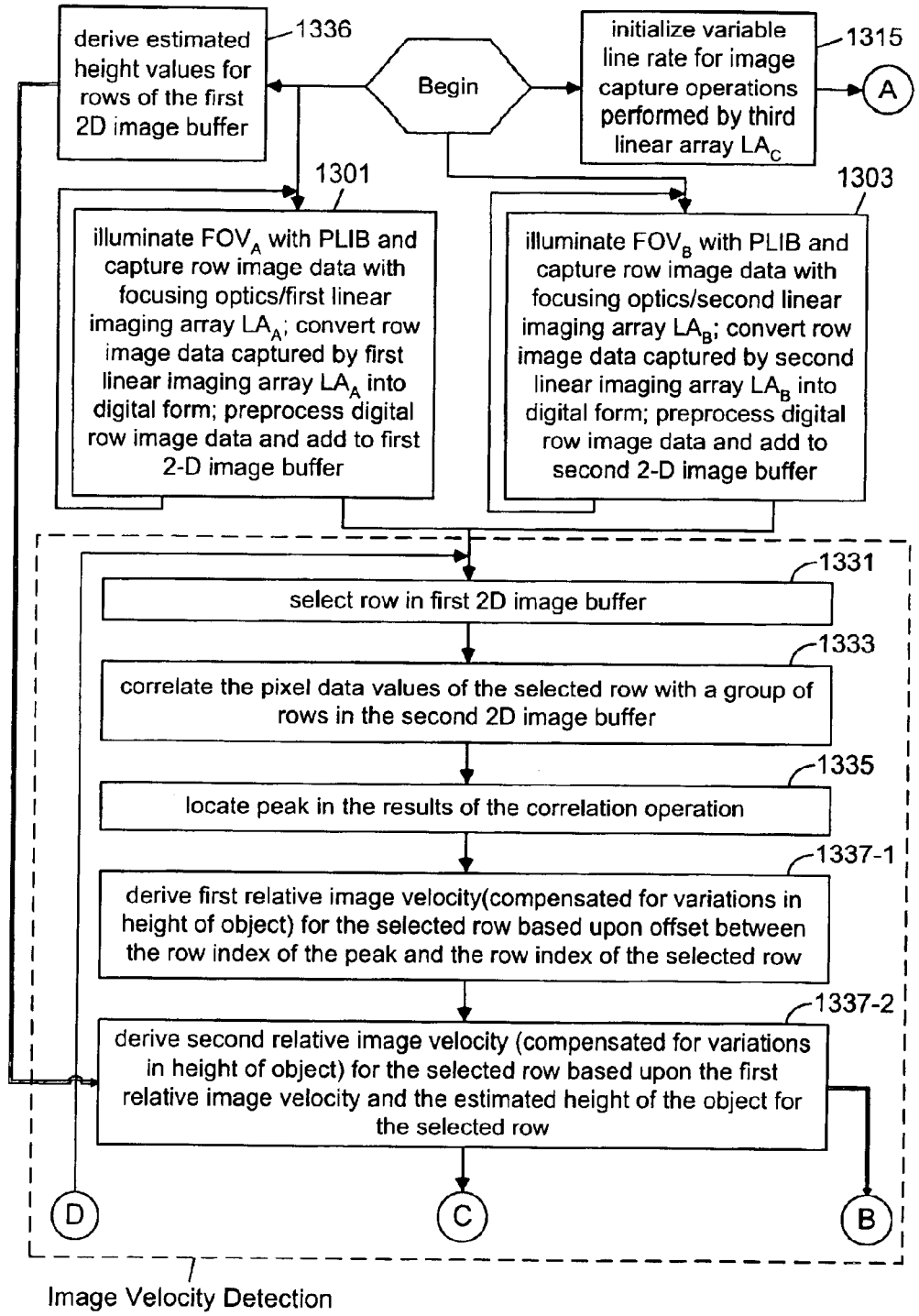
FIG. 14A10A

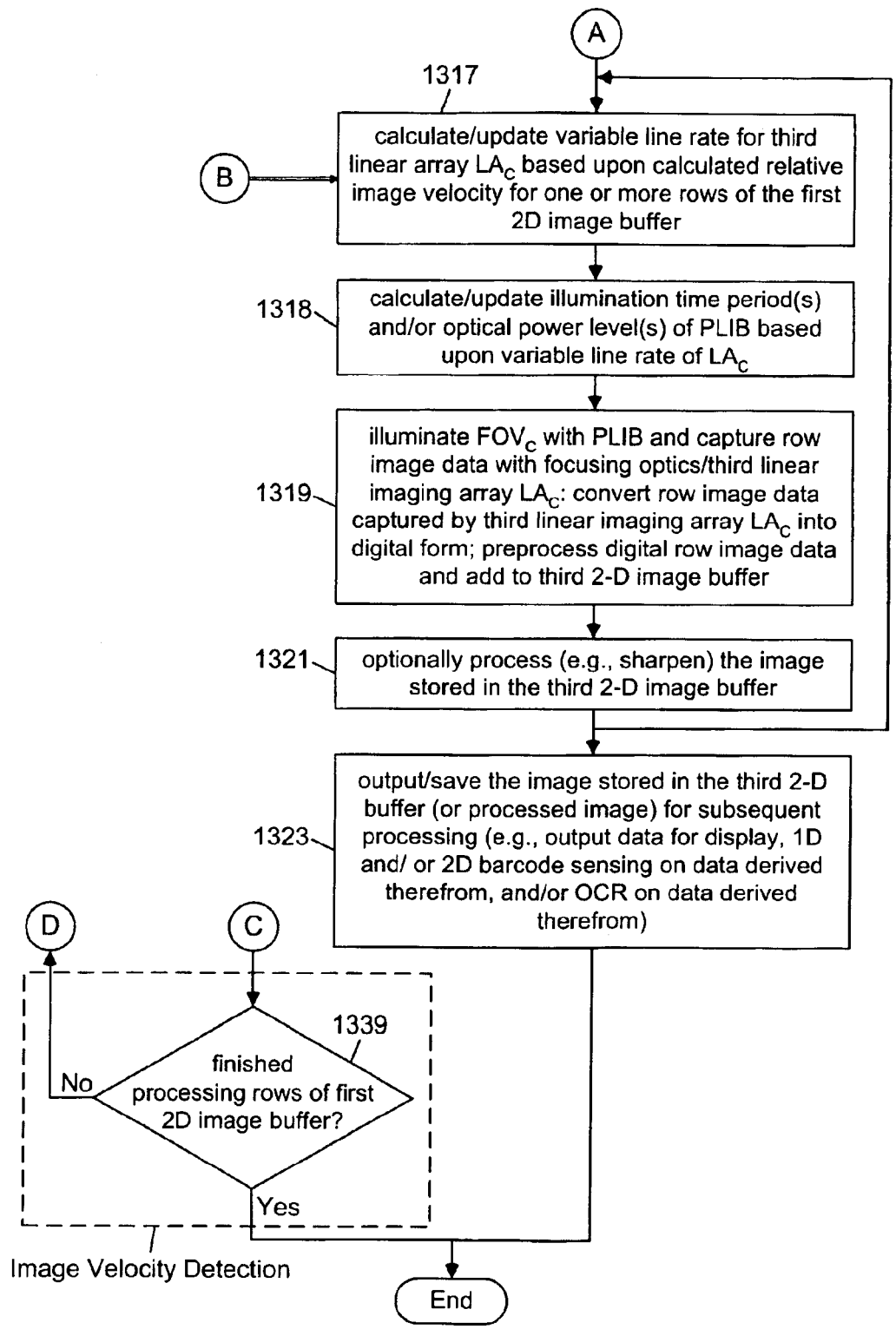
FIG. 14A10B

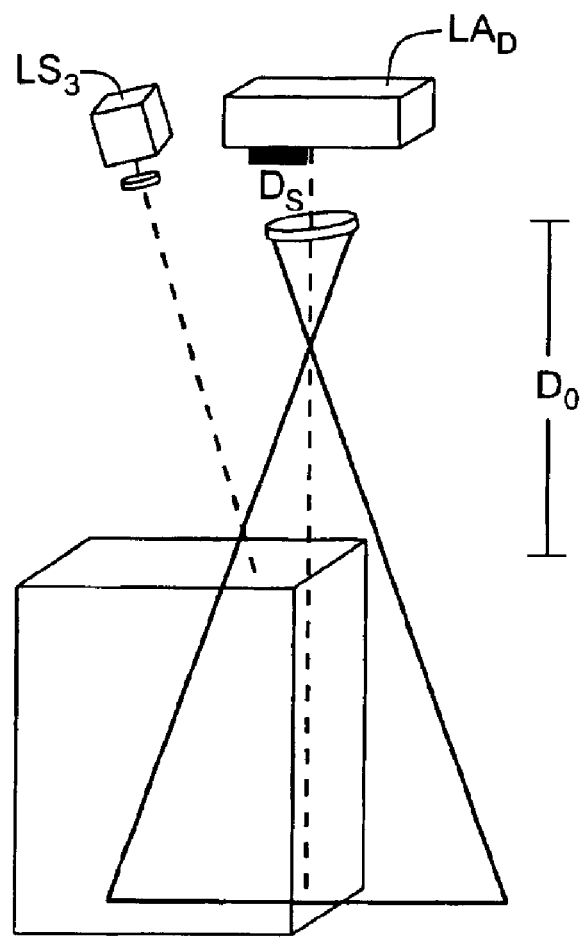
FIG. 14B1

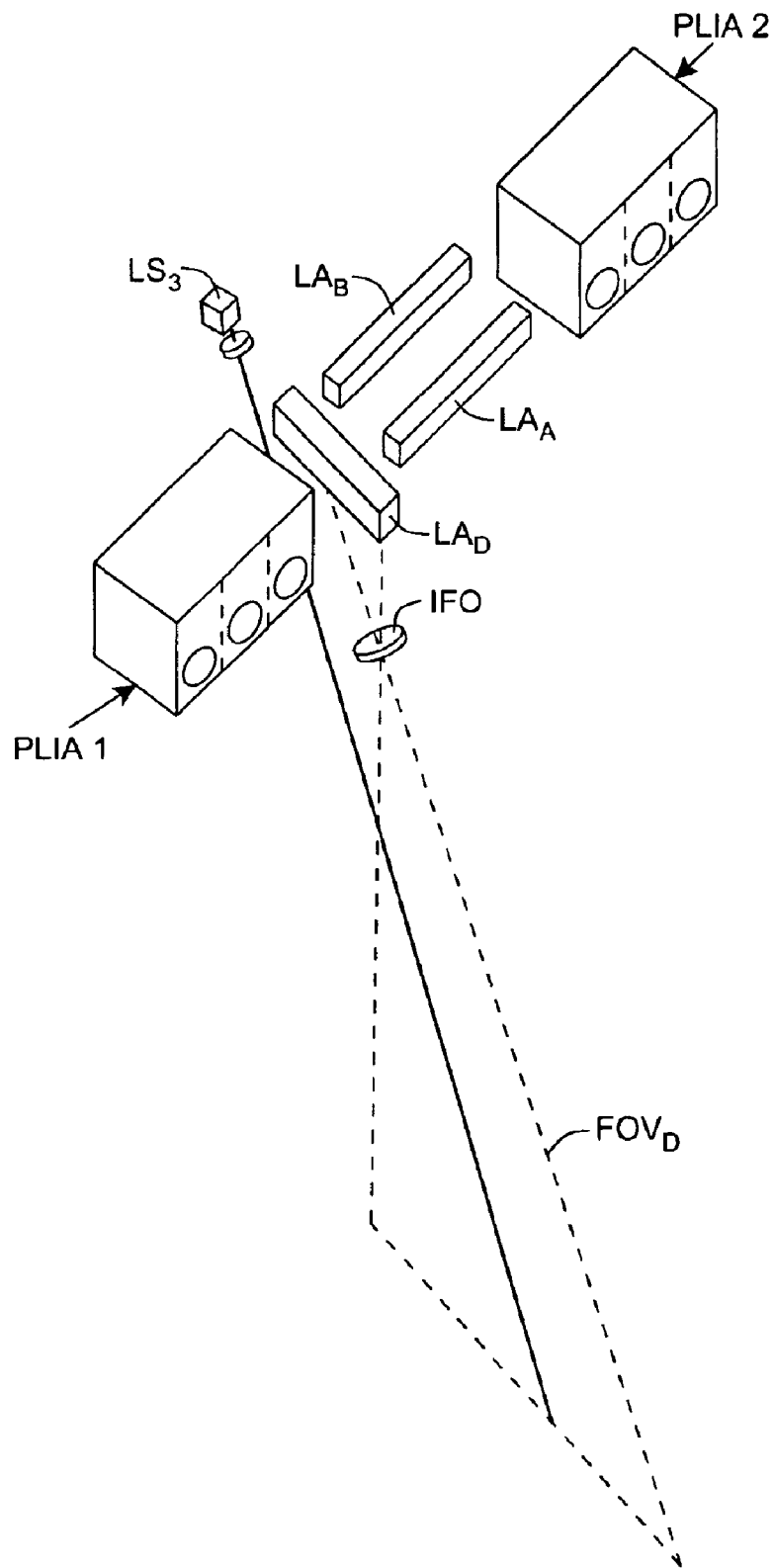
FIG. 14B2

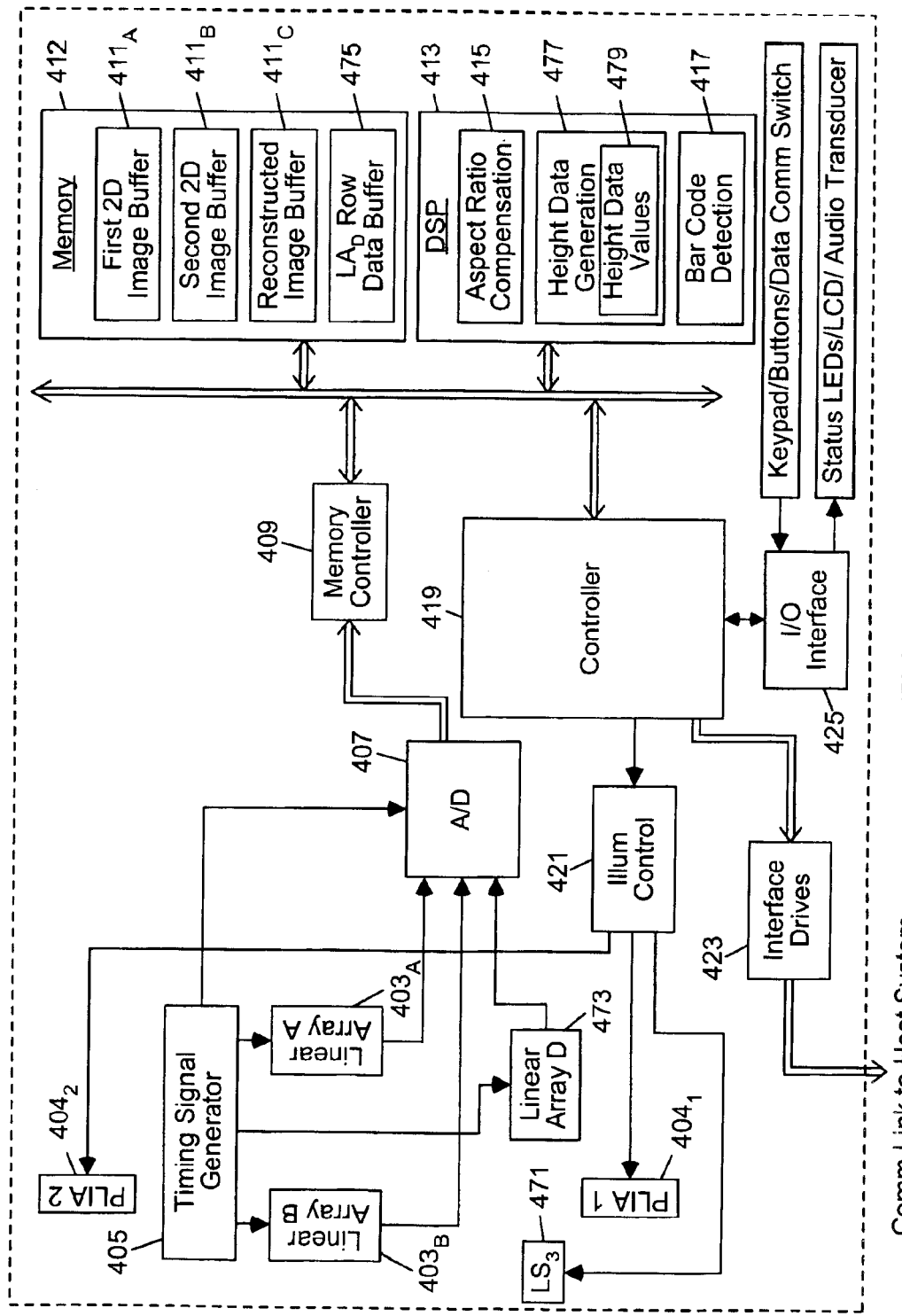
FIG. 14B3

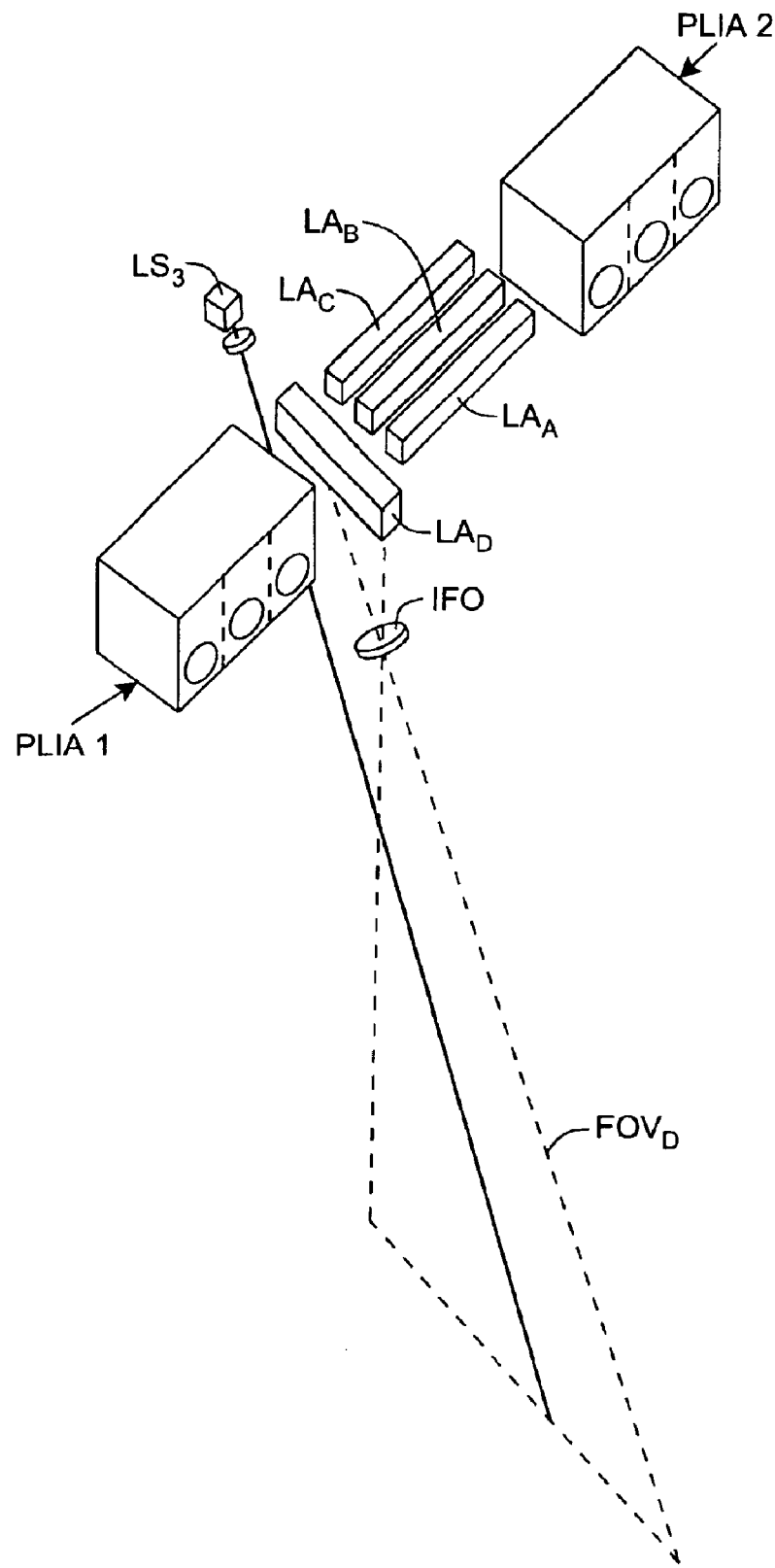
FIG. 14B4

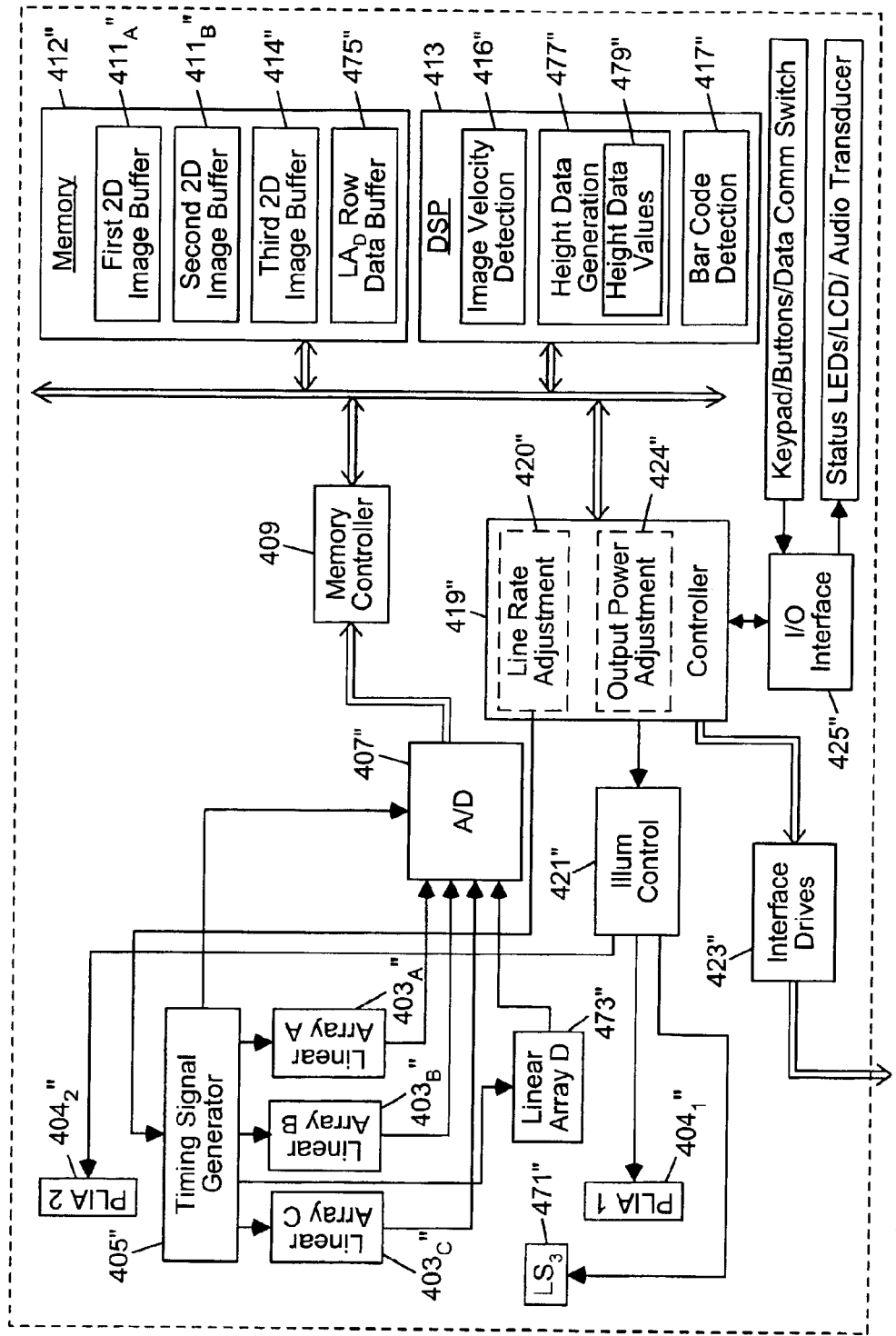
FIG. 14B5

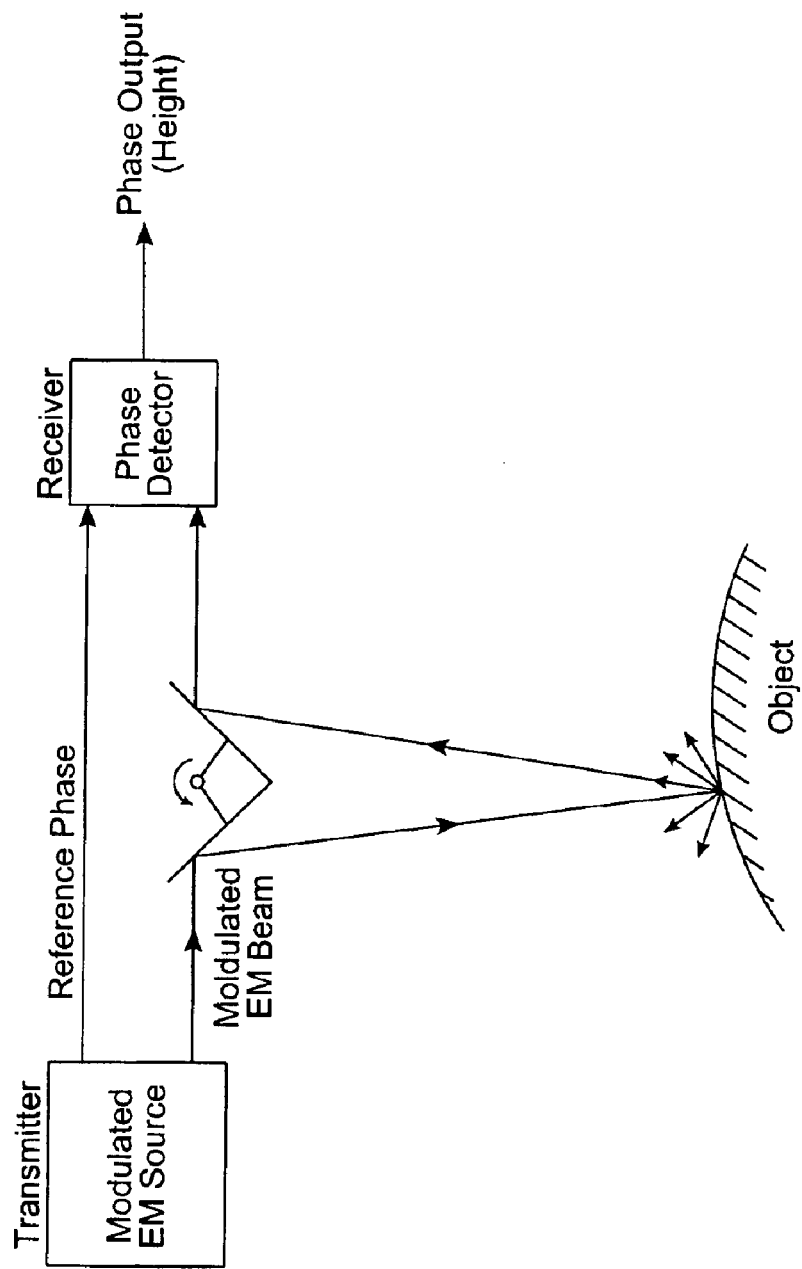
FIG. 14C1

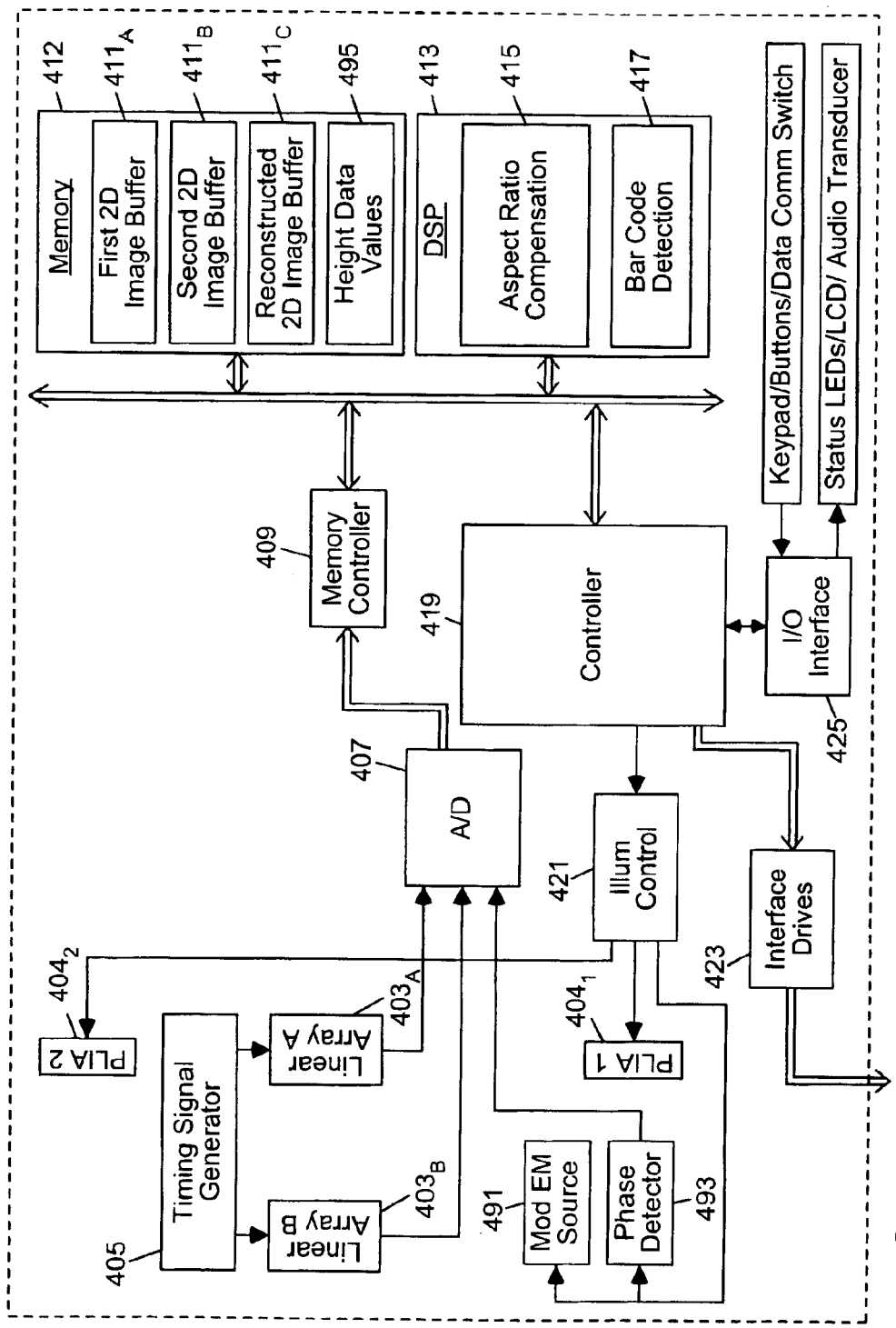
FIG. 14C2

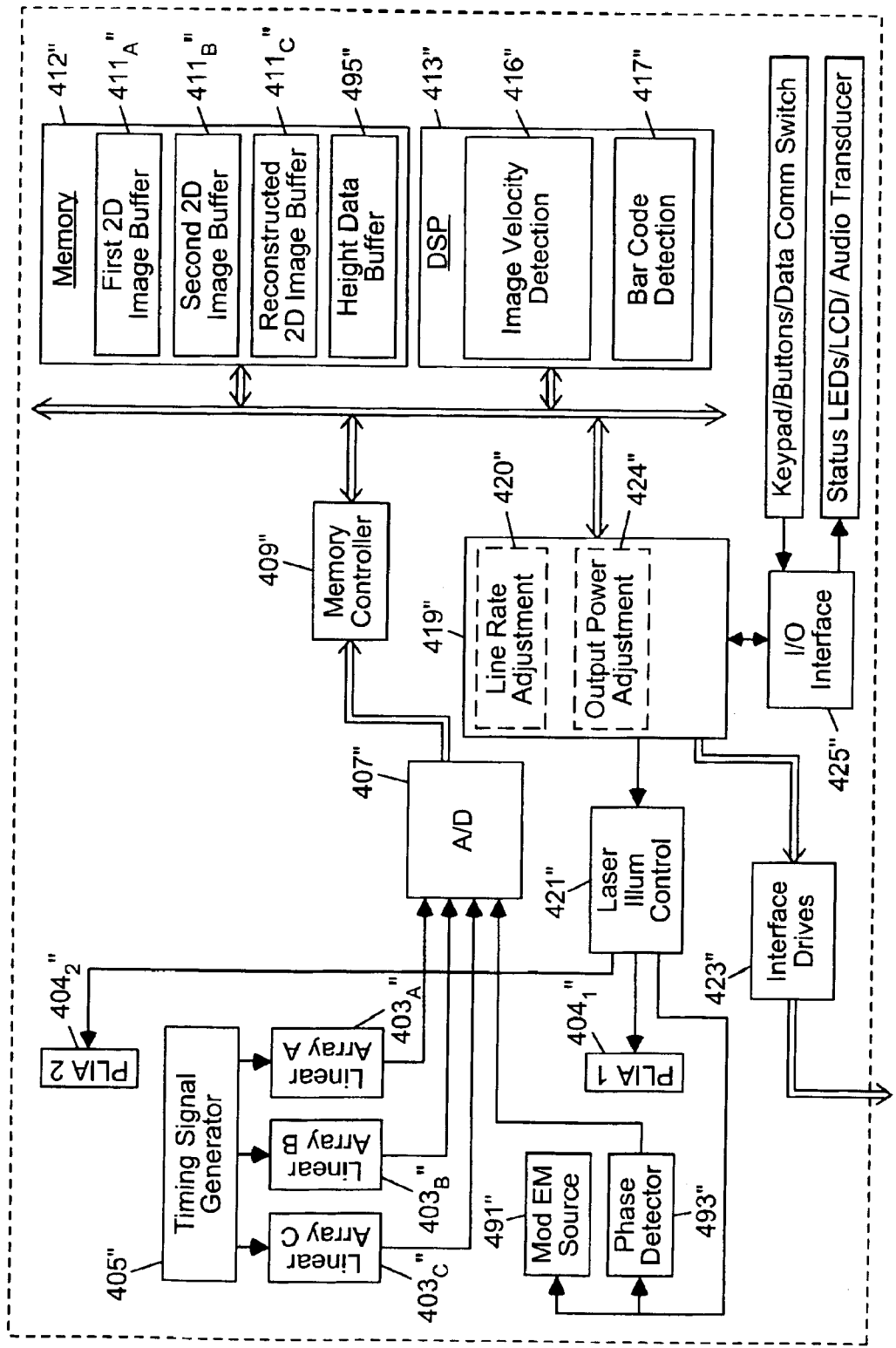
FIG. 14C3

```
COURIER 8
 ABCDEFGHIJKLMN
 OPQRSTUVWXYZ
 abcdefghijklmn
 opqrstuvwxyz
 12345-67890
ABCDEFGHIJKLMN
OPQRSTUVWXYZ
 abcdefghijklmn
 opqrstuvwxyz
 12345-67890
```

```
COURIER 8
ABCDEFGHIJKLMN
OPQRSTUVWXYZ
abcdefghijklmn
opqrstuvwxyz
12345-67890
ABCDEFGHIJKLMN
OPQRSTUVWXYZ
abcdefghijklmn
opqrstuvwxyz
12345-67890
```

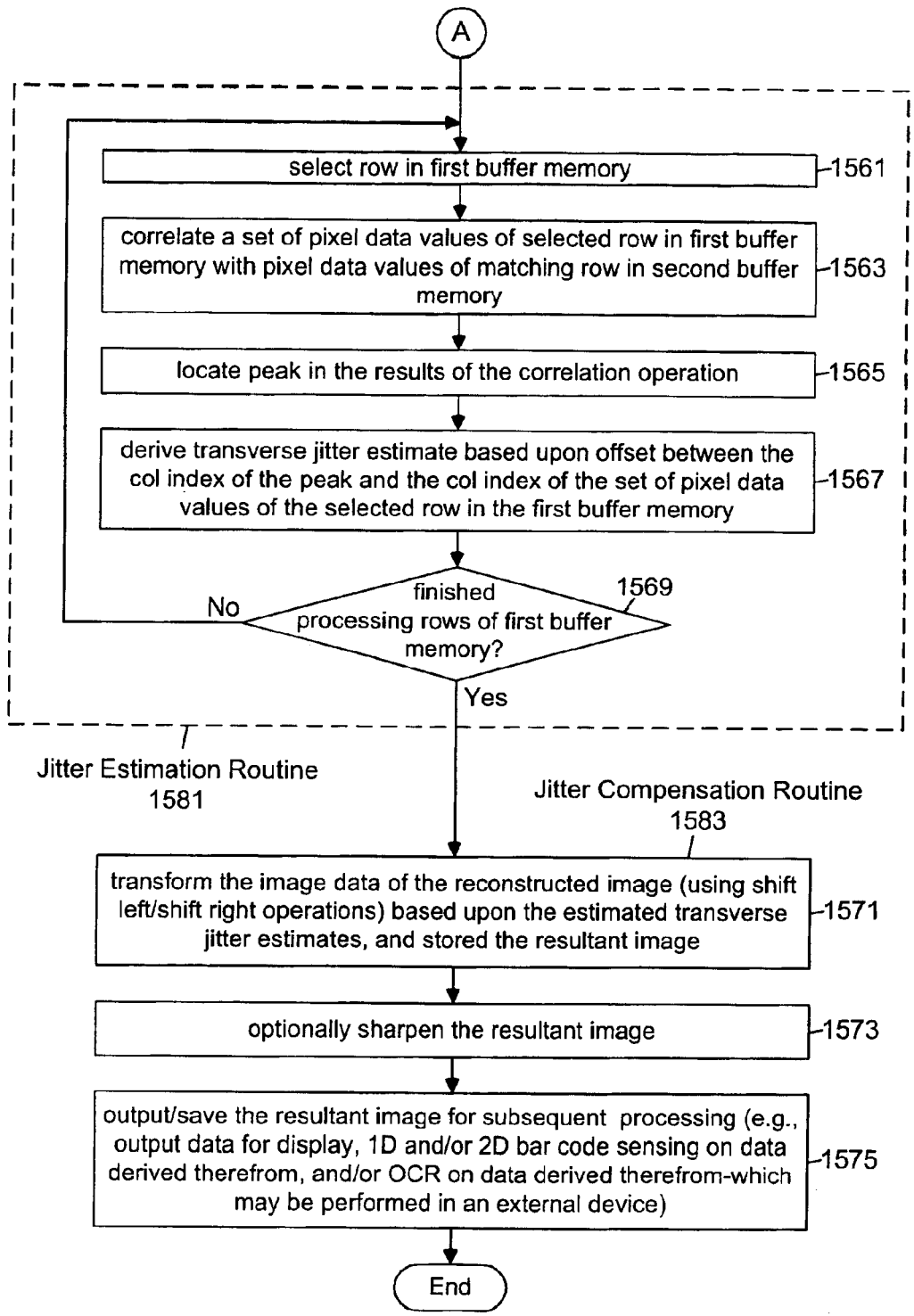
FIG. 15E(ii)

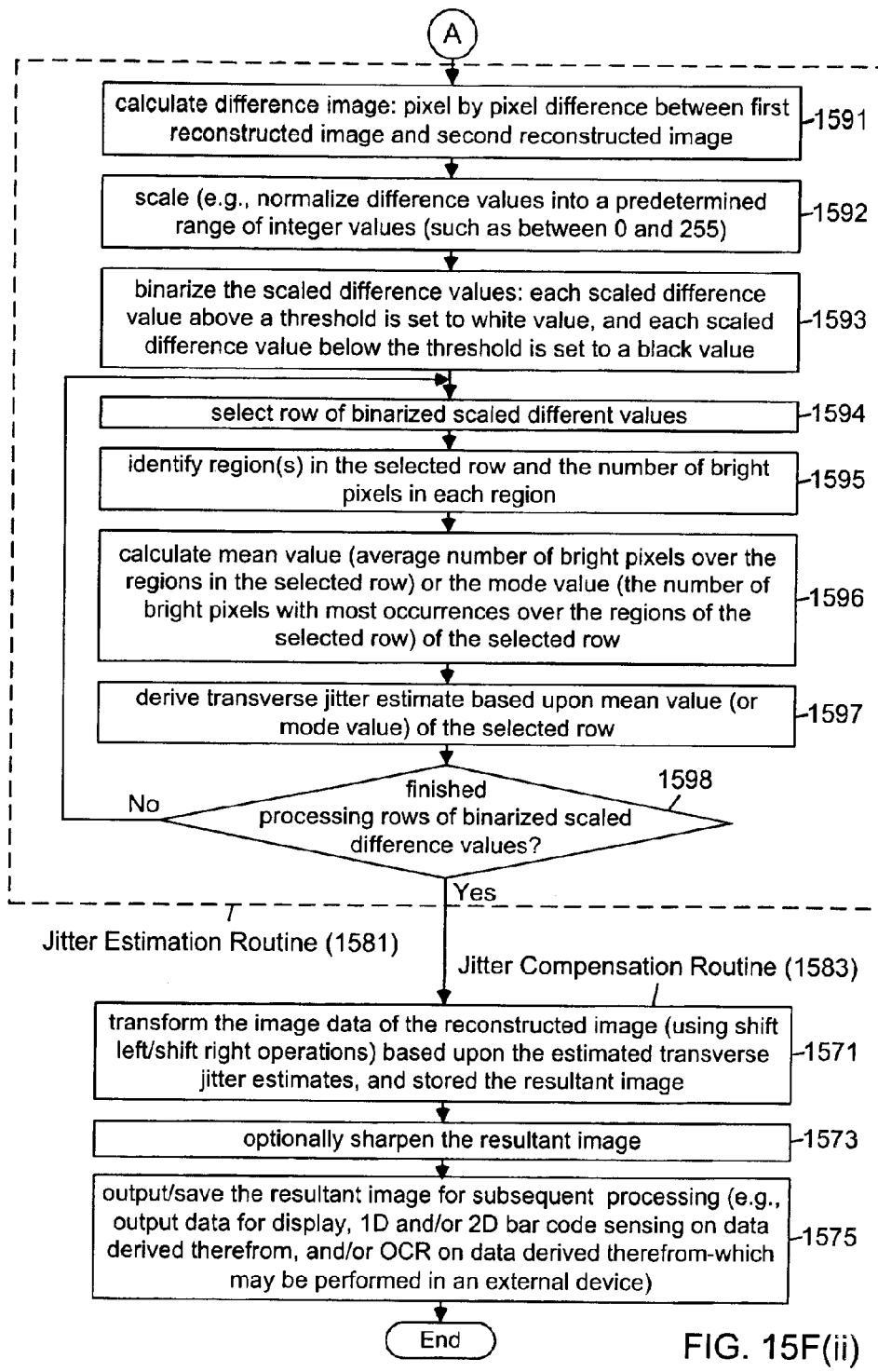
FIG. 15F(ii)

Row of Binarized Scaled Difference Values

BBBB...BBWWBBBB...BBWWWBBWWWBBBBBBBBBBBWWBBBBBBBBBBBBBBWBBBBBBBBB...

Region 1    Region 2    Region 3    Region 4    Region 5

FIG. 15G

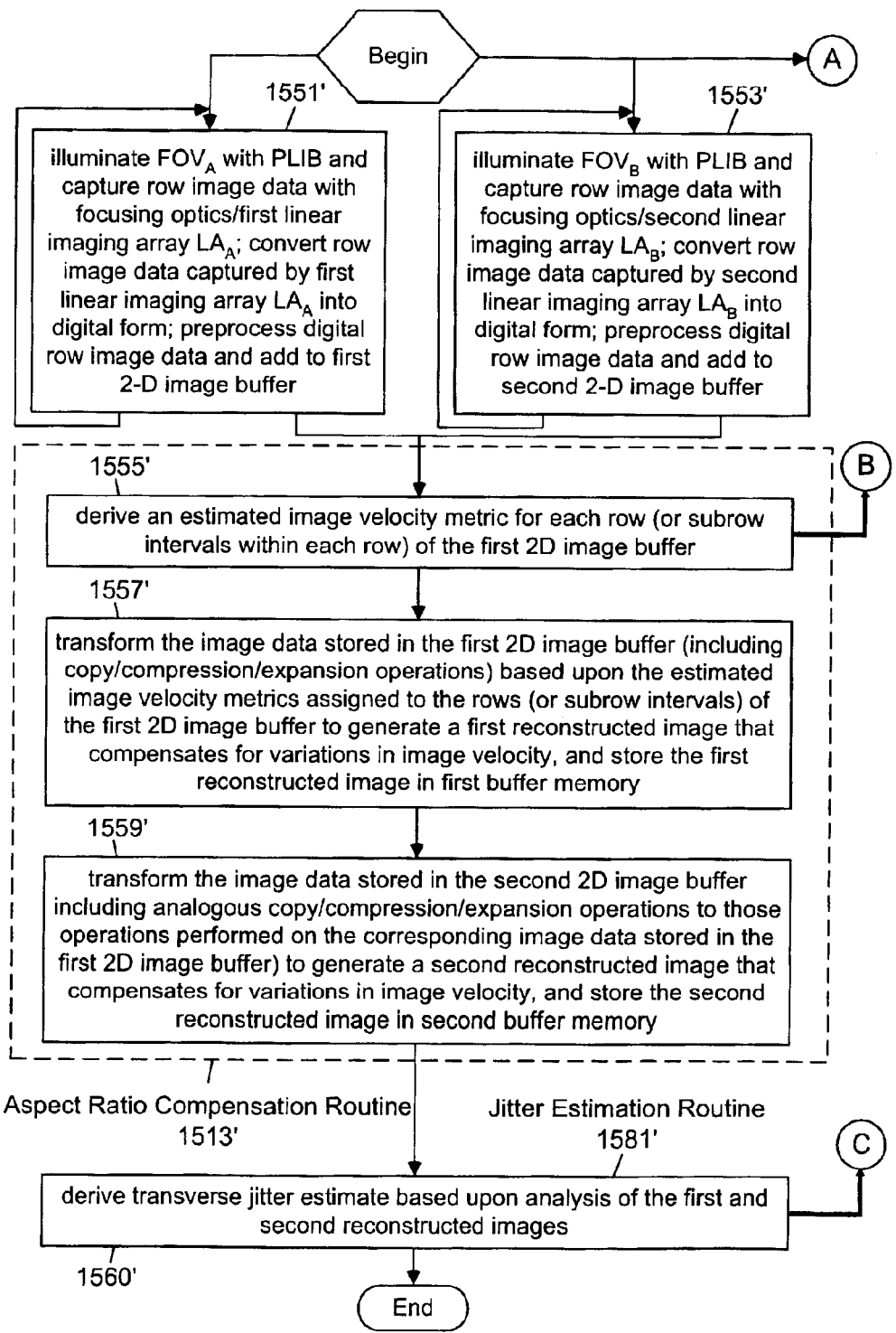
FIG. 15I1

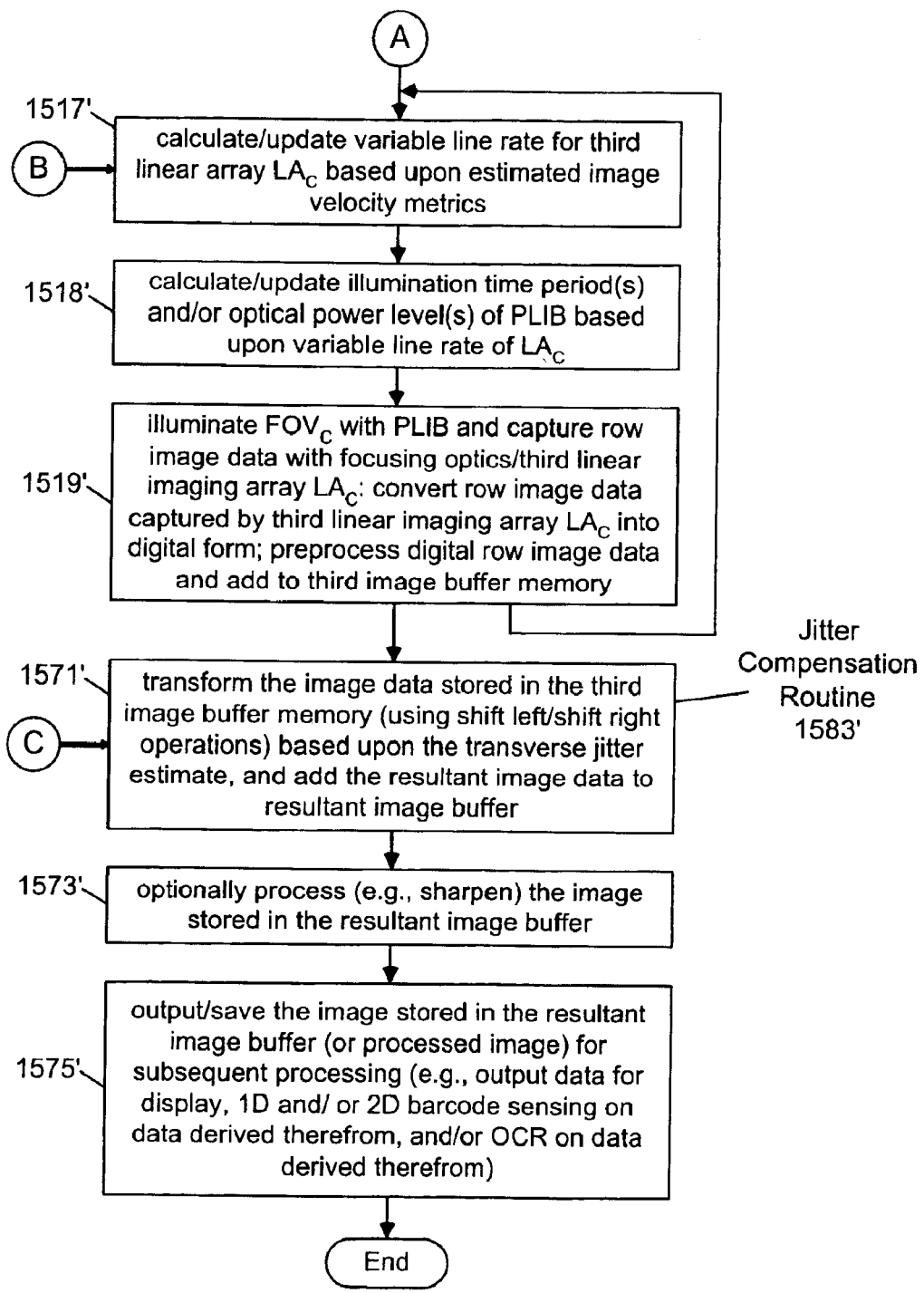
FIG. 15I2

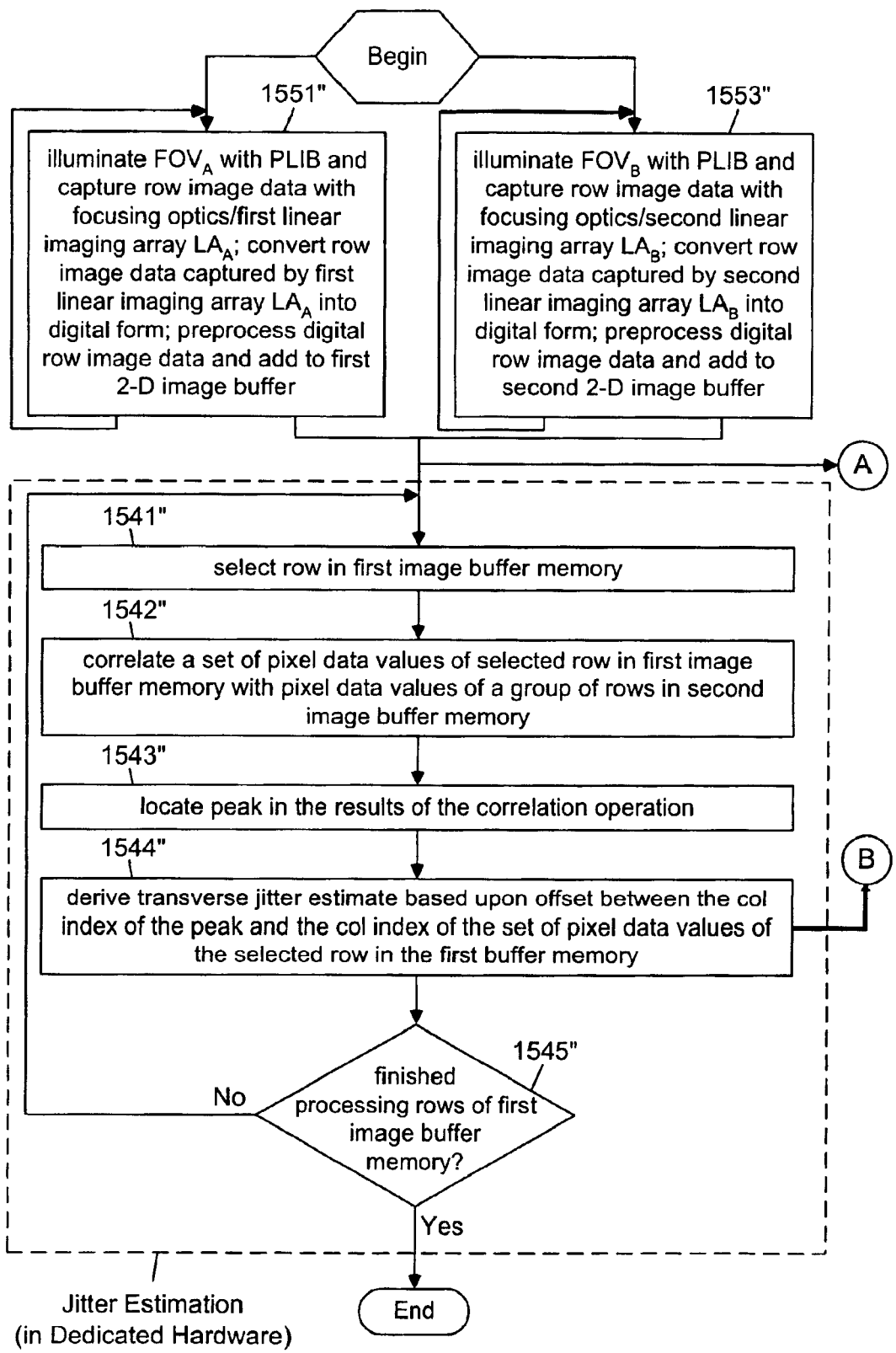
FIG. 15L1

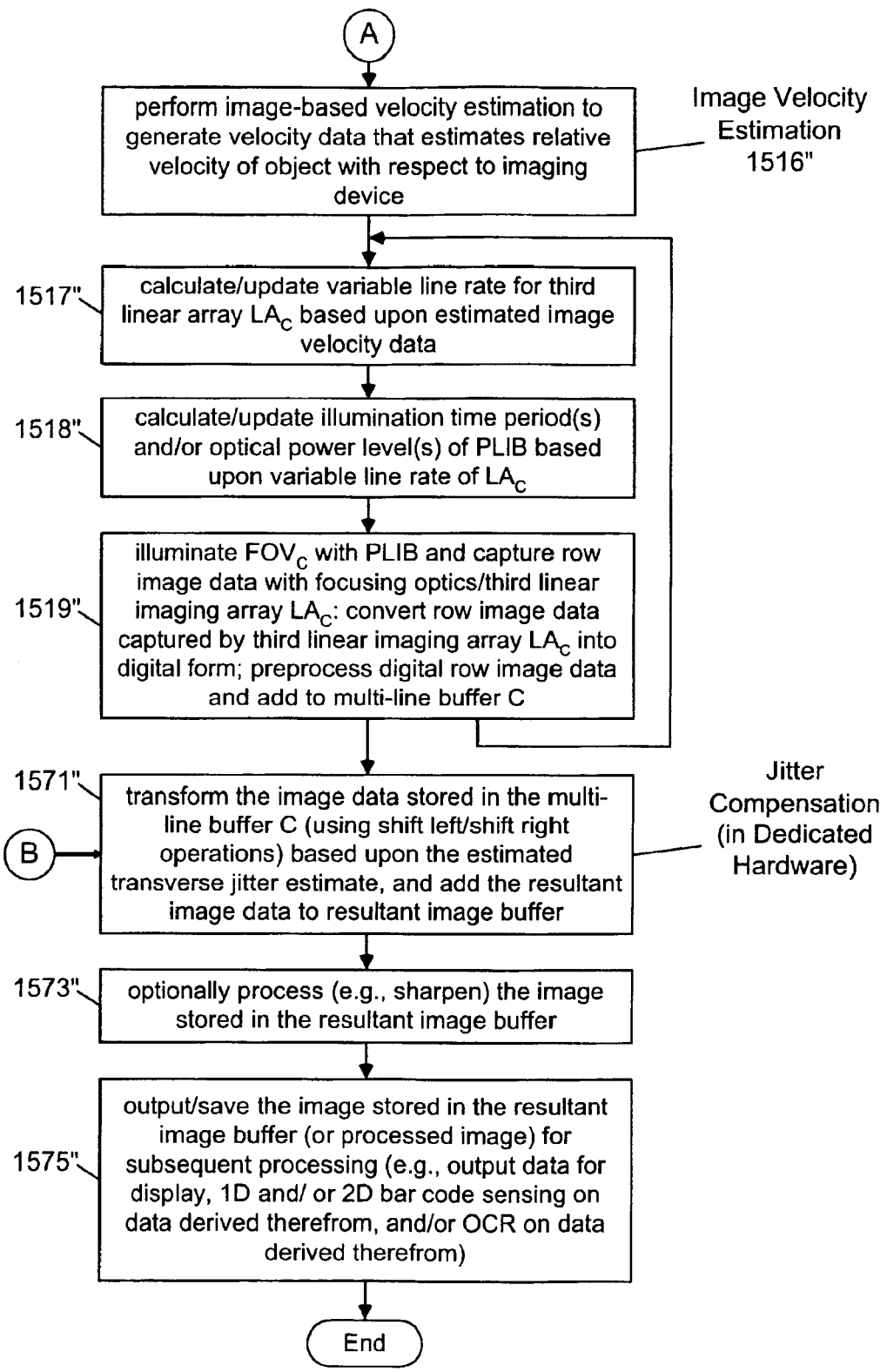
FIG. 15L2

IMAGING ENGINE EMPLOYING PLANAR LIGHT ILLUMINATION AND LINEAR IMAGING

CROSS-REFERENCE TO RELATED U.S. APPLICATION

This application is a Continuation-in-Part of application Ser. No. 09/990,585 filed Nov. 21, 2001; application Ser. No. 09/999,687 filed Oct. 31, 2001; application Ser. No. 09/954,477 filed Sep. 17, 2001, now U.S. Pat. No. 6,736,321; application Ser. No. 09/883,130 filed Jun. 15, 2001, now U.S. Pat. No. 6,830,189; application Ser. No. 09/781,665 filed Feb. 12, 2001, now U.S. Pat. No. 6,742,707; application Ser. No. 09/780,027 filed Feb. 9, 2001, now U.S. Pat. No. 6,629,641; application Ser. No. 09/721,885 filed Nov. 24, 2000, now U.S. Pat. No. 6,631,842; each of said Applications claimed as priority in Application No. PCT/US01/44011 filed Nov. 21, 2001, published by WIPO as WO 02/43195 A2; and each of said Applications being commonly owned by Assignee, Metrologic Instruments, Inc., of Blackwood, N.J., and incorporated herein by reference as if fully set forth herein in its entirety.

BACKGROUND OF THE INVENTION

1. Field of Invention

The present invention relates generally to improved methods of and apparatus and instruments for acquiring and analyzing information about the physical attributes of objects (such as reading bar code labels affixed to such objects), and digital image analysis.

2. Brief Description of the State of Knowledge in the Art

The use of image-based bar code symbol readers and scanners is well known in the field of auto-identification. Examples of image-based bar code symbol reading/scanning systems include, for example, hand-hand scanners, point-of-sale (POS) scanners, and industrial-type conveyor scanning systems.

Presently, most commercial image-based bar code symbol readers are constructed using charge-coupled device (CCD) image sensing/detecting technology. Unlike laser-based technology, CCD imaging technology has particular illumination requirements which differ from application to application.

For example, most prior art CCD-based hand-held bar code symbol readers utilize an array of light emitting diodes (LEDs) to flood the field of view of the imaging optics. In such systems, a large percentage of the output illumination from these LED sources is dispersed to regions other than the field of view of the imaging optics. Consequently, only a small percentage of the illumination is actually collected by the imaging optics of the system, and a large percentage of the illumination is wasted.

Examples of such prior art CCD-based hand-held bar code symbol readers are disclosed in U.S. Pat. Nos. Re. 36,528, 5,777,314, 5,756,981, 5,627,358, 5,484,994, 5,786,582, and 6,123,261 to Roustaei, each assigned to Symbol Technologies, Inc. and incorporated herein by reference in its entirety. In such prior art CCD-based hand-held scanners, an array of LEDs are mounted in a scanning head in front of a CCD image sensor that is provided with a cylindrical lens assembly. The LEDs are arranged at an angular orientation relative to a central axis passing through the scanning head so that a fan of light is emitted through the light transmission aperture thereof that expands with increasing distance away from the LEDs. The intended purpose of this LED illumination arrangement is to increase the "angular distance" and "depth of field" of such hand-held image-based bar code symbol readers. However, even with such improvements in LED illumination techniques, the working distance of such hand-held scanners can only be extended by using more LEDs within the scanning head of such scanners to produce greater illumination output therefrom, thereby increasing the cost, size and weight of such scanning devices.

Other CCD-based hand-held bar code symbol readers employing LED illumination have been proposed. For example, U.S. Pat. No. 5,192,856 to Schaham discloses a hand-held image scanner which uses a LED and beam forming optics (which include collimating and cylindrical lenses) to produce a beam of LED-based illumination for illuminating a bar code symbol on an object, and cylindrical optics mounted in front a linear CCD image detector for projecting a narrow a field of view about the illumination, thereby enabling collection and focusing of light reflected off the bar code symbol onto the linear CCD image detector.

CCD-based hand-held bar code symbol readers employing CCD image laser illumination have been proposed. For example, U.S. Pat. No. 4,963,756 to Quan et al discloses a hand-held image scanner using a laser source and Scheimpflug optics for focusing a planar laser illumination beam reflected off a bar code symbol onto a 2-D CCD image detector. U.S. Pat. No. 5,621,203 to Swartz et al discloses the use of a cylindrical lens to generate from a single laser diode an elongated beam of laser light. The fixed, static elongated beam is redirected by an oscillating mirror or lens such that it fans out an angle sufficient to illuminate a code pattern at a working distance and is swept in a direction transverse to the elongated dimension of the beam. A lens is mounted before a linear CCD image array, to receive diffused reflected laser light from the bar code symbol surface. And U.S. Pat. No. 5,988,506 to Schaham et al, herein incorporated by reference, discloses the use of a cylindrical lens to generate from a single visible laser diode (VLD) a narrow focused line of laser light which fans out an angle sufficient to fully illuminate a code pattern at a working distance. As disclosed, mirrors can be used to fold the laser illumination beam towards the code pattern to be illuminated in the working range of the system. Also, a horizontal linear lens array consisting of lenses is mounted before a linear CCD image array, to receive diffused reflected laser light from the code symbol surface. Each single lens in the linear lens array forms its own image of the code line illuminated by the laser illumination beam. Also, subaperture diaphragms are required in the CCD array plane to (i) differentiate image fields, (ii) prevent diffused reflected laser light from passing through a lens and striking the image fields of neighboring lenses, and (iii) generate partially-overlapping fields of view from each of the neighboring elements in the lens array.

Most prior art CCD-based image scanners employed in conveyor-type package identification systems require high-pressure sodium, metal halide or halogen lamps and large, heavy and expensive parabolic or elliptical reflectors to produce sufficient light intensities to illuminate the large depth of field scanning fields supported by such industrial scanning systems. Even when the light from such lamps is collimated or focused using such reflectors, light strikes the target object other than where the imaging optics of the CCD-based camera are viewing. Since only a small fraction of the lamps output power is used to illuminate the CCD camera's field of view, the total output power of the lamps must be very high to obtain the illumination levels required along the field of view of the CCD camera. The balance of the output illumination power is simply wasted in the form of heat.

U.S. Provisional Application No. 60/190,273 entitled "Coplanar Camera" filed Mar. 17, 2000, by Chaleff et al., and published by WIPO on Sep. 27, 2001 as part of WIPO Publication No. WO 01/72028 A1, both being incorporated herein by reference, discloses a CCD camera system which uses an array of LEDs and a single apertured Fresnel-type cylindrical lens element to produce a planar beam of illumination for illuminating a bar code symbol on an object over a large depth of field, and a linear CCD image detector mounted behind the apertured Fresnel-type cylindrical lens element so as to provide the linear CCD image detector with a field of view that is arranged with the planar extent of planar beam of LED-based illumination.

While the prior art laser-illuminated CCD-based image capture systems discussed above avoid the use of LED illumination, they suffer from several significant shortcomings and drawbacks. For example, when detecting images of target objects illuminated by a coherent illumination source (e.g. a VLD), "speckle" (i.e. substrate or paper) noise is typically modulated onto the laser illumination beam during reflection/scattering, and ultimately speckle-noise patterns are produced at the CCD image detection array, severely reducing the signal-to-noise (SNR) ratio of the CCD camera system. Importantly, the prior art systems described above fail to provide any way of, or means for reducing speckle-noise patterns produced at its CCD image detector thereof, by its coherent laser illumination source.

In general, speckle-noise patterns are generated whenever the phase of the optical field is randomly modulated. The problem of speckle-noise patterns in laser scanning systems is mathematically analyzed in the twenty-five (25) slide show entitled "Speckle Noise and Laser Scanning Systems" by Sasa Kresic-Juric, Emanuel Marom and Leonard Bergstein, of Symbol Technologies, Holtsville, N.Y., published at http://www.ima.umn.edu/industrial/99-2000/kresic/sld001.htm, and incorporated herein by reference. Notably, Slide 11/25 of this WWW publication summaries two generally well known methods of reducing speckle-noise by superimposing statistically independent (time-varying) speckle-noise patterns: (1) using multiple laser beams to illuminate different regions of the speckle-noise scattering plane (i.e. object); or (2) using multiple laser beams with different wavelengths to illuminate the scattering plane. Also, the celebrated textbook by J. C. Dainty, et al, entitled "Laser Speckle and Related Phenomena" (Second edition), published by Springer-Verlag, 1994, incorporated herein by reference, describes a collection of techniques which have been developed by others over the years in effort to reduce speckle-noise. However, the prior art generally fails to disclose, teach or suggest how such prior art speckle-reduction techniques might be successfully practiced in a laser illuminated hand-held bar code symbol reader.

As described above, hand-held image-based bar code symbol readers may utilize a linear (1-D) imaging array or an area (2-D) imaging array to receive diffused reflected laser light from the bar code symbol surface. Advantageously, a linear imaging array provides a lower component cost. However, the use of the lower-cost linear imaging array in capturing images introduces problems. One problem is aspect ratio variations/distortions in the images captured by the linear imaging array. More specifically, in the event the scanning beam/imaging device is moved with respect to the bar code label/object to be scanned at a varying velocity during image capture operations, the image captured by the linear imaging array is distorted as shown in FIGS. 1A and 1B. Where the scanning beam/linear imaging array is moved with respect to the bar code label/object to be scanned at increasing velocity, the image is compressed as shown. On the other hand, where the scanning beam/linear imaging array is moved with respect to the bar code label/object to be scanned at decreasing velocity, the image is expanded as shown. If such distortion is significant, it can render the bar code symbol reader ineffective in many applications, such as reading dense 2-D bar code symbols. Another problem is jitter (motion of the object relative to device in a direction transverse to the intended swipe direction). Such transverse motion is referred to herein as "transverse jitter" or "horizontal jitter". FIG. 15A illustrates the distortion causes by such horizontal jitter. If such horizontal jitter is significant, the resulting image distortions can degrade the quality of the images captured by the device and lead to errors/inaccuracies in subsequent image analysis operations (such as bar code symbol detections operations and/or OCR operations) performed on these images.

Similar problems occur in hand-held image capture devices, examples of which are described in U.S. Pat. Nos. 5,578,813; 6,222,174; and 6,300,645. Such hand-held image capture devices use a mechanical position transducer (e.g., roller or wheel) that operates similar to a computer mouse to output position information of the device relative to the object. Alternately, such hand-held image capture devices use one or more optical sensors that operate similar to an optical mouse (for example, as described in U.S. Pat. Nos. 4,631,400; 4,794,384; 5,729,008 and 6,256,016) to output position information of the device relative to the object. In such image capture devices, the position information is tagged to image data derived from an imaging array during image capture operations to generate a position-tagged data stream, and image stitching techniques are applied to the position-tagged data stream to bring multiple image swaths into registration to thereby form a single image.

Similar problems occur in astronomy, target tracking, velocimetry and airborne reconnaissance, examples of which are set forth in U.S. Pat. Nos. 4,162,509; 4,580,894; 5,020,903. Such systems use correlation of pixel data values derived from two spaced-apart linear imaging sensors to measure velocity.

Importantly, the prior art image-based techniques for velocity measurement are passive (relying on ambient light) or employ light sources that illuminate over a wide area. In such configurations, light is dispersed to regions other than the field of view of the imaging optics. Consequently, only a small percentage of the illumination is actually collected by the imaging optics of the system, and a large percentage of the illumination is wasted.

Thus, there is a great need in the art for improved image-based techniques/devices for velocity measurement that do not waste illumination (and thus require less power to provide such illumination).

Moreover, the prior art generally fails to disclose, teach or suggest image-based techniques/devices that measure velocity variations of the imaging device with respect to the object to be scanned and compensate for aspect ratio distortions that result from such velocity variations, which are suitable for use in a hand-held bar code symbol reader. Moreover, the prior art generally fails to disclose, teach or suggest image-based techniques/devices that perform velocity estimation/aspect ratio compensation in addition to image-based jitter estimation and compensation to compensate for both aspect ratio distortion and jitter distortion, which are suitable for use in a hand-held bar code symbol reader. In such an environment, these image-based techniques must operate at high speeds and operate in a resource constrained processing environment—constrained in memory, power utilization and weight—in order to provide cost-effective distortion-free real-time image acquisition and image-based bar code symbol reading suitable for many diverse applications, such as reading dense 2-D bar code symbols.

Thus, there is a great need in the art for improved image-based techniques/devices that provide velocity estimation/aspect ratio compensation and image-based jitter estimation and compensation to compensate for aspect ratio distortions and jitter distortions, which are suitable for use in a hand-held bar code symbol reader in order to provide cost-effective distortion-free real-time image acquisition and image-based bar code symbol reading suitable for many diverse applications, such as reading dense 2-D bar code symbols.

OBJECTS AND SUMMARY OF THE PRESENT INVENTION

Accordingly, a primary object of the present invention is to provide improved methods of and devices for illuminating the surface of at least one target object during image capture operations, and for producing digital images using such improved methods of object illumination, while avoiding the shortcomings of the prior art.

Another object of the present invention is to provide improved methods of and devices for image acquisition that utilize a plurality of linear imaging arrays in addition to at least one illumination module that produces planar light illumination that substantially overlaps the field of views corresponding to the plurality of linear imaging arrays during image capture operations that produce digital images.

Another object of the present invention is to provide improved methods of and devices for image acquisition utilizing a plurality of lower cost linear imaging arrays to produce a plurality of composite two-dimensional (2D) digital images of at least one target object, and image-based mechanisms/techniques that analyze the plurality of composite 2-D digital images to estimate relative velocity of the target object.

Another object of the present invention is to provide improved methods of and devices for image acquisition utilizing a plurality of lower cost linear imaging arrays to produce a plurality of composite two-dimensional (2D) digital images of at least one target object, and image-based mechanisms/techniques that analyze the plurality of composite 2-D digital images to estimate relative velocity of the target object in a manner that compensates for variations in height of the target object.

Another object of the present invention is to provide methods of and devices for image acquisition (and subsequent bar code symbol detection, OCR, etc) that produce an improved 2-D digital image of at least one target object utilizing a plurality of lower cost linear imaging arrays.

Another object of the present invention is to provide methods of and devices for image acquisition (and subsequent bar code symbol detection, OCR, etc) that utilize a plurality of lower cost linear imaging arrays to produce an improved 2-D digital image of at least one target object in a manner that reduces aspect ratio distortions (which result form variations in velocity of the target object with respect to the linear imaging arrays) in the 2-D digital image.

Another object of the present invention is to provide methods of and device for image acquisition (and subsequent bar code symbol detection, OCR, etc) that utilize a plurality of lower cost linear imaging arrays to produce an improved 2-D digital image of at least one target object in a manner that reduces aspect ratio distortions and maintains a constant white level in the 2-D digital image.

Another object of the present invention is to provide methods of and devices for image acquisition (and subsequent bar code symbol detection, OCR, etc) that utilize a plurality of lower cost linear imaging arrays to produce an improved 2-D digital image of at least one target object in a manner that reduces jitter distortions (which result form movement of the target object with respect to the linear imaging arrays in a direction transverse to the intended direction of motion) in the 2-D digital image.

Another object of the present invention is to provide improved image processing techniques/mechanisms that produce a first image of portions of the target object, the first image having substantially constant aspect ratio, utilizing image transformation operations that are based upon object velocity data, or utilizing camera control operations that are based upon object velocity data.

Another object of the present invention is to provide improved image processing techniques/mechanisms that carry out image-based horizontal jitter estimation and compensation operations, which estimate jitter over the image capture operations from which the first image is derived and transform the first image utilizing shift operations that are based upon such estimated jitter to produce a second image of portions of the target object which compensates for horizontal jitter distortion that would otherwise result therefrom.

A further object is to provide for planar light illumination that substantially overlaps (and preferably overfills) the field of views of a plurality of linear imaging devices over a range of working distances during sequential image capture operations.

Another object of the present invention is to provide planar light illumination that substantially overlaps (and preferably overfills) the field of views of a plurality of linear imaging devices over a range of working distances during sequential image capture operations, and that is focused so that its minimum width occurs at a point (or plane) which is the furthest object distance in the range of working distances.

Another object of the present invention is to provide planar light illumination that is substantially co-planar to the field of views of a plurality of linear imaging devices over a range of working distances.

Another object of the present invention is to use at least one source of coherent illumination (e.g., one or more VLDs) to produce such planar light illumination.

Another object of the present invention is to use at least one source of incoherent illumination (e.g., one or more LEDs) to produce such planar light illumination.

Another object of the present invention is to produce such planar light illumination with at least one planar light illumination module comprising an illumination source (VLD or LED), at least one focusing lens element, and at least one cylindrical lens element integrated into a modular housing.

Another object of the present invention is to produce such planar light illumination with a plurality of planar light illumination arrays disposed on opposite sides of the plurality of linear imaging arrays.

Another object of the present invention is to produce such planar light illumination with multiple planar light illumination modules that are spaced apart and oriented on an optical bench in a manner that produces a composite beam of planar light illumination with substantial uniform intensity distribution over a range of working distances.

Another object of the present invention is to provide improved image-based mechanisms/techniques that analyze the plurality of composite 2-D digital images to estimate relative velocity of the target object, wherein relative velocity is based on spatial offset of corresponding features in the plurality of composite 2-D images.

Another object of the present invention is to provide improved image-based velocity estimation techniques/mechanisms wherein velocity estimates are derived from spatial offset of corresponding features in a plurality of composite 2-D images.

Another object of the present invention is to provide such improved image-based velocity estimation techniques/mechanisms wherein the features in a given composite 2-D image are derived from the number of edges in each row of the given composite 2-D image.

Another object of the present invention is to provide such improved image-based velocity estimation techniques/mechanisms wherein the features in a given composite 2-D image are derived from local extrema in the derivative of edge count over the rows of the given composite 2-D image.

Another object of the present invention is to provide such improved image-based velocity estimation techniques/mechanisms wherein the features in a given composite 2-D image are derived from statistical analysis of the pixel data values in each row of the given composite 2-D image.

Another object of the present invention is to provide improved image-based velocity estimation techniques/mechanisms that utilize correlation analysis of the pixel data values over rows of the plurality of composite 2-D images.

Another object of the present invention is to provide improved image-based mechanisms/techniques that analyze the plurality of composite 2-D digital images to estimate relative velocity of the target object and compensate such velocity estimates for variations in height of said target object(s).

Another object of the present invention is to provide such improved image-based velocity estimation techniques/mechanisms, wherein compensation of such velocity estimates is based on estimate of a tilt angle of the target object over the rows of a composite 2-D image.

Another object of the present invention is to estimate the tilt angle of the target object over the rows of a composite 2-D image from one or more height measurements (which may be derived from a geometry-based triangulation-type range finding technique, a time-of-flight-type range finding technique, or other range finding approach).

Another object of the present invention is to provide improved image processing techniques/mechanisms that produce a first image of portions of the target object, the first image having substantially constant aspect ratio, utilizing line rate control operations (which are based upon estimated image velocity data) that control the variable line rate of a linear imaging array to maintain a substantially constant aspect ratio.

Another object of the present invention is to provide improved image processing techniques/mechanisms that utilize transformation operations that transform one or more composite 2-D images utilizing local compression, expansion, copy operations (which are based upon estimated image velocity) to produce the first image having substantially constant aspect ratio.

Another object of the present invention is to provide improved image processing techniques/mechanisms that analyze pixel data values derived from output of a plurality of linear imaging arrays to derive jitter data that estimates motion along a direction transverse to the intended direction of motion.

Another object of the present invention is to provide improved image processing techniques/mechanisms that analyze matching rows of reconstructed images (which are derived from the output of a plurality of linear imaging arrays) to derive jitter data that estimates motion along a direction transverse to the intended direction of motion.

Another object of the present invention is to provide improved image processing techniques/mechanisms that analyze matching rows of a difference image (which is derived from the pixel by pixel difference between corresponding rows in two reconstructed images) to derive jitter data that estimates motion along a direction transverse to the intended direction of motion.

Another object of the present invention is to provide improved image processing techniques/mechanisms that performs correlation analysis on pixel data values derived from the output of a plurality of linear imaging arrays to derive jitter data that estimates motion along a direction transverse to the intended direction of motion.

Another object of the present invention is to provide improved data processing techniques/mechanisms that buffer a row of pixel data values (which are derived from the output of a linear image array or from a reconstructed image) and transform such pixel data values utilizing shift operations that are based upon jitter data, to produce a second image having substantially constant aspect ratio, and thereby compensating for motion along the direction transverse to the intended direction of motion.

Another object of the present invention is to provide improved image processing techniques/mechanisms that sharpen a first image with substantially constant aspect ratio to produce a resultant image having substantially constant aspect ratio, which is stored in memory for subsequent processing.

Another object of the present invention is to provide such methods/device/techniques/mechanisms that are suitable for use in a resource constrained environment (e.g., constrained in memory, power utilization and/or weight), such has hand-held imagers and image-based hand-held bar code scanners.

Another object of the present invention is to embody such methods/device/techniques/mechanisms in an image-based bar code symbol reader, such a hand-held bar code scanner, presentation bar code scanner, or industrial bar code scanner.

Another object of the present invention is to provide improved methods of and devices for image acquisition utilizing a plurality of lower cost linear imaging arrays to produce a plurality of composite two-dimensional (2D) digital images of at least one target object, and image-based mechanisms/techniques that analyze the plurality of composite 2-D digital images to derive velocity data that estimates relative velocity of the target object and output such velocity data to a controller that updates the operating parameters of an illumination source (e.g., illumination power parameters, duty cycle parameters, etc) based upon the velocity data to compensate for changes in the relative object velocity as estimated by the velocity data.

Another object of the present invention is to provide improved methods of and devices for image acquisition utilizing a plurality of lower cost linear imaging arrays to produce a plurality of composite two-dimensional (2D) digital images of at least one target object, and image-based mechanisms/techniques that analyze the plurality of composite 2-D digital images to derive velocity data that estimates relative velocity of the target object and output such velocity data to a controller that updates the operating parameters (e.g., orientation parameters, focus parameters, zoom parameters, exposure parameters, etc.) of a camera subsystem based upon the velocity data to compensate for changes in the relative object velocity as estimated by the velocity data.

A further object of the present invention is to provide improved methods of and devices for image acquisition that utilize a plurality of linear imaging arrays, at least one illumination module (including at least one coherent light source, e.g., VLD) that produces planar light illumination that substantially overlaps the field of views corresponding to the plurality of linear imaging arrays during image capture operations that produce digital images, and one or more of despeckling mechanisms to reduce speckle noise in such digital images.

A further object of the present invention is to provide improved methods of and devices for image acquisition that utilize at least one imaging array, at least one illumination module (including at least one coherent light source, e.g. VLD) that produces planar light illumination that substantially overlaps the field of view corresponding to the imaging array during image capture operations that produce digital images, and illumination control circuitry that modulates the power level of illumination produced by the coherent light source during each photo-integration time period of the imaging array to thereby reduce speckle noise in images captured by the imaging array.

Another object of the present invention is to provide such improved methods of and devices for image acquisition, whereby the illumination control circuitry modulates the power level of illumination by controlling the number and/or duration of time periods corresponding to different power levels of illumination produced by the coherent light source during each photo-integration time period of the imaging array.

Another object of the present invention is to provide such improved methods of and devices for image acquisition, whereby the illumination control circuitry controls number and/or duration of such time periods such that substantially constant energy is produced by the coherent light source over the time periods (thereby enabling the different speckle patterns produced over the time periods to optimally cancel each other out).

A further object of the present invention is to provide a self-contained imaging engine for use in hand-held imagers/image-based bar code symbol readers, presentation imagers/image-based bar code symbol readers, other data acquisition devices, computer peripheral devices, other computing devices, and the like, the imaging engine including a plurality of linear imaging arrays, image formation optics, at least one illumination module and supporting circuitry that are embodied within a modular engine housing.

Another object of the present invention is to provide such a self-contained imaging engine wherein the at least one illumination module produces planar light illumination that substantially overlaps the field of views corresponding to the plurality of linear imaging arrays.

Another object of the present invention is to provide such a self-contained imaging engine wherein the supporting circuitry includes: timing signal generation circuitry that supplies timing signals to the linear imaging arrays in order to read out the row image data produced by such arrays (such row image data may be read out at a constant line rate or at a variable line rate); illumination control circuitry that supplies current to the illumination sources in the at least one illumination module; analog-to-digital conversion circuitry, which optionally filters row data image signal supplied thereto (to remove unwanted noise components) and converts the row image data supplied thereto into digital form; and data buffering circuitry, for storing the digital row image data generated by the analog-to-digital conversion circuitry and communicating the row image data stored therein over a data communication bus.

Another object of the present invention is to provide such a self-contained imaging engine wherein one linear image array has a variable line rate that is controlled by the timing signals supplied thereto such that the image capture operations performed by the one linear imaging array maintain a substantially constant aspect ratio, to thereby compensate for aspect ratio distortions that result from variations in velocity of engine with respect to target object(s); the variable line rate is based upon velocity estimates derived from processing of the pixel data values of other linear imaging arrays disposed therein.

Another object of the present invention is to provide such a self-contained imaging engine wherein the supporting circuitry includes a line rate adjustment module that is operably coupled to timing signal generation circuitry and adjusts the variable line rate of the one linear image device.

Another object of the present invention is to provide such a self-contained imaging engine wherein the supporting circuitry includes output illumination control module, that is operably coupled to illumination control circuitry and adjusts the optical power level and/or illumination time period for the illumination that overlaps one or more of the FOVs of the linear imaging arrays of the engine for speckle reduction/constant white levels.

Another object of the present invention is to provide such a self-contained imaging engine wherein the supporting circuitry is disposed on at least one printed circuit board integral to the engine housing.

Another object of the present invention is to provide such a self-contained imaging engine wherein the supporting circuitry includes imaging processing circuitry, operably coupled to the data buffering circuitry over the data communication bus, that realizes portions of image-based mechanisms/techniques for image velocity estimation, aspect ratio compensation, jitter estimation and compensation, bar code detection, OCR, and/or image lift.

Another object of the present invention is to provide imaging processing circuitry that realizes image-based mechanisms/techniques for image velocity estimation, aspect ratio compensation, jitter estimation and compensation, bar code detection, OCR, and/or image lift, wherein the imaging processing circuitry comprises dedicated hardware (such as one or more FPGAs, one or more CPLDs, and/or one or more ASICs).

Another object of the present invention is to provide imaging processing circuitry that realizes image-based mechanisms/techniques for image velocity estimation, aspect ratio compensation, jitter estimation and compensation, bar code detection, OCR, and/or image lift, wherein the imaging processing circuitry comprises dedicated hardware (such as one or more FPGAs, one or more CPLDs, and/or one or more ASICs) in addition to and one or more digital signal processing engines and associated memory.

Another object of the present invention is to provide imaging processing circuitry that realizes image-based mechanisms/techniques for image velocity estimation, aspect ratio compensation, jitter estimation and compensation, bar code detection, OCR, and/or image lift, wherein the imaging processing circuitry comprises one or more digital signal processing engines and associated memory.

These and other objects of the present invention will become apparent hereinafter and in the Claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIG. 2F1 is an isometric view of a planar light illumination source (PLIS) that is embodied in the PLIAs of FIG. 2A and produces a planar light illumination beam (PLIB) therefrom.

FIG. 2F2 is a front view of the PLIS of FIG. 2F1 illustrating the fan angle $\theta$ of the PLIB produced therefrom as the beam propagates along its characteristic propagation direction.

FIG. 2F3 is a side view of the PLIS of FIGS. 2F1 and 2F2 illustrating the fan angle $\phi$ (representing degree of convergence/divergence) along the height dimension of the beam (i.e., the dimension orthogonal to the characteristic plane); when the planar light illumination beam is projected onto a target surface, its profile of power versus displacement (over the width of its planar dimension as best shown in FIG. 2F2) will preferably have an approximately Gaussian distribution.

FIG. 2G1 is an isometric view of an exemplary VLD-based PLIS that produces a planar beam of substantially coherent light for use in the PLIAs described herein, including: a housing 14 that supports a visible laser diode (VLD) 13, focusing lens 15 and cylindrical lens, all disposed along a central optical axis; the cylindrical lens 16, which may be fixedly mounted within a notch in the housing 14, is oriented so that its central axis is oriented substantially perpendicular to the central optical axis; the focusing lens 15 is disposed along the central optical axis at a distance from the VLD 13 which causes the laser beam output from the VLD 13 to be converging in the direction of the cylindrical lens 16; the cylindrical lens 16 disperses (i.e. spreads) the focused laser beam along the plane in which the cylindrical lens 16 has curvature, while the characteristics of the planar light illumination beam (PLIB) in the direction transverse to the propagation plane are determined by the focal length of the focusing lens 15.

FIG. 2G2 is a front view of the VLD-based PLIS of FIG. 2G1 illustrating the fan angle along the characteristic propagation direction of the PLIB produced therefrom.

FIG. 2G3 is a side view of the VLD-based PLIS of FIG. 2G1 illustrating the fan angle (representing degree of convergence/divergence) along the height dimension of the PLIB produced therefrom.

FIGS. 2H1 and 2H2 are pictorial illustrations of an exemplary LED-based PLIS that produces a planar beam of incoherent light for use in the PLIAs described herein, including: a light emitting diode (LED) 4501, realized on a semiconductor substrate 4502, and having a small and narrow (as possible) light emitting surface region 4503 (i.e. light emitting source); a focusing lens 4504 for focusing a reduced size image of the light emitting source 4503 to its focal point; a cylindrical lens element 4505 beyond the focusing lens 4504, for diverging or spreading out the light rays of the focused light beam along a planar extent to produce a spatially-incoherent planar light illumination beam (PLIB) 4506, while the height of the PLIB is determined by the focusing operations achieved by the focusing lens 4505; and a compact barrel or like structure 4507, for containing and maintaining the above described optical components in optical alignment, as an integrated optical assembly.

FIGS. 2I1 and 2I2 are pictorial illustrations of an alternate LED-based PLIS that produces a planar beam of incoherent light for use in the PLIAs described herein, including: a light emitting diode (LED) 4511 having a small and narrow (as possible) light emitting surface region 4512 (i.e. light emitting source) realized on a semiconductor substrate 4513; a focusing lens 4514 (having a relatively short focal distance) for focusing a reduced size image of the light emitting source 4512 to its focal point; a collimating lens 4515 located at about the focal point of the focusing lens 4514, for collimating the light rays associated with the reduced size image of the light emitting source 4512; a cylindrical lens element 4516 located closely beyond the collimating lens 4515, for diverging the collimated light beam substantially within a planar extent to produce a spatially-incoherent planar light illumination beam (PLIB) 4518; and a compact barrel or like structure 4517, for containing and maintaining the above described optical components in optical alignment, as an integrated optical assembly.

FIGS. 2J1, 2J2 and 2J3 are pictorial illustrations of an LED-based PLIA for use in the imaging devices of the present invention described herein, including: a linear-type light emitting diode (LED) array 4601, on a semiconductor substrate 4602, providing a linear array of light emitting sources 4603 (having the narrowest size and dimension possible); a focusing-type microlens array 4604, mounted above and in spatial registration with the LED array 4601, providing a focusing-type lenslet 4604A above and in registration with each light emitting source, and projecting a reduced image of the light emitting source 4605 at its focal point above the LED array; a collimating-type microlens array 4607, mounted above and in spatial registration with the focusing-type microlens array 4604, providing each focusing lenslet with a collimating-type lenslet 4607A for collimating the light rays associated with the reduced image of each light emitting device; a cylindrical-type microlens array 4608, mounted above and in spatial registration with the collimating-type micro-lens array 4607, providing each collimating lenslet with a linear-diverging type lenslet 4608A for producing a spatially-incoherent planar light illumination beam (PLIB) component 4611 from each light emitting source; and an IC package 4609 containing the above-described components in the stacked order described above, and having a light transmission window 4610 through which the spatially-incoherent PLIB 4611 is transmitted towards the target object being illuminated.

FIG. 3 is a pictorial illustration of the image capture operations and image processing operations carried out by a PLILIM-based imaging device in accordance with the present invention that build up and process a pair of composite 2-D images to derive image velocity metrics for the rows of a select one of the composite 2-D image, transform the select one composite 2-D image based upon the image velocity metrics to form a reconstructed 2D image with substantially constant aspect ratio, thereby compensating for variations in image velocity that may occur during image capture, and store the reconstructed 2D image for subsequent processing (e.g., bar code reading, OCR, and/or image lift).

FIGS. 6A1 and 6A2, taken together, set forth a flow chart illustrating exemplary image processing operations carried out by the PLILIM-based imaging devices described herein as part of Image Velocity Estimation/Aspect Ratio Compensation in accordance with the present invention; such operations identify statistical features of raw intensity values over the rows of multiple composite 2-D images (blocks 601–609 and blocks 611–619), match such features to generate a list of corresponding features (block 621), and derive relative image velocity metrics for the rows of a selected composite 2-D image based upon location of corresponding features in the list (blocks 623–625).

FIGS. 6B1A and 6B1B, taken together, set forth a flow chart illustrating exemplary image processing operations carried out by the PLILIM-based bar imaging devices described herein as part of Image Velocity Estimation/

Aspect Ratio Compensation in accordance with the present invention; such operations identify edge attributes (e.g., local extrema of row edge count values) over the rows of multiple composite 2-D images (blocks 601'–609' and blocks 611'–619'), match such features to generate a list of corresponding features (block 621), and derive relative image velocity metrics for the rows (or subrow intervals) of a selected composite 2-D image based upon location of corresponding features in the list (blocks 623–625).

FIGS. 6B2 though 6B7 illustrate exemplary operations for detecting and counting edges (e.g., sharp transitions) over the rows of pixel data values stored in a given 2D image buffer (e.g., first 2D image buffer or second 2D image buffer) and processing such edge counts to identify local extreme/features therein, which may be carried out by the PLILIM-based bar imaging devices described herein as part of Image Velocity Estimation/Aspect Ratio Compensation in accordance with the present invention.

FIGS. 6B8(i), 6B8(ii), 6B9 and 6B10 are flow charts illustrating exemplary operations for matching (e.g., identifying correspondence between) features from the set S1 of features from the first 2D image buffer with features from set S2 of features from the second 2D image buffer to build a list of corresponding feature pairs (the pair consisting of one feature from set S1 matched to one feature in set S2), which may be carried out by the PLILIM-based bar imaging devices described herein as part of Image Velocity Estimation/Aspect Ratio Compensation in accordance with the present invention.

FIGS. 6B11(i), 6B11(ii), 6B11(iii) and 6B11(iv) illustrate alternate operations for matching (e.g., identifying correspondence between) features from the set S1 of features from the first 2D image buffer with features from set S2 of features from the second 2D image buffer to build a list of corresponding feature pairs (the pair consisting of one feature from set S1 matched to one feature in set S2), which may be carried out by the PLILIM-based bar imaging devices described herein as part of Image Velocity Estimation/Aspect Ratio Compensation in accordance with the present invention.

FIG. 6B12 is a flow chart illustrating exemplary operations for smoothing image velocity values over the rows (or subrow intervals) of a given 2D image buffer, which may be carried out by the PLILIM-based bar imaging devices described herein as part of Image Velocity Estimation/Aspect Ratio Compensation in accordance with the present invention.

Figure 7A:
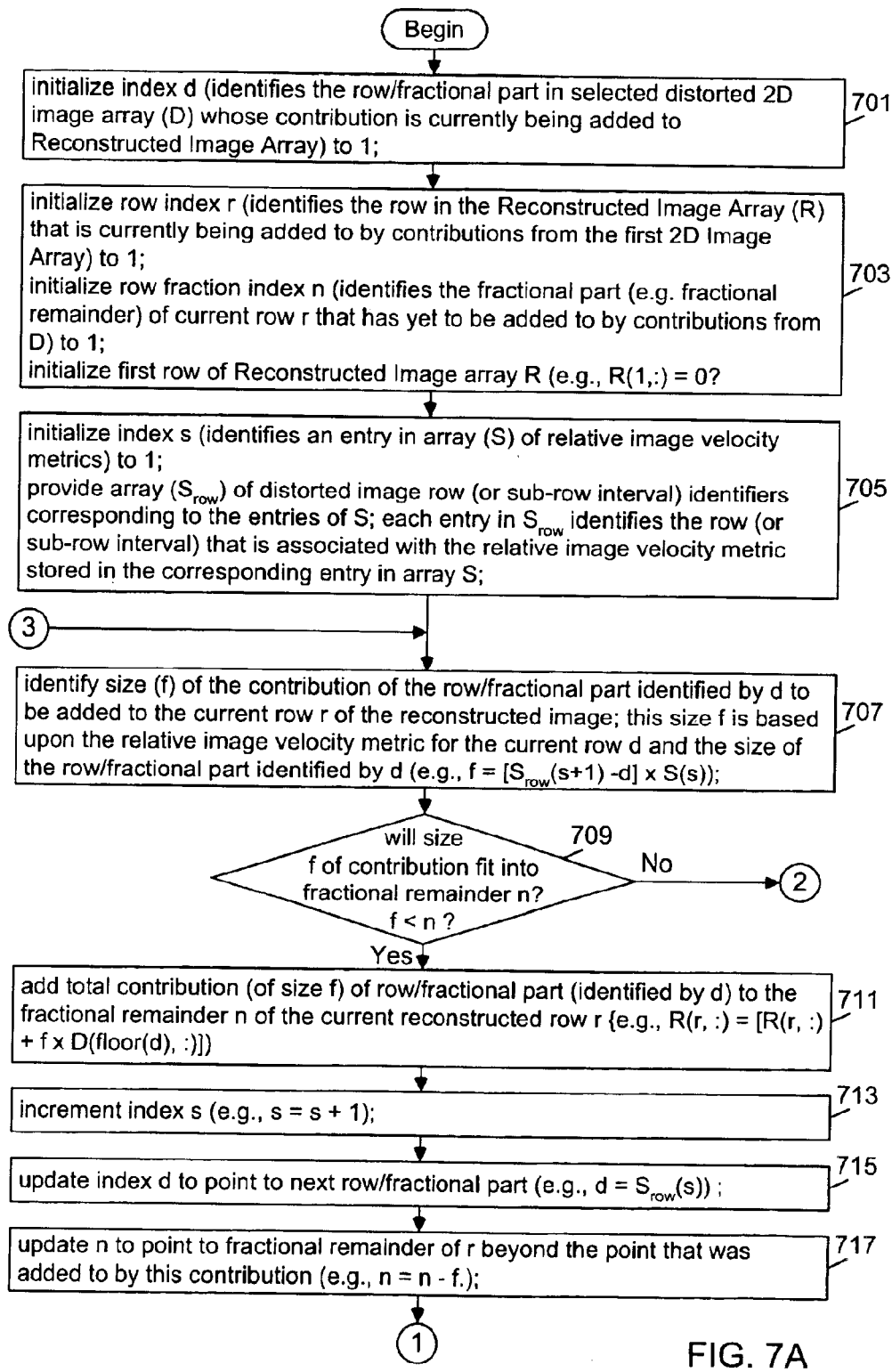
Figure 7B:
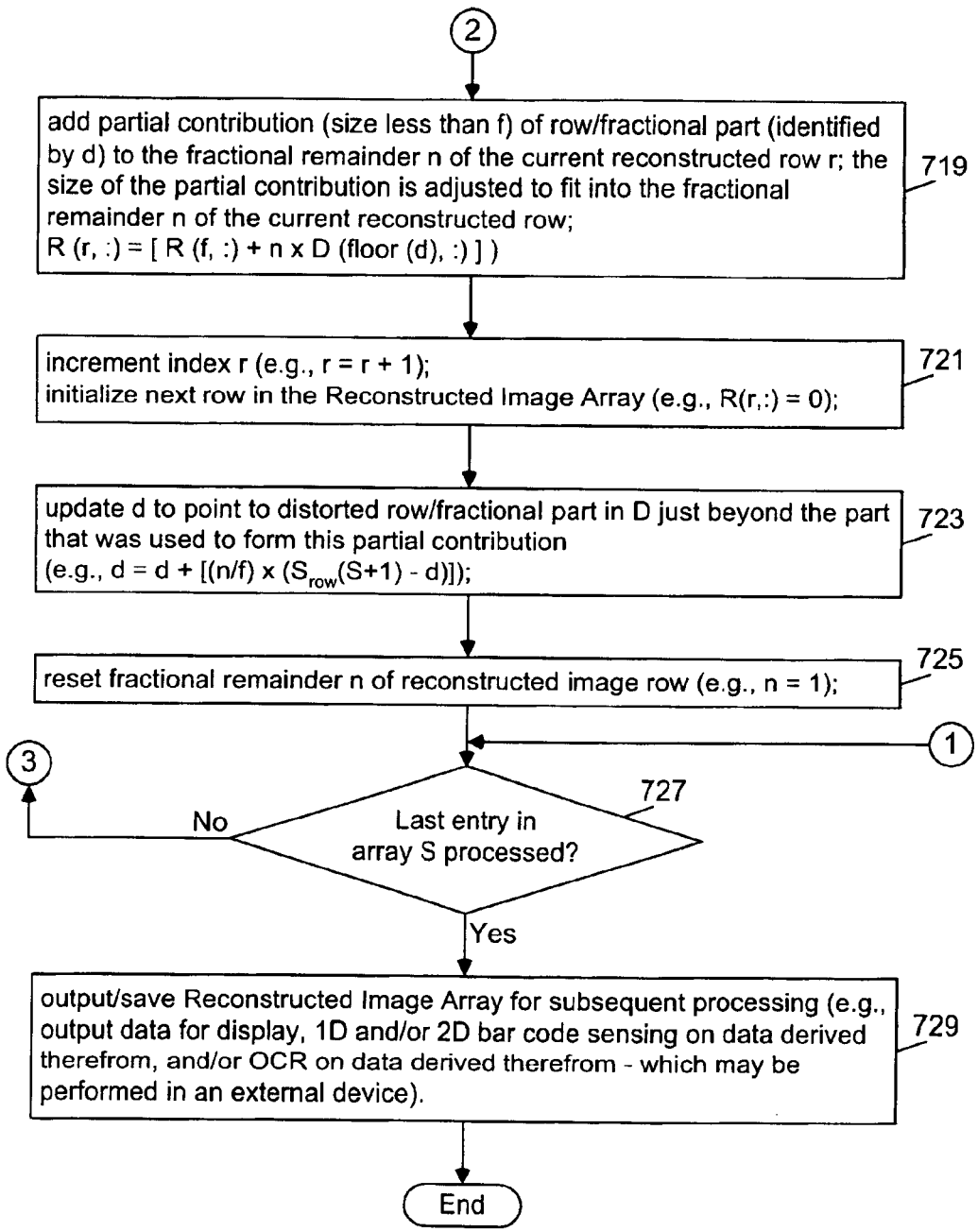
Figure 7C:
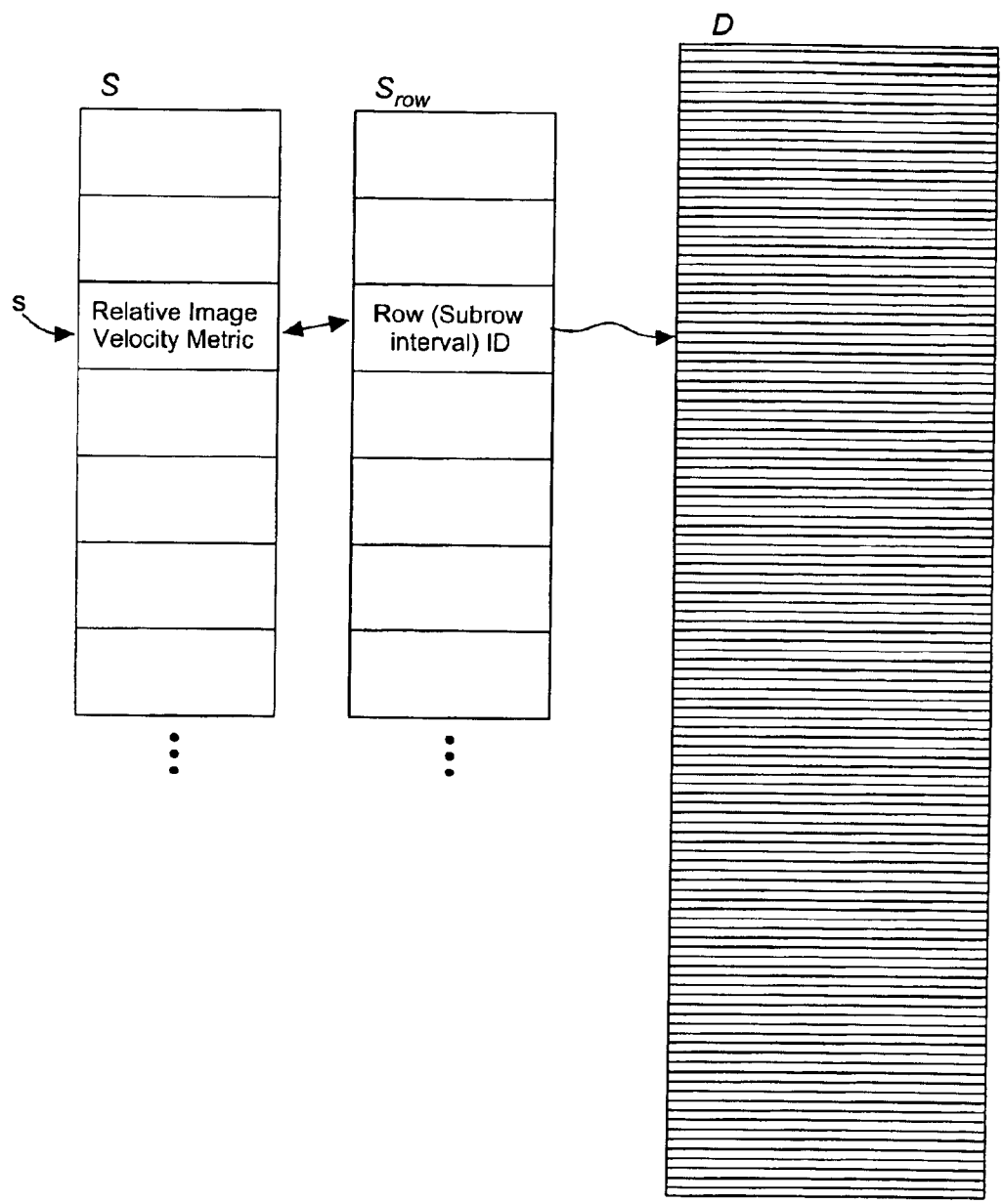

FIGS. 7A–7C illustrate exemplary image processing operations that may be carried out by the PLILIM-based imaging devices described herein as part of its Aspect Ratio Compensation routine in accordance with the present invention; such image processing operations perform image transformation operations (copy, compression and expansion) sequentially over portions of the selected composite 2-D image (labeled "D") based upon the relative image velocity metrics for the rows (or sub-row intervals) to build up corresponding portions of the reconstructed image (labeled "R"); the resulting reconstructed image R, which has substantially constant aspect ratio, is stored in memory for subsequent processing.

FIGS. 7D1 and 7D2, taken together, set forth a flow chart illustrate exemplary image processing operations that sharpen (e.g., increase the visibility of image structures with high spatial frequencies such as details, edges, fine textures, etc) an image, which may be carried out by the PLILIM-based imaging devices described herein in accordance with the present invention.

Figure 8A:
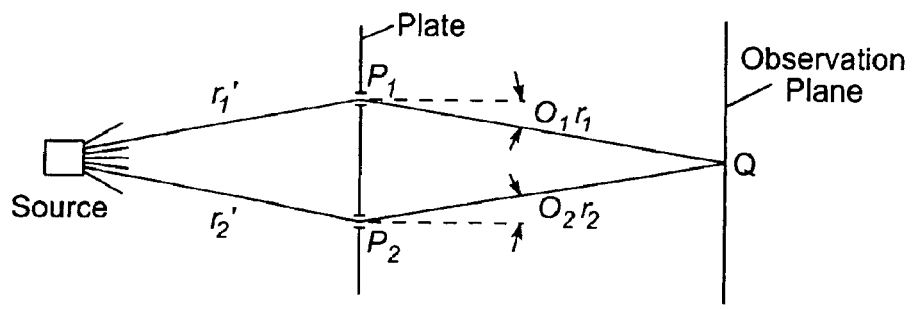
Figure 8B:
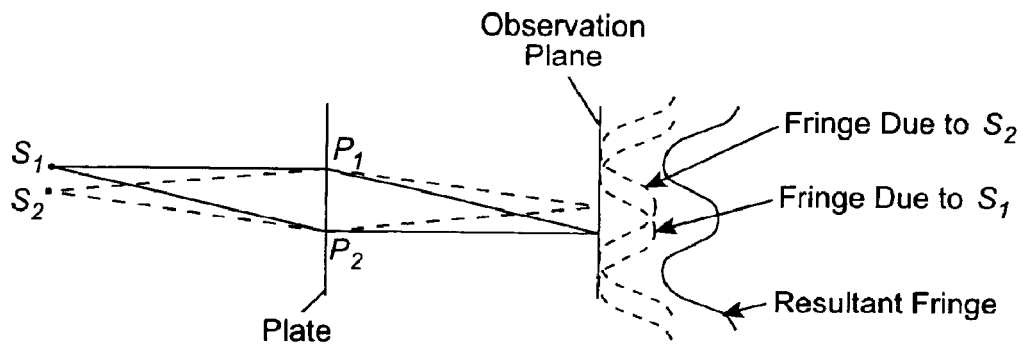

FIGS. 8A and 8B set forth pictorial illustrations of Young's double slit interference experiment, which can be used to understand the concept of spatial coherence of a coherent source.

Figure 9A:
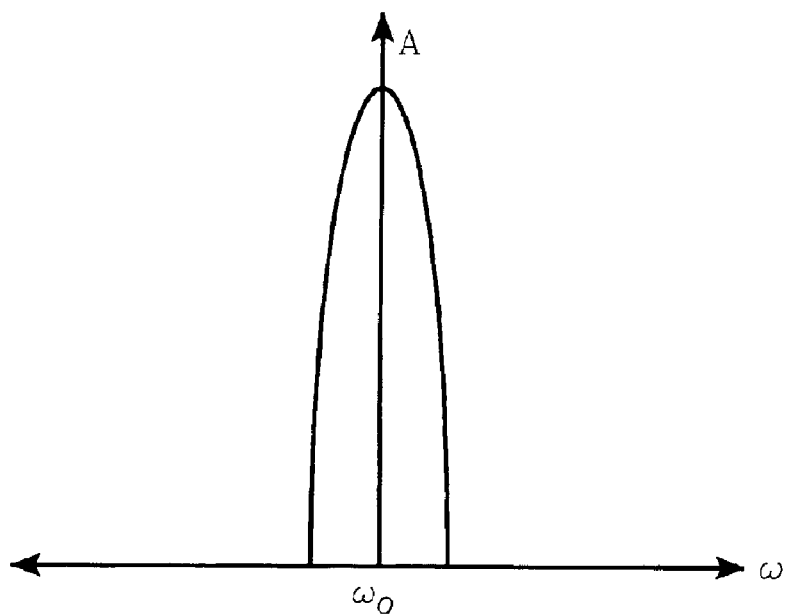

FIG. 9A is a pictorial representation of light beam with "high" temporal coherence (e.g., smaller variations ($\Delta\omega$) in the frequency (or wavelength) of the waves that make up the beam).

Figure 9B:
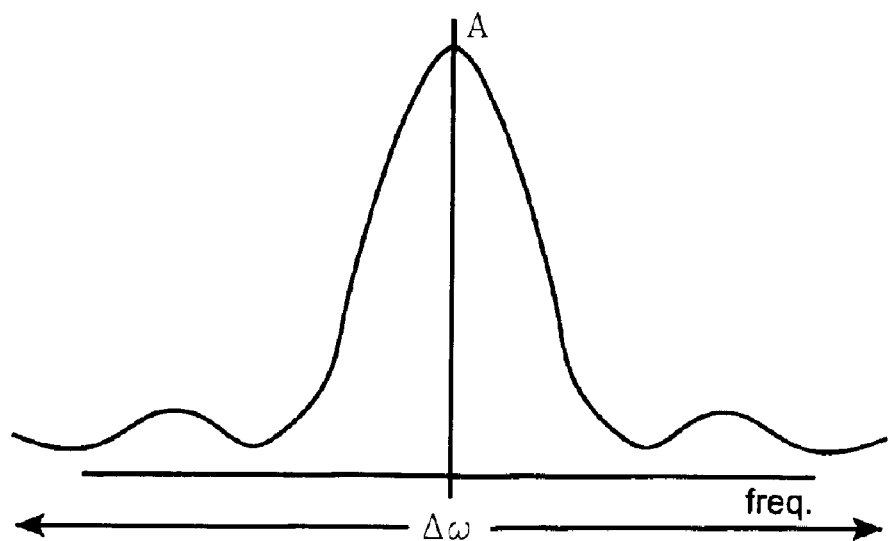

FIG. 9B is a pictorial representation of light beam with "low" temporal coherence (e.g., larger variations ($\Delta\omega$) in the frequency (or wavelength) of the waves that make up the beam).

Figure 10:
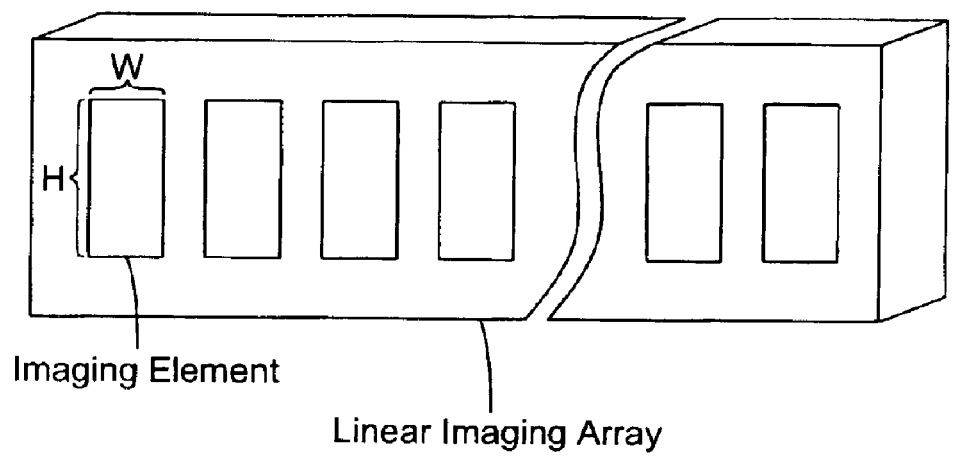

FIG. 10 is a pictorial illustration of a linear imaging array having imaging elements characterized by a large height-to-width aspect ratio (H/W>>1), referred to herein as "vertically-elongated pixels"), which may embodied in the PLILIM-based devices described herein to reduce the peak speckle noise percentage (as well as the RMS value of the speckle noise) detected by the image detection elements of such PLILIM-based devices.

Figure 11A:
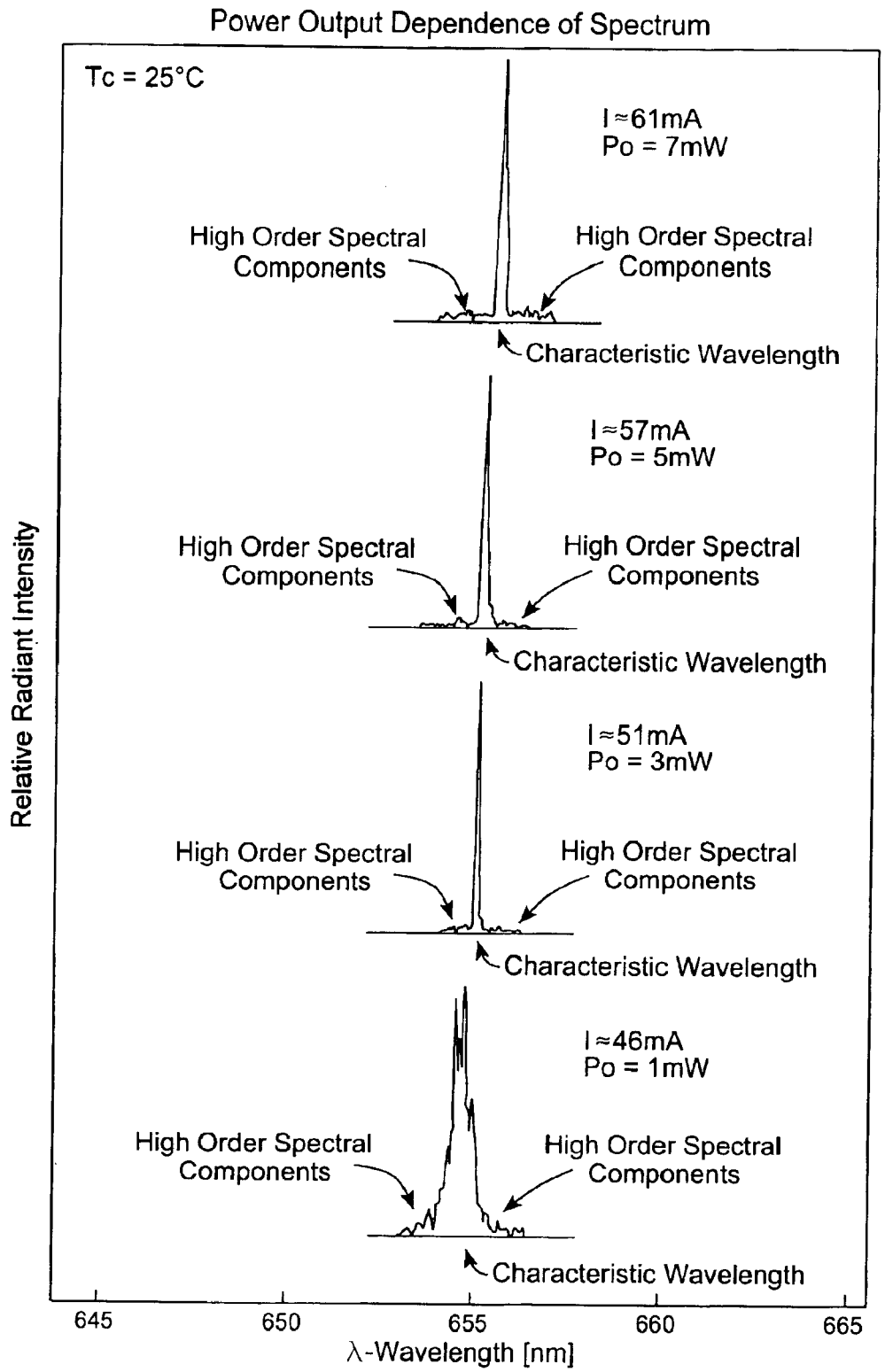

FIG. 11A illustrates the relationship of changes in supply current I/output power level Po to the spectral characteristics of light produced by an exemplary VLD (the SLD1133VL VLD readily available from Sony Semiconductor of San Jose, Calif.) at a specific operating temperature of 25 degrees C.; note that spectral characteristics, including the amount of high order spectral components (e.g., those components that lie outside the narrow spike that represents the characteristic wavelength of the VLD at the given current level) of light produced by the exemplary VLD vary with respect to changes in supply current/output power level.

Figure 11B:
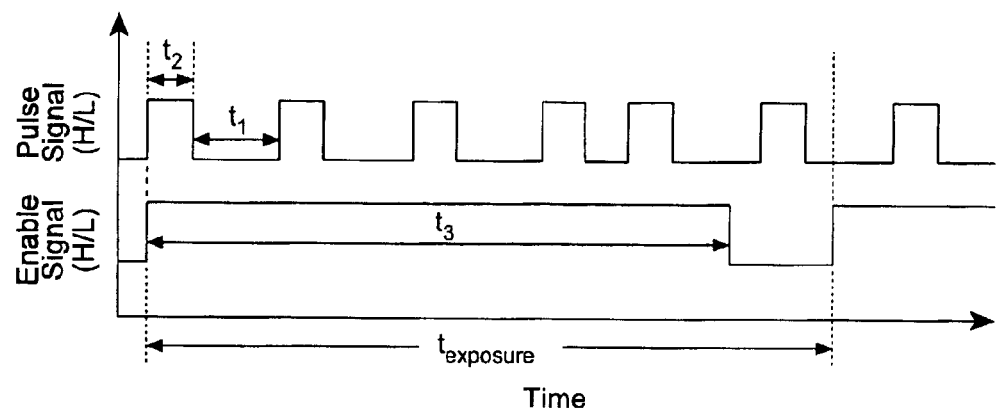
Figure 11C:
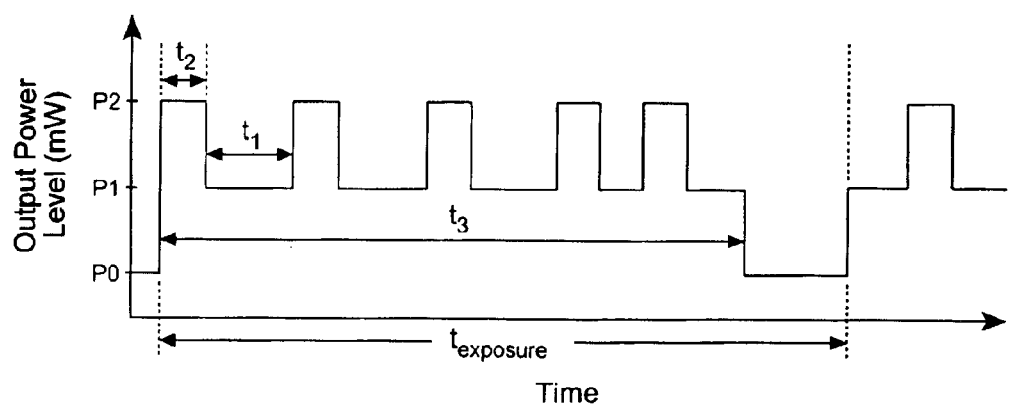

FIGS. 11B and 11C illustrate two different waveforms supplied by laser control circuitry to laser illumination source(s) over a representative photo-integration time period of the linear imaging arrays of the devices described herein; such waveforms operate the laser illumination source (e.g., VLD) at multiple different optical power levels (two shown as P1 and P2) over corresponding time periods (t1 and t2) within the integration time period $t_{exposure}$ of the linear imaging array(s) of the device; such operations produce varying high order spectral components (e.g., reduced temporal coherent light) over the integration time period, which reduces the speckle noise detected by the imaging elements of the device; preferably the number and duration of time periods t1 and t2 is controlled such that: i) energy produced by the VLD over the t1 time periods is substantially equal to the energy produced by the VLD over the t2 time periods, and 2) the total energy produced by the VLD over the integration time period $t_{exposure}$ does not exceed a maximum value (typically chosen to avoid saturation of the linear imaging array(s) of the device).

Figure 11D:
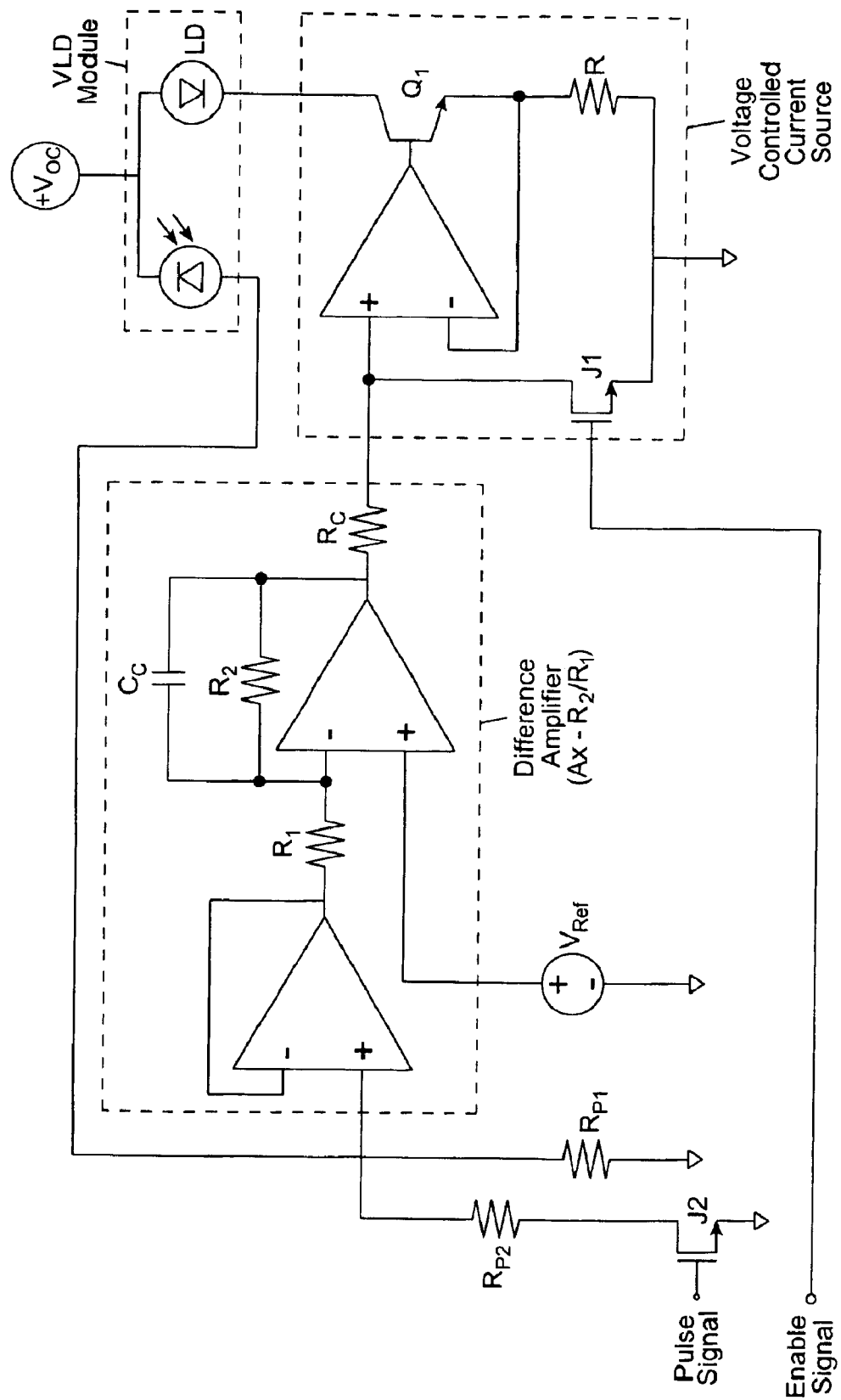

FIG. 11D is a functional block diagram of an illustrative embodiment of laser illumination control circuitry that operates in accordance with the waveforms described above with respect to FIGS. 11B and 11C.

Figure 11E:
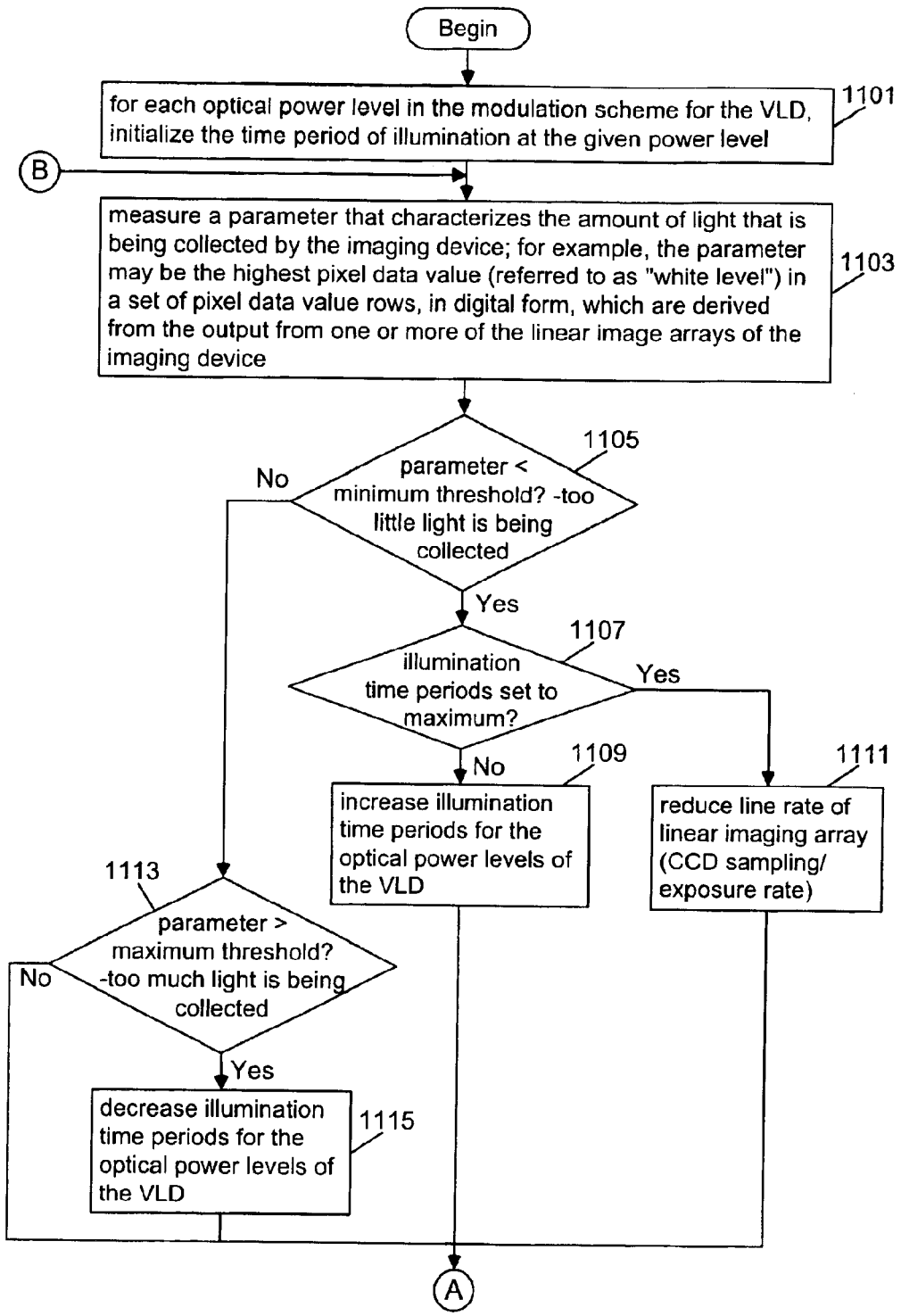

FIG. 11E(i) and 11E(ii) is a flow chart illustrating exemplary illumination control operations that are suitable for use in conjunction with the system architecture of FIG. 13B1 in accordance with the present invention; such operations (which are preferably realized as a programmed set of instructions executing on controller 419" of FIG. 13B1) provide for output power modulation of the illumination sources (for speckle reduction as described herein) and control the white level of the third composite 2-D image in a real time manner to provide a substantially constant white pixel level over varying line rates of the third linear imaging array $LA_C$.

Figure 12A:
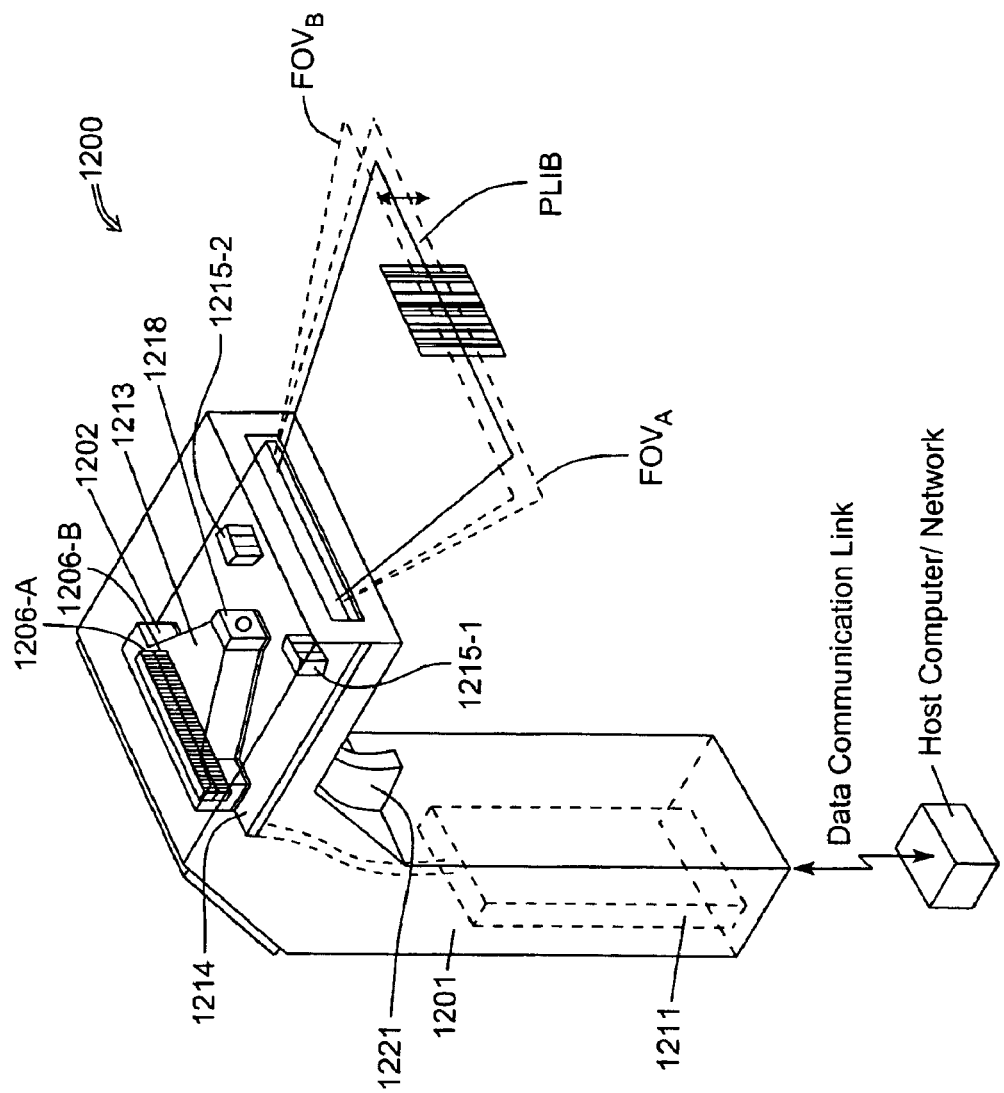

FIG. 12A is a pictorial illustration of a hand-supportable PLILIM-based imaging device in accordance with the present invention, including: an image capture engine 1202 mounted on an optical-bench/multi-layer PC board 1214 within a hand-holdable housing 1201; the image capture engine 1202 includes multiple linear (i.e., 1-D) image detection arrays (e.g., two shown as 1206-A and 1206-B) and image formation optics 1218 disposed within a modular housing 1213; the image formation optics 1218 collect light that is reflected from the illuminated object along the corresponding field of views (FOVs) (e.g., FOV-A and FOV-B), and pass such collected light to the linear image detection arrays 1206A and for image capture; the substantially planar field of views (e.g., FOV-A and FOV-B) are displaced (offset) from one another along the direction of intended motion of the target object relative to the system housing; a pair of PLIAs 1215-1 and 1215-2 (each comprising multiple light sources, e.g., VLDs or LEDs) are mounted on the optical bench 1214 on opposite sides of the image capture engine 1202, for producing the composite PLIB that illuminates the field of views of the linear image detection arrays (e.g., FOV-A and FOV-B). The composite PLIB spatially overlaps and preferably is substantially coextensive (i.e. coplanar) with the field of views of the linear image detection arrays (e.g., FOV-A and FOV-B) along a substantial portion of the range of working distances of the device, while images of the illuminated target object are formed on and detected by the plurality of linear image detection arrays; and at least one printed circuit board (one shown as 1211) contained with the housing 1201 onto which is integral mounted image processing circuitry that carries out Image Velocity/Aspect Ratio Compensation/Jitter Estimation and Compensation as described herein on images derived from the row data captured by the linear image detection arrays (in addition, the image processing circuitry preferably carries out bar code symbol reading operations and possibly optical character recognition (OCR) operations, and the like, on such images and/or the image produced and stored by such operations); in addition, the at least one printed circuit board preferably includes a communication interface that supports data communication between the device and a host computer/network over a data communication link therebetween; the PLILIM-based imager device may also include an LCD panel, a data entry keypad and/or a user-activated switch that provides user control of predetermined system operations (which may include user activation of the image capture operations and subsequent image processing operations, and/or user activation of communication of bar code symbol data from the device to the host computer/network).

Figure 12B:
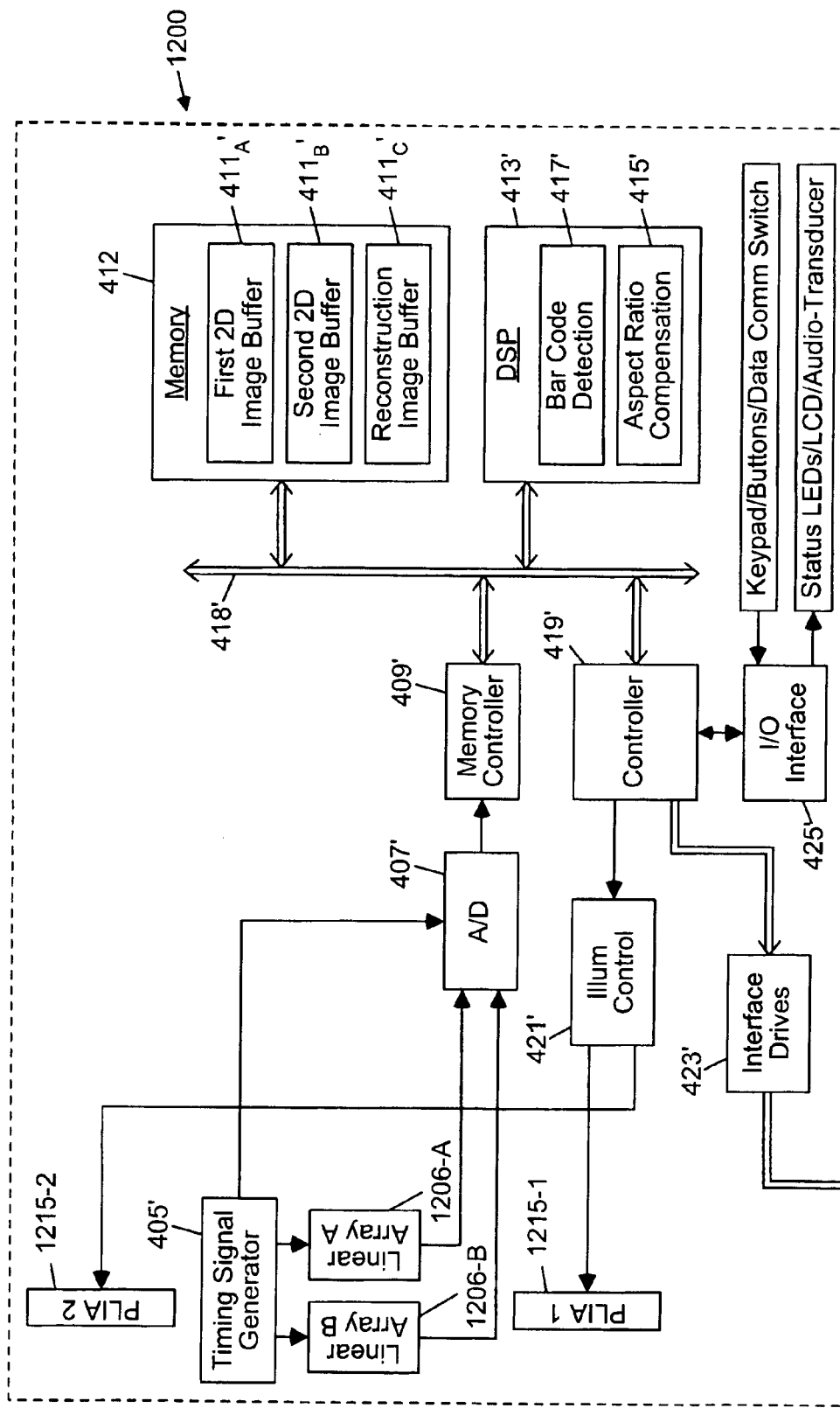

FIG. 12B illustrates an exemplary system architecture for the hand-holdable PLILIM-based imaging device of FIG. 12A; preferably, the device is also capable of performing bar code detection operations and image lift operations suitable for OCR and other imaging applications.

FIG. 13A1 is a pictorial illustration of an alternate embodiment of a PLILIM-based light illumination and image capture module in accordance with the present invention including: a plurality of linear imaging arrays ($LA_A$, $LA_B$, $LA_C$) and image formation optics that cooperate to image substantially planar field of views (FOVs), whose generalized outline is shown with dotted lines, that are displaced (offset) from one another along the direction of intended motion of the target object relative to the system housing; the imaging elements of each linear imaging array ($LA_A$, $LA_B$, $LA_C$) extend in a direction transverse to the direction of intended motion; a pair of planar light illumination arrays ($PLIA_1$ and $PLIA_2$) are preferably arranged on opposite sides of the linear image arrays $LA_A$, $LA_B$, $LA_C$ and cooperate to project planar light illumination that substantially overlaps (and preferably overfills) the FOVs of the plurality of linear image detectors $LA_A$, $LA_B$, $LA_C$ along a substantial portion of the range of working distances of the module; preferably, the FOV of each linear imaging array $LA_A$, $LA_B$, $LA_C$ and the planar light illumination are substantially coplanar along a substantial portion of the range of working distances of the module as shown.

FIG. 13A2 is a pictorial illustration of an exemplary illumination scheme for the module of FIG. 13A1, depicting the spatial relationship between the planar light illumination and the FOVs of the linear image detectors of the module of FIG. 13A1 at a representative working distance; as shown, the planar light illumination overfills (e.g., encompasses and extends beyond) the FOVs of the plurality of linear image detectors at the representative working distance.

Figure 3:
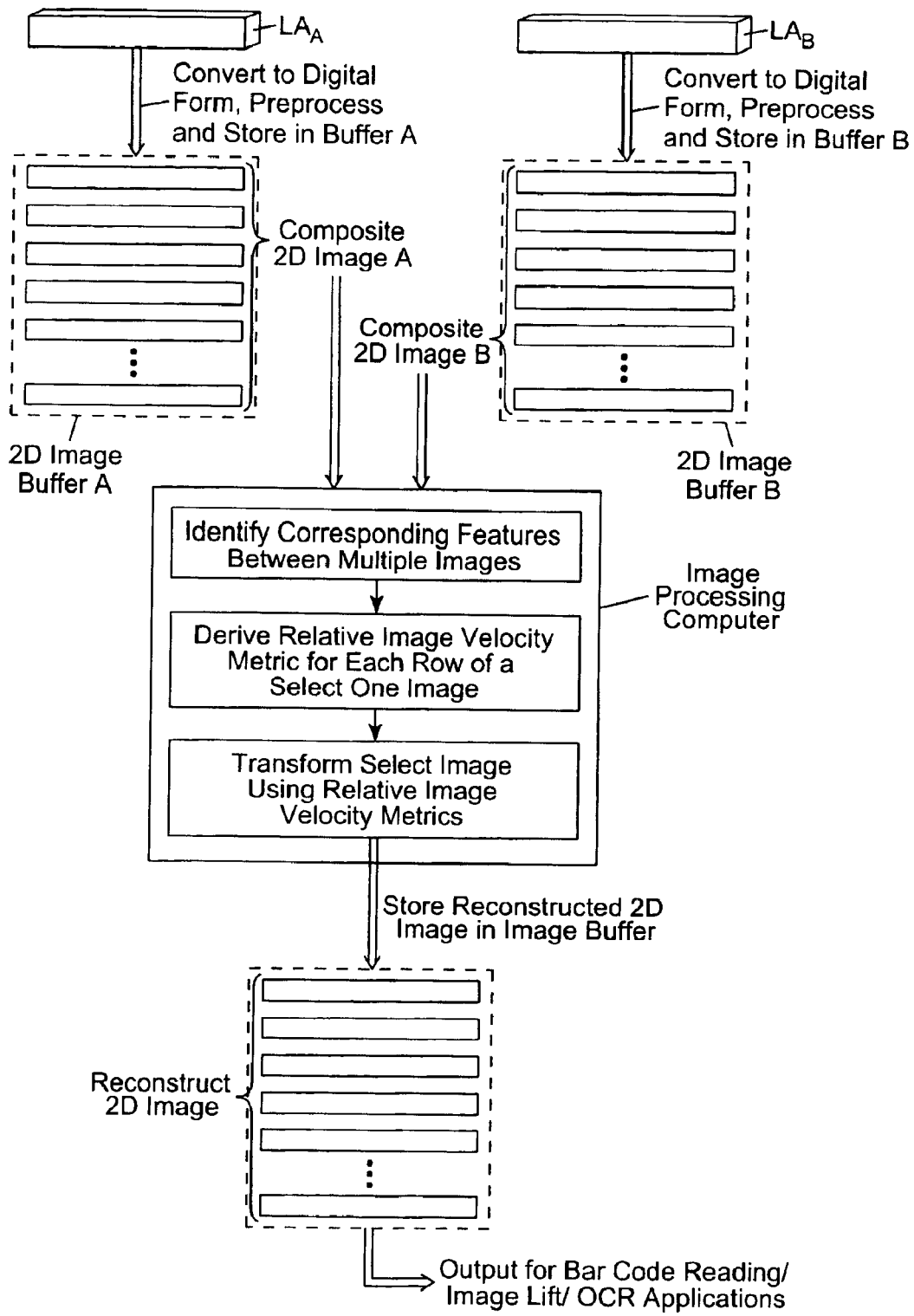

FIG. 13A3 is a pictorial illustration of an alternate illumination scheme for the module of FIG. 13A1, depicting the spatial relationship between the planar light illumination and the FOVs of the linear image detectors of the module of FIG. 13A1 at a representative working distance; as shown, the planar light illumination substantially overlaps (but does not overfill all of) the FOVs of the linear imaging detectors of the module at the representative working distance.

FIG. 13A4 is a pictorial illustration of the image capture operations and image processing operations carried out by a PLILIM-based imaging device in accordance with the present invention that build up and process a pair of composite 2-D images to derive image velocity metrics for the rows of a select one of the composite 2-D image, calculate/adjust the variable line rate of a third linear imaging array based upon the image velocity metrics to capture a third composite 2-D image with substantially constant aspect ratio (thereby compensating for variations in image velocity that may occur during image capture), calculate/adjust the output power level of illumination based upon the variable line rate of the third linear imaging array such that the white level of the third composite 2-D image is substantially constant, and store the third composite 2-D image for subsequent processing (e.g., bar code reading, OCR, and/or image lift).

FIG. 13B1 illustrates an exemplary system architecture for a PLILIM-based imaging device of FIG. 13A1 in accordance with the present invention. Preferably, the device is also capable of performing bar code detection and image lift operations suitable for OCR and other imaging applications.

Figure 1A:
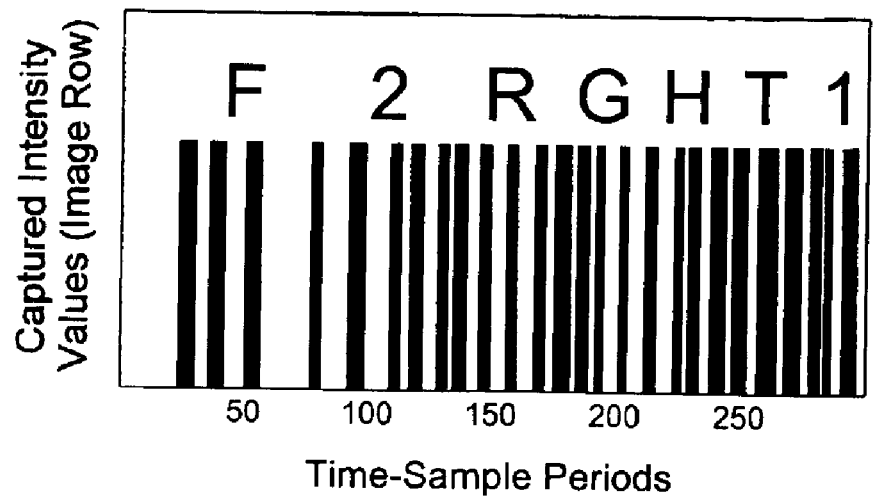
FIG. 1A illustrates an image of bar code label captured by a linear imaging camera where the linear imaging camera is moved with respect to the bar code label/object to be scanned at a varying velocity (as depicted in the graph of FIG. 1B) during image capture operations; when the linear imaging camera is moved with respect to the bar code label/object at increasing velocity, the image is compressed; on the other hand, when the linear imaging camera is moved with respect to the bar code label/object at decreasing velocity, the image is expanded.
Figure 1B:
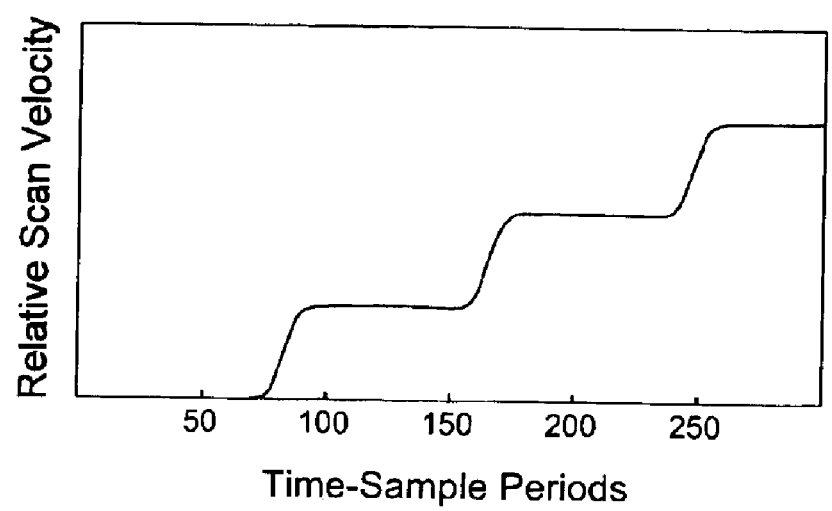
FIG. 1B is a graph that illustrates the varying velocity the linear imaging camera with respect to the bar code label/object to be scanned over the image capture operations that capture the image shown in FIG. 1A.
Figure 2A:
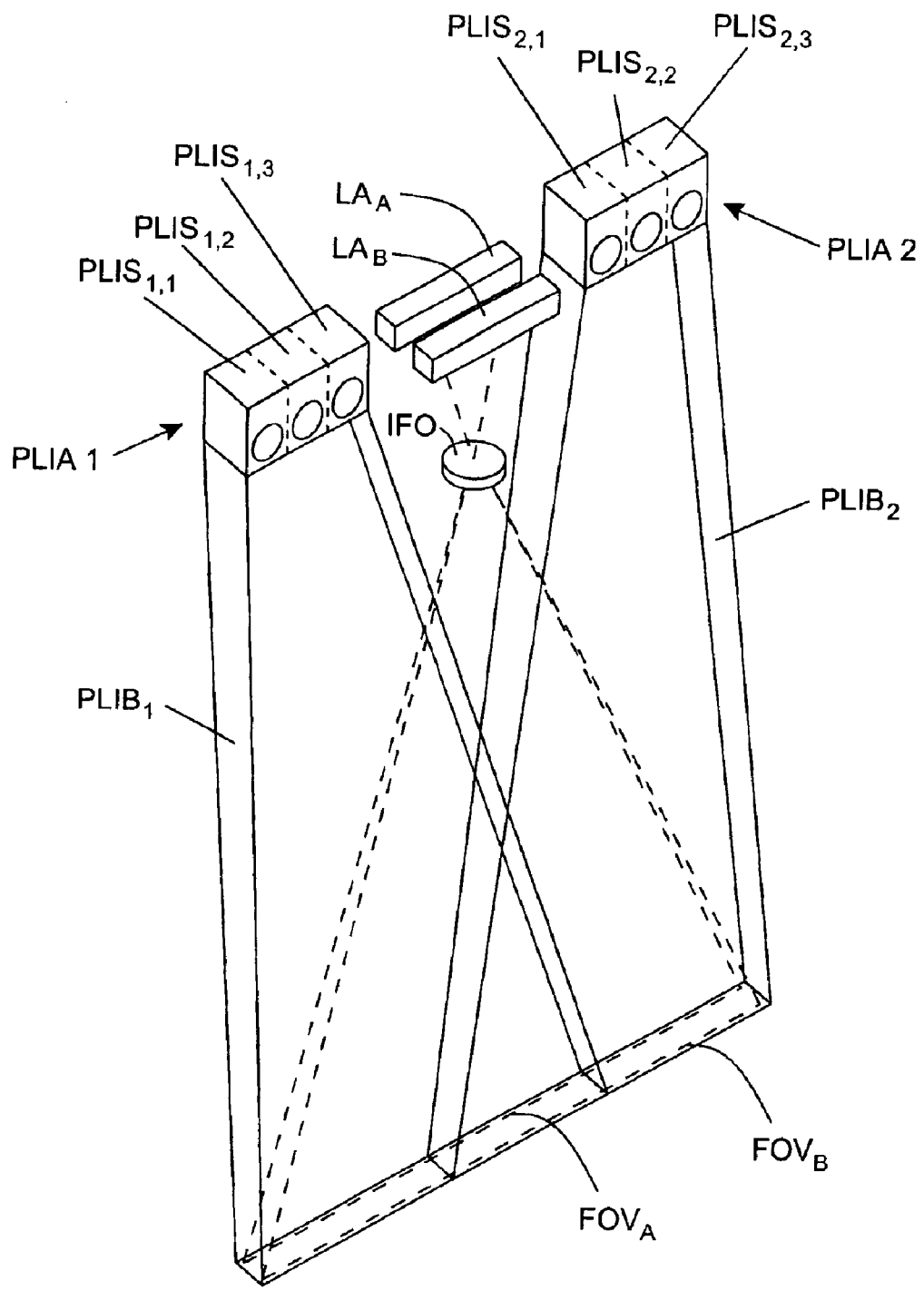
FIG. 2A is a pictorial illustration of an illustrative embodiment of a planar laser illumination and linear imaging (PLILIM-based) light illumination and image capture module in accordance with the present invention including: a plurality of linear imaging arrays ($LA_A$ and $LA_B$) and image formation optics that cooperate to image substantially planar field of views (FOVs), whose generalized outline is shown with dotted lines, that are displaced (offset) from one another along the direction of intended motion of the target object relative to the system housing; the imaging elements of each linear imaging array ($LA_A$ and $LA_B$) extend in a direction transverse to the direction of intended motion; a pair of planar light illumination arrays ($PLIA_1$ and $PLIA_2$) are preferably arranged on opposite sides of the linear image arrays $LA_A$ and $LA_B$ and cooperate to project planar light illumination that preferably overfills (e.g., encompasses and extends beyond) the FOVs of the plurality of linear image detectors $LA_A$ and $LA_B$ along a substantial portion of the range of working distances of the module; preferably, the FOV of each linear imaging array $LA_A$ and $LA_B$ and the planar light illumination are substantially coplanar along a substantial portion of the range of working distances of the module as shown.
Figure 2B:
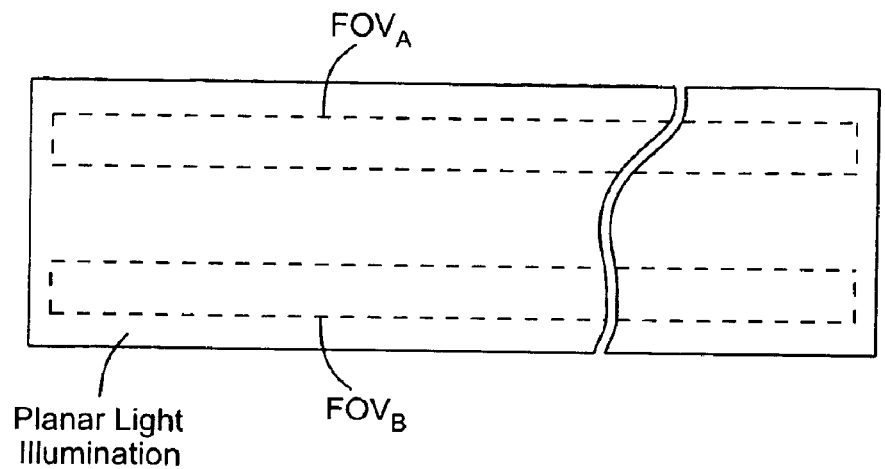
FIG. 2B is a pictorial illustration of an exemplary illumination scheme for the module of FIG. 2A, depicting the spatial relationship between the planar light illumination and the FOVs of the linear image detectors of the module of FIG. 2A at a representative working distance; as shown, the planar light illumination overfills (e.g., encompasses and extends beyond) the FOVs of the plurality of linear image detectors at the representative working distance.

FIGS. 13B2A through 13B3B flow charts illustrating two different exemplary methodologies for Image Velocity Estimation/Aspect Ratio Compensation carried out by the PLILIM-based imaging devices of FIGS. 13A1–13A4 and 13B1 in accordance with the present invention. In the methodology of FIGS. 13B2A and 13B2B, image velocity is derived from distance (e.g., row offset) between corresponding features in the two images. And in the methodology of FIGS. 13B3A and 13B3B, image velocity is derived from distance (e.g. row offset) between a selected row in one image and a correlation result between the selected row and multiple rows of the other image.

FIGS. 14A1, 14A2 and 14A3 illustrate the effect of height/range variation during the swiping motion on the composite 2-D image acquired by a PLILIM-based imaging device as described herein; note that when the target object is tilted at an angle with respect to the imaging plane, the magnification of the target object in the image varies over the image; in the example shown, the target object is tilted at an angle_with respect to the imaging plane in a manner such that the letter A on the top portion of the surface is located at a height/range value that is greater than the height/range value of the letter A on the bottom portion of the surface as best shown in FIGS. 14A1 and 14A2. This tilt causes the magnification of the letter A on the top portion of the composite 2-D image to be smaller as compared to the magnification of the letter A on the bottom portion of the composite 2-D image as best shown in FIG. 14A3. If such height variations (and resulting magnification variations) are significant, the height/magnification variations can lead to inaccuracies when estimating image velocity without taking into account and compensating for such variations in height/magnification.

FIG. 14A4 is a vector diagram that illustrates the relationship between relative image velocity V and relative image velocity V' for a portion of the image; the relative image velocity V assumes there are no variations in height/range of the object, while the relative image velocity V' compensates for variations in height/range of the object; note that by geometry the compensated relative image velocity V' can be estimated by multiplying the uncompensated relative image velocity V by the trigonometric function sin(θ).

FIGS. 14A5(1) through 14A5(4) illustrate exemplary methodologies which may embodied in the PLILIM-based devices described herein as part of Image Velocity Estimation/Aspect Ratio Compensation in accordance with the present invention; such methodologies derive image velocity V' that compensates for variations in height/range of the object; all of the methodologies estimate the height/range of the object over rows of the image, derive an estimate for angle_based on such height values, and multiply the uncompensated image velocity V for a given row i by the trigonometric function sin(_) (or by an equivalent expression that estimates the function sin(_) to generate the compensated image velocity V' for the given row i.

FIG. 14A6 depicts data structures that may be used in conjunction with any one of the exemplary methodologies described above with respect to FIGS. 14A5(1) through 14A5(4) in deriving the image velocity V' that compensates for variations in height/range of the object; note that the compensated image velocity V' for a given row i is derived by multiplying the uncompensated image velocity metric V by the estimate of the sin(θ$_j$)—which is derived from the height values of rows stored in the Height Data Array.

FIGS. 14A7A through 14A10B set forth flow charts that embody such image velocity compensation techniques/mechanisms as part of Image Velocity Detection/Aspect Ratio Compensation carried out by the PLILIM-based imaging devices described herein.

FIG. 14B1 is a pictorial illustration of a range finding technique utilizing structured light and a linear imaging detector, which can be embodied in the PLILIM-based imaging devices described herein for Image Velocity Detection/Aspect Ratio Compensation in accordance with the present invention.

FIGS. 14B2 and 14B3 depict the range finding technique of FIG. 14B1 as part of the exemplary system architecture for the PLILIM-based imaging device described above with respect to FIG. 4A.

FIGS. 14B4 and 14B5 depict the range finding approach of FIG. 14B1 as part of the exemplary system architecture for the PLILIM-based imaging device described above with respect to FIG. 13B1.

FIG. 14C1 is a pictorial illustration of a range finding technique utilizing time-of-flight (TOF) principles, which can be embodied in the PLILIM-based imaging devices described herein for Image Velocity Detection/Aspect Ratio Compensation in accordance with the present invention.

FIG. 14C2 depicts the range finding technique of FIG. 14C1 as part of the exemplary system architecture for the PLILIM-based imaging device described above with respect to FIG. 4A.

FIG. 14C3 depicts the range finding approach of FIG. 14C1 as part of the exemplary system architecture for the PLILIM-based imaging device described above with respect to FIG. 13B1.

Figures 15A, 15B, 15C:
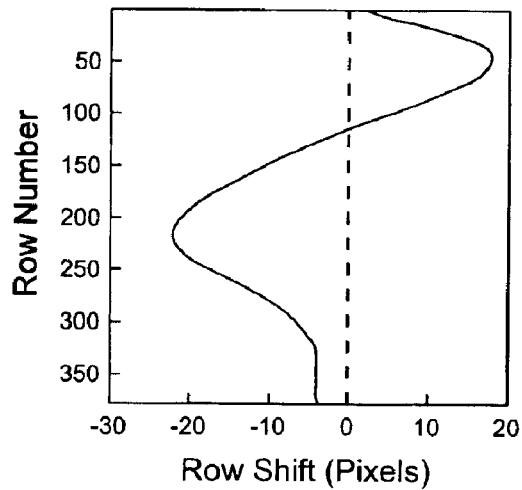

FIG. 15A depicts an image captured by a linear imaging camera where the linear imaging camera moves along a swipe direction with respect to target object during image capture operations; the imaging camera experiences horizontal jitter (movement transverse to the swipe direction) which causes distortion as shown.

FIG. 15B is a graph illustrating row shift values that estimate the horizontal jitter of the imaging camera relative to the target object during image capture operations (e.g., a swipe of the imaging camera relative to the target object).

FIG. 15C depicts an image that results from Jitter Compensation operations carried out by the PLILIM-based devices described herein; such Jitter Compensation operations transform image data utilizing shift operations (which may be pixel or sub-pixel shift operations) based upon horizontal jitter estimates, to thereby generate a 2D image that compensates for the estimated horizontal jitter of the imaging device relative to the target object(s).

Figure 15D:
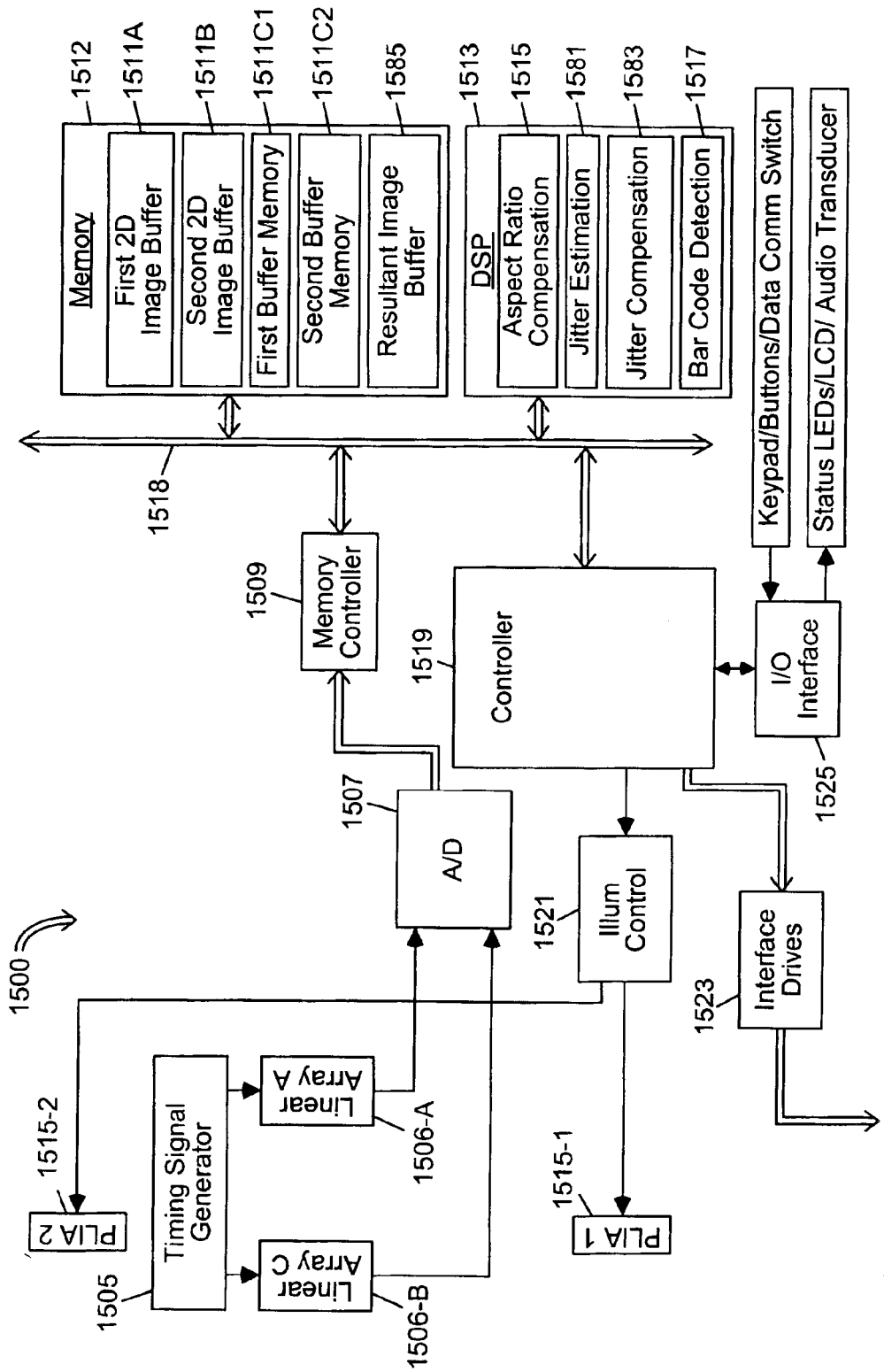

FIG. 15D illustrates an exemplary system architecture for a PLILIM-based imaging device that carries out Jitter Estimation and Compensation/Image Velocity Detection/Aspect Ratio Compensation in accordance with the present invention; preferably, the device is also capable of performing bar code detection operations and image lift operations suitable for OCR and other imaging applications.

Figure 15E:
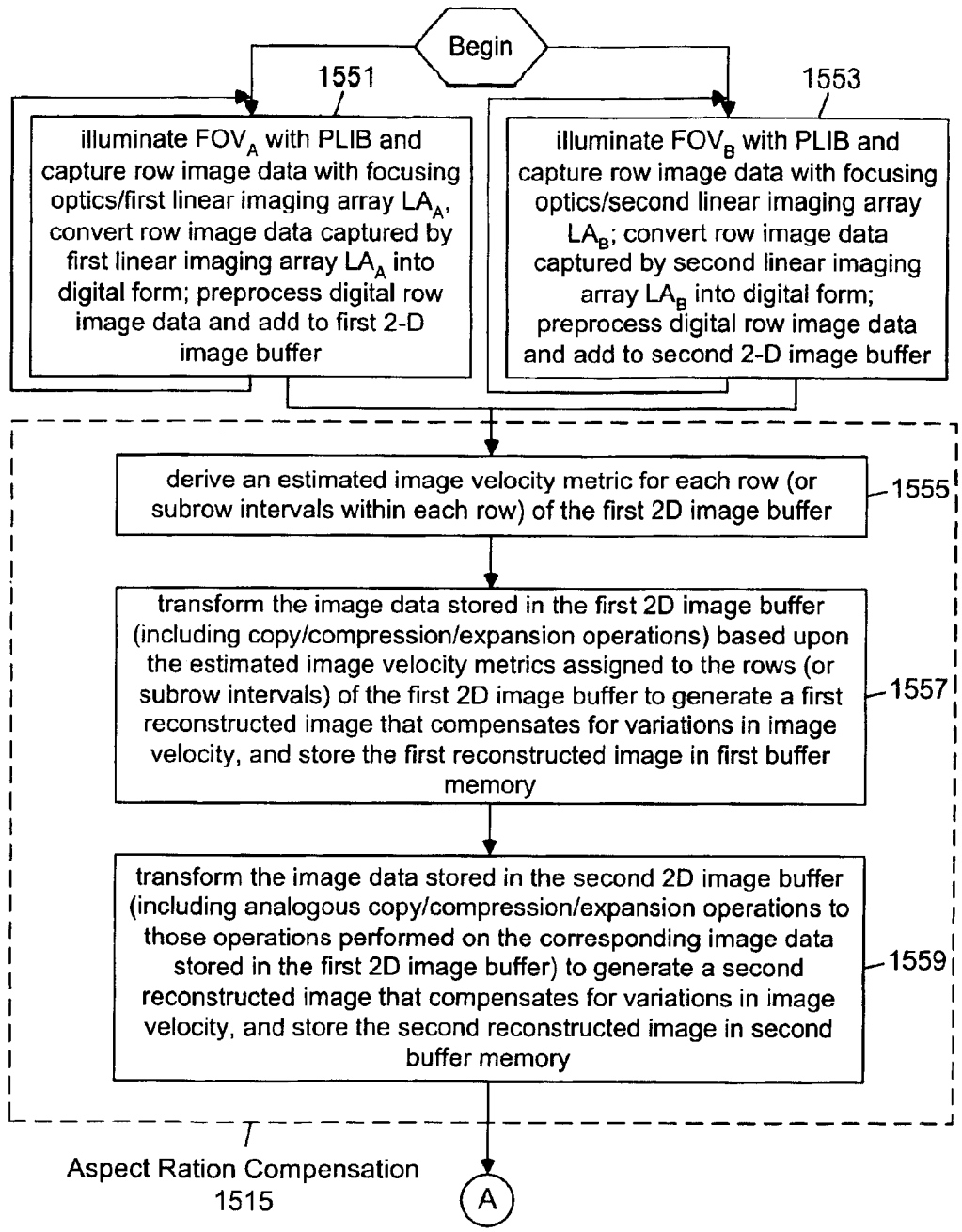

FIGS. 15E(i)–15E(ii) and 15F(i)–15F(ii) are flow charts illustrating two different exemplary methodologies for Jitter Estimation and Compensation/Image Velocity Detection/Aspect Ratio Compensation carried out by the PLILIM-based imaging device of FIG. 15D in accordance with the present invention. In the methodology of FIGS. 15E(i)–15E(ii), horizontal jitter is derived from correlation of corresponding (i.e., matching) rows in the two reconstructed imaged stored in the buffer memories 1511C1 and 1511C2, respectively. And in the methodology of FIGS. 15F(i)–15F(ii), horizontal jitter is derived from analysis of a difference image (which is based upon pixel by pixel difference between the two reconstructed imaged stored in the buffer memories 1511C1 and 1511C2, respectively).

Figure 15F:
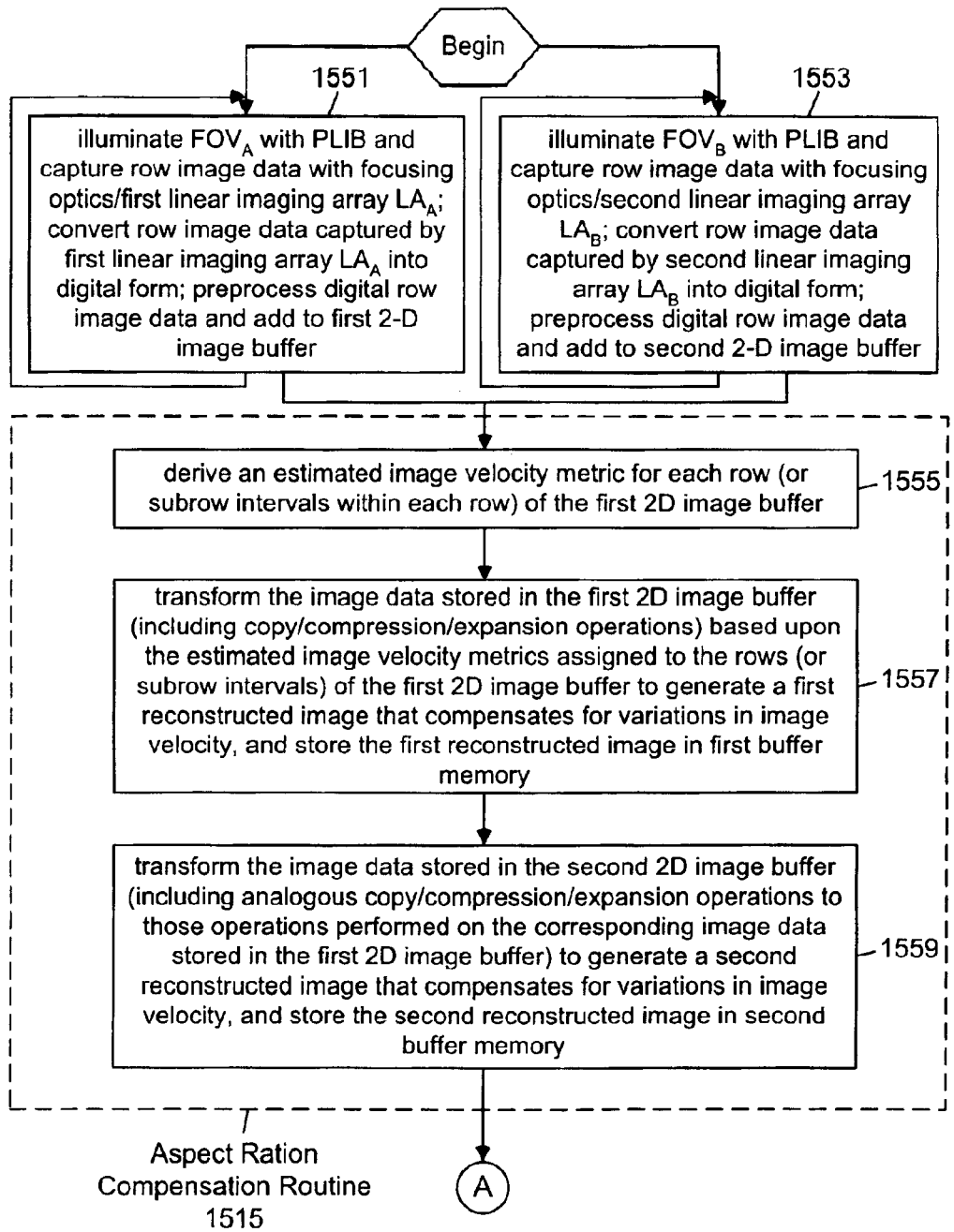

FIG. 15G illustrates regions of white pixels in the row of a binarized scaled difference image in accordance with the Jitter Estimation and Compensation operations of the flow chart of FIGS. 15F(i)–15F(ii).

Figure 15H:
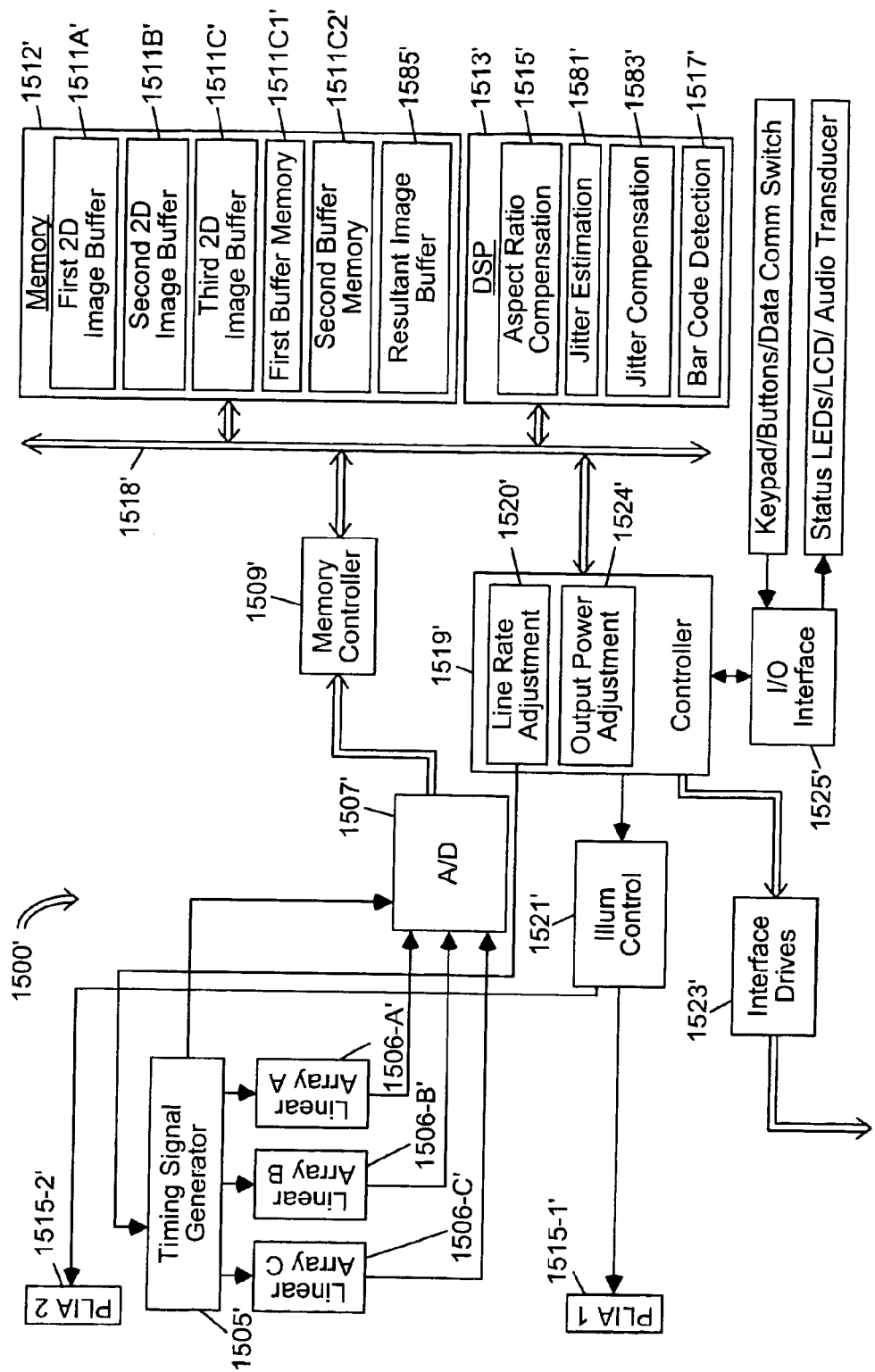

FIG. 15H illustrates an alternative system architecture for a PLILIM-based imaging device that carries out Jitter Estimation and Compensation/Image Velocity Detection/Aspect Ratio Compensation in accordance with the present invention; preferably, the device is also capable of performing bar code detection operations and image lift operations suitable for OCR and other imaging applications.

FIGS. 15I1 and 15I2 set forth a flow chart illustrating exemplary methodology carried out by the PLILIM-based imaging device of FIG. 15H that carries out Jitter Estimation and Compensation/Image Velocity Detection/Aspect Ratio Compensation in accordance with the present invention.

Figure 15J:
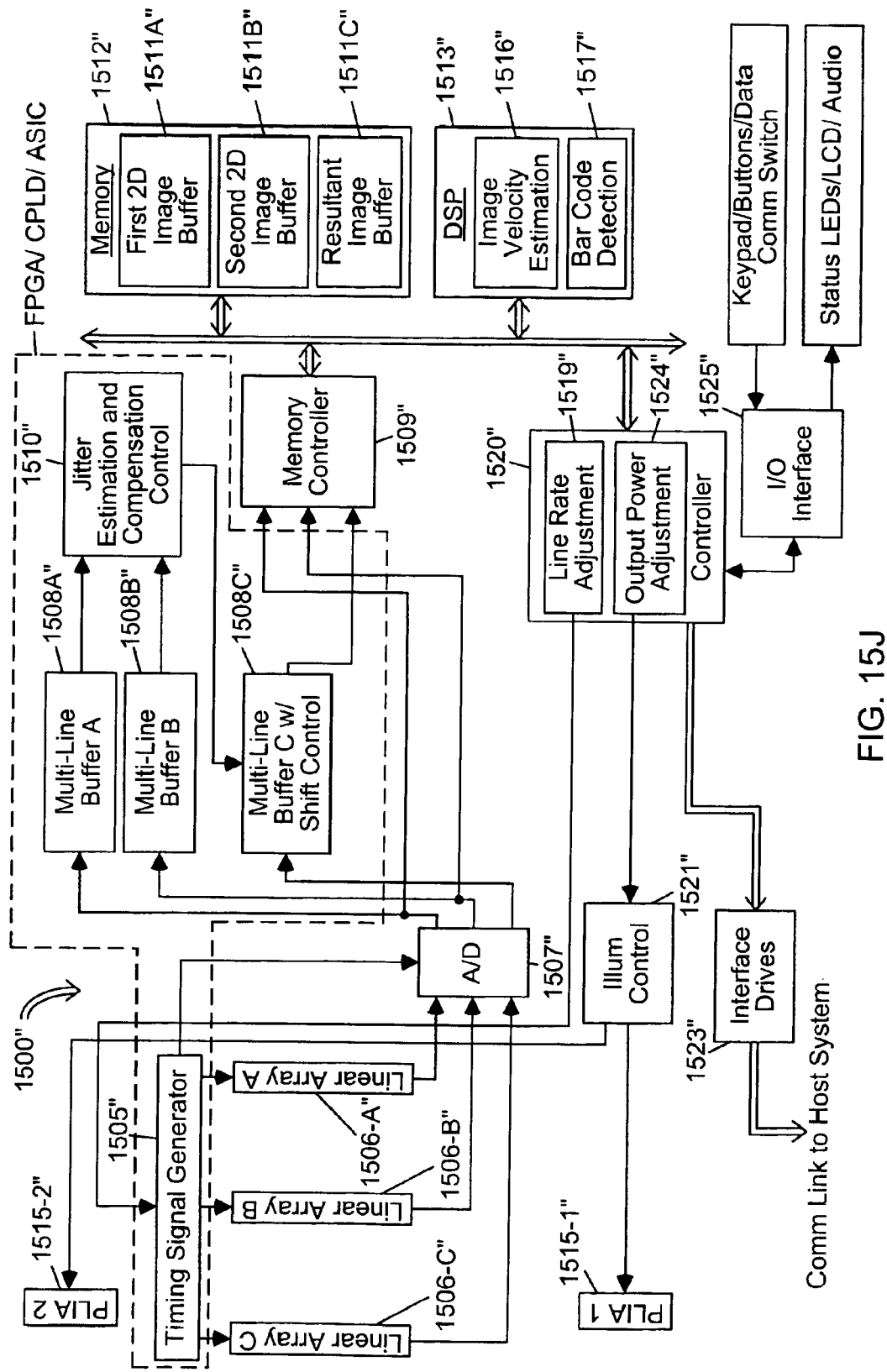

FIGS. 15J and K illustrate alternative system architectures for a PLILIM-based imaging device that carries out Jitter Estimation and Compensation/Image Velocity Detection/Aspect Ratio Compensation in accordance with the present invention; preferably, the device is also capable of performing bar code detection operations and image lift operations suitable for OCR and other imaging applications.

Figure 15K:
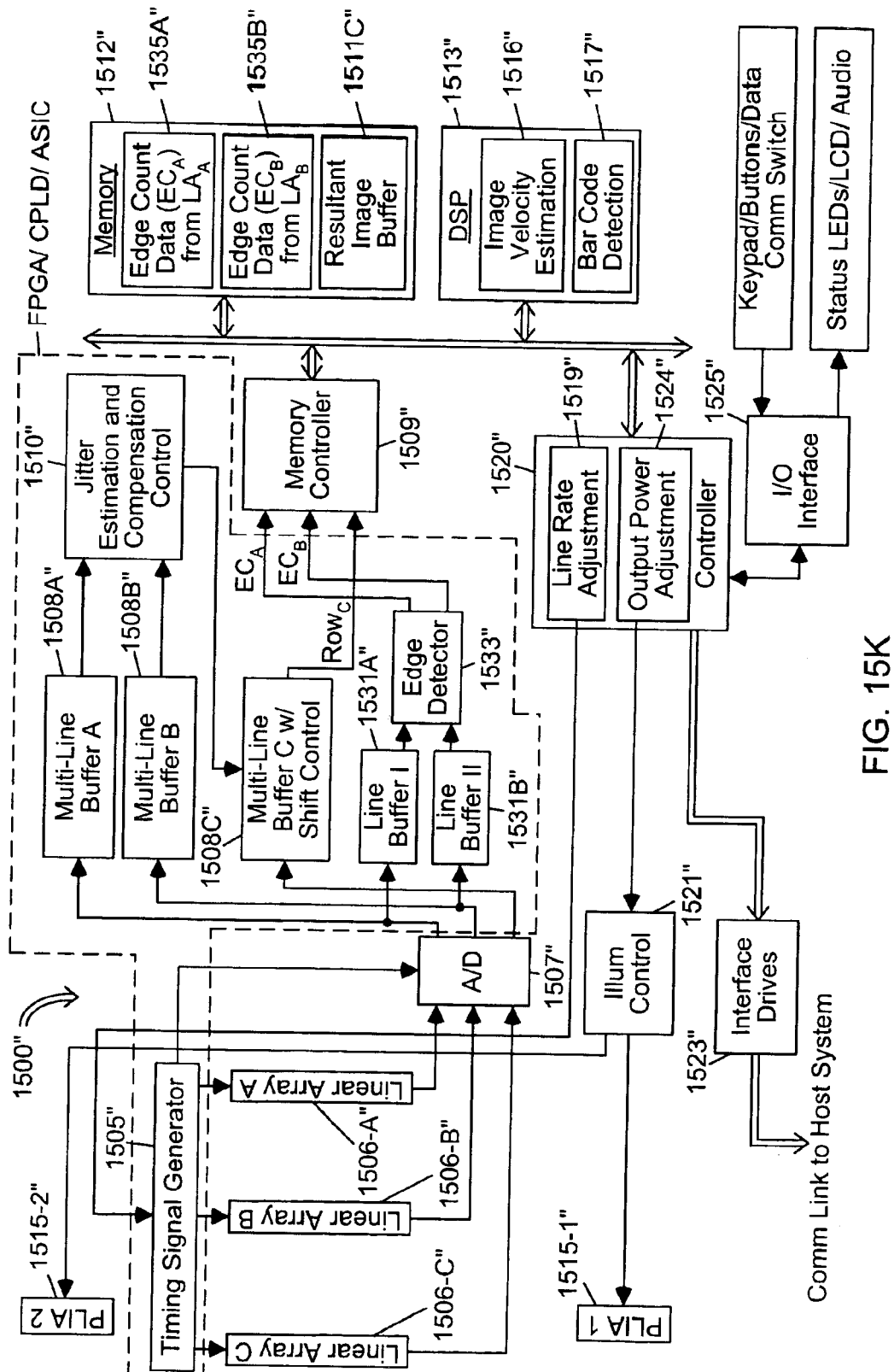

FIGS. 15L1 and 15L2 set forth a flow chart illustrating exemplary methodology carried out by the PLILIM-based imaging device of FIGS. 15J and 15K that carries out Jitter Estimation and Compensation/Image Velocity Detection/Aspect Ratio Compensation in accordance with the present invention.

Figure 16A:
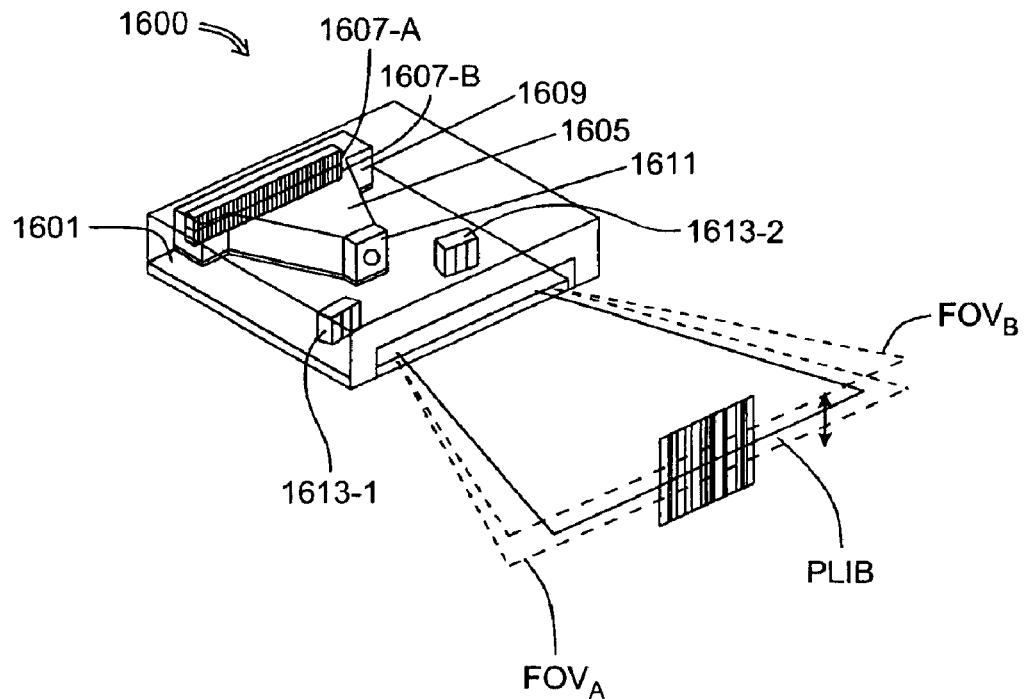
Figure 16C:
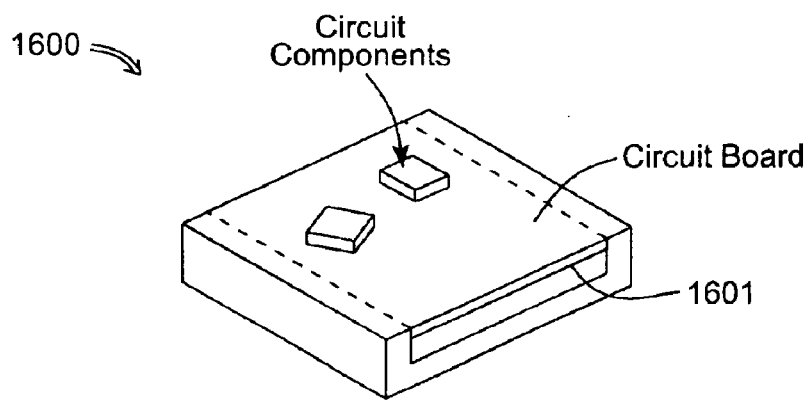
Figure 16B:
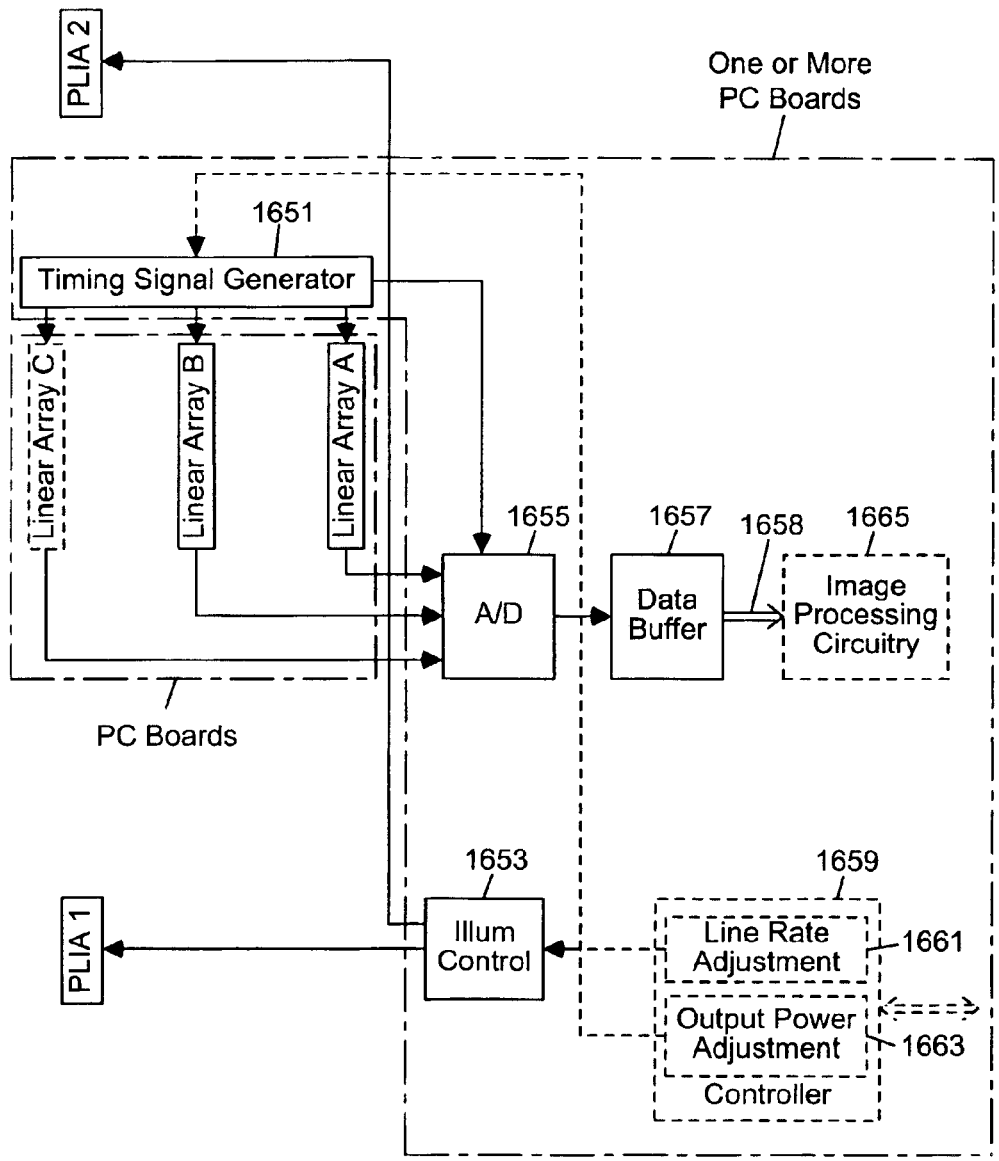

FIG. 16A illustrates a self-contained imaging engine that embodies the planar light illumination and linear imaging mechanisms and methodologies as described herein; the engine includes: an optical-bench 1601 contained as part of the engine housing 1603; a camera subsystem 1605 is mounted on the optical bench 1601 and includes a plurality of linear imaging arrays (e.g. 1-D CCD or CMOS image detection arrays, two shown as 1607-A and 1607-B), which preferably have vertically-elongated image detection elements as described herein for speckle-reduction, contained within a light-box 1609 provided with image formation optics 1611 through which light collected from the illuminated object along the field of views (e.g., $FOV_A$ and $FOV_B$) is permitted to pass; a pair of PLIAs 1613-1 and 1613-2 are mounted on the optical bench 1601 on opposite sides of the camera subsystem 1605, for producing planar light illumination that substantially overlaps (and preferably overfills) the field of views (e.g., $FOV_A$ and $FOV_B$) along the working range of the engine during illumination and image capture operation; one or more printed circuit boards are integral to the engine housing 1603 and include circuit elements shown in FIG. 16B.

FIGS. 16B and 16C illustrate the circuit elements realized on the one or more printed circuit boards of the imaging engine of FIG. 16A.

Figure 17A:
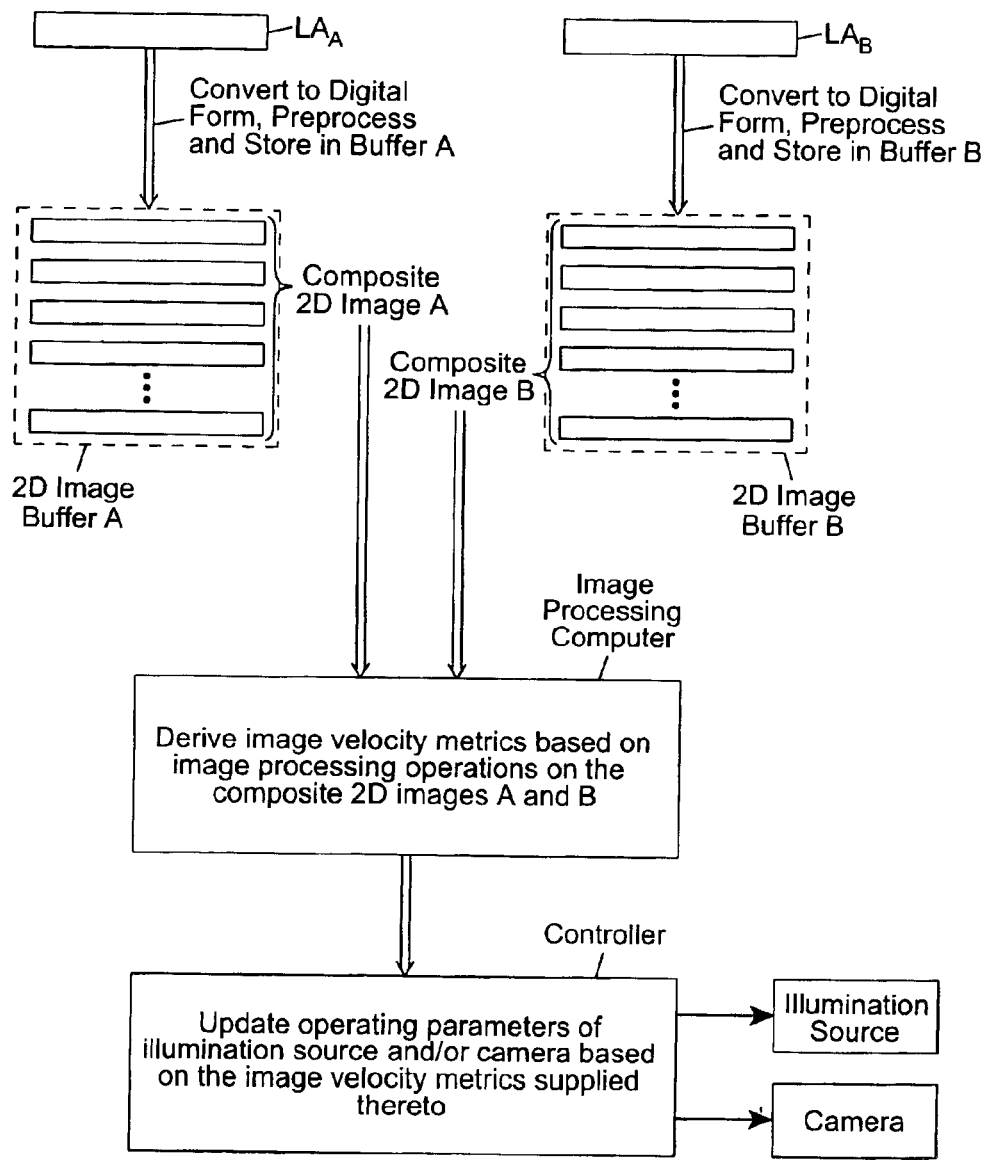

FIG. 17A is a pictorial illustration of the image capture operations and image processing operations carried out by a PLILIM-based imaging device in accordance with the present invention that build up and process a pair of composite 2-D images to derive image velocity metrics for the rows of a select one of the composite 2-D image, and output the image velocity metrics to a camera controller that automatically adjusts the operating parameters of a camera based thereon.

Figure 17B:
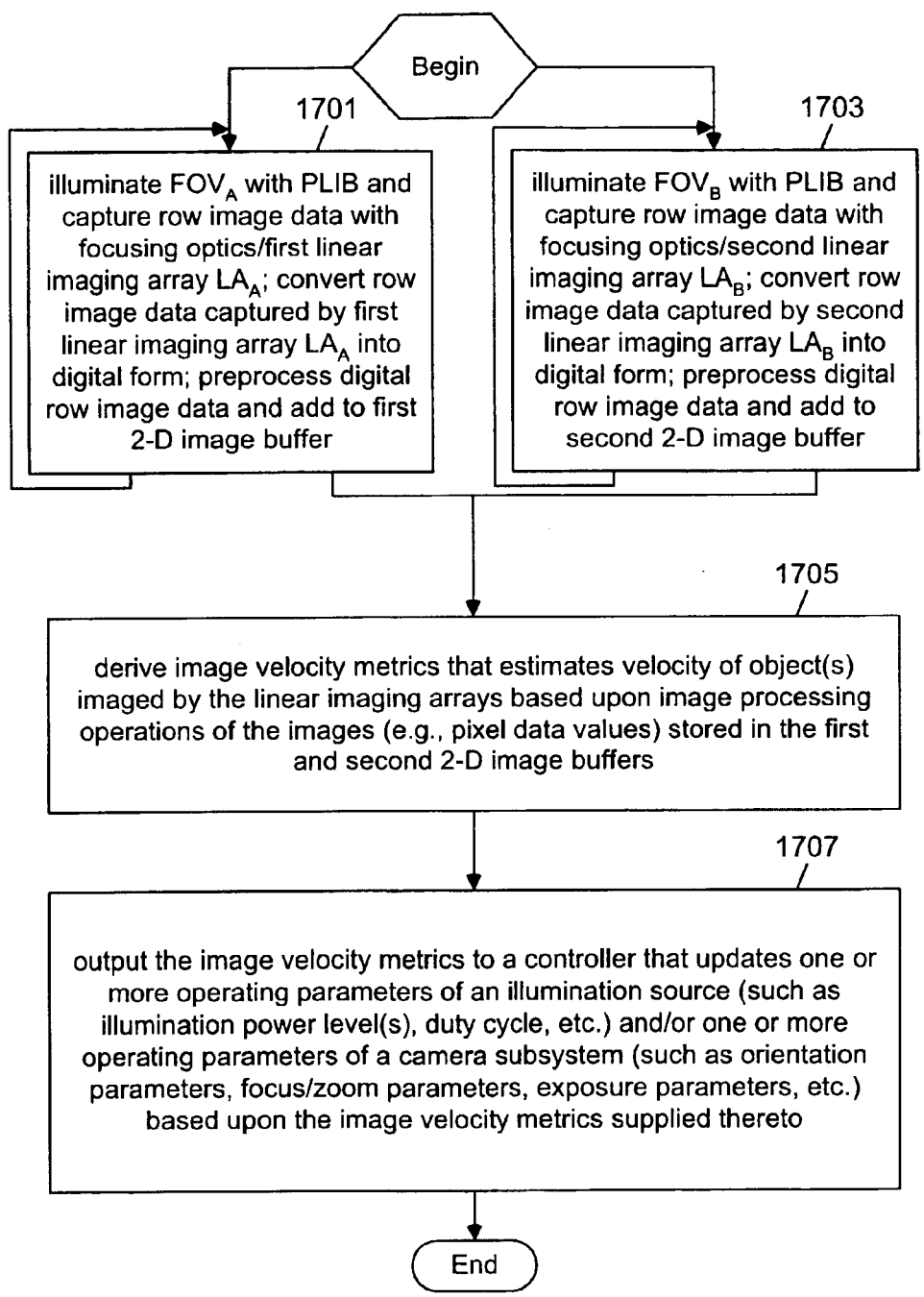

FIG. 17B is a flow chart illustrating exemplary operations carried out by a PLILIM-based imaging device for camera control application in accordance with the present invention.

DETAILED DESCRIPTION OF THE ILLUSTRATIVE EMBODIMENTS OF THE PRESENT INVENTION

Referring to the figures in the accompanying Drawings, the various illustrative embodiments of an PLILIM-based imaging device in accordance with the present invention will be described in great detail.

In accordance with the principles of the present invention, a target object (e.g. a bar coded package, textual materials, graphical indicia, etc.) is illuminated by planar light illumination—which is light illumination having substantially-planar spatial distribution along a characteristic propagation direction. In other words, the planar light illumination has a width of illumination (which extends along a transverse direction to the characteristic direction of propagation as best shown in FIG. 2F2) that is much greater than its height of illumination (which extends along a direction orthogonal to the characteristic propagation direction as best shown in FIG. 2F3). The planar light illumination overlaps the field of views (FOVs) of a plurality of linear (1-D) imaging arrays along a substantial portion of the range of working distances of the imaging system, while images of the illuminated target object are formed on and detected by the plurality of linear (1-D) imaging arrays. The FOV of each linear imaging array and the planar light illumination are substantially coplanar along a substantial portion of range of working distances of the imaging system, and the FOVs of the plurality of linear image arrays are displaced (offset) from one another along the direction of intended motion of the target object relative to the system housing. As is well known in the field of optics, an imaging system has a range of working distances (between a minimum working distance and maximum working design) where objects positioned outside this range of working distances appear out of focus at the imaging device (e.g., linear imaging arrays).

Figure 2C:
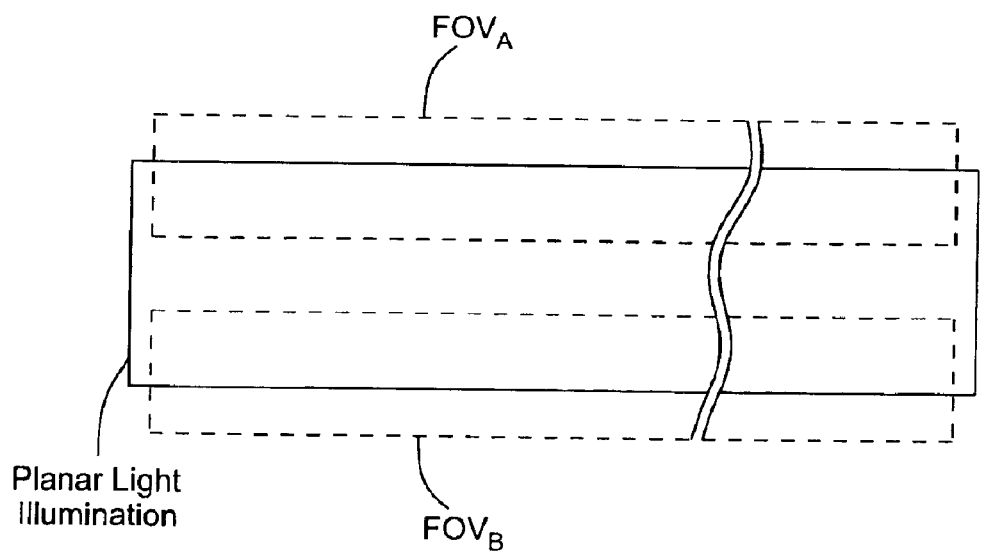
FIG. 2C is a pictorial illustration of an alternate illumination scheme for the module of FIG. 2A, depicting the spatial relationship between the planar light illumination and the FOVs of the linear image detectors of the module of FIG. 2A at a representative working distance; as shown, the planar light illumination substantially overlaps (but does not overfill) the FOVs of the linear imaging detectors of the module at the representative working distance.
Figure 2D:
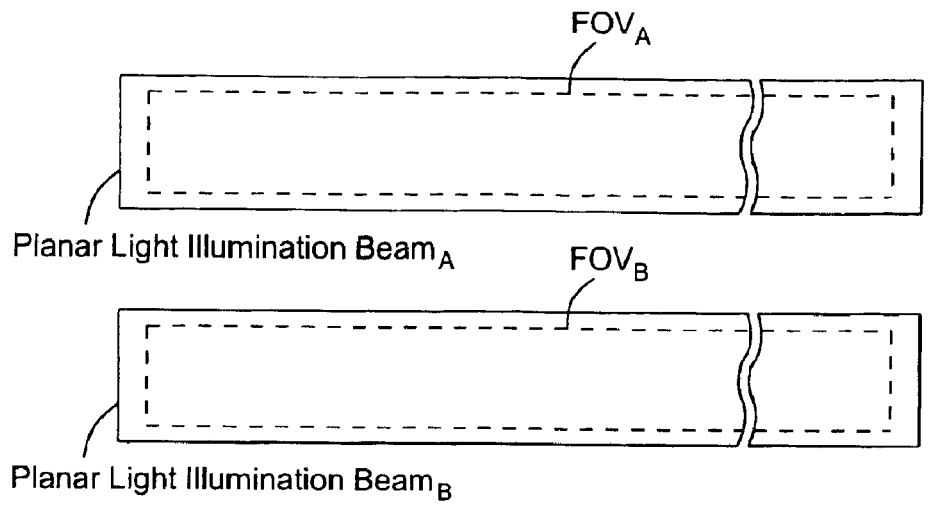
FIG. 2D is a pictorial illustration of an alternate illumination scheme for the module of FIG. 2A, depicting the spatial relationship between the planar light illumination and the FOVs of the linear image detectors of the module of FIG. 2A at a representative working distance; as shown, separate beams of planar light illumination ($PLIB_A$ and $PLIB_B$) overfill corresponding FOVs ($FOV_A$ and $FOV_B$) of the linear imaging detectors $LA_A$ and $LA_B$ of the module at the representative working distance.

Preferably, the planar light illumination overfills (e.g., encompasses and extends beyond) the FOVs of the plurality of linear imaging arrays along a substantial portion of the range of working distances of the imaging system (examples shown in FIGS. 2A, 2B and 2D). Alternatively, the planar light illumination may substantially overlap (but not encompass) the FOVs of the plurality of linear imaging arrays along a substantial portion of the range of working distances of the imaging system (examples shown in FIGS. 2C and 2E).

Preferably, the planar light illumination and the FOVs of the plurality of linear image arrays are "stationary" in that they are neither scanned nor deflected relative to the system housing during planar light illumination and image detection operations, while the target object is moved relative to the system housing (for example, via movement of the system housing or movement of the target object to be scanned). Alternatively, the planar light illumination and the FOVs of the plurality of linear imaging arrays can be "moving" in that they are scanned (i.e. deflected) relative to the system housing during planar light illumination and image detection operations (for example, via one or more rotating beam folding mirrors).

In such configurations, the row data detected by each linear image array represents a different 1-D slice of the target object as the target object passes through the corresponding FOV of the given linear imaging array. To build a 2-D image of the target object (for image-based bar code reading, image lift and/or other imaging applications) from the row data detected by a given linear imaging array, several successive rows (that represent adjacent portions of the target object) are detected by the given linear imaging array and arranged consecutively to form the rows of a composite 2-D image. This technique requires relative motion between the target object and the system housing (for example, by moving the system housing with respect to a substantially stationary target object or moving the target object with respect to a substantially stationary system housing) so that the FOV of the given linear image array scans different portions (strips) of the target object over time.

If the integration time period of the imaging elements of the linear image array remains constant and such relative motion occurs at constant velocity, then each pixel in the resulting composite 2-D image will have the same aspect ratio. In this case, aspect ratio refers to the ratio of the width of the object surface seen by the pixel to the height of the object surface that is observed. Conversely, variations in the velocity of such relative motion will cause variations in the aspect ratio of the pixels in the resulting composite 2-D image, thereby resulting in distortions in the resulting composite 2-D image—the image will appear compressed and/or stretched along the direction of motion as illustrated in FIGS. 1A and 1B. It should be noted that variations in the integration time period of the imaging elements of the linear imaging array (with constant relative motion) will cause variations in the aspect ratio of the pixels of the composite 2-D image; however, such effects are preferably minimized by maintaining a constant integration time period for the imaging elements of the linear image array during the image formation and detection operations of the 1-D slices of the target object that form the composite 2-D image.

For purposes of illustration, consider an imaging element that is 10 μm square viewing a target object through optics that cause a magnification of 20×. In this case, the size of the element's field of view on the target object will be 200 μm square. Perpendicular to the direction of motion, the amount of the target object that the imaging element views is independent of the velocity of relative motion—no matter how fast the relative motion is, the imaging element always sees 200 μm of the target object along this direction. Along the direction of motion, however, the amount of object surface that passes through the field of view of the imaging element is dependent on the velocity of relative motion. If the velocity of such relative motion remains constant (over the integration time periods of the imaging element), the imaging element views a constant area of the target object, and the corresponding pixels of the resulting composite 2-D image will have a constant aspect ratio. If the velocity of such relative motion increases (over the integration time periods of the imaging element), the imaging element views a larger area of the target object and the corresponding pixels of the resulting composite 2-D image will have varying aspect ratio whereby the pixels are compressed along the direction of motion. If the velocity of such relative motion decreases (over the integration time periods of the imaging element), the imaging element views a smaller area of the target object, and the corresponding pixels of the resulting composite 2-D image will have varying aspect ratio whereby the pixels are expanded along the direction of motion.

In summary, if the velocity of such relative motion varies during the time that the composite 2-D image is being built up, then different regions of the composite 2-D image will have different aspect ratios. Large variations in the velocity of such relative motions causes significant distortion, which is undesirable for bar code reading (for example, if left unchecked, it may lead to failures in detecting/decoding high density two dimensional bar code symbols in the composite 2-D image), optical character recognition (for example, if left unchecked, it may lead to failures in recognizing textual characters/symbols in the composite 2-D image) or visual inspection of the composite 2-D image. For example, in hand-held image-based bar code reading applications, velocity variations (e.g., jitter) in hand movement of the scanner housing relative to the target object can be substantial and cause distortion that, if left unchecked, can lead to failures in detecting/decoding bar code symbols (such as high-density 2-D bar code symbols) in the captured images. Similarly, in hand-held image-capture applications, velocity variations (e.g., jitter) in hand movement of the scanner housing relative to the target object can be substantial and cause distortion that, if left unchecked, can lead to failures in recognizing textual characters/symbols in the captured images. In presentation-type (or hold-under type) image-based bar code reading applications, velocity variations (e.g., jitter) in hand movement of the target object relative to the scanner housing can be substantial and cause distortion that, if left unchecked, can lead to failures in detecting/decoding bar code symbols (such as high-density 2-D bar code symbols) in the captured images. Similarly, in presentation-type (or hold-under type) image-capture applications, velocity variations (e.g., jitter) in hand movement of the target object relative to the scanner housing can be substantial and cause distortion that, if left unchecked, can lead to failures in recognizing textual characters/symbols in the captured images.

In order to compensate for variations in the velocity such relative motion, the plurality of linear imaging arrays are used to simultaneously build up multiple composite 2-D images of the target object. The multiple composite 2-D images are stored in memory and accessed by image processing circuitry (which may be realized by one or more programmed computer processing modules, such as a microprocessor, digital signal processor or other image processing engine) that: identifies correspondence between features in the multiple composite 2-D images, derives a relative image velocity metric for each row of a select one of the composite 2-D images from spatial offset between corresponding features (the relative image velocity metric for a given row estimates the variation in relative image velocity for the given row), and transforms the selected composite 2-D image (using copy, compression and expansion operations on portions of the selected composite 2-D image) utilizing the relative image velocity metrics to generate a reconstructed 2D image that compensates for the estimated variations in relative image velocity. In other words, the aspect ratio of the reconstructed 2D image is substantially constant, thereby substantially reducing or eliminating any image distortion (e.g., compression/stretching) resulting from the variations in relative image velocity.

By virtue of the present invention, scanned objects are illuminated with substantially planar light that is substantially coplanar with the field of views of the plurality of linear imaging arrays. Such techniques provide improved depth of field, high pixel frame rates, and improved illumination efficiency—light is not delivered outside the narrow FOVs of the linear imaging arrays. Moreover, such techniques enable the use of low-power, light-weight, high-response, ultra-compact, high-efficiency solid-state laser illumination devices, such as visible laser diodes (VLDs), to selectively illuminate ultra-narrow sections of an object during image formation and detection operations, in contrast with high-power, low-response, low-efficiency illumination devices (e.g. wide area LED illumination) required by prior art illumination and image detection systems. In addition, the planar light illumination techniques of the present invention enable high-speed modulation of the planar laser illumination, and use of simple (i.e. substantially-monochromatic wavelength) lens designs for substantially-monochromatic optical illumination and image formation and detection operations.

Moreover, the image-based velocity measurement techniques of the present invention—which derive an estimate for relative image velocity in a composite 2-D image (which is derived from a sequence of 1-D images)—enable the use of lower cost linear imaging arrays in many diverse imaging applications, including hand-held image-based bar code reading, hand-held image capture suitable for OCR, presentation-type (and hold-under) image-based bar code reading, and presentation-type (and hold-under) image capture suitable for OCR, in contrast to the use of higher cost area imaging arrays that have been previously utilized for such applications.

In addition, the image-based aspect ratio compensation techniques of the present invention—which transform the composite 2-D image utilizing estimated relative image velocity to generate a reconstructed 2D image that compensates for variations in estimated relative image velocity—substantially reduce (or eliminate) image distortion (e.g., compression/stretching) resulting the variations in relative image velocity. Such improvements enable the use of lower cost linear imaging arrays in many diverse imaging applications, including hand-held image-based bar code reading, hand-held image capture suitable for OCR, presentation-type (and hold-under) image-based bar code reading, and presentation-type (and hold-under) image capture suitable for OCR, in contrast to the use of higher cost area imaging arrays that have been previously utilized for such applications.

It is preferred that the planar light illumination be focused so that minimum beam height of such planar laser illumination (for example, 2000 mm along its non-spreading direction) occurs at a point or plane which is the farthest or maximum working distance at which the system is designed to acquire images of objects, as best shown in FIGS. 2F3 and 2G3. Hereinafter, this aspect of the present invention shall be deemed the "Focus Beam At Farthest Object Distance (FBAFOD)" principle. The FBAFOD principle helps compensate for decreases in the power density of the incident planar light illumination due to the fact that the width of the planar light illumination increases in length for increasing object distances away from the imaging system.

As will be illustrated in greater detail hereinafter, PLILIM-based systems embodying the "Planar Light Illumination and Linear Imaging" and "image velocity detection and compensation" principles of the present invention are well suited for a hand-held scanner (which is designed to be picked up by the operator, typically at a point of sale (POS) station or during inventory operations in warehouse applications, and aimed at the label to be scanned for data acquisition); however such principles can be used in other bar code reading and imaging systems, including presentation scanners and other point-of-sale (POS) scanners in addition to hold-under scanners and other industrial scanners.

Point-of-sale (POS) scanners are typically designed to be used at a retail establishment to determine the price of an item being purchased. POS scanners are generally smaller than industrial scanner models, with more artistic and ergonomic case designs. Small size, low weight, resistance to damage from accident drops and user comfort, are all major design factors for the POS scanner. POS scanners include hand-held scanners, hands-free presentation scanners and combination-type scanners supporting both hands-on and hands-free modes of operation. These scanner categories will be described in greater detail below.

As described above, hand-held scanners are designed to be picked up by the operator and aimed at the label to be scanned. In addition, hand-held scanners have many uses outside POS applications such as inventory management and portable data acquisition and object identification.

Hands-free presentation scanners are designed to remain stationary and have the item to be scanned picked up and passed in front of the scanning device. Presentation scanners can be mounted on counters looking horizontally, embedded flush with the counter looking vertically, or partially embedded in the counter looking vertically, but having a "tower" portion which rises out above the counter and looks horizontally to accomplish multiple-sided scanning. If necessary, presentation scanners that are mounted in a counter surface can also include a scale to measure weights of items.

Some POS scanners can be used as handheld units or mounted in stands to serve as presentation scanners, depending on which is more convenient for the operator based on the item that must be scanned.

An industrial scanner is a scanner that has been designed for use in a warehouse or shipping application where large numbers of packages must be scanned in rapid succession. Industrial scanners include conveyor-type scanners (which scan packages as they move by on a conveyor belt) and hold-under scanners (which scan packages that are picked up and held underneath it). The package is then manually routed or otherwise handled, perhaps based on the result of the scanning operation. Hold-under scanners are generally mounted so that its viewing optics are oriented in downward direction, like a library bar code scanner.

Planar Laser Illumination and Linear Image Capture

In FIG. 2A, there is shown an illustrative embodiment of a PLILIM-based light illumination and image capture module in accordance with the present invention including: a plurality of linear imaging arrays (for example, two shown as $LA_A$ and $LA_B$) and image formation optics (IFO) that cooperate to image substantially planar field of views (FOVs), whose generalized outline is shown with dotted lines, that are displaced (offset) from one another along the direction of intended motion of the target object relative to the system housing. The imaging elements of each linear imaging array (e.g., $LA_A$ and $LA_B$) extend in a direction transverse to the direction of intended motion. A pair of planar light illumination arrays ($PLIA_1$ and $PLIA_2$) are preferably arranged on opposite sides of the linear image arrays $LA_A$ and $LA_B$ and cooperate to project planar light illumination that overfills (e.g., encompasses and extends beyond) the FOVs of the plurality of linear image detectors $LA_A$ and $LA_B$ along a substantial portion of the range of working distances of the module, as best shown in FIG. 2B, while images of the illuminated target object are formed on and detected by the plurality of linear imaging arrays $LA_A$ and $LA_B$. Preferably, the FOV of each linear imaging array $LA_A$ and $LA_B$ and the planar light illumination are substantially coplanar along a substantial portion of the range of working distances of the module as shown.

Alternatively, the planar light illumination projected by the planar light illumination arrays $PLIA_1$ and $PLIA_2$ may substantially overlap (but not overfill) the FOVs of the linear imaging array $LA_A$ and $LA_B$ along a substantial portion of the range of working distances of the imaging module, as best shown in FIG. 2C, while images of the illuminated target object are formed on and detected by the plurality of linear imaging arrays $LA_A$ and $LA_B$.

Figure 2E:
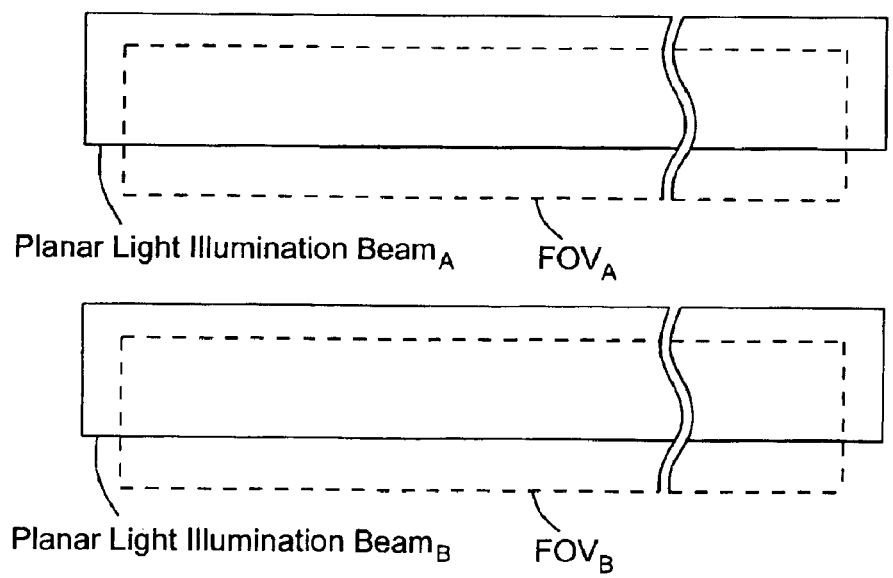
FIG. 2E is a pictorial illustration of an alternate illumination scheme for the module of FIG. 2A, depicting the spatial relationship between the planar light illumination and the FOVs of the linear image detectors of the module of FIG. 2A at a representative working distance; as shown, as shown, separate beams of planar light illumination ($PLIB_A$ and $PLIB_B$) overlap (but do not overfill) corresponding FOVs ($FOV_A$ and $FOV_B$) of the linear imaging detectors $LA_A$ and $LA_B$ of the module at the representative working distance.

In others variation, separate beams of planar light illumination ($PLIB_A$ and $PLIB_B$) overlap corresponding FOVs ($FOV_A$ and $FOV_B$) of the linear imaging array $LA_A$ and $LA_B$ along a substantial portion of the range of working distances of the imaging module, as best shown in FIGS. 2D and 2E, while images of the illuminated target object are formed on and detected by the plurality of linear imaging arrays $LA_A$ and $LA_B$. In the variation illustrated in FIG. 2D, the separate beams of planar light illumination ($PLIB_A$ and $PLIB_B$) overfill the corresponding FOVs ($FOV_A$ and $FOV_B$) of the linear imaging array $LA_A$ and $LA_B$ along a substantial portion of the range of working distances of the imaging system, while images of the illuminated target object are formed on and detected by the plurality of linear imaging arrays $LA_A$ and $LA_B$. In the variation illustrated in FIG. 2E, the separate beams of planar light illumination ($PLIB_A$ and $PLIB_B$) substantially overlap (but do not overfill) the corresponding FOVs ($FOV_A$ and $FOV_B$) of the linear imaging array $LA_A$ and $LA_B$ along a substantial portion of the range of working distances of the imaging module, while images of the illuminated target object are formed on and detected by the plurality of linear imaging arrays $LA_A$ and $LA_B$. Such variations can be realized with two pairs of PLIAs, each PLIA pair generating a separate PLIB. Alternatively, a single pair of PLIAs and beam splitting/shaping optical elements, well known to those in the field of optics, can be used to produce separate beams of planar light illumination ($PLIB_A$ and $PLIB_B$) corresponding to the FOVs ($FOV_A$ and $FOV_B$) of the linear imaging array $LA_A$ and $LA_B$.

In this illustrative embodiment, the planar light illumination produced by $PLIA_1$ and $PLIA_2$ and the FOVs of the plurality of linear image arrays $LA_A$ and $LA_B$ are "stationary" in that they are neither scanned nor deflected relative to the system housing during planar light illumination and image detection operations, while the target object is moved relative to the system housing (for example, via movement of the system housing or movement of the target object to be scanned).

Each PLIA ($PLIA_1$ and $PLIA_2$) comprises at least one planar light illumination source (PLIS)—in the exemplary module illustrated in FIG. 2A, each PLIA includes 3 PLIS, which are labeled $PLIS_{x,1}$, $PLIS_{x,2}$ and $PLIS_{x,3}$. Each PLIS produces a planar light illumination beam—a light illumination beam having substantially-planar spatial distribution along a characteristic propagation direction. As shown in FIGS. 2F1, 2F2 and 2F3, the planar light illumination beam (PLIB) produced by a given PLIS spreads out in a characteristic plane with a fan angle θ substantially greater than the fan angle φ (representing degree of convergence/divergence) along the height dimension of the beam (i.e., the dimension orthogonal to the characteristic plane). When the planar light illumination beam is projected onto a target surface, its profile of power versus displacement (over the width of its planar dimension as best shown in FIG. 2F2) will preferably have an approximately Gaussian distribution.

In accordance with the principles of the present invention, the plurality of planar light illumination sources (PLISs) are preferably spaced out and tilted such that their individual power density distributions add up to produce a (composite) planar light illumination beam having a magnitude of illumination which is distributed substantially uniformly over the entire working depth of the PLILIM-based system (i.e. along the height and width of the composite planar light illumination beam).

Moreover, the plurality of planar light illumination sources (PLISs) are preferably spaced out and tilted such that: i) each PLIB component is arranged in a coplanar relationship with a portion of the FOVs of the linear image arrays $LA_A$ $LA_B$, and ii) the composite planar light illumination beam overfills (encompasses and extends beyond) the FOVs of the linear image arrays $LA_A$ and $LA_B$ along a substantial portion of the range of working distances of the imaging module, as best shown in FIGS. 2A and 2B, while images of the illuminated target object are formed on and detected by the plurality of linear imaging arrays $LA_A$ and $LA_B$.

Alternatively, the plurality of planar light illumination sources (PLISs) may be spaced out and tilted such that: i) each PLIB component is arranged in a coplanar relationship with a portion of the FOVs of the linear image arrays $LA_A$ and $LA_B$, and ii) the composite planar light illumination beam substantially overlaps (but does not overfill) the FOVs of the linear imaging array $LA_A$ and $LA_B$ along a substantial portion of the range of working distances of the imaging module, as best shown in FIG. 2C, while images of the illuminated target object are formed on and detected by the plurality of linear imaging arrays $LA_A$ and $LA_B$.

In others variation described above, separate beams of planar light illumination ($PLIB_A$ and $PLIB_B$) overlap corresponding FOVs ($FOV_A$ and $FOV_B$) of the linear imaging array $LA_A$ and $LA_B$ along a substantial portion of the range of working distances of the imaging module, as best shown in FIGS. 2D and 2E, while images of the illuminated target object are formed on and detected by the plurality of linear imaging arrays $LA_A$ and $LA_B$.

The planar light illumination produced by the PLIS/PLIAs may be provided by one or more laser light sources, and thus is substantially coherent in nature. Details of an exemplary VLD-based PLIS that produces a planar beam of substantially coherent light are illustrated in FIGS. 2G1, 2G2, and 2G3, including: a housing 14 that supports a visible laser diode (VLD) 13 (e.g., Mitsubishi ML1XX6 Series high-power 658 nm AlGaInP semiconductor laser), focusing lens 15 and cylindrical lens, all disposed along a central optical axis. The cylindrical lens 16, which may be fixedly mounted within a notch in the housing 14, is oriented so that its central axis is oriented substantially perpendicular to the central optical axis. The focusing lens 15 is disposed along the central optical axis at a distance from the VLD 13 which causes the laser beam output from the VLD 13 to be converging in the direction of the cylindrical lens 16. Notably, the function of the cylindrical lens 16 is to disperse (i.e. spread) the focused laser beam from focusing lens 15 along the plane in which the cylindrical lens 16 has curvature, while the characteristics of the planar laser illumination beam (PLIB) in the direction transverse to the propagation plane are determined by the focal length of the focusing lens 15. Thus, the focal length of the focusing lens 15 is preferably selected so that the substantially planar laser illumination beam produced from the cylindrical lens 16 is focused at the farthest object distance in the field of view of the module, as shown in FIG. 1G3, in accordance with the "FBAFOD" principle of the present invention. The FBAFOD principle helps compensate for decreases in the power density of the incident planar laser illumination due to the fact that the width of the planar laser illumination increases in length for increasing object distances away from the imaging system.

It should be noted that other optical elements (other than cylindrical optical elements) can be used to produce substantially planar laser illumination. For example, U.S. Pat. No. 4,826,299 to Powell, incorporated herein by reference, discloses a linear diverging lens which has the appearance of a prism with a relatively sharp radius at the apex, capable of expanding a laser beam in only one direction. Such a lens can replace the cylindrical lens element of the PLIS as described in Application No. PCT/US01/44011, incorporated by reference above in its entirety. In another example, U.S. Pat. No. 4,589,738 to Ozaki discloses an optical arrangement which employs a convex reflector or a concave lens to spread a laser beam radially and then a cylindrical-concave reflector to converge the beam linearly to project a laser line. Like the Powell lens, the optical arrangement of U.S. Pat. No. 4,589,738 can be readily embodied within the PLIS of the present invention. And in another example, Application No. PCT/US01/44011, incorporated by reference above in its entirety, describes the use of a pair of small cylindrical (i.e. PCX and PCV) lenses that expand a laser beam in only one direction, The PCX-type lens has one piano surface and a positive cylindrical surface with its base and the edges cut in a circular profile. The function of the PCX-type lens is laser beam focusing. The PCV-type lens has one piano surface and a negative cylindrical surface with its base and edges cut in a circular profile. The function of the PCX-type lens 730 is laser beam spreading (i.e. diverging or planarizing).

Alternatively, the planar light illumination produced by the PLIS/PLIAs may be provided by one or more LED light sources, and thus is substantially incoherent in nature. It is understood, however, that to due focusing limitations associated therewith, LED-based PLIS/PLIAs are expected to more practical uses in short-range type imaging applications, than in long-range type imaging applications. Details of an exemplary LED-based PLIS that produces a planar beam of incoherent light are illustrated in FIGS. 2H1 and 2H2, including: a light emitting diode (LED) 4501, realized on a semiconductor substrate 4502, and having a small and narrow (as possible) light emitting surface region 4503 (i.e. light emitting source); a focusing lens 4504 for focusing a reduced size image of the light emitting source 4503 to its focal point, which typically will be set by the maximum working distance of the system in which the PLIS is to be used; and a cylindrical lens element 4505 beyond the focusing lens 4504, for diverging or spreading out the light rays of the focused light beam along a planar extent to produce a spatially-incoherent planar light illumination beam (PLIB) 4506, while the height of the PLIB is determined by the focusing operations achieved by the focusing lens 4505; and a compact barrel or like structure 4507, for containing and maintaining the above described optical components in optical alignment, as an integrated optical assembly.

Preferably, the focusing lens 4504 used in LED-based PLIS is characterized by a large numerical aperture (i.e. a large lens having a small F #), and the distance between the light emitting source and the focusing lens is made as large as possible to maximize the collection of the largest percentage of light rays emitted therefrom, within the spatial constraints allowed by the particular design. Also, the distance between the cylindrical lens 4505 and the focusing lens 4504 should be selected so that beam spot at the point of entry into the cylindrical lens 4505 is sufficiently narrow in comparison to the width dimension of the cylindrical lens. Preferably, flat-top LEDs are used to construct the LED-based PLIS, as this sort of optical device will produce a collimated light beam, enabling a smaller focusing lens to be used without loss of optical power. The spectral composition of the LED 4501 can be associated with any or all of the colors in the visible spectrum, including "white" type light which is useful in producing color images in diverse applications in both the technical and fine arts.

The optical process carried out within the LED-based PLIS of FIG. 2H1 is illustrated in greater detail in FIG. 2H2. As shown, the focusing lens 4504 focuses a reduced size image of the light emitting source of the LED 4501 towards the farthest working distance in the PLILIM-based system. The light rays associated with the reduced-sized image are transmitted through the cylindrical lens element 4505 to produce the spatially-incoherent planar light illumination beam (PLIB ) 4506, as shown.

In FIG. 2I1, there is shown a second illustrative embodiment of an LED-based PLIS for use in the PLILIM-based imaging systems/devices of the present invention described herein. As shown, the LED-based PLIS 4510 comprises: a light emitting diode (LED) 4511 having a small and narrow (as possible) light emitting surface region 4512 (i.e. emitting source) realized on a semiconductor substrate 4513; a focusing lens 4514 (having a relatively short focal distance) for focusing a reduced size image of the light emitting source 4512 to its focal point; a collimating lens 4515 located at about the focal point of the focusing lens 4514, for collimating the light rays associated with the reduced size image of the light emitting source 4512; and a cylindrical lens element 4516 located closely beyond the collimating lens 4515, for diverging the collimated light beam substantially within a planar extent to produce a spatially—incoherent planar light illumination beam (PLIB) 4518; and a compact barrel or like structure 4517, for containing and maintaining the above described optical components in optical alignment, as an integrated optical assembly.

Preferably, the focusing lens 4514 in LED-based PLIS 4510 should be characterized by a large numerical aperture (i.e. a large lens having a small F #), and the distance between the light emitting source and the focusing lens be as large as possible to maximize the collection of the largest percentage of light rays emitted therefrom, within the spatial constraints allowed by the particular design. Preferably, flat-top LEDs are used to construct the PLIS of the present invention, as this sort of optical device will produce a collimated light beam, enabling a smaller focusing lens to be used without loss of optical power. The distance between the collimating lens 4515 and the focusing lens 4513 will be as close as possible to enable collimation of the light rays associated with the reduced size image of the light emitting source 4512. The spectral composition of the LED can be associated with any or all of the colors in the visible spectrum, including "white" type light which is useful in producing color images in diverse applications.

The optical process carried out within the LED-based PLIS of FIG. 2I1 is illustrated in greater detail in FIG. 2I2. As shown, the focusing lens 4514 focuses a reduced size image of the light emitting source of the LED 4512 towards a focal point at about which the collimating lens is located. The light rays associated with the reduced-sized image are collimated by the collimating lens 4515 and then transmitted through the cylindrical lens element 4516 to produce a spatially-coherent planar light illumination beam (PLIB), as shown.

In FIGS. 2J1 through 2J3, there is shown an illustrative embodiment of an LED-based PLIA for use in PLILIM-based systems/devices of the present invention described herein. As shown, the LED-based PLIA 4600 is realized as an array of components employed in the design of FIGS. 2J1 and 2J2, contained within a miniature IC package, namely: a linear-type light emitting diode (LED) array 4601, on a semiconductor substrate 4602, providing a linear array of light emitting sources 4603 (having the narrowest size and dimension possible); a focusing-type microlens array 4604, mounted above and in spatial registration with the LED array 4601, providing a focusing-type lenslet 4604A above and in registration with each light emitting source, and projecting a reduced image of the light emitting source 4605 at its focal point above the LED array; a collimating-type microlens array 4607, mounted above and in spatial registration with the focusing-type microlens array 4604, providing each focusing lenslet with a collimating-type lenslet 4607A for collimating the light rays associated with the reduced image of each light emitting device; and a cylindrical-type microlens array 4608, mounted above and in spatial registration with the collimating-type micro-lens array 4607, providing each collimating lenslet with a linear-diverging type lenslet 4608A for producing a spatially-incoherent planar light illumination beam (PLIB) component 4611 from each light emitting source; and an IC package 4609 containing the above-described components in the stacked order described above, and having a light transmission window 4610 through which the spatially-incoherent PLIB 4611 is transmitted towards the target object being illuminated. The above-described IC chip can be readily manufactured using manufacturing techniques known in the micro-optical and semiconductor arts.

Notably, the LED-based PLIS 4500 illustrated in FIGS. 2J1 and 2J2 can also be realized within an IC package design employing a stacked microlens array structure as described above. In this alternative embodiment, the following components will be realized within a miniature IC package, namely: a light emitting diode (LED) providing a light emitting source (having the narrowest size and dimension possible) on a semiconductor substrate; focusing lenslet, mounted above and in spatial registration with the light emitting source, for projecting a reduced image of the light emitting source at its focal point, which is preferably set by the further working distance required by the application at hand; a cylindrical-type microlens, mounted above and in spatial registration with the collimating-type microlens, for producing a spatially-incoherent planar light illumination beam (PLIB) from the light emitting source; and an IC package containing the above-described components in the stacked order described above, and having a light transmission window through which the composite spatially-incoherent PLIB is transmitted towards the target object being illuminated.

The image formation optics of the PLILIM-based imaging module may provide a fixed focal length with constant angular field of view (FOV). In this configuration, the imaging module can view more of the target object's surface as the target object is moved further away from the module. A major disadvantage of this configuration is that the resolution of the image that is acquired by the linear detection arrays, expressed in terms of pixels or dots per inch (dpi), varies as a function of the distance from the target object to the imaging lens. However, a fixed focal length imaging lens assembly has advantages: it is easier and less expensive to design and manufacture, it does not require moving parts (thus lending itself to a more rugged design that is suitable for many POS applications where users are prone to drop and mishandle the system).

Alternatively, the image formation optics of the PLILIM-based imaging module may provide a variable focus fixed focal length with constant angular field of view (FOV). In this configuration, the image formation optics can adjust its image distance to compensate for a change in the target's object distance, and the depth of field (DOF) of the imaging subsystem does not limit the ability of the imaging module to accommodate possible object distances and orientations. As described in detail in Application No. PCT/US01/44011, incorporated by reference above in its entirety, the components of the imaging module are able to move in such a way as to change the image distance of the imaging lens to compensate for a change in the target's object distance, thus preserving good image focus no matter where the target object might be located. This variable focus technique can be practiced in several different ways, namely: by moving lens elements in the imaging module; by moving the linear imaging arrays relative to the imaging lens element(s); and by dynamic focus control. Such variable focus mechanisms are advantageous in that they provide improved focusing. However, such variable focus mechanisms have disadvantages: they are more difficult and expensive to design and manufacture, and they require moving parts (thus making such mechanisms difficult to embody in rugged design that is suitable for many POS applications where users are prone to drop and mishandle the system).

In another alternative, the image formation optics of the imaging module may provide variable focal length (i.e. a zoom-type imaging) with a variable angular field of view (FOV). Note that as the target object moves farther from the imaging module, the dimensions of the projection of the FOVs of the module on the surface of the target object become larger. Zoom-type imaging optics compensate for this effect. As described in detail in Application No. PCT/US01/44011, incorporated by reference above in its entirety, zoom-type imaging optics are capable of changing focal length, and therefore angular field of view (FOV) by moving one or more lens elements. The position at which the zooming lens element(s) must be placed in order to achieve a given focal length is typically determined by consulting a lookup table, which is constructed ahead of time either experimentally or by design software, in a manner well known in the art. An advantage to using zoom-type image optics is that the resolution of the image that is acquired, in terms of pixels or dots per inch, remains constant no matter what the distance from the target object to the image formation optics. However, such zoom-type image formation optics have disadvantages: they are more difficult and expensive to design and manufacture, and they require moving parts (thus making such mechanisms difficult to embody in rugged design that is suitable for many POS applications where users are prone to drop and mishandle the system).

Image Velocity Estimation and Aspect Ratio Compensation

In accordance with the present invention, the plurality of linear imaging arrays (for example, the two linear imaging arrays $LA_A$ and $LA_B$ of the PLILIM-based imaging module of FIG. 2A) are used to simultaneously build up multiple composite 2-D images of the target object. In order to build up the multiple composite 2-D images, the row of pixel data values (in analog form) from each linear imaging array is output there from, converted into digital form, preprocessed and stored in memory. Image processing circuitry (which may be realized by one or more programmed computer processing modules, such as a microprocessor, digital signal processor or other image processing engine) accesses and processes the multiple 2D images stored in memory to: identify correspondence between features in the multiple composite 2-D images, derive a relative image velocity metric for each row of a select one of the composite 2-D images from spatial offset between corresponding features (the relative image velocity metric for a given row estimates the variation in relative image velocity for the given row), and transforms the selected composite 2-D image (using copy, compression and expansion operations on portions of the selected composite 2-D image) utilizing the relative image velocity metrics to generate a reconstructed 2D image that compensates for the estimated variations in relative image velocity. In other words, the aspect ratio of the reconstructed 2D image is substantially constant, thereby substantially reducing or eliminating any image distortion (e.g., compression/stretching) resulting from the variations in relative image velocity. A pictorial representation of such image processing operations that build (and process) a pair of composite 2-D images to form the reconstructed 2D image is shown in FIG. 3.

Figure 4A:
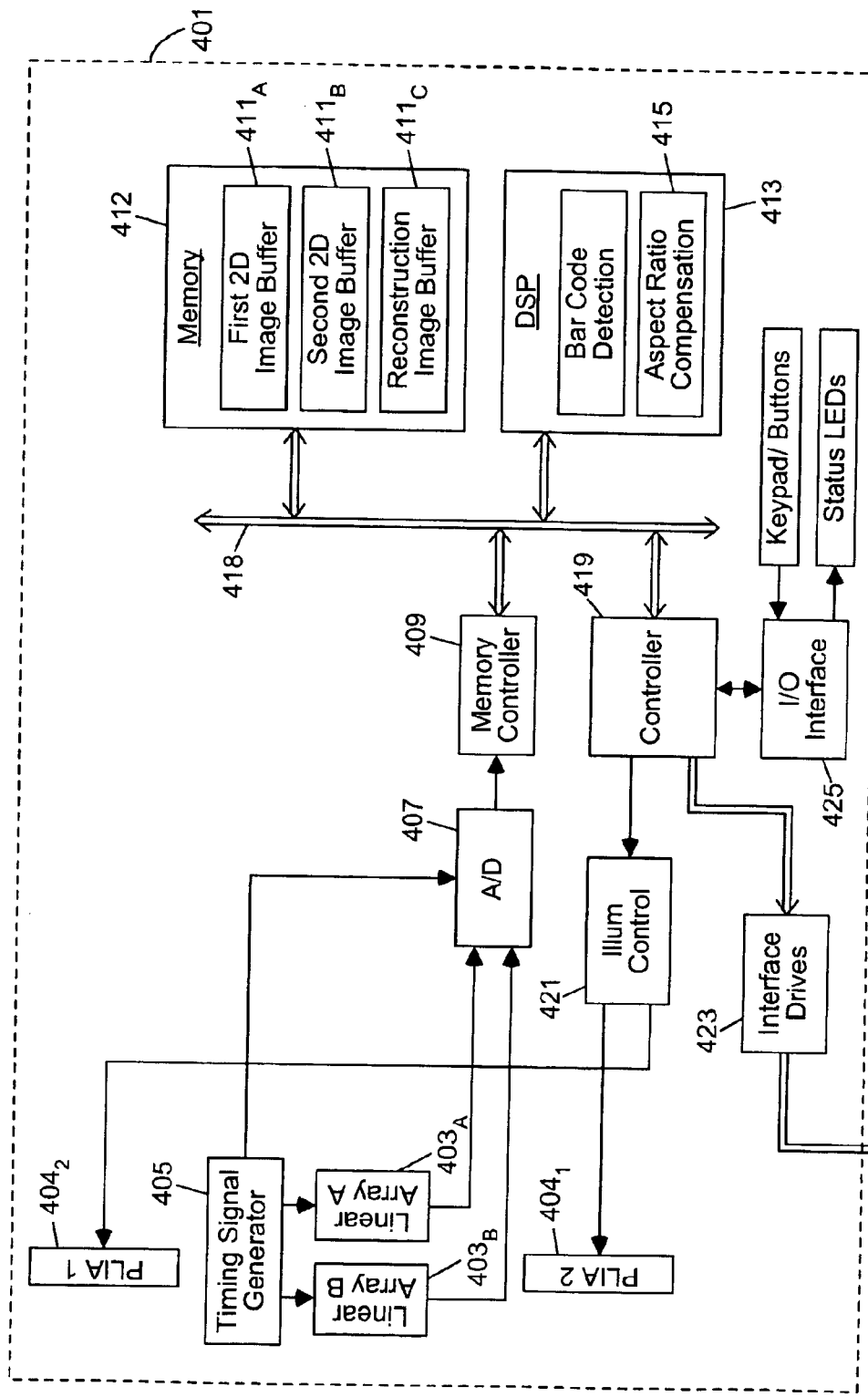
FIG. 4A illustrates an exemplary system architecture for a PLILIM-based imaging device in accordance with the present invention; preferably, the device is also capable of performing bar code detection and image lift operations suitable for OCR and other imaging applications.

FIG. 4A illustrates an exemplary system architecture for a PLILIM-based imaging device in accordance with the present invention. Preferably, the device is also capable of performing bar code detection and image lift operations suitable for OCR and other imaging applications. Note that the device employs PLILIM-based laser illumination and image capture methods (and apparatus) of the present invention as discussed above with respect to FIGS. 2A–2G3 and FIG. 3; yet the details of such methods and apparatus are omitted from FIG. 4 for the sake of simplicity of illustration and description. As shown therein, the PLILIM-based imaging device 401 includes a plurality of linear imaging arrays (for example, two shown as Linear Array A and Linear Array B) that cooperate with image formation optics (not shown) to image substantially planar field of views (FOVs) that are displaced (offset) from one another along the direction of intended motion of the target object relative to the system housing. The linear imaging arrays may be CCD-type linear image devices (for example, the model ILX554B linear CCD image array (2048 imaging elements) available from Sony Electronics. Alternatively, the linear imaging arrays may be CMOS-type linear image devices. A pair of planar light illumination arrays ($PLIA_1$ and $PLIA_2$) project planar light illumination (in this exemplary embodiment, a plane of coherent laser light) that substantially overlaps (and may encompasses and extends beyond) the FOVs of the plurality of linear image detectors (e.g., Linear Array A and Linear Array B) along a substantial portion of the range of working distances of the device, while images of the illuminated target object are formed on and detected by the plurality of linear imaging arrays (Linear Array A and Linear Array B). Timing Signal Generation circuitry 405 supplies timing signals to the linear imaging arrays in order to read out the row image data produced by such devices. Such row image data is derived from the energy detected by the imaging elements of the linear imaging arrays over an integration time period of such devices and is typically read out from the linear image arrays in a serial manner. Such row image data is supplied to analog-to-digital conversion circuitry 407, which optionally filters the row data image signal supplied thereto (to remove unwanted noise components) and converts the row image data supplied thereto into digital form. The analog-to-digital conversion circuitry 407 operably cooperates with memory controller 409 to add such row image data (in digital form) into memory buffers corresponding to the linear imaging array from which the row image data was derived.

Such operations build up and store in given memory buffer a composite 2-D image (in digital form) derived from the row image data output from the corresponding to linear imaging array. In this manner, memory buffer 411A stores a composite 2-D image (in digital form) derived from the row image data output from the linear imaging array A, and memory buffer 411B stores a composite 2-D image (in digital form) derived from the row image data output from the linear imaging array B. As shown, the memory buffers that store the composite 2-D images are preferably realized as allocated portions (e.g., address space) in one or more memory modules (one shown) 412, which may be SDRAM, SRAM or other types of memory; however, alternative data buffering designs (such as dedicated data buffer/cache modules) can be used.

As described above in detail, if the velocity of relative motion between the target object and system housing varies during the time that the composite 2-D images are being built up, then different regions of the composite 2-D images will have different aspect ratios. An image processing computer 413 (which is preferably realized using a digital signal processor as shown) executes a set of programmed instructions 415 (labeled "Aspect Ratio Compensation") that access the multiple composite 2-D images stored in the image buffers (411A and 411B) and perform image processing operations utilizing such composite 2-D images that estimate the such variations in the velocity of such relative motion and generate a reconstructed image that compensates for such estimated variations (i.e., has a more uniform aspect ratio). The image processing computer 413 stores the reconstructed image in memory buffer 411C for subsequent processing. As shown, the memory buffer 411C that store the reconstructed image is preferably realized as allocated portions (e.g., address space) in memory module(s) 412, which may be SDRAM, SRAM or other types of memory; however, alternative data buffering designs (such as dedicated data buffer/cache modules) can be used.

In addition, the image processing computer 413 preferably executes a set of programmed instructions 417 (labeled "Bar Code Detection") that accesses one or more of the composite 2-D images stored in the memory buffers (411A and 411B) and/or the reconstructed image stored in memory buffer 411C and carries out image-based bar code symbol detection and decoding operations on such image(s). These imaging processing operations preferably detect and decode one-dimensional bar code symbols (and possibly two-dimensional bar code symbols) within the image and generate symbol character data representative thereof. Moreover, such imaging processing operations preferably carry out image-based omni-directional bar code detection and decoding whereby bar code symbol(s) at varying spatial orientation within the image are detected and decoded. For example, such image-based bar code symbol detection and decoding operations can be realized with SwiftDecode™ Bar Code Decode software, available from Omniplanar, Inc. of Princeton, N.J. (http://www.omniplanar.com). The image processing computer 413 may also execute additional image processing routines that carry out OCR operations, handwriting/signature recognition operations or other imaging operations.

Figure 4B:
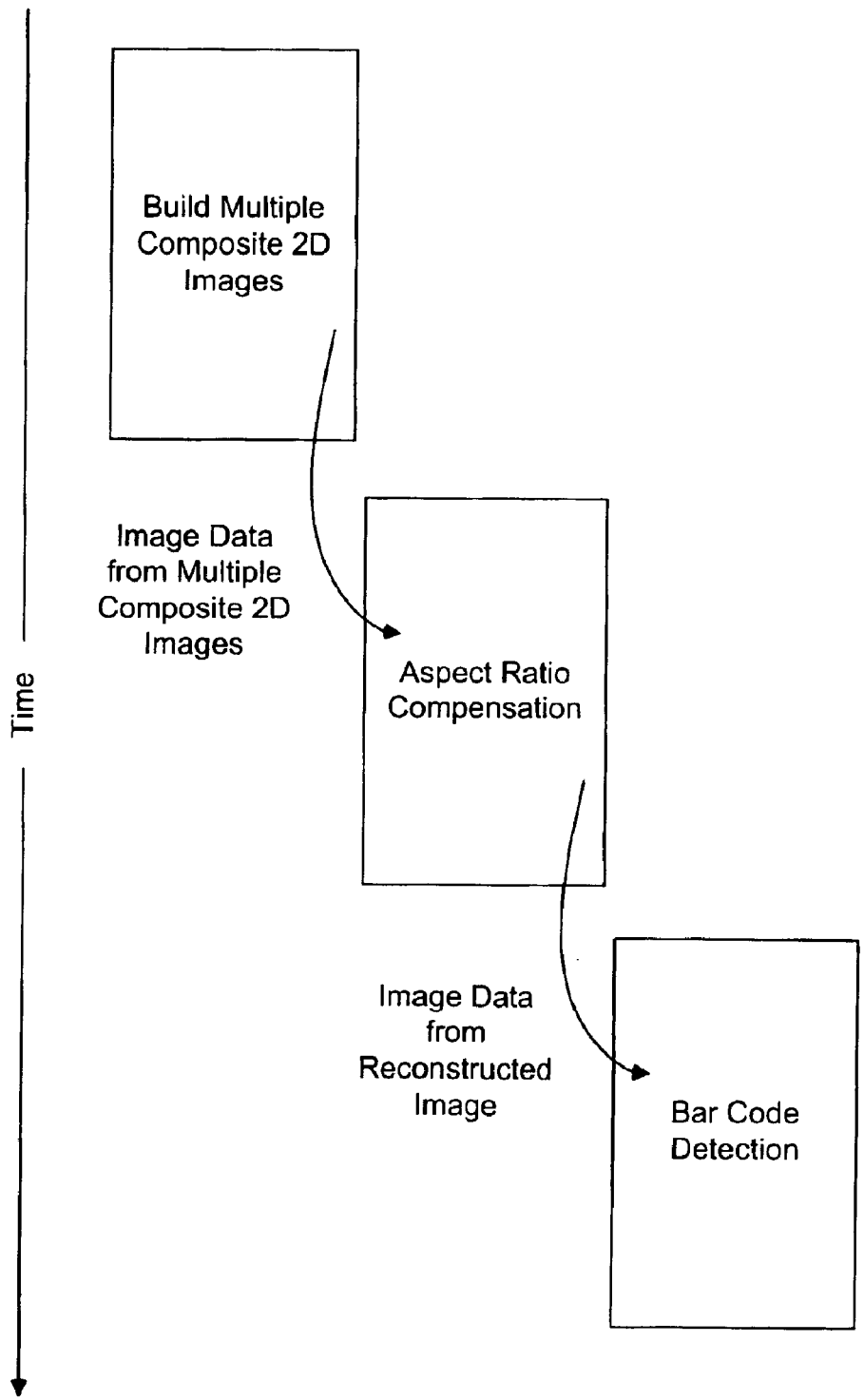
FIG. 4B is a pictorial illustration of an exemplary processing scheme carried out by the PLILIM-based imaging device of FIG. 4A, depicting the temporal relationship of operations carried out by the device; note that Bar Code Detection on the reconstructed image occurs subsequent to Aspect Ratio Compensation.
Figure 4C:
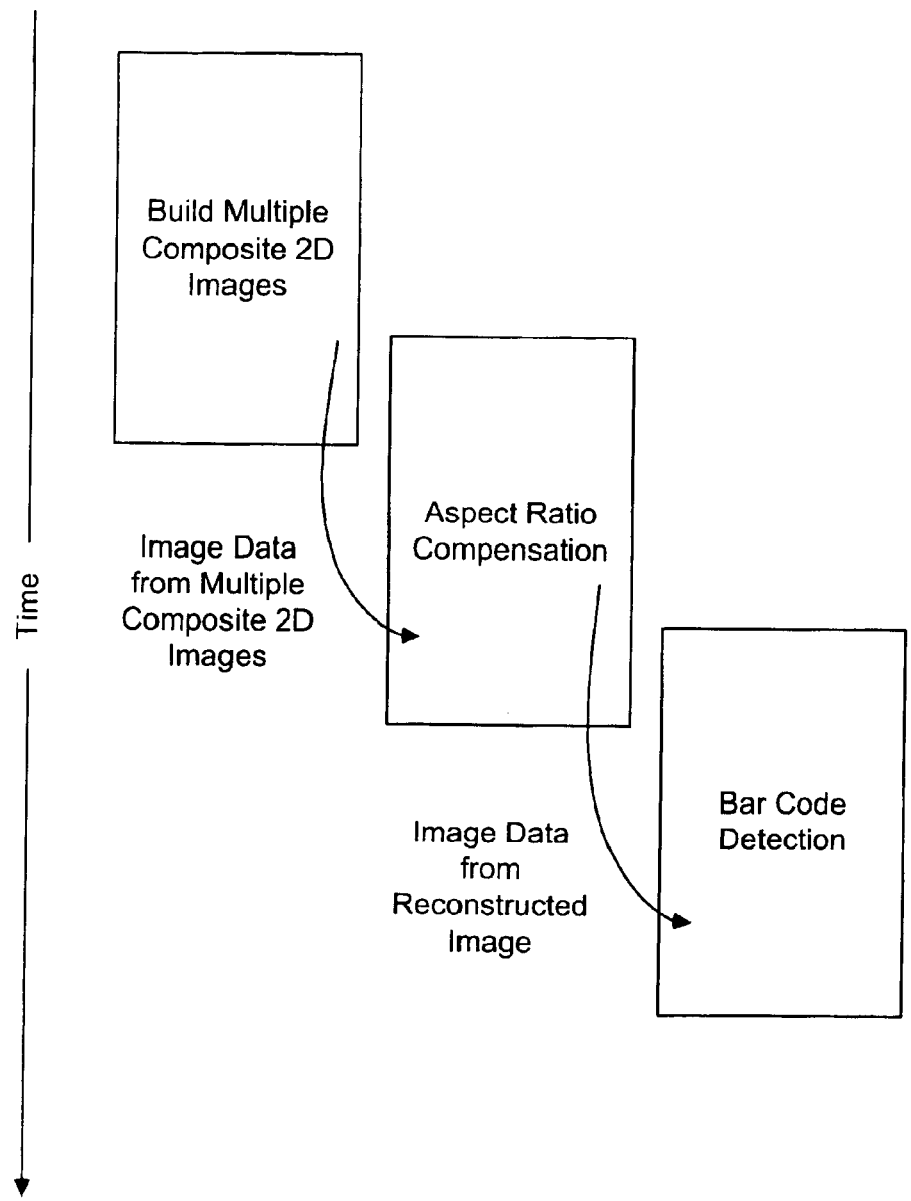
FIG. 4C is a pictorial illustration of an alternate processing scheme carried out by the PLILIM-based imaging device of FIG. 4A, depicting the temporal relationship of operations carried out by the device; note that Bar Code Detection on the reconstructed image occurs concurrent with Aspect Ratio Compensation.

In the illustrative embodiments shown in FIGS. 4B and 4C, the image processing computer 413 executes the Bar Code Detection routine subsequent to (FIG. 4B), or concurrent with (FIG. 4C), the Aspect Ratio Compensation routine. In these configurations, the Bar Code Detection routine accesses image data of the reconstructed image stored in memory buffer 411C and carries out image-based bar code symbol detection and decoding operations on the reconstructed image.

Figure 4D:
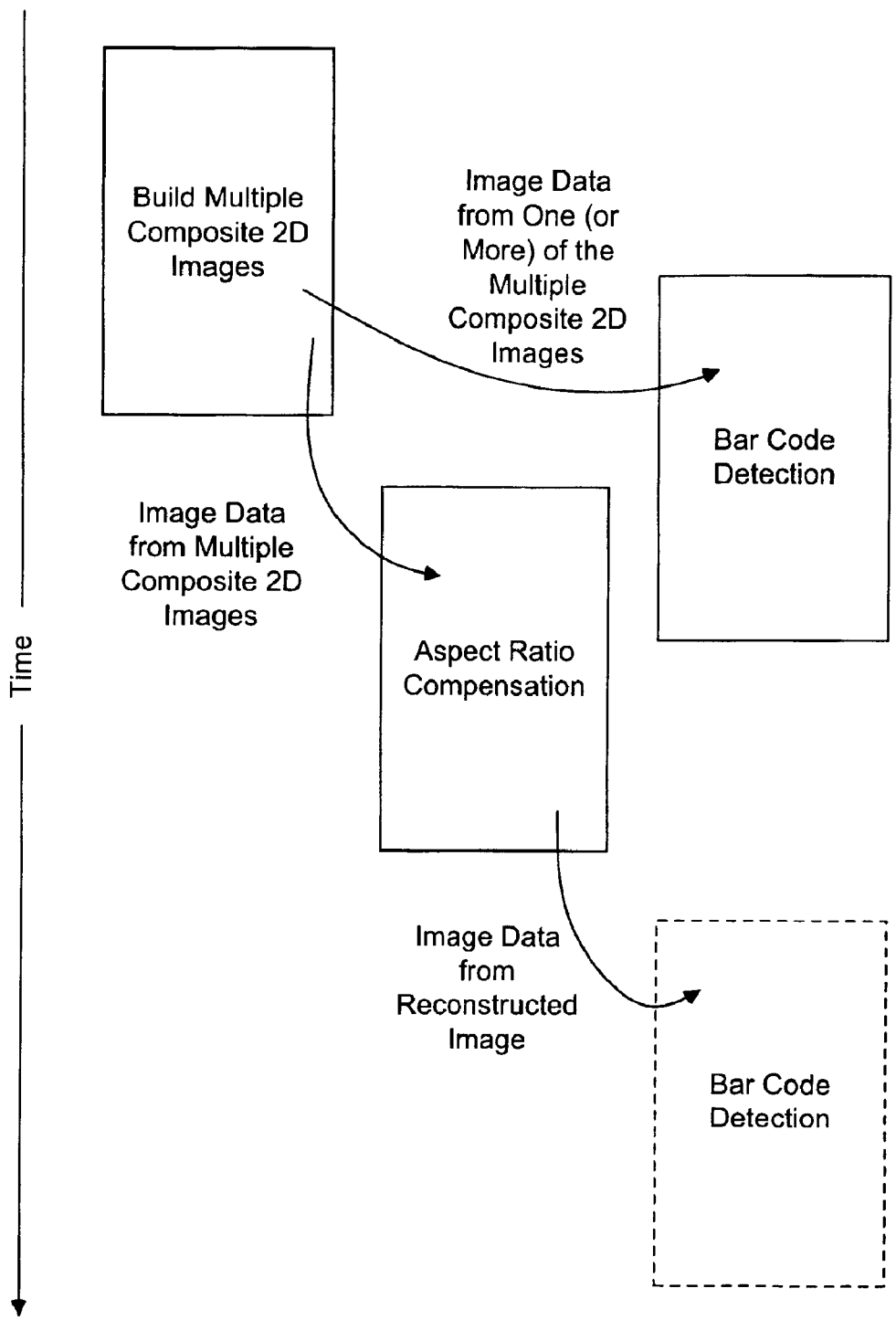
FIG. 4D is a pictorial illustration of an alternate processing scheme carried out by the PLILIM-based imaging device of FIG. 4A, depicting the temporal relationship of operations carried out by the device; note that Bar Code Detection is performed on image data from one or more of the multiple composite 2-D images concurrent with Aspect Ratio Compensation on such images.
Figure 4E:
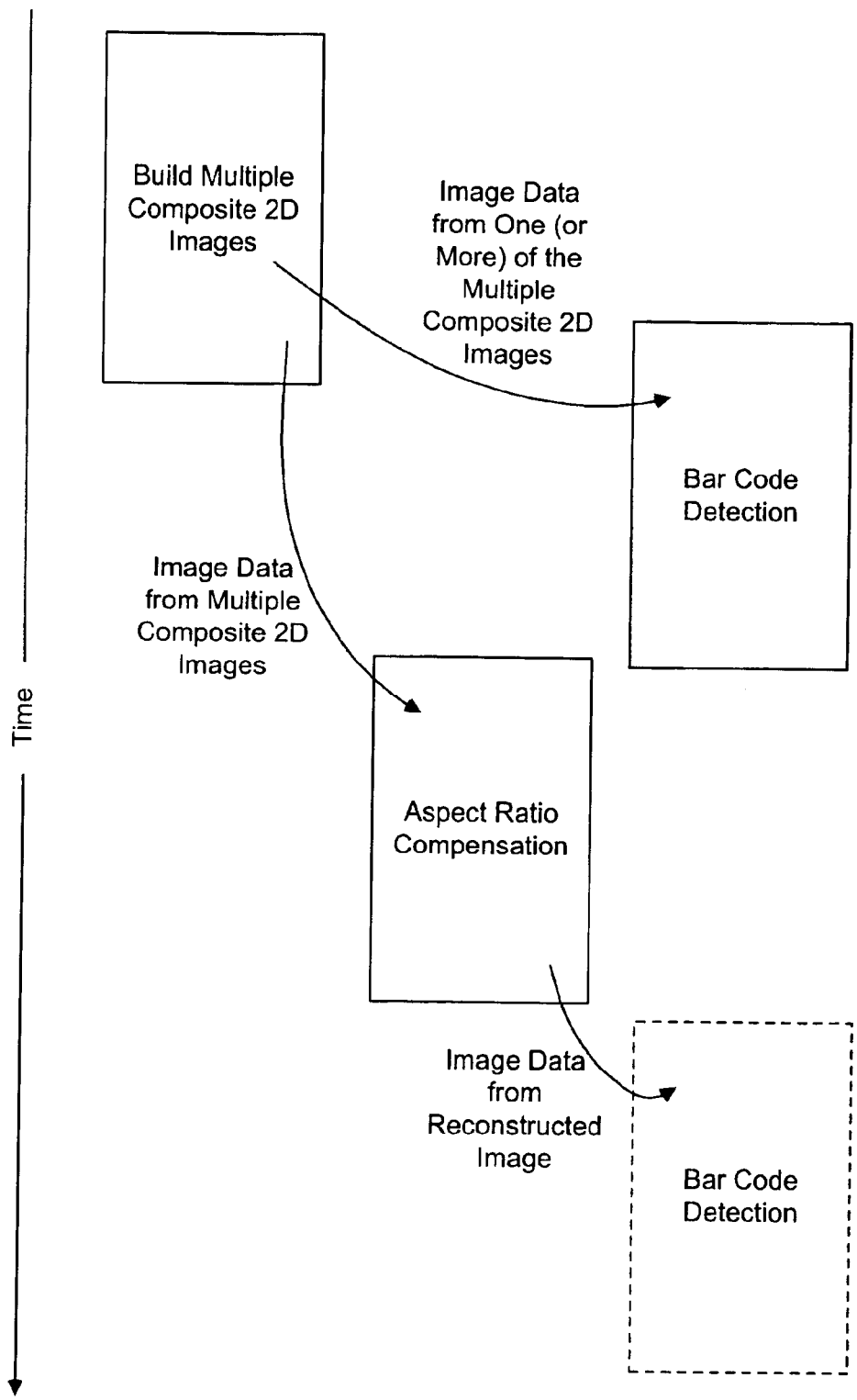
FIG. 4E is a pictorial illustration of an alternate processing scheme carried out by the PLILIM-based imaging device of FIG. 4A, depicting the temporal relationship of operations carried out by the device; note that Bar Code Detection is performed on image data from one or more of the multiple composite 2-D images is performed prior to Aspect Ratio Compensation on such images.

In the illustrative embodiments shown in FIGS. 4D and 4E, the image processing computer 413 executes the Bar Code Detection routine, which accesses one or more of the composite 2-D images stored in the memory buffers (e.g., 411A, 411B) and carries out image-based bar code symbol detection and decoding operations on such composite 2-D image(s). The Aspect Ratio routine is carried out concurrent with (FIG. 4D), or subsequent to (FIG. 4E), the Bar Code Detection routine that operates on the image data from one or more of the composite 2-D images. In these configurations, an optional invocation of the Bar Code Detection routine image (as indicated by the dotted lines) may be carried out on the image data of the reconstructed image produced by the Aspect Ratio Compensation routine and stored in memory buffer 411C.

The programmed set of instructions which carry out the image processing operations described above (e.g., labeled "Aspect Ratio Compensation" and/or "Bar Code Detection") are typically written in a high-level programming language (i.e., a programming language readable by those skill in the art, such as the "C" programming language) and compiled by a software tool (called a compiler) into a set of instructions that are suitable for execution by the image processing computer 413. The compiled set of instructions together with a system control program (e.g., a real-time operating system) are then stored in non-volatile memory (not shown) of the device 400 for access and execution by the image processing computer 413 as described above.

Bar code symbol character data (generated via execution of the Bar Code Detection routine on the image processing computer 413) is transferred, under control of controller 419, to communication interface circuitry 423, which communicates the bar code symbol character data to a host system over a communication link there between, which, for example, may be a wireless data link (such as an infra-red link, Bluetooth RF link, IEEE802.11a RF link or IEEE 802.11b RF link) or wired serial data link (such as keyboard wedge link—for example supporting XT-, AT- and PS/2- style keyboard protocols, an RS-232 link, USB link, a Firewire (or IEEE 1394) link, an RS-422 link, RS-485 link, or Ethernet link), a wired parallel data bus, or other common wired interface links (such as an OCIA link, an IBM 46XX link, a Light Pen Emulation link, a LTPN link)).

In addition, the reconstructed image (generated via execution of the Aspect Ratio Compensation routine on the image processing computer 413) is preferably transferred, under control of controller 419, to communication interface circuitry 423, which communicates the reconstructed image to a host system over the communication link there between. Alternatively, the reconstructed image can be compressed (for example, into a TIFF, GIFF, JPEG compressed format) and the reconstructed image (in compressed form) can be transferred, under control of controller 419, to the communication interface circuitry 423, which communicates the reconstructed image (in compressed form) to a host system over the communication link there between. Such compression can be performed, for example, by the image processing computer 413, controller 419, or circuitry in the communication interface circuitry 423. In this illustrative configuration, the host system receives the reconstructed image (or decompresses its compressed form) and performs image processing operations that carry out OCR of textual symbologies (and possibly other symbologies) on the reconstructed image, thereby outputting a text-based document that is suitable for editing by a standard word processing/text editing program.

A system bus 418 (which may be a simple bus structure has shown, or alternatively may be more complicated and hierarchical in nature) provides the data/signal paths over which the memory controller 409, memory module(s) 412, image processing computer 413 and controller 419 communicate. The controller 419 (which performs system control operations for the device 400) interfaces to illumination control circuitry 421, which operates (under control of controller 419) to provide power (e.g., current) to the illumination sources (e.g., VLDs or LEDs) of $PLIA_1$ and $PLIA_2$ during planar illumination and image capture operations. In the event that the illumination sources embodied therein produce coherent laser light, the current levels provided to such illumination sources are preferably modulated in manner that reduces the temporal coherence of the planar laser illumination as described below in detail, which advantageously reduces the RMS power of the speckle noise detected by the PLILIM-based illumination and image capture module. Moreover, the device 400 may employ mechanical means (i.e., oscillating optical elements) that reduces the spatial coherence of the planar laser illumination as set forth below, which advantageously reduces the RMS power of the speckle noise detected by the PLILIM-based illumination and image capture module. In this configuration, the controller 419 preferably controls operation of such mechanical means. In addition, as described above, the image formation optics may include focus control mechanisms and/or zoom-control mechanisms embodied therein. In this configuration, the controller 419 preferably performs camera control operations that cooperate with such mechanisms to adjust the focus and/or zoom of the image formation optics.

The controller 419 also interfaces to I/O interface circuitry 425, which may provide drive signals to an audio-transducer and/or LED-based status visual indicators (labeled "Status LEDs") used to signal successful symbol reading operations to users and the like, and may provide user input via interaction with a keypad, buttons or switches (such as a "Data Communication Switch") as shown. In addition, the I/O interface may also provide for interfacing with a plurality of other accessory devices (such a display device).

The controller 419 also operates the device 400 in accordance with a system control architecture (or scheme). In general, there are various system control architecture that can be embodied by the controller 419. For example, the PLILIM-based illumination and image capture and subsequent image-based bar code symbol detection/decoding and communication of bar code symbol character data to the host system may occur automatically (without the need for human interaction to activate such operations). Alternatively, the PLILIM-based illumination and image capture and subsequent image-based bar code symbol detection/decoding may occur automatically (without the need for human interaction to activate such operation) and the communication to the host system of the symbol data corresponding thereto may be activated by a manually-activated data transmission switch as described in detail in co-pending U.S. patent application Ser. No. 09/204,176 filed Dec. 3, 1998 (108-027USA000) and co-pending U.S. patent application Ser. No. 09/452,976 filed Dec. 2, 1999 (108-078USA000); incorporated by reference above in their entirety. In another alternative, the PLILIM-based illumination and image capture and subsequent image-based bar code symbol detection/decoding and communication of bar code symbol character data to the host system may be activated by a manual trigger switch or like mechanism, as disclosed, for example, in U.S. Pat. Nos. 5,828,048; 5,828, 049; 5,825,012; 5,808,285; 5,796,091; 5,789,730; 5,789, 731; 5,777,315; 5,767,501; 5,736,482; 5,661,292; 5,627, 359; 5,616,908; 5,591,953; 5,557,093; 5,528,024; 5,525, 798, 5,484,992; 5,468,951; 5,425,525; 5,240,971; 5,340, 973; 5,260,553; incorporated herein by reference.

The image processing computer 413 may utilize one or more digital signal processing engines/cores and cache memory that stores (e.g. buffers) instructions/data and provides low latency access to such instructions/data when requested by the processing engine(s). A digital signal processing engine (or like device) is preferable because such devices have low power requirements, high performance levels in image processing applications (because of the microarchitecture employed therein), and low cost.

Preferably, the functionality of the controller 419 and image processing computer 413 (and possibly the memory controller 409, I/O interface circuitry 425 and/or communication interface circuitry 423) are embodied in a single integrated circuit (typically referred to as a "System on a Chip"). An example of such an integrated circuit is the Intel PXA250 applications processor, which includes a high performance microprocessor that is capable of performing the duties of the imaging processing computer 413 and controller 419 as described above along with integrated memory controller (e.g., SDRAM Control/SDRAM Control/DMA Control), integrated I/O interface circuitry (LCD interface, I²S interface, I²C interface) and integrated communication interface circuitry (IRDA interface, UART interfaces, Bluetooth Interface, USB client interface). In addition, it is preferable that controller 419 (and possibly image processing computer 413) embody features commonly found in modern RISC microprocessors, including advanced power management circuitry (which typically operate to temporarily shut down/disable elements of the microprocessor that are being used), pipelined execution stages, speculative instruction execution and speculative data prefetching (which requires branch prediction mechanisms), and out-of-order instruction execution. Many of these features are embodied in the Intel PXA250 applications processor. In addition, the functionality of the timing signal generator 405, possibly some of the functionality of the memory controller 409 (such as buffering data produced by the analog-to-digital conversion circuitry 407 and/or memory access/DMA control), and possibly some of the image processing operations described herein as part of the Aspect Ratio Compensation Routine (such as edge extraction/analysis as described below), Bar Code Detection Routine, or other image processing operations may be embodied in dedicated hardware, such as one or more programmable gate arrays (e.g., Spartan II line of FPGAs available from Xilinx Inc. of San Jose, Calif.), one or more programmable logic devices (e.g., CPLD line available from Xilinx Inc. of San Jose, Calif.), and/or one or more Application Specific Integrated Circuits (ASICs).

Figure 5A:
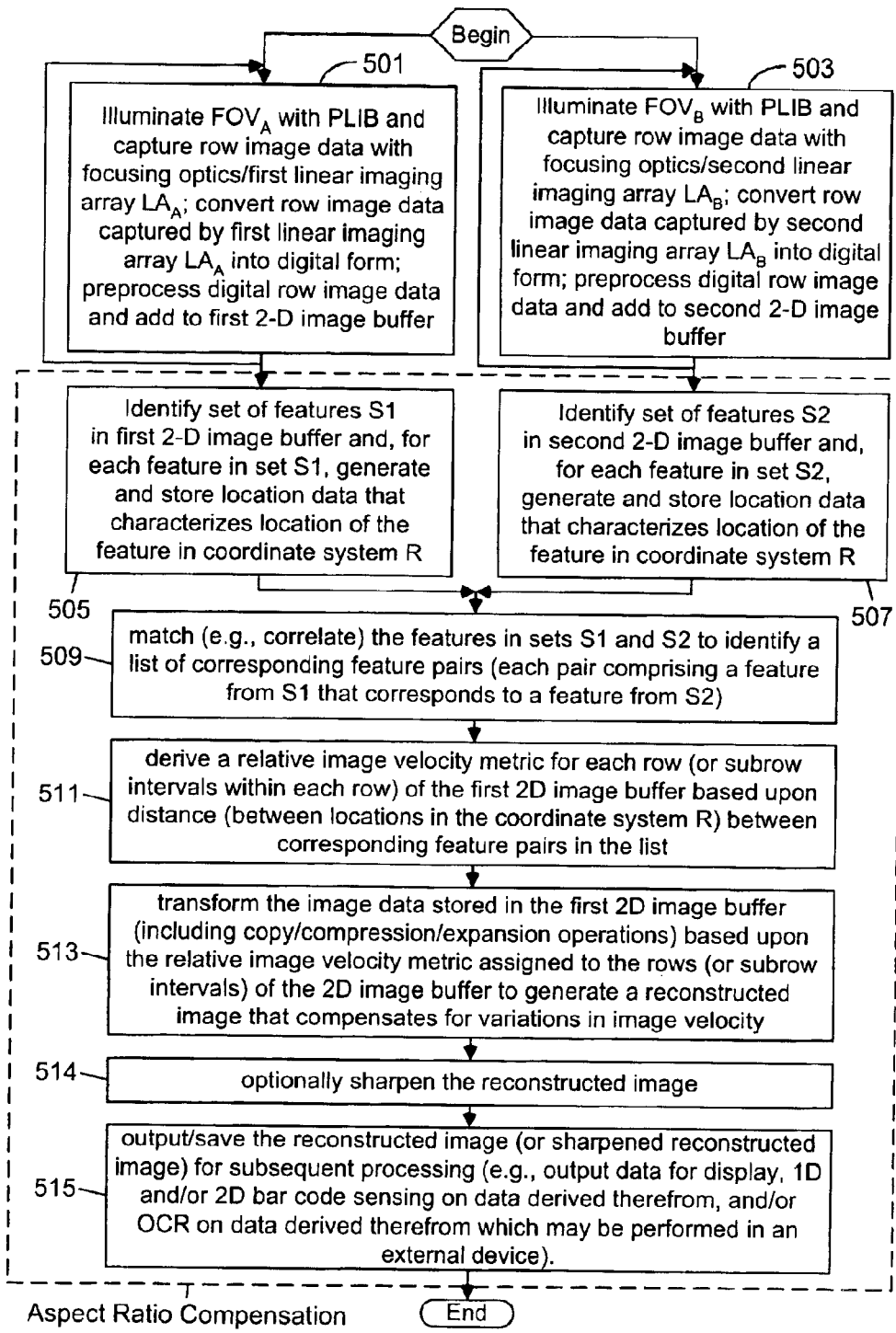
FIGS. 5A and 5B are flow charts illustrating two different exemplary methodologies for Image Velocity Estimation/Aspect Ratio Compensation carried out by the PLILIM-based imaging devices described herein in accordance with the present invention; in the methodology of FIG. 5A, image velocity is derived from distance (e.g., row offset) between corresponding features in the two images; and in methodology of FIG. 5B, image velocity is derived from distance (e.g. row offset) between a selected row in one image and a correlation result between the selected row and multiple rows of the other image.
Figure 5B:
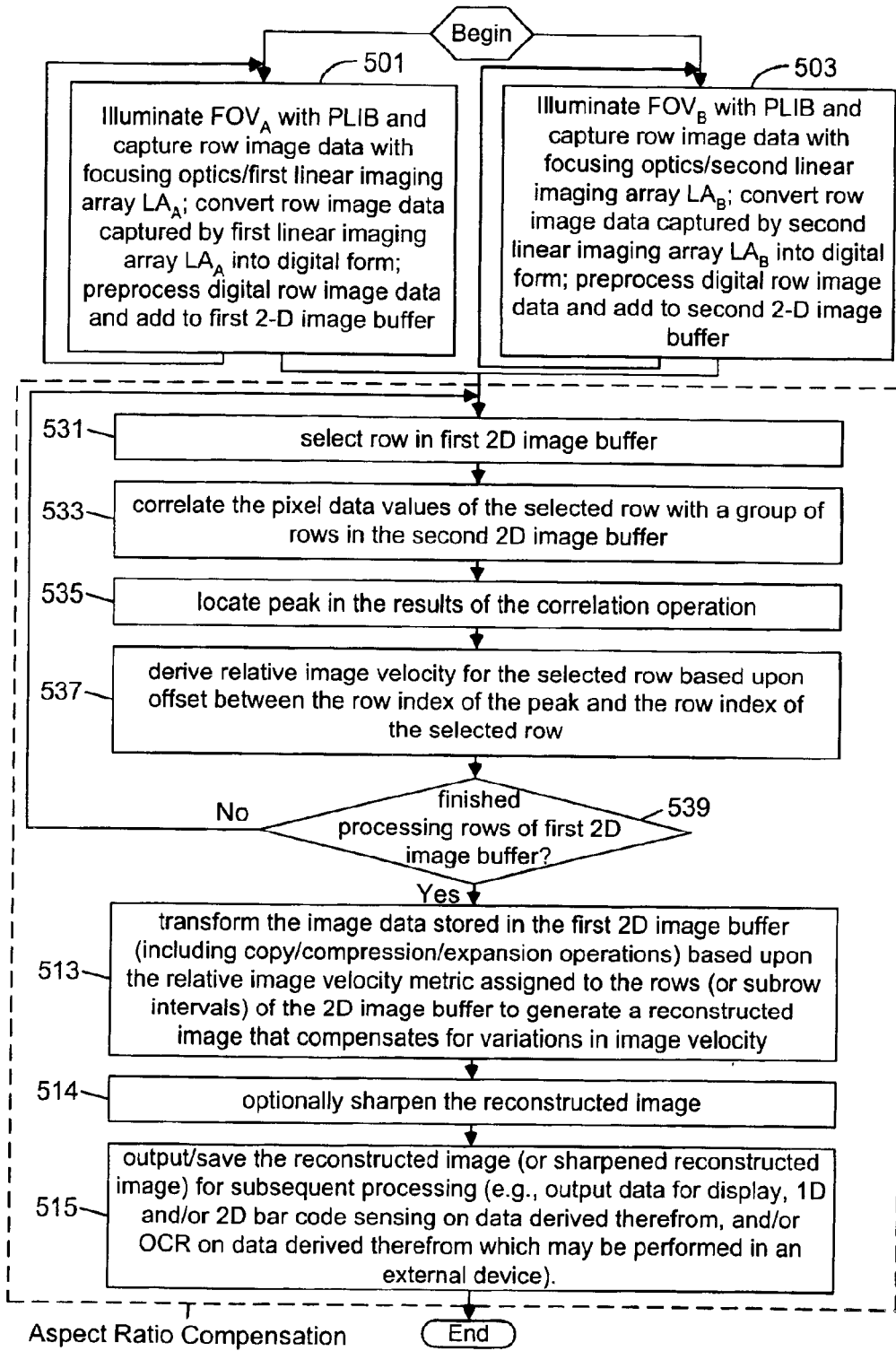

FIGS. 5A and 5B are flow charts illustrating two different exemplary methodologies carried out by the PLILIM-based imaging device of FIG. 4A in accordance with the present invention. In the methodology of FIG. 5A, image velocity is derived from distance (e.g., row offset) between corresponding features in the two images. And in the methodology of FIG. 5B, image velocity is derived from distance (e.g. row offset) between a selected row in one image and a correlation result between the selected row and multiple rows of the other image.

Referring now to the exemplary operations of FIG. 5A, in blocks 501 and 503, planar light illumination (e.g., a composite planar light illumination beam provided by $PLIA_1$ and $PLIA_2$) is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to $LA_A$ and $LA_B$, respectively). Such operations are repeated over successive rows (e.g., lines) to form the multiple composite 2-D images in the image buffers. Blocks 505 through 515, which represent an exemplary embodiment of the Aspect Ratio Compensation routine executed by the image processing computer 413 in accordance with the present invention, access the multiple composite 2-D images stored in the image buffers and process such composite 2-D images to: i) estimate variations in the velocity of relative motion between the device and target object during image capture operation, and ii) transform one of the composite 2-D images (utilizing the estimated velocity variations) to form a reconstructed image that compensates for such estimated variations (i.e., has a more uniform aspect ratio). The reconstructed image is stored in memory (e.g., image buffer 411C) for subsequent processing (e.g., output for display, Bar Code Symbol Detection and Decoding and/or OCR operations).

In blocks 505 and 507, each composite 2-D image is processed to identify a set of features therein, and location data that characterizes location of the features in a coordinate system R is generated and stored. The coordinate system R is preferably a 2-dimensional Cartesian system that is local in nature—it characterizes location of a given feature in a reference frame internal to the scanner housing, such as the pixel space of the composite 2-D image buffer. However, any other arbitrary 2-dimensional (or three-dimensional coordinate system) may be employed. When using a three-dimensional coordinate system, the three dimensions of the feature are typically derived from height (or range) of the feature with respect to the internal reference frame. This height may be estimated utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, herein incorporated by reference in its entirety.

The features identified in blocks 505 and 507 may be raw intensity values, edge attributes, contour attributes, point (or corner or center of a region) attributes, statistical features or any other feature type that carries information that differentiates the portion of the image corresponding to the feature from noise. Details of exemplary feature types are described in: i) Brown, "A Survey of Image Registration Techniques", ACM Computing Surveys, 24(4), pgs. 325–376, 1992; Weng et al., "Motion and Structure from Two Perspective Views: Algorithms, Error Analysis and Error Estimation," IEEE Transactions on Pattern Analysis and machine Intelligence, Vol. 11, No. 5, May 1989; and Huang et al., "Motion and Structure from Feature Correspondence: A Review," Proceedings of IEEE, Vol. 82, No. 2, February 1994; herein incorporated by reference in their entirety. Exemplary image processing operations that identify statistical features of the raw intensity values over the rows of a given composite 2-D image is described below with respect to blocks 601–609 (labeled 505') and blocks 611–619 (labeled 507') of FIGS. 6A1 and 6A2. Other exemplary image processing operations that identify edge attributes (e.g., local extrema of row edge count values) over the rows of a given composite 2-D image is described below with respect to blocks 601'–609' (labeled 505") and blocks 611'–619' (labeled 507") of FIGS. 6B1A and 6B1B.

In block 511, for a select one of the multiple composite 2-D images (for example, the first composite 2-D image stored in image buffer 511A), an image velocity metric is derived for each row (or subrow intervals within each row) of the selected composite 2-D image. The image velocity metric for a given row (or subrow interval), which characterizes an estimate of the velocity of the scanner housing relative to the target object for the given row (or subrow interval), is based upon distance between corresponding features in the list generated in block 509. The distance between corresponding features is given by the distance between locations of corresponding features in the coordinate system R (such locations are generated in block 505/507 as discussed above). Exemplary image processing operations that generate such image velocity metrics utilizing interpolation over the rows (or subrow intervals) of the selected composite 2-D image is described below with respect to blocks 623 and 625 (labeled block 511') of FIGS. 6A1 through 6B.

In Block 509, features (from the feature sets identified in block 505 and 507) are matched (e.g., registered) to generate a list of corresponding features. For example, in the case where a pair of composite images are formed and processed, the list of corresponding features may identify corresponding feature pairs wherein each feature pair identifies a feature from one composite 2-D image that corresponds to a feature from the other composite 2-D image as noted in block 509. In a more general case where multiple composite 2-D images are formed and processed, the list of corresponding features may comprise tuples each identifying at least one feature from each composite 2-D image, wherein the features of the a given tuple correspond to one another. Generally, the feature matching process of block 509 measures a degree of similarity (or dissimilarity) between feature points over the multiple composite 2-D images and maximizes this similarity measure (or minimizes the dissimilarity measure) to derive the list of corresponding features for the multiple composite 2-D images. An exemplary feature matching process is described below with respect to FIGS. 6B8(i), 6B8(ii), 6B9, 6B10, 6B11(i) and 6B11(ii).

In block 511, for a select one of the multiple composite 2-D images (for example, the first composite 2-D image stored in image buffer 511A), an image velocity metric is derived for each row (or subrow intervals within each row) of the selected composite 2-D image. The image velocity metric for a given row (or subrow interval), which characterizes an estimate of the velocity of the scanner housing relative to the target object for the given row (or subrow interval), is based upon distance between corresponding features in the list generated in block 509. The distance between corresponding features is given by the distance between locations of corresponding features in the coordinate system R (such locations are generated in block 505/507 as discussed above). Exemplary image processing operations that generate such image velocity metrics utilizing interpolation over the rows (or subrow intervals) of the selected composite 2-D image is described below with respect to blocks 623 and 625 (labeled block 511') of FIGS. 6A and 6B.

In block 513, the selected composite 2-D image is transformed (utilizing copy, compression and expansion operations that are based upon the relative image velocity metrics assigned to the rows (or subrow intervals) of the selected composite 2-D image in block 511) to generate a reconstructed image that compensated for variations in image velocity (as estimated by the relative image velocity metrics). Exemplary image processing operations that perform transform operations (such as copy, compression and expansion) sequentially over portions of the selected composite 2-D image to build up corresponding portions of the reconstructed image is described below with respect to FIGS. 7A–7C.

In block 514, the reconstructed image is optionally sharpened (which increases the visibility of image structures with high spatial frequencies such as details, edges, fine textures). An example of image sharpening operations suitable for use in block 514 is described below respect to FIGS. 7D1 and 7D2.

Finally, in block 515, the reconstructed image produced in bock 513 (or sharpened reconstructed image produced in block 514) is output and saved (for example, in image buffer 411C) for subsequent processing (e.g., output data for display, 1D and/or 2D bar code sensing on data derived therefore, and/or OCR on data derived there from).

Referring now to the exemplary operations in FIG. 5B, in blocks 501 and 503, planar light illumination (e.g., a composite planar light illumination beam provided by $PLIA_1$ and $PLIA_2$) is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to $LA_A$ and $LA_B$, respectively). Such operations are repeated over successive rows (e.g., lines) to form the multiple composite 2-D images in the image buffers.

Blocks 531 through 515, which represent an exemplary embodiment of the Aspect Ratio Compensation routine executed by the image processing computer 413 in accordance with the present invention, access the multiple composite 2-D images stored in the image buffers and process such composite 2-D images to: i) estimate variations in the velocity of relative motion between the device and target object during image capture operation, and ii) transform one of the composite 2-D images (utilizing the estimated velocity variations) to form a reconstructed image that compensates for such estimated variations (i.e., has a more uniform aspect ratio). The reconstructed image is stored in memory (e.g., image buffer 411C) for subsequent processing (e.g., output for display, Bar Code Symbol Detection and Decoding and/or OCR operations).

The Aspect Ratio Compensation routine operates in blocks 531 through 539 to derive a relative image velocity metric for rows in one of the two composite 2-D images (e.g., rows in the first 2D buffer).

In block 531, a row in one of the two composite 2-D images (e.g., a row from the first 2D buffer) is selected.

In block 533, the pixel data values of the selected row is correlated to the pixel data values of a group of rows in the other composite 2-D image (e.g., a group of rows from the second 2D buffer. Preferably, such correlation is performed as a template matching process whereby the selected row from the first 2D image buffer is overlaid onto a given row in the group of rows from the second 2D image buffer, the pixel data values that are overlaid are multiplied together, and the total of such multiplications (the correlation result) is stored for the given row. This template matching process is performed for each row in the group of rows to store a correlation result for each row in the group.

In block 535, the correlation results produced in block 533 are analyzed to identify the peak (e.g., maximum correlation value) therein.

In block 537, an image velocity metric for the selected row is derived from the row offset between the peak (identified in block 535) and the selected row. For example, an image velocity metric $S_{row}(n)$ for a given row n may be calculated as follows:

$S_{row}(n)=(\delta/p)/D$ where $\delta$ is the center-to-center spacing between the linear image sensor rows from which corresponding rows are derived (e.g., center-to-center spacing between the linear image sensor $LA_A$ and $LA_B$);

p is the pixel dimensions along the scan direction (given in the same units as $\delta$); and D is the row offset (e.g., number of rows) between the peak and the selected row.

In block 539, operation returns to the block 531 to process the next row (and derive an image velocity metric for the next row) unless there are no more rows to process and the operations continues to block 513. Note that the image velocity metrics for the rows over the selected composite 2-D image buffer may be generated utilizing interpolation over the rows of the selected composite 2-D image as described below with respect to blocks 623 and 625 (labeled block 511') of FIGS. 6A1 through 6B.

In block 513, the selected composite 2-D image is transformed (utilizing copy, compression and expansion operations that are based upon the relative image velocity metrics assigned to the rows of the selected composite 2-D image to generate a reconstructed image that compensated for variations in image velocity (as estimated by the relative image velocity metrics). Exemplary image processing operations that perform transform operations (such as copy, compression and expansion) sequentially over portions of the selected composite 2-D image to build up corresponding portions of the reconstructed image is described below with respect to FIGS. 7A–7C.

In block 514, the reconstructed image is optionally sharpened (which increases the visibility of image structures with high spatial frequencies such as details, edges, fine textures). An example of image sharpening operations suitable for use in block 514 is described below respect to FIGS. 7D1 and 7D2.

Finally, in block 515, the reconstructed image produced in bock 513 (or sharpened reconstructed image produced in block 514) is output and saved (for example, in image buffer 411C) for subsequent processing (e.g., output data for display, 1D and/or 2D bar code sensing on data derived therefore, and/or OCR on data derived there from).

FIGS. 6A1 and 6A2 illustrate exemplary image processing operations that are preferably carried out by the PLILIM-based imaging device of FIG. 4A as part of its Aspect Ratio Compensation routine in accordance with the present invention. Such operations identify statistical features of raw intensity values over the rows of multiple composite 2-D images (blocks 601–609 and blocks 611–619), match (e.g., register) such features to generate a list of corresponding features (block 621), and derive relative image velocity metrics for the rows of a selected composite 2-D image based upon location of corresponding features in the list (blocks 623–625).

In blocks 601–607, a loop is performed over the rows of the first composite 2-D image stored in the image buffer 211A wherein the operations of blocks 603 and 605 are performed for each row therein.

In block 603, for each pixel data value in the current row, a bin corresponding to the pixel data value is identified and the count for such bin is updated. For example, the 255 integer values (0 to 254) for an 8 bit pixel may be assigned to 8 bins (0–7) as follows:

| Pixel Data Values (0–255) | Bin (0–7) |
|---|---|
| 0–31 | 0 |
| 32–63 | 1 |
| 64–95 | 2 |
| 96–127 | 3 |
| 128–159 | 4 |
| 160–191 | 5 |
| 192–223 | 6 |
| 224–255 | 7 |

The operations of block 603 form a histogram of bin values for the current row.

In block 605, the bin of the histogram with the largest count is identified, and the characteristic value for the current row is equated to the identified "largest" bin.

After completing the loop in block 607, any array of characteristic values each corresponding to a given row in the first composite 2-D image is stored in memory.

In block 609, the array of characteristic values is processed to identify those rows where the characteristic values cross a reference value (such as the average characteristic value over the rows of the first composite 2-D image). The row identifier (e.g., row index) for each crossing is added to a set (e.g., list) of features for the first composite 2-D image, which is stored in memory for subsequent use.

Similar operations are performed for each one of the other composite 2-D images, respectively. For example, in blocks 611–617, a loop is performed over the rows of the second composite 2-D image stored in the image buffer 411B to generate any array of characteristic values each corresponding to a given row in the second composite 2-D image. And in block 619, the array of characteristic values is processed to identify those rows where the characteristic values cross a reference value (such as the average characteristic value over the rows of the first composite 2-D image). The row identifier (e.g., row index) for each crossing is added to a set (e.g., list) of features for the second composite 2-D image, which is stored in memory for subsequent use.

In Block 621, the features (row identifiers) from the feature sets identified in blocks 609/619 are matched (e.g., registered) to generate a list of corresponding features. For example, in the case where a pair of composite images are formed and processed, the list of corresponding features may identify corresponding feature pairs wherein each feature pair identifies a feature from one composite 2-D image that corresponds to a feature from the other composite 2-D image as noted in block 621. In a more general case where multiple composite 2-D images are formed and processed, the list of corresponding features may comprise tuples each identifying at least one feature from each composite 2-D image, wherein the features of the a given tuple correspond to one another. Generally, the feature matching process of block 621 measures a degree of similarity (or dissimilarity) between feature points over the multiple composite 2-D images and maximizes this similarity measure (or minimizes the dissimilarity measure) to derive the list of corresponding features for the multiple composite 2-D images. An exemplary feature matching process is described below with respect to FIGS. 6B8(i), 6B8(ii), 6B9, 6B10, 6B11(i) and 6B11(ii).

In block 623, a loop is performed over the feature pairs of the list generated in block 621 to derive an image velocity metric for each feature (row identifier) in a selected composite 2-D image (for example, the first composite 2-D image). The image velocity metric for a given feature, which characterizes an estimate of the velocity of the scanner housing relative to the target object for the given feature, is based upon distance between corresponding features in the list generated in block 623. The distance between corresponding features is given by the distance between locations of corresponding features in the coordinate system R. As described above, the coordinate system R may be a local 2-dimensional coordinate system such as the pixel space of the composite 2-D image buffer. In this case, the distance between corresponding features (e.g., row identifiers) is provided by the row offset D between such row identifiers, and an exemplary distance metric $S_{raw}(n)$ for a given feature/row n may be calculated as follows:

$$S_{raw}(n)=(\delta/p)/D \text{ where}$$

$\delta$ is the center-to-center spacing between the linear image sensor rows from which corresponding features/rows are derived (e.g., center-to-center spacing between the linear image sensor $LA_A$ and $LA_B$);

p is the pixel dimensions along the scan direction (given in the same units as $\delta$); and D is the row offset (e.g., number of rows) between corresponding features.

Finally, in block 625, interpolation operations are performed over the relative image velocity metrics for the feature rows to derive a relative image velocity metric for each row of the selected composite 2-D image, which is stored for subsequent processing. Alternatively, each row of the selected composite 2-D image may be logically partitioned into multiple subrow intervals (for example 8 subrow intervals). In this case, interpolation operations are performed over the relative image velocity metrics for the feature rows to derive a relative image velocity metric for each subrow interval over the rows of the selected composite 2-D image, which is stored for subsequent processing. In addition, such interpolation operations may involve smoothing that removes any sharp discontinuities in the relative image velocity metrics for the rows (or subrow intervals) of the selected composite 2-D image. Exemplary interpolation operations suitable for use in block 625 is set forth in the flow chart of FIG. 6B12.

FIG. 6B1 illustrates exemplary image processing operations that are preferably carried out by the PLILIM-based bar imaging device of FIG. 4A as part of its Aspect Ratio Compensation routine in accordance with the present invention. Such operations identify edge attributes (e.g., local extrema of row edge count values) over the rows of multiple composite 2-D images (blocks 601'–609' and blocks 611'–619'), match (e.g., register) such features to generate a list of corresponding features (block 621), and derive relative image velocity metrics for the rows (or subrow intervals) of a selected composite 2-D image based upon location of corresponding features in the list (blocks 623–625).

In blocks 601'–607', a loop is performed over the rows of the first composite 2-D image stored in the image buffer 211A wherein the operations of blocks 603' and 605' are performed for each row therein.

In block 603', the number of edges in the current row is detected. Any one of a number of edge extraction operators may be used to detect edges. For example, a one-pixel edge operator may be performed that detects an edge when the difference between a given pixel data value and a local window of pixel data values exceed a predetermined threshold. Alternately, standard edge operators (such as Sobel, Kirsch, Psuedo-Laplace, Laplacian-of-Gaussia filter, Marr-Hildreth filter, etc.) may be used to detect the edges in the current row. A detailed description of such exemplary edge detection operators is described in Klette et al., "Handbook of Image Processing Operators," Wiley and Sons, 1996, pp. 219–244, herein incorporated by reference in its entirety. Another approach is described below with respect to FIGS. 6B2 through 6B5.

In block 605', the characteristic value for the current row is equated to the edge count for the current row.

After completing the loop in block 607', any array of characteristic values each corresponding to a given row in the first composite 2-D image is stored in memory.

In block 609', the array of characteristic values is processed to identify local extrema (e.g., maxima, minima, rising point of inflection, falling point of inflection) in the array of characteristic values. The row identifier (e.g., row index) for each local extrema is added to a set (e.g., list) of features for the first composite 2-D image, which is stored in memory for subsequent use. Exemplary operations suitable for use in block 609' is described below with respect to FIGS. 6B6A through 6B7.

Similar operations are performed for each one of the other composite 2-D images, respectively. For example, in blocks 611'–617', a loop is performed over the rows of the second composite 2-D image stored in the image buffer 411B to generate any array of characteristic values each corresponding to a given row in the second composite 2-D image. And in block 619', the array of characteristic values is processed to identify local extrema (e.g., maxima, minima, rising point of inflection, falling point of inflection) in the array of characteristic values. The row identifier (e.g., row index) for each local extrema is added to a set (e.g., list) of features for the second composite 2-D image, which is stored in memory for subsequent use. Exemplary operations suitable for use in block 619' are described below with respect to FIGS. 6B6A through 6B7.

In block 621, the features (row identifiers) from the feature sets identified in blocks 609'/619' are matched (e.g., registered) to generate a list of corresponding features. For example, in the case where a pair of composite images are formed and processed, the list of corresponding features may identify corresponding feature pairs wherein each feature pair identifies a feature from one composite 2-D image that corresponds to a feature from the other composite 2-D image as noted in block 621. In a more general case where multiple composite 2-D images are formed and processed, the list of corresponding features may comprise tuples each identifying at least one feature from each composite 2-D image, wherein the features of the a given tuple correspond to one another. Generally, the feature matching process of block 621 measures a degree of similarity (or dissimilarity) between feature points over the multiple composite 2-D images and maximizes this similarity measure (or minimizes the dissimilarity measure) to derive the list of corresponding features for the multiple composite 2-D images. An exemplary feature matching process is described below with respect to FIGS. 6B8(i), 6B8(ii), 6B9, 6B10, 6B11(i) and 6B11(ii).

In block 623, a loop is performed over the feature pairs of the list generated in block 621 to derive an image velocity metric for each feature (row identifier) in a selected composite 2-D image (for example, the first composite 2-D image). The image velocity metric for a given feature, which characterizes an estimate of the velocity of the scanner housing relative to the target object for the given feature, is based upon distance between corresponding features in the list generated in block 623. The distance between corresponding features is given by the distance between locations of corresponding features in the coordinate system R. As described above, the coordinate system R may be a local 2-dimensional coordinate system such as the pixel space of the composite 2-D image buffer. In this case, the distance between corresponding features (e.g., row identifiers) is provided by the row offset D between such row identifiers, and an exemplary distance metric $S_{raw}(n)$ for a given feature/row n may be calculated as follows:

$$S_{raw}(n)=(\delta/p)/D \text{ where}$$

$\delta$ is the center-to-center spacing between the linear image sensor rows from which corresponding features/rows are derived (e.g., center-to-center spacing between the linear image sensor $LA_A$ and $LA_B$);

p is the pixel dimensions along the scan direction (given in the same units as $\delta$); and D is the row offset (e.g., number of rows) between corresponding features.

Finally, in block 625, interpolation operations are performed over the relative image velocity metrics for the feature rows to derive a relative image velocity metric for each row of the selected composite 2-D image, which is stored for subsequent processing. Alternatively, each row of the selected composite 2-D image may be logically partitioned into multiple subrow intervals (for example 8 subrow intervals). In this case, interpolation operations are performed over the relative image velocity metrics for the feature rows to derive a relative image velocity metric for each subrow interval over the rows of the selected composite 2-D image, which is stored for subsequent processing. In addition, such interpolation operations may involve smoothing that removes any sharp discontinuities in the relative image velocity metrics for the rows (or subrow intervals) of the selected composite 2-D image. Exemplary interpolation operations suitable for use in block 625 are set forth in the flow chart of FIG. 6B12.

In an alternate embodiment, optical flow techniques can be carried out by the PLILIM-based imaging device of FIG. 4A as part of its Aspect Ratio Compensation routine in accordance with the present invention. Optical flow is a well-known iterative technique that identifies the velocity of an image feature (one or more pixels of an image) between images in units of pixels per image.

In optical flow, E (x,y,t) is the sensed irradiance at time t at the image point (x,y), and u(x,y) and v(x,y) are components of the optical flow vector at that time t. It is expected that the sensed irradiance will be the same at t+δt at the point (x+δx) and (y+δy) where δx=uδt and δy=vδt; or $$E(x,y,t)=E(x+u\delta t, y+v\delta t, t+\delta t) \text{ for a small time interval } \delta t \quad (1)$$

If the sensed irradiance varies smoothly over x,y,t, the following partial differential equation (2) can be derived from (1):

$$Ex\ u+Ey\ v+Et=0 \quad (2)$$

where $u=dx/dt; v=dy/dt; Ex=\delta E/\delta x; Ey=\delta E/\delta y; Et=\delta E/\delta t$ This is called the optical flow constraint equation since it expresses a constraint on the components u and v of the optical flow.

Another constraint related to smoothness and error of the optical flow is added as follows:

$$Es+Ec \text{ is minimized where} \quad (3)$$

$$Es=\int\int (u_x^2+u_y^2)+(v_x^2+v_y^2)dx\ dy$$

$$Ec=\int\int (Ex\ u+Ey\ v+Et)^2 dx\ dy$$

$\lambda$ is a parameter the weighs the error Ec relative to smoothness Es.

The constraint equation of (3) can be solved using iterative methods to provide the following. The u component at a given pixel $(i,j)=u_{ij}=$for a given iteration N+1 comprises two parts:

First part is derived from the local average of the u values of surrounding pixels (in space and time) in iteration N Second part is an adjustment, which in velocity space is in the direction of the brightness gradient.

The v component at a given pixel $(i,j)=v_{ij}=$for a given iteration N+1 comprises two parts:

First part is derived from the local average of the v values of surrounding pixels (in space and time) in iteration N Second part is an adjustment, which in velocity space is in the direction of the brightness gradient.

After multiple iterations, the u,v components over the pixel space converge to provide a resultant velocity vector (u,v) for each pixel. For details describing such optical flow techniques, refer to "Robot Vision" by Klaus and Horn, MIT Press, 1997, pp. 278–296, herein incorporated by reference in its entirety.

Exemplary Edge Detection/Counting Analysis

FIGS. 6B2 though 6B5 illustrate exemplary operations for detecting and counting edges (e.g., sharp transitions) over the rows of pixel data values stored in a given 2D image buffer (e.g., first 2D image buffer or second 2D image buffer). As shown in the high level flow chart of FIG. 6B2, such operations include two main blocks A, B. In block A, the absolute value of the first derivative of the pixel data values along each row of the given 2D image buffer is calculated. And in block B, the data generated in block A is processed to identify and count edges in each row of the given 2D image buffer.

FIG. 6B3 is a flow chart illustrating exemplary steps/operations to carry out block A of FIG. 6B2. The absolute value of the derivative for the first pixel data value of a given row is calculated as the absolute value of the difference between next pixel data value and the first pixel data value (Q'(y,1)=abs(Q'(y,2)–Q'(y,1))). The absolute value of the derivative for the last pixel data value of a given row is calculated as the absolute value of the difference between next to last pixel data value and the last pixel data value (Q'(y, lastcol)=abs(Q'(y,lastcol)–Q'(y,lastcol–1)). And the absolute value of the derivative for the intermediary pixel data values (between the first and last pixel data values) of a given row is calculated as the absolute value of the difference between next pixel data value and the previous pixel data value (Q'(y,x)=abs(Q'(y,x+1)–Q'(y,x–1)).

FIG. 6B4 is a flow chart illustrating exemplary steps/operations to carry out block B of FIG. 6B2. Note that an edge is equated to each derivative value that satisfies the following three constraints:

i) the derivative value is not the same as the next derivative value (Q'(y,x)≠Q'(y,x+1));

ii) the derivative value is greater than the last distinct derivative value and next derivative value (Q'(y,x)>Q'(y,x–c–1) and Q'(y,x)>Q'(y,x+1)); and iii) the derivative value is greater than a threshold value (Q'(y,x)>$t_d$);

Each detected edge is then added to an edge count for the given row. The edge count for a given row y is stored in array $C_Q$ of edge count values for the rows of the given 2D image buffer.

FIG. 6B5 is a graph that depicts the absolute value of the first derivative of the pixel data values along a given row generated in accordance with the steps/operations of FIG. 6B3. FIG. 6B5 also depicts edges (marked by circles annotated as LM1, LM2, . . . LM7) identified in accordance with the steps/operations of FIG. 6B4.

Exemplary Feature Identification

FIG. 6B6A through 6B7 illustrate exemplary steps/operations for identifying local extrema in the characteristic values (e.g., detected edge count values) for the rows of a given 2D image buffer, and recording the row identifier, characteristic value and extrema type for each local extrema detected. The arrays $R_Q$, $V_Q$ and $E_Q$ store the row identifiers, characteristic values, and extrema type identifiers for the detected local extrema. Such local extrema preferably include the following types:

local minima (type 1)—a characteristic value $C_Q(y)$ for row y that satisfies the following two constraints: i) the characteristic value is less than the last distinct characteristic value ($C_Q(y)<C_Q(y-c-1)$), and ii) the characteristic value is less than the next characteristic value ($C_Q(y)<C_Q(y+1)$);

local maxima (type 2)-a characteristic value $C_Q(y)$ for row y that satisfies the following two constraints: i) the characteristic value is greater than the last distinct characteristic value ($C_Q(y)>C_Q(y-c-1)$), and ii) the characteristic value is greater than the next characteristic value ($C_Q(y)>C_Q(y+1)$);

rising point of inflection (type 3)—a characteristic value $C_Q(y)$ for row y that satisfies the following three constraints: i) multiple previous rows have the same characteristic value (c>0), ii) the characteristic value is greater than the last distinct characteristic value ($C_Q(y)>C_Q(y-c-1)$), and iii) the characteristic value is less than the next characteristic value ($C_Q(y)<C_Q(y+1)$); and falling point of inflection (type 4)—a characteristic value $C_Q(y)$ for row y that satisfies the following three constraints: i) multiple previous rows have the same characteristic value (c>0), ii) the characteristic value is less than the last distinct characteristic value ($C_Q(y)<C_Q(y-c-1)$), and iii) the characteristic value is greater than the next characteristic value ($C_Q(y)>C_Q(y+1)$).

The row identifier and type identifier of each detected extrema is recorded. FIG. 6B7 depicts the characteristic values over the rows of the first and second 2D image buffer. FIG. 6B7 also depicts the local extrema (minima, maxima, rising point of inflection, falling point of inflection), which are marked by circles, that are detected and recorded in accordance with the steps/operations of FIG. 6B6.

Exemplary Feature Correspondence Analysis

FIGS. 6B8(i), 6B8(ii), 6B9 and 6B10 illustrate exemplary operations for matching (e.g., identifying correspondence between) features from the set S1 of features from the first 2D image buffer with features from set S2 of features from the second 2D image buffer to build a list of corresponding feature pairs (the pair consisting of one feature from set S1 matched to one feature in set S2). As shown in the high level flow chart of FIGS. 6B8(i) and 6B8(ii), such operations begin in block 801 whereby, for each given feature in the first 2D image buffer, all features in the second 2D image buffer that potentially correspond to the given feature are identified. As indicated, potential correspondence between feature pairs is preferably detected when two features satisfy a set of constraints such as:

the features must be of the same type (minimum, maximum, rising point of inflection, falling point of inflection);

the row offset between features must have a predetermined sign (for example, greater than zero, or less than zero) and must be within a predetermined tolerance value; and/or the difference between characteristic values of the two features must be less than a maximum tolerance value.

In blocks 803 through 809, a loop is performed over the features in set S1 whereby the operations of blocks 805 and 807 are executed for a given feature in set S1. In block 805, it is determined if there is only one potential correspondence for the given feature in set S1. In other words, of the potential corresponding feature pairs identified in block 801, there is only one potential corresponding feature pair that includes the given feature in set S1.

If block 805 is evaluated as false (e.g., there is more than one potential correspondence for the given feature in set S1), the operation continues to block 809 to process the next feature in the loop.

However, if block 805 is evaluated as true (e.g., there is only one potential correspondence for the given feature in set S1), the operation continues to block 807 whereby the sole corresponding feature pair is added to a list of corresponding feature pairs (e.g., the potential assignment of correspondence is made permanent). The operation then continues block 809 to process the next feature in the loop.

Upon processing the last feature in set S1, the loop ends in block 809 and operation continues to block 811.

Blocks 811 and 813 is a loop that process features in set S1 with multiple potential assignments to thereby find the "best assignment" (e.g., the assignment that leads to "best correspondence" for such features as measured by a correspondence metric. An example of steps/operations that perform such "best correspondence" analysis of blocks 811 and 813 is set forth in the flow chart of FIG. 6B9.

In block 811, if there are no features in the first 2D image buffer that have multiple potential correspondences, the operation continues to step 815.

The loop of blocks 811 and 813 exit when there are no longer any features in set S1 with multiple assignments. The operation then return to block 803.

In block 815, the list of corresponding features is processed to identify one or more outlier assignments. An outlier assignment exists when the offset between corresponding features of the assignment exceeds a maximum threshold value. For example, the maximum threshold amount may be based upon a running row offset average as set forth in the exemplary steps/operations of FIG. 6B10.

In block 817, it is determined whether any outlier assignment was identified in block 815. If so, the operation continues to step 819 wherein the one or more outlier assignments identified in step 815 is removed from the list of corresponding features (e.g., the list of permanent assignments) and such assignment is prevented from being made in the future. The operation then returns to the loop of blocks 803 to 809 to redo the correspondence analysis as set forth above.

However, if in block 817, it is determined that no outlier assignment was identified in block 815, the correspondence analysis of FIGS. 6B8(i) and 6B8(ii) ends.

Referring now to FIG. 6B9, which illustrates exemplary steps/operations that perform the "best correspondence" analysis of block 813 of FIG. 6B8(i). Such analysis begins in block 851 by calculating the average row offset (average distance between row ids) between corresponding features in the list of corresponding feature pairs generated in block 807.

A two-part nested loop (outer loop/inner loop) is then performed. The outer loop is performed between blocks 851 and 865 over features with multiple assignments in the set S1 of features. The inner loop is performed between blocks 855 and 863 over potential correspondences for the given feature with multiple assignments (e.g., the current iteration of the outer loop).

In block 857, it is determined whether the difference between the row offset between features of the given potential correspondence (e.g., the potential correspondence for the current iteration of the inner loop) and the average row offset calculated in block 851 is less than the stored low offset value. If so, the operation continues to step 859 and 861; otherwise the operation continues to block 863 to process the next potential correspondence in the inner loop (if need be).

In block 859, the given potential correspondence (e.g., the potential correspondence for the current iteration of the inner loop) is identified as "closest" and in block 861, the stored low offset value is updated to the difference value in decision block 857 (e.g., the difference between the row offset between features of the given potential correspondence and the average row offset calculated in block 851). The operation then continues to block 863 to process the next potential correspondence in the inner loop (if need be).

Upon processing the last potential correspondence in block 863, the inner loop exits and proceeds to block 865 to process the next feature with multiple potential assignments in the outer loop (if need be).

Upon processing the last feature with multiple potential assignments, the outer loop exits in block 865 and the operation proceeds to block 867 wherein the best correspondence is equated to the "closest" potential correspondence as identified in block 859.

Referring now to FIG. 6B10, which illustrates exemplary steps/operations that perform the "outlier" identification of block 815 of FIG. 6B8(ii). Such operations begin by performing a loop in blocks 871 through 883 over feature pairs in the list of corresponding features (e.g., list of permanent assignments already made).

In block 873, a running average row offset (e.g., average distance between row ids for those corresponding feature pairs that have been processed) is calculated.

In block 875, it is determined whether the difference between the row offset between features of the given correspondence (e.g., the feature correspondence for the current iteration of the loop) and the running average row offset calculated in block 873 is greater than a threshold value and greater than a stored maximum value. If so, the operation continues to step 877 and 879; otherwise the operation continues to block 881 to process the next correspondence in the loop (if need be).

In block 877, the given correspondence (e.g., the correspondence for the current iteration of the loop) is identified as "current outlier assignment" and in block 879, the stored maximum value is updated to the difference value in decision block 875 (e.g., the difference between the row offset between features of the given correspondence and the running average row offset calculated in block 873). The operation then continues to block 881 to process the next correspondence in the loop (if need be).

Upon processing the last correspondence (e.g., last corresponding feature pair) in block 881, the loop exits and operation proceeds to block 883 wherein the "current outlier assignment" as identified in block 877 (if it exists) is equated to an outlier assignment; and the process ends.

FIGS. 6B11(i), 6B11(ii), 6B11(iii) and 6B11(iv) illustrate exemplary operations for matching (e.g., identifying correspondence between) features from the set S1 of features from the first 2D image buffer with features from set S2 of features from the second 2D image buffer to build a list of corresponding feature pairs (the pair consisting of one feature from set S1 matched to one feature in set S2). Such operations begin in block 890 whereby, for each given feature in the first 2D image buffer, all features in the second 2D image buffer that potentially correspond to the given feature are identified. As indicated, potential correspondence between two features of a feature pair is preferably detected only when the two features satisfy a set of constraints such as:

the features must be of the same type (minimum, maximum, rising point of inflection, falling point of inflection;

the row offset between features must have a predetermined sign (for example, greater than zero, or less than zero) and must be within a predetermined tolerance value; and/or the difference between characteristic values of the two features must be less than a maximum tolerance value.

Each potential matching feature pair is labeled a vertex $v_i$ (that identifies a feature $f_x$ in S1 and a feature $f_y$ in S2) and added to a list of vertices.

Two vertices $v_i$, $v_j$, in the list of vertices may be joined by an edge as illustrated in FIG. 6B11(iii). Preferably, an edge is defined between two vertices only when the two vertices satisfy a set of constraints such as: the type of the features for one vertex of the pair is different that the type of the features for the other vertex of the pair. In block 891, a cost function is defined for edges between vertex pairs in the list of vertices produced in block 890. The cost function for a given edge $C_{i,j}$ between two vertices $v_i$, $v_j$ represents a cost that provides some indication as to the likelihood that the two vertices of the edge are adjacent to one another. Preferably this cost function is based upon the spatial distance (e.g., row offset) between the features in S1 and S2 for the two vertices of the edge as well as other parameters that characterize the similarity (or dissimilarity) of the features in S1 and S1 for the two vertices of the edge. In addition, the cost function may include weights that are assigned to different parts of the cost function in order to adjust the relative "strength" assigned to the each part of the function in determining the cost for the edge. An exemplary cost function that includes such parameters can be defined as:

$$C_{i,j} = \sqrt{w_1 * (m_i - m_j)^2 + w_2 * (n_i - n_j)^2 + w_3 * (d_i - d_j)^2}$$

where $m_i$ is the row index for the feature in S1 for vertex $v_i$, $n_i$ is the row index for the feature in S2 for vertex $v_i$, $d_i$ is the absolute value of the difference between characteristic values for the rows $m_i$ and $n_i$, $m_j$ is the row index for the feature in S1 for vertex $v_j$, $n_j$ is the row index for the feature in S2 for vertex $v_j$, $d_j$ is the absolute value of the difference between characteristic values for the rows $m_j$ and $n_j$, and $w_1$, $w_2$ and $w_3$ are weights assigned to the three different parts of the cost function (for example, by setting $w_1=w_2=w_3=1.0$, the different parts are assigned equal strength, alternatively, such weights can be modified to adjust the relative "strength" of the three different parts).

In block 892, a square table of the results of the cost function for edges between vertex pairs is built. An exemplary table is shown below:

| | 0 | 1 | 2 | 3 | 4 | — | Last Vertex in List (L) |
|---|---|---|---|---|---|---|---|
| 1 | | 0 | $C_{1,2}$ | $C_{1,3}$ | $C_{1,4}$ | — | $C_{1,L}$ |
| 2 | | 0 | 0 | $C_{2,3}$ | $C_{2,4}$ | — | $C_{2,L}$ |
| 3 | | 0 | 0 | 0 | $C_{3,4}$ | — | $C_{3,L}$ |
| 4 | | 0 | 0 | 0 | 0 | — | $C_{4,L}$ |
| . | | 0 | 0 | 0 | 0 | 0 | . |
| . | | | | | | | . |
| . | | | | | | | . |
| Last Vertex in List (L) | | 0 | 0 | 0 | 0 | 0 | 0 |

Note that in the event that an edge is not defined between a pair of vertices, the cost function between such vertices is labeled "0". Note that in the exemplary table above, the elements that are on and below the diagonal that runs from the top left to bottom right corner of the table are labeled "0" because backward matching of features is physically nonsensical in this illustrative case.

In blocks 893 through 898, the operations iterate over paths that traverse the vertices/edges in the list of vertices as defined above in order to find the shortest path (e.g., the path with minimal accumulated cost) over the vertices/edges in the list of vertices. Such operations are based on a well-known algorithm from graph theory—Dijkstra's shortest path algorithm as described in detail in Gross and Yellen et al. "Graph Theory at its Applications, CRC Press, 1998, pgs. 147–150, herein incorporated by reference in its entirety. FIG. 6B11(iv) illustrates two different paths that traverse different sets of vertices/edges in the list of vertices.

During the iterative processing in blocks 893 through 898, a path (labeled current path) that traverses a set of vertices/edges in the list of vertices is identified in block 894.

In block 895, the results of the cost function (as generated in block 892) over the edges of the current path are accumulated (e.g., summed).

In block 896, it is determined whether the accumulated costs produced in block 895 is less than the stored minimal accumulated cost value. If so, the operation continues to step 897; otherwise the operation continues to block 898 to process the next path through the vertices/edges in the list of vertices (if need be).

In block 897, the stored minimal accumulated cost is updated to the accumulated costs for the current path and the shortest path identifier is updated to identify the current path. The operation then continues to block 898 to process the next path through the vertices/edges in the list of vertices (if need be).

In block 898, upon processing the last path through the vertices/edges in the list of vertices, the iteration of blocks 893 through 898 ends and the operation proceeds to block 899; otherwise the operations return to block 893 to process the next path through the vertices/edges in the list of vertices (if need be).

In block 899, the vertices (and corresponding feature pairs) that lie on the shortest path (e.g., the path with minimal accumulated cost as identified in block 897) are identified, and each identified feature pair (e.g., the feature pair corresponding to each vertex on the shortest path) is added to the list of corresponding features, and the feature correspondence analysis of FIGS. 6B11(i) and 6B11(ii) ends.

Exemplary Row/Subrow Velocity Smoothing Operations

FIG. 6B12 is a flow chart illustrating exemplary operations for smoothing the image velocity values over the rows (or subrow intervals) of a given 2D image buffer. The smoothing operations proceed over the image velocity values assigned to the rows (or subrow intervals) of the given 2D image buffer (for example, utilizing interpolation operations) and stored in an array $S_{fit}$. Each image velocity value is smoothed utilizing summation and counting operations over a local smoothing window (of size $w_s$) to produce smoothed image velocity values that are stored in array $S_{val}$.

Exemplary Image Transformation Operations to Build Reconstructed Image with Constant Aspect Ratio FIGS. 7A–7D2 illustrate exemplary image processing operations that are preferably carried out by the PLILIM-based imaging device of FIG. 4A as part of its Aspect Ratio Compensation routine in accordance with the present invention. Such image processing operations perform image transformation operations (such as copy, compression and expansion) sequentially over portions of the selected composite 2-D image (labeled "D") based upon the relative image velocity metrics for the rows (or sub-row intervals) to build up corresponding portions of the reconstructed image (labeled "R"). The resulting reconstructed image R, which has substantially constant aspect ratio, is optionally sharpened and the resultant image is stored in memory for subsequent processing (e.g., output data for display, 1D and/or 2D bar code sensing on data derived therefore, and/or OCR on data derived there from).

The relative image velocity metric for a given row (or sub-row interval), which is derived from distance between corresponding features as described above with respect to block 511 (and blocks 511' and 511"), characterizes the relation of the measured relative image velocity for the row (or sub-row interval) to the perfect relative image velocity for the row (or sub-row interval). The measured relative image velocity for a given row (or sub-row interval) characterizes the relative velocity of the scanner housing with respect to the target object while capturing the given row (or sub-row interval). The perfect relative image velocity for a given row (sub-interval) characterizes the relative velocity of the scanner housing with respect to the target object that would result in a constant aspect ratio. In the case where the pixel dimension orthogonal to the primary scan direction is equal to the pixel dimension p along the primary scan direction, the prefect relative image velocity for a given row (sub-interval) characterizes the relative velocity of the scanner housing with respect to the target object that would result in a 1:1 aspect ratio.

Thus, a relative image velocity metric which is greater than one is an indication that the imaging device was moving too fast with respect to the target object. In this first case, the image of the given row (sub-row interval) is compressed (in other words, the aspect ratio of the image row has decreased) and it must be expanded to form its contribution to the Reconstructed Image Array R. On the other hand, a relative image velocity metric which is less than one is an indication that the imaging device was moving too slow with respect to the target object. In this second case, the image of the given row (sub-row interval) is stretched out (in other words, the aspect ratio of the image row has increased) and it must be combined with other distorted rows to form its contribution to the Reconstructed Image Array R. Finally, a relative image velocity metric which is equal to one is an indication that the imaging device was moving at the correct velocity with respect to the target object. In this third case, the image of the given row (sub-row interval) is copied (without combining other distorted row portions) to form its contribution to the Reconstructed Image Array R.

Note that the images D and R are two-dimensional arrays where the first dimension is the rows and the second dimension is the columns. Thus, D(y, x) is the pixel at row y and column x of D. As is conventional, a colon (:) may be used in place of an image dimension to indicate all of the pixels of the array along that dimension. For instance D(y, :) is the entire y-th row of D.

An index d is used to identify (i.e., point to) a specific row (and fractional part within a row) in D whose contribution is currently being added to the Reconstructed Image Array R. Note that the index d may be implemented with a real number as described below. Alternatively, the index d can be implemented with multiple integer numbers (one integer value representing a given row and another integer value representing the fractional part within a given row).

An index r is used to identify (i.e., point to) a row in the Reconstructed Image Array R. that is currently being added to by contributions from D.

An index n is used to identify (i.e., point to) the fractional part (e.g., fractional remainder) of the current row r that has yet to be added to by contributions from D. Note that the index n may be implemented with a real number as described below. Alternatively, the index n can be implemented with an integer number representing the fractional part within the row.

As shown in FIG. 7C, an index s identifies (i.e., points to) to an entry in an array S of relative image velocity metrics. Each entry in the array S corresponds to an entry in array $S_{row}$. Each entry in array $S_{row}$ identifies (i.e., points to) a given row (and subrow interval within the given row) that is associated with the relative image velocity metric stored in the corresponding entry in array S. Note that the pointers stored in the entries of array $S_{row}$ may be implemented with a real number as described below. Alternatively, such pointers can be implemented with multiple integer numbers (one integer value representing a given row and another integer value representing the subrow interval within the given row). As described above, the relative image velocity metric for a given row (or sub-row interval) characterizes the relation of measured relative image velocity for the row (or sub-row interval) to the perfect relative image velocity for the row (or sub-row interval).

Generally, the operations move along the entries (image velocity metrics) of array S (and corresponding rows/sub-row intervals) to combine as few or as many of such rows/sub-row intervals as necessary (depending on the calculated relative image velocity metrics stored in array S. Note that is it is perfectly acceptable for the index d to be fractional. In this case, the distorted image row to which d refers is floor(d), where the floor operation rounds its argument down to the next lowest integer. A fractional d simply means that as the operations work their way through the distorted image array D, the contribution of an entire row may have yet been added to the reconstructed image array R. For instance, d=5.25 indicates that the contribution of ¼ of the fifth distorted row in D has been added to the reconstructed image array R. In other words, ¾ of the fifth distorted row in D has not been used to build the reconstructed image array R.

In blocks 701–705, the operations begin by initializing the data structures used therein. More specifically, in block 701, the index d is initialized to 1 (e.g., to point to the first row/fractional part in D). In block 703, the index r is initialized to 1 (e.g., to point to the first row in R), the index n is initialized to 1 (e.g., to indicate that the entire first row remains to be added to by contributions from D), and the first row of the reconstructed image array R is initialized (e.g., zeroed). And in block 705, the index s is initialized to 1 (to point to the first entry in the array S).

In block 707, the size (f) of the contribution of the given row/fractional part identified by d is calculated based upon the relative image velocity metric for the given row/fraction part (e.g., S(s)) and the size of the given row/fractional part (e.g., $[S_{row}(s+1)-d]$). For example, f may be calculated by multiplying $[S_{row}(s+1)-d]$ times S(s) as shown. Note that the size f defines whether the given row/fractional part is compressed, expanded or copied when added to the reconstructed image R in blocks 711 and 719 below.

In block 709, it is determined whether the size f of the contribution will fit into the fractional remainder n of the current row r of the reconstructed image R (e.g. is f<n). If so, the operation continues to block 711; otherwise the operation jumps to block 719 described below.

In block 711, the total contribution (of sized) of the row/fractional part identified by d is added (e.g., composited) into the fractional remainder n of the current row r of the reconstructed image R (e.g., R(r,:)=[R(r,:)+f× D(floor(d),:)]).

In block 713, the index s is updated to point to the next entry in array S (e.g., s=s+1).

In block 715, the index d is updated to point to the next row/fractional part in the distorted image D (e.g., d=$S_{row}$(s)).

In block 717, the index n is updated to point to the fractional remainder of r beyond the point that was added by the contribution (of size f) in block 711 (e.g., n=n−f) and the operation continues to block 727 described below.

In block 719, a partial contribution (size<f) of the row/fractional part identified by d is added (e.g., composited) into the fractional remainder n of the current row r of the reconstructed image R. The size of this partial contribution is adjusted to fit into the fractional remainder n (e.g., R(r,:)=[R(r,:)+n×D(floor(d),:)]).

In block 721, the index r is updated to point to the next row in the reconstructed image array R (e.g., r=r+1), and the next row is initialized/cleared (e.g., R(r,:)=0).

In block 723, the index d is updated to point to the row/fractional part in the distorted image D just beyond the point that was used to form the partial contribution in block 719 (e.g., d=d+[(n/f)×($S_{row}$(s+1)−d)].

In block 725, the index n for the reconstructed image row is reset (e.g., n=1) to identify that the full row r remains to be added to by contributions from D, and the operation continues to block 727.

In block 727, it is determined whether the last entry in array S (and the last row/fractional part in D) has been processed. If not, the operation returns to block 707 to continue processing the remaining entries in array S (and the remaining row/fractional parts in D); otherwise, the operation continues to block 729.

In block 729, the Reconstructed Image Array R is output and saved in the Reconstructed Image Buffer 411C for subsequent processing and the reconstructed image formation operations end. Such subsequent processing operations may involve outputting the image data stored therein for display on a display device, performing ID and/or 2D bar code sensing operations (e.g., the Bar Code Detection Routine) on data derived therefore, and/or performing OCR operations on data derived therefore (which may be performed on an external device, such as he host system operably coupled to the image device via a communication link as described above with respect to FIG. 4A).

FIGS. 7D1 and 7D2 illustrate exemplary operations for sharpening an image in order to increase the visibility of image structures with high spatial frequencies such as details, edges, fine textures. To sharpen an image, a mathematical operation is performed on the image on a pixelby-pixel basis. The result of this operation is a second image of the same size. This second image is then subtracted from the original image to yield a third, sharpened image. The sharpening operation involves the application of a stencil, or kernel, to the reconstructed image. A stencil may be thought of as a small square image window that can be moved around on top of the reconstructed image as an aid to calculation. The value of each stencil "pixel" is actually a weight that is used to determine the relative contribution of the reconstructed image pixel underneath it to the intermediate second image.

To calculate the sharpened image pixel value at coordinates (y,x), the stencil is centered on (y,x) of the reconstructed image. The value of the second image pixel at those coordinates then equals the sum of the values of the pixels of the reconstructed image that are covered by the stencil, with each reconstructed image pixel value being multiplied by the stencil value that covers it. The value of the sharpened image pixel at those coordinates is then given by the reconstructed image pixel value minus some multiple of the second image pixel value. This procedure may be written as:

$$R_{sharp}(y, x) = R(y, x) - \frac{k}{\varepsilon^2} \sum_{i=-floor(\frac{n}{2})}^{floor(\frac{n}{2})} \sum_{j=-floor(\frac{n}{2})}^{floor(\frac{n}{2})} L(j+2, i+2)R(y+j, x+i) \quad (1)$$

where $\varepsilon$ is the pixel spacing, which is equal to 1 if the pixels are adjacent (as in this application);

k is a coefficient that controls the strength of the sharpening effect;

L is the sharpening stencil and n is the dimension of the sharpening stencil (that is, L is an n×n array; if n=3 then i and j run through the values −1, 0 and 1); and floor( ) is a function that rounds the argument down to the next lowest integer; the floor of an integer returns the same integer.

This equation may also be written with a simpler appearance as $$R_{sharp}(y, x) = R(y, x) - \frac{k}{\varepsilon^2} \sum_i \sum_j M(j+2, i+2)R(y+j, x+i) \quad (2)$$

if the ranges of the indices i and j are understood or explained separately.

A good choice of sharpening stencil is the following discrete approximation of the Laplacian function:

$$L = \frac{1}{6}\begin{bmatrix} 1 & 4 & 1 \\ 4 & -20 & 4 \\ 1 & 4 & 1 \end{bmatrix} \quad (3)$$

As an example, consider the pixel values

| 8 | 7 | 2 |
| 1 | 6 | 4 |
| 9 | 5 | 3 | where the coordinate indices y and x with respect to the center pixel vary as follows:

| y − 1, x − 1 | y − 1, x | y − 1, x + 1 |
| y, x − 1 | y, x | y, x + 1 |
| y + 1, x − 1 | y + 1, x | y + 1, x + 1 |

Then if the center pixel has coordinates (2,2), the value of the sharpened image pixel at the same coordinates is calculated as follows using $\varepsilon = k = 1$ and the stencil L:

$$R_{sharp}(2, 2) = R(2, 2) - (1/6)[-R(1, 1) - 4R(1, 2) - R(1, 3) -$$
$$4R(2, 1) + 20R(2, 2) - 4R(2, 3) - R(3, 1) -$$
$$4R(3, 2) - R(3, 3)]$$
$$R_{sharp}(2, 2) = 6 - (1/6)[-8 - 4(7) - 2 - 4(1) + 20(6) - 4(4) -$$
$$9 - 4(5) - 3]$$
$$R_{sharp}(2, 2) = 1$$

The result of this pixel-by-pixel sharpening process of FIG. 7D is a sharpened image which has increased visibility of image structures with high spatial frequencies (such as details, edges, fine textures) that are contained in the original image.

Speckle Reduction

As described above, a coherent laser illumination source (e.g., VLD) may be used to illuminate the FOVs of the imaging arrays of the PLILIM-based imaging modules/devices/engines of the present invention described herein. Such coherent laser illumination introduces "speckle" (i.e., substrate or paper) noise that is modulated onto the coherent laser illumination beam during reflection/scattering. If not reduced, such speckle noise would ultimately be detected by the imaging arrays and reduce the signal-to-noise (SNR) ratio in the images derived therefrom, thereby introducing unwanted errors in the image-based bar code reading operations (and/or OCR operations or other imaging operations) performed on such images.

In accordance with the present invention, any one of (or any combination of) a number of techniques and apparatus can be utilized to effectively reduce the spatial and/or temporal coherence of planar laser illumination utilized in the PLILIM-based imaging modules/devices/engines described herein in a manner that produces numerous different time-varying speckle patterns, which are temporally averaged (and possibly spatially averaged) over the photo-integration time period of the imaging array(s) therein to reduce the RMS power of the speckle noise observed (i.e., detected) at such imaging array(s).

Spatial coherence of light is a measure of the correlation (in frequency and phase) of light from two different regions of the same source that arrives at the same target point. The farther apart two regions of the source can be and emit light that is equal in frequency and phase when sampled at a single point that is the same distance from each region of the source, the better spatial coherence of the source.

Young's double slit interference experiment, which is pictorially illustrated in FIG. 8A, can be used to understand spatial coherence. In the experiment, a coherent source is placed behind a plate with two slits $P_1$ and $P_2$ at a distance of $r_1'$ and $r_2'$, respectively. At a point Q within an observation plane (which is normal to the perpendicular bisector of the two slits $P_1$ and $P_2$), an interference fringe is expected at Q under two conditions:

a) the time delay difference is less than the coherence time of the source; in other words, $((r_2+r_2')-(r_1+r_1'))/c < \tau_c$; and b) the visibility of the fringe depends on the degree of correlation between light waves at the two slits; here the source size is important to the degree of correlation at the two slits.

To understand the relation between source size and the degree of correlation, one may consider two narrowband point sources $S_1$ and $S_2$ as shown in FIG. 8B. In the observation plane, $S_1$ produces a sinusoidal fringe, and $S_2$ produces a sinusoidal fringe that is shifted spacially from the $S_1$ fringe. The fringe period depends on the separation between $P_1$ and $P_2$, while the shift depends on the separation between $S_1$ and $S_2$ and the degree correlation (in amplitude and phase) of the radiation produced by the two sources. If the spatial coherence of the two point sources is high, the shift will be narrow in magnitude. Yet, if the spatial coherence of the two point sources is low, the shift will grow in magnitude.

Temporal coherence of light is a measure of correlation of the time periods between matching phases in a wavefront originating from a source along the traveling wavefront. The smaller the variations in such time periods along the traveling wavefront, the better temporal coherence of the source.

Temporal coherence and possibly spatial coherence of light is related to chromaticity of light, which refers to how many different wavelengths are present in a given light source. A light source with monochromaticity emits light having a single wavelength. A light source with polychromaticity emits light having multiple wavelengths. An ideal monochromatic light source produces light with complete temporal coherence (the time periods between matching phases along the traveling wavefront are constant) and complete spatial coherence (light from two different regions of the source arrives at the same target point with matching frequency and phase). A polychromatic light source produces light with reduced temporal coherence (there are variations in the time periods between matching phases along the traveling wavefront) and possibly reduced spatial coherence (light from two different regions of the source arrives at the same target point with variations in frequency and phase). Lasers (such as VLDs) tend to be relatively monochromatic and thus exhibit a high degree of spatial and temporal coherence. FIG. 9A is a pictorial representation of laser source with high degree of monochromaticity/low degree of polychromaticity (e.g., smaller variations ($\Delta\omega$) in the frequency (or wavelength) of the waves that make up the beam), and thus has a high degree of spatial and temporal coherence. FIG. 9B is a pictorial representation of laser source with a lower degree of monochromaticity/higher degree of polychromaticity (e.g., larger variations ($\Delta\omega$)) in the frequency (or wavelength) of the waves that make up the beam), and thus has reduced spatial and temporal coherence as compared to the laser source of FIG. 9A.

If one considers the temporal coherence and spatial coherence of light produced by two or more identical light sources (or a source modeled as two or more identical light sources), such coherence (which commonly refers to both temporal and spatial coherence) is related to the intensity profile of the composite light beam produced by the light sources. This relationship is conveniently explained if one considers the radiance (e.g., power per unit area per unit solid angle) of the composite light beam. If the light produced by two or more light sources is highly coherent, the radiance of the light sources is summed (equivalently, the power increases by a factor of N and the solid angle divergence decreases by a factor of N, where N is the number of sources). In contrast, if the light produced by two or more light sources is incoherent, the radiance of the individual light sources cannot exceed the radiance of the individual light sources (equivalently, the intensity of the beam increases by a factor of N, but the divergence does not decrease, which results in the same radiance). Thus, an increase in the coherence in the light produced by the two or more light sources causes lower divergence and increase in radiance in the composite beam produced therefrom, while a reduction in the coherence in the light produced by the two or more light sources causes higher divergence and decrease in radiance in the composite beam produced therefrom.

Any technique that reduces the spatial coherence and/or reduces the temporal coherence of the planar laser illumination (or the returning light) in a manner that produces numerous different time-varying speckle patterns (which are temporally averaged (and possibly spatially averaged) over the photo-integration time period of the imaging array(s) therein to reduce the RMS power of speckle noise and improve the signal-to-noise (SNR) ratio of the images captured therein) may be carried out in the imaging modules/device/engines described herein. Exemplary speckle-reduction techniques include the following: i) using a multiplicity of real laser sources (e.g., multiplicity of VLD sources) and beam shaping optics (such as cylindrical lens) to produce multiple planar laser beams that are optically combined to form a composite planar laser beam with reduced spatial coherence; ii) reducing the spatial coherence of the planar laser illumination by applying spatial phase modulation techniques (e.g., moving/rotating lens elements, acousto-optical Bragg-type cells, deformable mirror structures, LCD-type spatial phase modulators, or other spatial phase modulators) to the laser illumination during transmission towards the target object; iii) reducing the spatial coherence of the planar laser illumination by applying spatial intensity modulation techniques (e.g., moving/rotating spatial intensity modulating filtering elements (such as an array or disk), an LCD-type spatial intensity modulator, or other spatial intensity modulators) to the laser illumination during transmission towards the target object; iv) reducing the temporal coherence of the planar laser illumination by applying temporal intensity modulation techniques (e.g., employing mode-locked laser diodes as the laser illumination source, employing electro-optical temporal intensity modulators disposed along the optical path of the planar laser illumination; internal and external laser beam amplitude modulation (AM) devices disposed along the optical path of the planar laser illumination, internal and external laser beam frequency modulation (FM) devices disposed along the optical path of the planar laser illumination, and other temporal intensity modulators) to the laser illumination during transmission towards the target object; v) reducing the temporal coherence of the planar laser illumination by applying temporal phase modulation techniques (e.g., an optically resonant cavity (i.e., etalon device) affixed to the external portion of the laser illumination source (i.e., VLD(s)), a phase-only LCD (PO-LCD) temporal phase modulation panel, fiber optical arrays, and other temporal phase modulator) to the laser illumination during transmission towards the target object; v) reducing the temporal coherence of the planar laser illumination by applying temporal frequency modulation techniques (e.g., junction-current control that periodically induces the laser illumination source (e.g., VLD(s)) into a mode of frequency hopping, thermal control that periodically induces the laser illumination source (e.g., VLD(s)) into a mode of frequency hopping, and multi-mode laser illumination sources (e.g., VLD(s)) that are operated just above their lasing threshold, and other temporal frequency modulators) to the laser illumination during transmission towards the target object; vi) reducing the spatial coherence of the returning light produced by reflection/scattering of the planar laser illumination on the target object by apply spatial intensity modulation techniques (e.g. electro-optical dynamic spatial filters disposed along the optical axis of the system before the linear imaging array(s), moving/rotating spatial filters disposed along the optical axis of the system before the linear imaging array(s), and other spatial intensity modulators) to the returning light; vii) reducing the temporal coherence of the returning light produced by reflection/scattering of the planar laser illumination on the target object by apply temporal intensity modulation techniques (e.g. electro-optical (LCD-type, ferro-electric-type) shutters, pupils, and stops disposed along the optical axis of the system before the linear imaging array(s), and other temporal intensity modulators) to the returning light; viii) by producing a series of consecutively captured digital images of an object (over a series of photo-integration time periods of the linear imaging array(s)), wherein the series of digital images include time-varying speckle noise patterns (for example, produced in a hand-held imager by natural oscillations of the hand relative to the system, or produced by forced motion of the system relative to the object), and additively combining and averaging a small window of pixel data (for example 3×3 pixel window) in the series of digital images so as to produce a reconstructed digital image having reduced speckle noise (i.e., the RMS power of speckle noise is reduced); ix) producing numerous spatially-varying speckle noise patterns over a given integration time period of the linear imaging array(s)) (for example, produced in a hand-held imager by natural oscillations of the hand relative to the system, or produced by forced motion of the illumination/returning light/imaging array(s) relative to the object), and detecting (preferably with elongated image detecting elements having a large (>>1) height-to-width ratio and image formation optics having the lowest possible F/#) the contribution of such spatially-varying speckle patterns over the spatial area of each given image detecting element (which combines and averages this contribution), to thereby produce linear images having reduced speckle noise (i.e., the RMS power of speckle noise is reduced). Details of such exemplary speckle-reduction techniques and apparatus are described in Application No. PCT/US01/44011, incorporated by reference above in its entirety.

In the event that a coherent laser illumination source (e.g., VLD) is used to illuminate the FOVs of the linear imaging arrays of the illustrative PLILIM-based imaging module/device of FIG. 2A, such module/device preferably employs the first speckle-reduction technique noted above (labeled i), whereby a multiplicity of real laser sources (e.g., multiplicity of VLD sources) and beam shaping optics (such as cylindrical lens) produce multiple planar laser beams that are optically combined to form a composite planar laser beam with reduced spatial coherence. More specifically, the PLIAs and the PLISs within each PLIA are preferably spatially arranged and mounted on an optical bench in a manner that optically combines and projects the plurality of incoherent PLIB components produced there from in a coplanar relationship with the plurality of FOVs of the linear imaging arrays $LA_A$ and $LA_B$ such that multiple spatially-incoherent and temporally-incoherent PLIB components illuminate the same points on the surface of the target object. By virtue of such operations, the linear image detection arrays $LA_A$ and $LA_B$ detect spatially-varying and time-varying speckle-noise patterns produced by the spatially-incoherent and temporally-incoherent PLIB components reflected/scattered off the illuminated object. Such spatially-varying and time-varying speckle-noise patterns are time-averaged and spatially-averaged at the linear image arrays $LA_A$ and $LA_B$ during the photo-integration time period of such arrays so as to reduce the RMS power of speckle-pattern noise observable at the linear image imaging arrays $LA_A$ and $LA_B$. In this configuration, speckle-pattern noise is reduced by employing optically-combined planar laser illumination beams (PLIB) components produced from a multiplicity of spatially-incoherent and temporally-incoherent laser diode sources. The greater the number of spatially-incoherent/temporally-incoherent laser diode sources that are optically combined and projected onto points on the objects being illuminated, the greater the reduction in RMS power of observed speckle-pattern noise within PLILIM-based imaging module/device.

Moreover, in the event that a coherent laser illumination source (e.g., VLD) is used to illuminate the FOVs of the linear imaging arrays of the illustrative PLILIM-based imaging module/device of FIG. 2A, such module/device preferably employs the ninth speckle-reduction technique noted above (labeled ix), whereby numerous spatially-varying speckle noise patterns are produced over a given integration time period of the linear imaging array(s), and the contribution of such spatially-varying speckle patterns is detected over the spatial area of each given image detecting element (which combines and averages this contribution), to thereby produce linear images having reduced speckle noise. More specifically, numerous spatially-varying speckle noise patterns are produced over a given integration time period of the linear imaging arrays $LA_A$ and $LA_B$ (for example, produced in a hand-held imaging device by natural oscillations of the hand relative to the device, or produced by forced motion of the linear imaging arrays $LA_A$ and $LA_B$/the planar laser illumination/and/or the reflected light relative to the target object). The image detection elements of the linear imaging arrays $LA_A$ and $LA_B$ preferably are characterized by a large height-to-width aspect ratio (H/W>>1), referred to herein as "vertically-elongated pixels", as illustrated in FIG. 10. In addition, the image formation optics of the PLILIM-based imaging module/device/engine preferably have the lowest possible F/# that does not go so far as to increase aberrations by blurring the optical signal received thereby, as is described in detail in Application No. PCT/US01/44011, commonly assigned to the assignee of the present invention and incorporated by reference in its entirety above. These features reduce the peak speckle noise percentage (as well as the RMS value of the speckle noise) detected by the image detection elements of the PLILIM-based system.

In addition, in the event that a coherent laser illumination source (e.g., VLD) is used to illuminate the FOVs of the linear imaging arrays of the illustrative PLILIM-based imaging module/device of FIG. 2A, the illumination control circuitry of the PLILIM-based imaging device preferably operates to provide time-varying current to the laser illumination source(s) (e.g., VLD(s)) over each integration time period of the linear image array(s) of the device in a manner that results in the generation of more higher order spectral components/a higher degree of polychromatic light (e.g., reduced coherence) in the laser illumination produced therefrom, thereby reducing speckle-noise observed in the linear imaging array(s) of the PLILIM-based imaging device. Generally, changes in supply current (and the corresponding output power level) of a laser illumination source (e.g., VLD) varies the spectral characteristics produced by the laser illumination source (e.g., VLD). FIG. 11A illustrates the relationship of changes in supply current I/output power level Po to the spectral characteristics of light produced by an exemplary VLD (the SLD1133VL VLD readily available from Sony Semiconductor of San Jose, Calif.) at a specific operating temperature of 25 degrees C.

Note that spectral characteristics, including the amount of high order spectral components (e.g., those wavelengths that lie outside the narrow spike that represents the characteristic wavelength of the VLD at the given current level), of light produced by the exemplary VLD vary with respect to changes in supply current/output power level. In accordance with the present invention, the current levels supplied to the laser illumination source(s) (e.g., VLD(s)) of the device are varied over the integration time period of the linear image array(s) of the device in a manner that results in the generation of high order spectral components/higher degree of polychromatjc light (e.g., reduced coherence) in the laser illumination produced therefrom, which reduces speckle-noise observed in the linear imaging array(s) of the PLILIM-based imaging device.

The current waveforms supplied by the laser control circuitry to the laser illumination source(s) that produce such high order spectral components/higher degree of polychromatic light (e.g., reduced coherence) can be quite diverse in character. An example of current control waveforms and the optical power produced by the given VLD in response thereto is shown in FIGS. 11B and 11C, respectively.

Note that in the waveforms of FIGS. 11B and 11C, the VLD is operated at two different optical power levels P1 and P2 over time periods t1 and t2, respectively, within the integration time period $t_{exposure}$ of the linear imaging array(s) of the device. As described above, the optical power levels P1 and P2 have different spectral distributions.

Also note that it is preferable that the number and duration of time periods t1 and t2 is controlled such that: i) energy produced by the VLD over the t1 time periods is substantially equal to the energy produced by the VLD over the t2 time periods (in order to most effectively cancel the varying speckle noise patterns produced at the different optical power levels), and 2) the total energy produced by the VLD over the integration time period $t_{exposure}$ does not exceed a maximum value (typically chosen to avoid saturation of the linear imaging array(s) of the device).

For example, consider an exemplary design wherein the current levels supplied to six VLDs (three in $PLIA_1$ and three in $PLIA_2$) is controlled such that each VLD is operated at two different optical power levels P1 and P2 over time periods t1 and t2, respectively, within the integration time period $t_{exposure}$ of the linear imaging arrays of the device. In such a design, the integration time period $t_{exposure}$ may be on the order of 1000 μs, the optical power levels P1 and P2 may be on the order of 0.5 mW and 0.25 mW, respectively, and the time periods t1 and t2 may be on the order of 83 μs and 167 μs, respectively. Thus, there are four (4) t1/t2 time periods during each integration time period $t_{exposure}$ of the linear imaging arrays the device.

FIG. 11D is a functional block diagram of an illustrative embodiment of laser illumination control circuitry that operates in accordance with the current control waveforms described above with respect to FIGS. 11B and 11C. In this illustrative embodiment, a voltage controlled current source, which is preferably realized by a transistor Q1, bias resistor R, and an op-amp whose output is operably coupled to the base of transistor Q1 and whose inputs are coupled to a feedback path and to ground via a pull-down FET J1 transistor as shown, is selectively enabled/disabled in response to the logic level of the Enable Signal (which is preferably supplied to the gate of the pull-down FET transistor J1). More specifically, the low (L) logic level of the Enable Signal disables the voltage controlled current source by turning ON the pull-down FET transistor J1, which pulls the positive (+) input of the op-amp to ground and turns the transistor Q1 off such that no current is supplied to the laser diode. In contrast, a high (H) logic level of the Enable Signal enables the voltage controlled current source by turning OFF the pull-down FET transistor J1, which isolates the positive (+) input of the op-amp from ground to allow the voltage levels supplied via the feedback path to control the voltage controlled current source.

The feedback path (including the monitor photodiode of the VLD module, the resistance network $R_{P1}$, $R_{P2}$ and switching transistor J2, and difference amplifier) supplies a control signal to the voltage controlled current source (e.g., to the+input of the op-amp), whereby the voltage level of the control signal maintains different yet constant power levels of the laser diode during the t1 time periods and t2 time periods within the integration time period $t_{exposure}$ of the linear image array(s) of the device. More specifically, the difference between a feedback voltage (e.g., the voltage drop across $R_{P1}$ during the t1 intervals wherein the Pulse Signal has a low (L) logic level and the switching transistor J2 is turned OFF, or the voltage drop across $R_{P1}//R_{P2}$ during the t2 intervals wherein the Pulse Signal has a high (H) logic level and the switching transistor J2 is turned ON) and reference voltage is amplified by a difference amplifier, whose output voltage level signal is supplied to the input node of the voltage controlled current source. The values of $R_{P1}$, $R_{P2}$ and the reference voltage are selected by experimentation (e.g. select-by-test) such that the output voltage levels produced by the difference amplifier and the corresponding current levels produced by the current source operate the laser diode at the predetermined different yet constant power levels (e.g., power level P1 during the t1 time intervals when the Pulse Signal has a low (L) logic level, and power level P2 during the t2 time intervals when the Pulse Signal has a high (H) logic level).

Note the despeckling techniques/mechanisms described herein are well suited for laser-based imaging, including any of the PLIIM-based devices/systems utilizing a linear imaging array or an area imaging array as described in Application No. PCT/US01/44011, incorporated by reference above in its entirety.

Hand-Supportable Planar Light Illumination and Linear Imaging (PLILIM) Device in Accordance with the Present Invention An illustrative embodiment of a hand-supportable PLILIM-based imaging device in accordance with the present invention is now described. In this illustrative embodiment, in the event that coherent laser light is used to illuminate the FOVs of the linear imaging arrays of the PLILIM-based imaging device, any one (or combination) of the despeckling mechanisms described above that reduce speckle-pattern noise may be embodied therein. In addition, the PLILIM-based imaging device employs image processing circuitry that performs Aspect Ratio Compensation as described herein—which derives a set of relative image velocity metrics related to a composite 2-D image and transforms the composite 2-D image to build a reconstructed image with substantially constant aspect ratio, which is stored in memory for subsequent processing (e.g., output data for display, 1D and/or 2D bar code sensing on data derived therefore, and/or OCR on data derived there from).

As shown in FIG. 12A, the PLILIM-based imaging device 1200 includes an image capture engine 1202 mounted on an optical-bench/multi-layer PC board 1214 within a hand-holdable housing 1201. The image capture engine 1202 includes multiple linear (i.e., 1-D) image detection arrays (e.g., two shown as 1206-A and 1206-B) and image formation optics 1218 disposed within a modular housing 1213.

The image formation optics 1218 collect light that is reflected from the illuminated object along the corresponding field of views (FOVs) (e.g., FOV-A and FOV-B), and pass such collected light to the linear image detection arrays 1206A and for image capture. The substantially planar field of views (e.g., FOV-A and FOV-B) are displaced (offset) from one another along the direction of intended motion of the target object relative to the system housing. A pair of PLIAs 1215-1 and 1215-2 (each comprising multiple light sources, e.g., VLDs or LEDs as described above) are mounted on the optical bench 1214 on opposite sides of the image capture engine 1202, for producing the composite PLIB that illuminates the field of views of the linear image detection arrays (e.g., FOV-A and FOV-B). As described above, the composite PLIB spatially overlaps and preferably is substantially coextensive (i.e. coplanar) with the field of views of the linear image detection arrays (e.g., FOV-A and FOV-B) along a substantial portion of the range of working distances of the device, while images of the illuminated target object are formed on and detected by the plurality of linear image detection arrays. The linear image detection arrays may be CCD-type linear imaging arrays, for example, the model ILX554B linear CCD image array with 2048 imaging elements, available from Sony Electronics. Alternatively, the linear imaging arrays may be CMOS-type linear image devices.

The image formation optics 1218 may provide a fixed focal length with constant angular field of view (FOV). In this configuration, the device 1200 can view more of the target object's surface as the target object is moved further away from the device. A major disadvantage of this configuration is that the resolution of the image that is acquired by the linear detection arrays, expressed in terms of pixels or dots per inch (dpi), varies as a function of the distance from the target object to the image formation optics. However, a fixed focal length imaging lens assembly has advantages: it is easier and less expensive to design and manufacture, it does not require moving parts (thus lending itself to a more rugged design that is suitable for many POS applications where users are prone to drop and mishandle the system).

Alternatively, the image formation optics 1218 may provide a variable focus fixed focal length with constant angular field of view (FOV). In this configuration, the image formation optics 1218 can adjust its image distance to compensate for a change in the target's object distance, and the depth of field (DOF) of the device does not limit the ability of the device to accommodate possible object distances and orientations. As described in detail in Application No. PCT/US01/44011, incorporated by reference above in its entirety, the components of the image capture engine 1202 are able to move in such a way as to change the image distance of the image formation optics to compensate for a change in the target's object distance, thus preserving good image focus no matter where the target object might be located. This variable focus technique can be practiced in several different ways, namely: by moving lens elements in the image capture engine; by moving the linear imaging arrays relative to the imaging lens element(s); and by dynamic focus control. Such variable focus mechanisms are advantageous in that they provide improved focusing. However, such variable focus mechanisms have disadvantages: they are more difficult and expensive to design and manufacture, and they require moving parts (thus making such mechanisms difficult to embody in rugged design that is suitable for many POS applications where users are prone to drop and mishandle the system).

In another alternative, the image formation optics 1218 may provide variable focal length (i.e. a zoom-type imaging) with a variable angular field of view (FOV). Note that as the target object moves farther from the device, the dimensions of the projection of the FOVs on the surface of the target object become larger. Zoom-type imaging optics compensate for this effect. As described in detail in Application No. PCT/US01/44011, incorporated by reference above in its entirety, zoom-type imaging optics are capable of changing focal length, and therefore angular field of view (FOV) by moving one or more lens elements. The position at which the zooming lens element(s) must be placed in order to achieve a given focal length is typically determined by consulting a lookup table, which is constructed ahead of time either experimentally or by design software, in a manner well known in the art. An advantage to using zoom-type image optics is that the resolution of the image that is acquired, in terms of pixels or dots per inch, remains constant no matter what the distance from the target object to the image formation optics. However, such zoom-type image formation optics have disadvantages: they are more difficult and expensive to design and manufacture, and they require moving parts (thus making such mechanisms difficult to embody in rugged design that is suitable for many POS applications where users are prone to drop and mishandle the system).

As described above, each PLIA (1214-1 and 1214-2) comprises a plurality of planar light illumination sources (PLISs) closely arranged relative to each other in a rectilinear fashion. Moreover, the relative spacing and orientation of each PLIS is such that the spatial intensity distribution of the individual planar light beams superimpose and additively combine to produce a composite planar illumination beam having a magnitude of illumination which is distributed substantially uniformly over the entire working depth of the device 1200 (i.e. along the height and width of the composite planar light illumination beam).

The PLILIM-based system 1200 also includes at least one printed circuit board (one shown as 1211) contained with the housing 1201 onto which is integral mounted image processing circuitry that carries out the Aspect Ratio Compensation routine as described herein on images derived from the row data captured by the linear image detection arrays 1206-A and 1206-B. In addition, the image processing circuitry preferably carries out bar code symbol reading operations and possibly optical character recognition (OCR) operations, and the like, on such images and/or the reconstructed image produced and stored by the Aspect Ratio Compensation routine.

In addition, the at least one printed circuit board preferably includes a communication interface that supports data communication between the system 1200 and a host computer/network over a data communication link therebetween as shown. The PLILIM-based imager 1200 may also include: i) a display device, such as an LCD panel, which is not shown in FIG. 12A, that is integral to the housing 1201 and displays, in a real-time manner, captured images, data being entered into the system, and graphical user interfaces (GUIs) required in the support of various types of information-based transactions; ii) a data entry keypad, which is not shown in FIG. 12A, that is integral to the housing 1201 and enables the user to manually enter data into the system as required during the course of operation; and/or a user-activated switch integral to the housing 1201 (for example, the trigger-type switch 1221 shown in FIG. 12A) that provides user control of predetermined system operations (which may include user activation of the image capture operations and subsequent image processing operations, and/or user activation of communication of bar code symbol data from the system 1200 to the host computer/network).

FIG. 12B illustrates an exemplary system architecture for the hand-holdable PLILIM-based imaging device 1200 of FIG. 12A. Preferably, the device is also capable of performing bar code detection operations and image lift operations suitable for OCR and other imaging applications. Note that the device employs PLILIM-based illumination and image capture methods (and apparatus) of the present invention as discussed above with respect to FIGS. 2A–2G3 and FIG. 3; yet the details of such methods and apparatus are omitted from FIG. 12B for the sake of simplicity of illustration and description.

As shown therein, the hand-holdable PLILIM-based imaging device 1200 includes a plurality of linear imaging arrays (for example, two shown as Linear Array A (1206-A) and Linear Array B (1206-B)) that cooperate with image formation optics (not shown) to image substantially planar field of views (FOVs) that axe displaced (offset) from one another along the direction of intended motion of the target object relative to the system housing. The linear imaging arrays may be CCD-type linear image devices (for example, the model ILX554B linear CCD image array (2048 imaging elements) available from Sony Electronics. Alternatively, the linear imaging arrays may be CMOS-type linear image devices. A pair of planar light illumination arrays (PLIA$_1$ (1215-1) and PLIA$_2$ (1215-2) project planar light illumination that substantially overlaps (and may encompasses and extends beyond) the FOVs of the plurality of linear image detectors (e.g., Linear Array A and Linear Array B) along a substantial portion of the range of working distances of the device, while images of the illuminated target object are formed on and detected by the plurality of linear imaging arrays (Linear Array A and Linear Array B). Timing Signal Generation circuitry 405' supplies timing signals to the linear imaging arrays in order to read out the row image data produced by such devices. Such row image data is derived from the energy detected by the imaging elements of the linear imaging arrays over an integration time period of such devices and is typically read out from the linear image arrays in a serial manner. Such row image data is supplied to analog-to-digital conversion circuitry 407', which optionally filters the row data image signal supplied thereto (to remove unwanted noise components) and converts the row image data supplied thereto into digital fonn. The analog-to-digital conversion circuitry 407' operably cooperates with memory controller 409' to add such row image data (in digital form) into memory buffers corresponding to the linear imaging array from which the row image data was derived.

Such operations build up and store in given memory buffer a composite 2-D image (in digital form) derived from the row image data output from the corresponding to linear imaging array. In this manner, memory buffer 411A' stores a composite 2-D image (in digital form) derived from the row image data output from the linear imaging array A, and memory buffer 411B' stores a composite 2-D image (in digital form) derived from the row image data output from the linear imaging array B. As shown, the memory buffers that store the composite 2-D images are preferably realized as allocated portions (e.g., address space) in one or more memory modules (one shown) 412', which may be SDRAM, SRAM or other types of memory; however, alternative data buffering designs (such as dedicated data buffer/cache modules) can be used.

As described above in detail, if the velocity of relative motion between the target object and system housing varies during the time that the composite 2-D images are being built up, then different regions of the composite 2-D images will have different aspect ratios. An image processing computer 413' (which is preferably realized using a digital signal processor as shown) executes a set of programmed instructions 415' (labeled "Aspect Ratio Compensation") that access the multiple composite 2-D images stored in the image buffers (411A' and 411B') and perform image processing operations utilizing such composite 2-D images that estimate the such variations in the velocity of such relative motion and generate a reconstructed image that compensates for such estimated variations (i.e., has a more uniform aspect ratio). The image processing computer 413' stores the reconstructed image in memory buffer 411C' for subsequent processing. As shown, the memory buffer 411C' that stores the reconstructed image is preferably realized as allocated portions (e.g., address space) in memory module(s) 412', which may be SDRAM, SRAM or other types of memory; however, alternative data buffering designs (such as dedicated data buffer/cache modules) can be used.

In addition, the image processing computer 413' preferably executes a set of programmed instructions 417' (labeled "Bar Code Detection") that accesses one or more of the composite 2-D images stored in the memory buffers (411A' and 411B') and/or the reconstructed image stored in memory buffer 411C' and carries out image-based bar code symbol detection and decoding operations on such image(s). These imaging processing operations preferably detect and decode one-dimensional bar code symbols (and possibly two-dimensional bar code symbols) within the image and generate symbol character data representative thereof. Moreover, such imaging processing operations preferably carry out image-based omni-directional bar code detection and decoding whereby bar code symbol(s) at varying spatial orientation within the image are detected and decoded. For example, such image-based bar code symbol detection and decoding operations can be realized with SwiftDecode™ Bar Code Decode software, available from Omniplanar, Inc. of Princeton, N.J. (http://www.omniplanar.com). The image processing computer 413' may also execute additional image processing routines that carry out OCR operations, handwriting/signature recognition operations or other imaging operations.

The programmed set of instructions which carry out the image processing operations as described above (labeled "Aspect Ratio Compensation" and "Bar Code Detection") are typically written in a high-level programming language (i.e., a programming language readable by those skill in the art, such as the "C" programming language) and compiled by a software tool (called a compiler) into a set of instructions that are suitable for execution by the image processing computer 413'. The compiled set of instructions together with a system control program (e.g., a real-time operating system) are then stored in non-volatile memory (not shown) of the device 1200 for access and execution by the image processing computer 413' as described above.

Bar code symbol character data (generated via execution of the Bar Code Detection routine on the image processing computer 413') is transferred, under control of controller 419', to communication interface circuitry 423', which communicates the bar code symbol character data to a host system over a communication link there between, which, for example, may be a wireless data link (such as an infra-red link, Bluetooth RF link, IEEE802.11a RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, RS-485 link, or Ethernet link), a wired parallel data bus, or other common wired interface links (such as an OCIA link, an IBM 46XX link, a Light Pen Emulation link, a LTPN link)).

In addition, the reconstructed image (generated via execution of the Aspect Ratio Compensation routine on the image processing computer 413') is preferably transferred, under control of controller 419', to communication interface circuitry 423', which communicates the reconstructed image to a host system over the communication link there between. Alternatively, the reconstructed image can be compressed (for example, into a TIFF, GIFF, JPEG compressed format) and the reconstructed image (in compressed form) can be transferred, under control of controller 419', to the communication interface circuitry 423', which communicates the reconstructed image (in compressed form) to a host system over the communication link there between. Such compression can be performed, for example, by the image processing computer 413', controller 419', or circuitry in the communication interface circuitry 423. In this illustrative configuration, the host system receives the reconstructed image (or decompresses its compressed form) and performs image processing operations that carry out OCR of textual symbologies (and possibly other symbologies) on the reconstructed image, thereby outputting a text-based document that is suitable for editing by a standard word processing/text editing program.

A system bus 418' (which may be a simple bus structure has shown, or alternatively may be more complicated and hierarchical in nature) provides the data/signal paths over which the memory controller 409', memory module(s) 412', image processing computer 413' and controller 419' communicate. The controller 419' (which performs system control operations for the device 1200) interfaces to illumination control circuitry 421', which operates (under control of controller 419') to provide power (e.g., current) to the illumination sources (e.g., VLDs or LEDs) of PLIA$_1$ (1215-1) and PLIA$_2$ (1215-2) during planar light illumination and image capture operations. In the event that coherent laser illumination sources (e.g., VLDs) are used to illuminate the FOVs of the linear imaging arrays, the current levels provided to such laser illumination sources are modulated in manner that reduces the temporal coherence of the planar laser illumination as described above in great detail, which advantageously reduces the RMS power of the speckle noise detected by the PLILIM-based illumination and image capture module. Moreover, the device 1200 may employ mechanical means (i.e., oscillating optical elements) that reduces the spatial coherence of the planar laser illumination as set forth below, which advantageously reduces the RMS power of the speckle noise detected by the PLILIM-based illumination and image capture module. In this configuration, the controller 419 preferably controls operation of such mechanical means. In addition, as described above, the image formation optics may include focus control mechanisms and/or zoom-control mechanisms embodied therein. In this configuration, the controller 419' preferably performs camera control operations that cooperate with such mechanisms to adjust the focus and/or zoom of the image formation optics.

The controller 419' also interfaces to I/O interface circuitry 425', which may provide drive signals to an audio-transducer and/or LED-based status visual indicators (labeled "Status LEDs") used to signal successful symbol reading operations to users and the like, and may provide user input via interaction with a keypad, buttons or switches (such as a "Data Communication Switch") as shown. In addition, the I/O interface may also provide for interfacing with a plurality of other accessory devices (such a display device).

The controller 419' also operates the device 1200 in accordance with a system control architecture (or scheme). In general, there are various system control architecture that can be embodied by the controller 419'. For example, the PLILIM-based illumination and image capture and subsequent image-based bar code symbol detection/decoding and communication of bar code symbol character data to the host system may occur automatically (without the need for human interaction to activate such operations). Alternatively, the PLILIM-based illumination and image capture and subsequent image-based bar code symbol detection/decoding may occur automatically (without the need for human interaction to activate such operation) and the communication to the host system of the symbol data corresponding thereto may be activated by a manually-activated data transmission switch as described in detail in co-pending U.S. patent application Ser. No. 09/204,176 filed Dec. 3, 1998 and co-pending U.S. patent application Ser. No. 09/452,976 filed Dec. 2, 1999; incorporated by reference above in their entirety. In another alternative, the PLILIM-based illumination and image capture and subsequent image-based bar code symbol detection/decoding and communication of bar code symbol character data to the host system may be activated by a manual trigger switch or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798; 5,484,992; 5,468,951; 5,425,525; 5,240,971; 5,340,973; 5,260,553; incorporated herein by reference.

The image processing computer 413' may utilize one or more digital signal processing engines/cores and cache memory that stores (e.g. buffers) instructions/data and provides low latency access to such instructions/data when requested by the processing engine(s). A digital signal processing engine (or like device) is preferable because such devices have low power requirements, high performance levels in image processing applications (because of the microarchitecture employed therein), and low cost.

Preferably, the functionality of the controller 419' and image processing computer 413' (and possibly the memory controller 409', I/O interface circuitry 425' and/or communication interface circuitry 423') are embodied in a single integrated circuit (typically referred to as a "System on a Chip"). An example of such an integrated circuit is the Intel PXA250 applications processor, which includes a high performance microprocessor that is capable of performing the duties of the imaging processing computer 413' and controller 419' as described above along with integrated memory controller (e.g., SDRAM Control/SDRAM Control/DMA Control), integrated I/O interface circuitry (LCD interface, I$^2$S interface, I$^2$C interface) and integrated communication interface circuitry (IRDA interface, UART interfaces, Bluetooth Interface, USB client interface). In addition, it is preferable that controller 419' (and possibly image processing computer 413') embody features commonly found in modern RISC microprocessors, including advanced power management circuitry (which typically operate to temporarily shut down/disable elements of the microprocessor that are being used), pipelined execution stages, speculative instruction execution and speculative data prefetching (which requires branch prediction mechanisms), and out-of-order instruction execution. Many of these features are embodied in the Intel PXA250 applications processor. In addition, the functionality of the timing signal generator 405', possibly some of the functionality of the memory controller 409' (such as buffering data produced by the analog-to-digital conversion circuitry 407' and/or memory access/DMA control), and possibly some of the image processing operations described herein as part of the Aspect Ratio Compensation Routine (such as edge detection as described below), Bar Code Detection Routine, or other image processing operations may be embodied in dedicated hardware, such as one or more programmable gate arrays (e.g., Spartan II line of FPGAs available from Xilinx Inc. of San Jose, Calif.), one or more programmable logic devices (e.g., CPLD line available from Xilinx Inc. of San Jose, Calif.), and/or one or more ASICs.

In FIG. 13A1, there is shown an illustrative embodiment of a PLILIM-based illumination and image capture module in accordance with the present invention including: a plurality of linear imaging arrays (for example, three shown as $LA_A$, $LA_B$ and $LA_C$) and image formation optics that cooperate to image substantially planar field of views (FOVs), whose generalized outline is shown with dotted lines, that are displaced (offset) from one another along the direction of intended motion of the target object relative to the system housing. The imaging elements of each linear imaging array (e.g., $LA_A$, $LA_B$ and $LA_C$) extend in a direction transverse to the direction of intended motion. A pair of planar light illumination arrays ($PLIA_1$ and $PLIA_2$) are preferably arranged on opposite sides of the linear image arrays and cooperate to project planar light illumination that overfills (e.g., encompasses and extends beyond) the FOVs of the plurality of linear image arrays along a substantial portion of the range of working distances of the module, as best shown in FIG. 13A2, while images of the illuminated target object are formed on and detected by the plurality of linear imaging arrays $LA_A$ and $LA_B$. The FOV of each linear imaging array $LA_A$, $LA_B$ and $LA_C$ and the planar light illumination preferably are substantially coplanar along a substantial portion of the range of working distances of the module as shown.

Alternatively, the planar light illumination projected by the planar light illumination arrays $PLIA_1$ and $PLIA_2$ may substantially overlap (but not overfill) the FOVs of the linear imaging array $LA_A$ and $LA_C$ (and overfill the FOV of linear imaging array $LA_B$) along a substantial portion of the range of working distances of the imaging module as best shown in FIG. 13A3, while images of the illuminated target object are formed on and detected by the plurality of linear imaging arrays $LA_A$, $LA_B$ and $LA_C$.

In others variations, separate beams of co-planar light illumination ($PLIB_A$, $PLIB_B$, and $PLIB_C$ may overlap corresponding FOVs ($FOV_A$, $FOV_B$, $FOV_C$) along a substantial portion of the range of working distances of the imaging module (which is analogous to the modes shown in FIGS. 2D and 2E for two FOVs), while images of the illuminated target object are formed on and detected by the plurality of linear imaging arrays $LA_A$, $LA_B$, $LA_C$.

In this illustrative embodiment, the planar light illumination produced by $PLIA_1$ and $PLIA_2$ and the FOVs of the plurality of linear image arrays $LA_A$, $LA_B$, $LA_C$ are "stationary" in that they are neither scanned nor deflected relative to the system housing during planar light illumination and image detection operations, while the target object is moved relative to the system housing (for example, via movement of the system housing or movement of the target object to be scanned).

Each PLIA ($PLIA_1$ and $PLIA_2$) comprises at least one planar light illumination source (PLIS)—in the exemplary module illustrated in FIG. 13A1, each PLIA includes 3 PLIS, which are labeled $PLIS_{x,1}$, $PLIS_{x,2}$ and $PLIS_{x,3}$. Each PLIS produces a planar light illumination beam—a light illumination beam having substantially-planar spatial distribution along a characteristic propagation direction as described above. Details of exemplary VLD-based PLIS/PLIAs and LED-based PLIS/PLIAs are described above.

In accordance with the principles of the present invention, the plurality of planar light illumination sources (PLISs) are preferably spaced out and tilted such that their individual power density distributions add up to produce a (composite) planar light illumination beam having a magnitude of illumination which is distributed substantially uniformly over the entire working depth of the PLILIM-based system (i.e. along the height and width of the composite planar light illumination beam).

Moreover, the plurality of planar light illumination sources (PLISs) are preferably spaced out and tilted such that: i) each PLIB component is arranged in a coplanar relationship with a portion of the FOVs of the linear image arrays $LA_A$, $LA_B$, $LA_C$ and ii) the composite planar light illumination beam overfills (encompasses and extends beyond) the FOVs of the linear image arrays $LA_A$, $LA_B$, $LA_C$ along a substantial portion of the range of working distances of the imaging module, as best shown in FIGS. 13A1 and 13A2, while images of the illuminated target object are formed on and detected by the plurality of linear imaging arrays $LA_A$, $LA_B$, $LA_C$. Alternatively, the plurality of planar light illumination sources (PLISs) may be spaced out and tilted such that: i) each PLIB component is arranged in a coplanar relationship with a portion of the FOVs of the linear image arrays $LA_A$, $LA_B$, $LA_C$; and ii) the composite planar light illumination beam substantially overlaps the FOV of the linear imaging array $LA_A$, $LA_B$, and $LA_C$ (but does not overfill one or more of such FOVs) along a substantial portion of the range of working distances of the imaging module while images of the illuminated target object are formed on and detected by the plurality of linear imaging arrays $LA_A$, $LA_B$, and $LA_C$. In others variation described above, separate beams of co-planar light illumination ($PLIB_A$ and $PLIB_B$) overlap corresponding FOVs ($FOV_A$, $FOV_B$, $FOV_C$) of the linear imaging array $LA_A$, $LA_B$, $LA_C$ along a substantial portion of the range of working distances of the imaging module while images of the illuminated target object are formed on and detected by the plurality of linear imaging arrays $LA_A$, $LA_B$, and $LA_C$.

The image formation optics of the PLILIM-based imaging module of FIG. 13A1 may provide a fixed focal length with constant angular field of view (FOV). In this configuration, the imaging module can view more of the target object's surface as the target object is moved further away from the module. A major disadvantage of this configuration is that the resolution of the image that is acquired by the linear detection arrays, expressed in terms of pixels or dots per inch (dpi), varies as a function of the distance from the target object to the imaging lens. However, a fixed focal length imaging lens assembly has advantages: it is easier and less expensive to design and manufacture, it does not require moving parts (thus lending itself to a more rugged design that is suitable for many POS applications where users are prone to drop and mishandle the system).

Alternatively, the image formation optics of the PLILIM-based imaging module of FIG. 13A1 may provide a variable focus fixed focal length with constant angular field of view (FOV). In this configuration, the image formation optics can adjust its image distance to compensate for a change in the target's object distance, and the depth of field (DOF) of the imaging subsystem does not limit the ability of the imaging module to accommodate possible object distances and orientations. As described in detail in Application No. PCT/US01/44011, incorporated by reference above in its entirety, the components of the imaging module are able to move in such a way as to change the image distance of the imaging lens to compensate for a change in the target's object distance, thus preserving good image focus no matter where the target object might be located. This variable focus technique can be practiced in several different ways, namely: by moving lens elements in the imaging module; by moving the linear imaging arrays relative to the imaging lens element(s); and by dynamic focus control. Such variable focus mechanisms are advantageous in that they provide improved focusing. However, such variable focus mechanisms have disadvantages: they are more difficult and expensive to design and manufacture, and they require moving parts (thus making such mechanisms difficult to embody in rugged design that is suitable for many POS applications where users are prone to drop and mishandle the system).

In another alternative, the image formation optics of the imaging module of FIG. 13A1 may provide variable focal length (i.e. a zoom-type imaging) with a variable angular field of view (FOV). Note that as the target object moves farther from the imaging module, the dimensions of the projection of the FOVs of the module on the surface of the target object become larger. Zoom-type imaging optics compensate for this effect. As described in detail in Application No. PCT/US01/44011, incorporated by reference above in its entirety, zoom-type imaging optics are capable of changing focal length, and therefore angular field of view (FOV) by moving one or more lens elements. The position at which the zooming lens element(s) must be placed in order to achieve a given focal length is typically determined by consulting a lookup table, which is constructed ahead of time either experimentally or by design software, in a manner well known in the art. An advantage to using zoom-type image optics is that the resolution of the image that is acquired, in terms of pixels or dots per inch, remains constant no matter what the distance from the target object to the image formation optics. However, such zoom-type image formation optics have disadvantages: they are more difficult and expensive to design and manufacture, and they require moving parts (thus making such mechanisms difficult to embody in rugged design that is suitable for many POS applications where users are prone to drop and mishandle the system).

A plurality of the linear imaging arrays of the PLILIM-based imaging module (for example, two linear imaging arrays $LA_A$ and $LA_B$ of FIG. 13A1) are used to simultaneously build up multiple composite 2-D images of the target object. In order to build up the multiple composite 2-D images, the row of pixel data values (in analog form) from each linear imaging array is output therefrom, converted into digital form, preprocessed and stored in memory. Image processing circuitry (which may be realized by one or more programmed computer processing modules, such as a microprocessor, digital signal processor or other image processing engine) accesses and processes the multiple 2D images stored in memory to: match features (e.g. identify correspondence between features), or alternatively correlate pixel data values, in the multiple composite 2-D images; identify a row offset value pertaining to matched features (or pertaining to the correlation result); and derive relative image velocity metrics for rows of a select one of the multiple composite 2-D images (the image stored in buffer A or the image stored in buffer B) from such row offset values. The image velocity metric for one or more rows is used to calculate in a real time manner the line rate for the third linear array $LA_C$ that compensates for variations in image velocity such that the image capture operations of the third linear array $LA_C$ maintain a constant aspect ratio over the scan lines captured by the third linear array $LA_C$. In addition, the calculated line rate of the third linear array $LA_C$ is used to calculate the optical power level of illumination that overlaps the FOV of the linear imaging array $LA_C$ (and possibly the optical power level of illumination that overlaps the FOV of the other linear arrays, e.g., $LA_A$ and $LA_B$) such that the average optical power level of such illumination over the photo-integration time periods of the linear array $LA_C$ is substantially constant (to provide a uniform white level in the image pixels captured by the linear imaging array $LA_C$) and does not exceed a recommended maximum level (to avoid saturation of the linear array $LA_C$).

The line rate of the third linear array $LA_C$ and the optical power of illumination that overlaps the FOV of the linear imaging array $LA_C$ (and possibly the optical power of illumination that overlaps the FOV of the other linear arrays, e.g., $LA_A$ and $LA_B$) are periodically updated (by scan line rate control circuitry and illumination control circuitry, respectively) in a real time manner to the match the calculated line rate and calculated optical power level, and each scan line (e.g., row pixel data values in analog form) produced therefrom is output from the third linear imaging array $LA_C$, converted into digital form, preprocessed and stored in memory.

Such operations build up a third composite 2-D image C of the target object that has substantially constant aspect ratio and has a substantially uniform white level. In other words, the aspect ratio of the third composite 2-D image C is substantially constant, thereby substantially reducing or eliminating any image distortion (e.g., compression/stretching) that would result from variations in relative image velocity if the scan line rate was not adjusted. In addition, the white level of the pixel data values that make up the third composite 2-D image C is substantially uniform, thereby substantially reducing or eliminating any variations in such white levels that would result from changing the variable line rate of the linear imaging array $LA_C$ if the power level of illumination was not adjusted.

The third composite 2-D image C is optionally processed (for example, sharpened) by the image processing circuitry and is saved (or output) for subsequent processing (which may, for example, involve output for display, 1D and/or 2D bar code detection operations, and OCR or other imaging operations). A pictorial representation of such image capture and processing operations is shown in FIG. 13A4.

FIG. 13B1 illustrates an exemplary system architecture for a PLILIM-based imaging device of FIG. 13A1 in accordance with the present invention. Preferably, the device is also capable of performing bar code detection and image lift operations suitable for OCR and other imaging applications. Note that the device employs PLILIM-based illumination and image capture methods (and apparatus) of the present invention as discussed above with respect to FIGS. 13A1–13A4; yet the details of such methods and apparatus are omitted from FIG. 13B1 for the sake of simplicity of illustration and description. As shown therein, the PLILIM-based imaging device 401" includes three or more linear imaging arrays (for example, three shown as Linear Array A (403$_A$"), Linear Array B (403$_B$") and Linear Array C (403$_C$")) that cooperate with image formation optics (not shown) to image substantially planar field of views (FOVs) that are displaced (offset) from one another along the direction of intended motion of the target object relative to the system housing. The linear imaging arrays may be CCD-type linear image devices (for example, the model ILX554B linear CCD image array (2048 imaging elements) available from Sony Electronics. Alternatively, the linear imaging arrays may be CMOS-type linear image devices. A pair of planar light illumination arrays (PLIA$_1$ (404$_1$") and PLIA$_2$ (404$_2$")) project planar light illumination that substantially overlaps (and may encompasses and extends beyond) the FOVs of the plurality of linear image detectors (e.g., Linear Array A (403$_A$"), Linear Array B (403$_B$") and Linear Array C (403$_C$")) along a substantial portion of the range of working distances of the device, while images of the illuminated target object are formed on and detected by the plurality of linear imaging arrays. Timing Signal Generation circuitry 405" supplies timing signals to the linear imaging arrays in order to read out the row image data produced by such devices. Such row image data is derived from the energy detected by the imaging elements of the linear imaging arrays over an integration time period of such devices and is typically read out from the lineax image arrays in a serial manner. The timing signals supplied to Linear Array A (403$_A$") and Linear Array B (403$_B$") control the two linear arrays to read out the row image data produced by such devices at a substantially constant line rate over the image capture operations that build ups the first and second composite 2-D images as described herein. However, the timing signals supplied to Linear Array C (403$_C$") controls the Linear Array C (403$_C$") to read out the row image data produced by such device at a variable line rate over the image capture operations that build ups the third composite 2-D image as described herein. The variable line rate for linear array C (403$_C$") (as controlled by the timing signals supplied thereto) is adjusted to compensate for variations in image velocity such that the image capture operations of linear array C (403$_C$") maintain a constant aspect ratio over the scan lines captured by linear array C (403$_C$") in building up the third composite 2-D image. In addition, the optical power of illumination that overlaps the FOV of linear imaging array C (403$_C$") (and possibly the optical power level of illumination that overlaps the FOV of the other linear arrays, e.g., linear arrays A and B) is controlled by illumination control circuitry such that the average optical power level of such illumination over the photo-integration time periods of linear array C (403$_C$") is substantially constant (to provide a uniform white level in the image pixels captured by the linear imaging array C (403$_C$")) and does not exceed a recommended maximum level (to avoid saturation of linear array C (403$_C$")).

The row image data produced by the plurality of linear imaging arrays (e.g., Linear Array A (403$_A$"), Linear Array B (403$_B$") and Linear Array C (403$_C$")) is supplied to analog-to-digital conversion circuitry 407", which optionally filters the row data image signal supplied thereto (to remove unwanted noise components) and converts the row image data supplied thereto into digital form. The analog-to-digital conversion circuitry 407" operably cooperates with memory controller 409" to add such row image data (in digital form) into memory buffers corresponding to the linear imaging array from which the row image data was derived.

Such operations build up and store in given memory buffer a composite 2-D image (in digital form) derived from the row image data output from the corresponding to linear imaging array. In this manner, memory buffer 411A" stores a composite 2-D image (in digital form) derived from the row image data output from the linear imaging array A (403$_A$"), memory buffer 411B' stores a composite 2-D image (in digital form) derived from the row image data output from the linear imaging array B (403$_B$"), and memory buffer 414" stores a composite 2-D image (in digital form) derived from the row image data output from the linear imaging array C (403$_C$"). As shown, the memory buffers that store the composite 2-D images are preferably realized as allocated portions (e.g., address space) in one or more memory modules (one shown) 412", which may be SDRAM, SRAM or other types of memory; however, alternative data buffering designs (such as dedicated data buffer/cache modules) can be used.

As described above in detail, if the velocity of relative motion between the target object and system housing varies during the time that the first and second composite 2-D images are being built up, then different regions of the first and second composite 2-D images will have different aspect ratios. An image processing computer 413" (which is preferably realized using a digital signal processor as shown) executes a set of programmed instructions 416" (labeled "Image Velocity Detection") that access multiple composite 2-D images stored in the image buffers (e.g., the first and second composite 2-D images stored in buffers 411A" and 411B", respectively) and perform image processing operations utilizing such composite 2-D images that estimate the variations in the velocity of such relative motion. Image velocity data representing such image velocity estimates is generated by execution of the Image Velocity Detection routine on the image processing computer 413" and is provided to a line rate adjustment module 420" (which is preferably realized as a programmed set of instructions executing on controller 419" as shown). The line rate adjustment module 420" utilizes the image velocity data supplied thereto to calculate in a real time manner the line rate for linear array C (403$_C$") that compensates for variations in image velocity such that the image capture operations of the linear array C (403$_C$") maintain a substantially constant aspect ratio over the scan lines captured by linear array C (403$_C$"), and supplies signals to the timing signal generator 405" that cause the timing signal generator to periodically adjust the variable line rate for linear array C (403$_C$") to the line rate calculated by module 420".

In addition, the line rate data calculated by line rate adjustment module 420" is provided to an optical power level adjustment module 424" (which is preferably realized as a programmed set of instructions executing on controller 419" as shown). The optical power level adjustment module 424" utilizes the line rate data supplied thereto to calculate in a real time manner the illumination time period(s) and/or optical power level(s) for the illumination that overlaps the FOV of the linear imaging C (403$_C$") (and possibly for illumination that overlaps the FOV of the other linear arrays, e.g., LA$_A$ and LA$_B$) such that the average optical power level of such illumination over the photo-integration time periods of the linear array C (403$_C$") is substantially constant (to provide a uniform white level in the image pixels captured by the linear imaging array C (403$_C$")) and does not exceed a recommended maximum level (to avoid saturation of the linear array C (403$_C$")). In addition, module 420" supplies signals to illumination control circuitry 421" that cause illumination control circuitry 421" to periodically adjust the illumination time period(s) and/or optical power level(s) for such illumination to match the values calculated by module 424". The illumination control circuitry 421" preferably adjusts the optical power level of such illumination by varying the current levels supplied to the VLD(s) or LED(s) in PLIA$_1$ (404$_1$") and/or PLIA$_2$ (404$_2$"), and preferably adjusts the illumination time period at a given optical power level by in response to signals provided thereto (which dictate such time periods).

Such operations build up a third composite 2-D image C of the target object that has substantially constant aspect ratio. In other words, the third composite 2-D image (in digital form) derived from the row image data output from the linear imaging array C ($403_C''$) has a substantially constant aspect ratio. Thus, any image distortion (e.g., compression/stretching) that would result from variations in relative image velocity if the scan line rate was not adjusted is substantially reduced or eliminated.

In addition, the white level of the pixel data values that make up the third composite 2-D image C is substantially uniform. Thus, any variations in white levels that would result from changing the variable line rate of the linear imaging array $LA_C$ if the power level of illumination was not adjusted is substantially reduced or eliminated.

The image processing computer 413" optionally processes (for example, carries out a sharpening routine on) the third composite 2-D image C and saves (or outputs) the resultant image for subsequent processing (which may, for example, involve output for display, 1D and/or 2D bar code detection operations, and OCR or other imaging operations).

In addition, the image processing computer 413 preferably executes a set of programmed instructions 417 (labeled "Bar Code Detection") that accesses the third composite 2-D image C (or resultant image derived from the processing of the third composite 2-D image) and carries out image-based bar code symbol detection and decoding operations on such image(s). These imaging processing operations preferably detect and decode one-dimensional bar code symbols (and possibly two-dimensional bar code symbols) within the image and generate symbol character data representative thereof. Moreover, such imaging processing operations preferably carry out image-based omni-directional bar code detection and decoding whereby bar code symbol(s) at varying spatial orientation within the image are detected and decoded. For example, such image-based bar code symbol detection and decoding operations can be realized with SwiftDecode™ Bar Code Decode software, available from Omniplanar, Inc. of Princeton, N.J. (http://www.omniplanar.com). The image processing computer 413" may execute additional image processing routines (that carry out OCR operations, handwriting/signature recognition operations or other imaging operations).

The programmed set of instructions which carry out the image processing operations described above (e.g., labeled "Image Velocity Detection" and/or "Bar Code Detection") are typically written in a high-level programming language (i.e., a programming language readable by those skill in the art, such as the "C" programming language) and compiled by a software tool (called a compiler) into a set of instructions that are suitable for execution by the image processing computer 413". The compiled set of instructions together with a system control program (e.g., a real-time operating system) are then stored in non-volatile memory (not shown) of the device 400 for access and execution by the image processing computer 413" as described above.

Bar code symbol character data (generated via execution of the Bar Code Detection routine on the image processing computer 413") is transferred, under control of controller 419", to communication interface circuitry 423, which communicates the bar code symbol character data to a host system over a communication link there between, which, for example, may be a wireless data link (such as an infra-red link, Bluetooth RF link, IEEE802.11a RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, RS-485 link, or Ethernet link), a wired parallel data bus, or other common wired interface links (such as an OCIA link, an IBM 46XX link, a Light Pen Emulation link, a LTPN link)).

In addition, the third composite 2-D image C (or resultant image derived from the processing of the third composite 2-D image) is preferably transferred, under control of controller 419", to communication interface circuitry 423", which communicates this image to a host system over the communication link there between. Alternatively, this image can be compressed (for example, into a TIFF, GIFF, JPEG compressed format) and the compressed image can be transferred, under control of controller 419", to the communication interface circuitry 423", which communicates the compressed image to a host system over the communication link there between. Such compression can be performed, for example, by the image processing computer 413", controller 419", or circuitry in the communication interface circuitry 423". In this illustrative configuration, the host system receives the image (or decompresses its compressed form) and processes the image. Such processing may involve OCR of textual symbologies (and possibly other symbologies) on the image, thereby outputting a text-based document that is suitable for editing by a standard word processing/text editing program. Alternatively, such processing may involve handwriting/signature recognition on the image, thereby outputting data that characterizes handwritten characters in the image. In another alternative, such processing may involve displaying the image on a display device for view by a user(s).

A system bus 418" (which may be a simple bus structure has shown, or alternatively may be more complicated and hierarchical in nature) provides the data/signal paths over which the memory controller 409", memory module(s) 412", image processing computer 413" and controller 419" communicate. The controller 419" (which performs system control operations for the device 400") interfaces to illumination control circuitry 421", which operates (under control of controller 419") to provide power (e.g., current) to the illumination sources (e.g., VLDs or LEDs) of $PLIA_1$ and $PLIA_2$ during planar light illumination and image capture operations. In the event that the illumination sources embodied therein produce coherent laser light, the current levels provided to such laser illumination sources are modulated in manner that reduces the temporal coherence of the planar laser illumination as described below in great detail, which advantageously reduces the RMS power of the speckle noise detected by the PLILIM-based illumination and image capture module. Moreover, the device 400" may employ mechanical means (i.e., oscillating optical elements) that reduces the spatial coherence of the planar laser illumination as set forth below, which advantageously reduces the RMS power of the speckle noise detected by the PLILIM-based illumination and image capture module. In this configuration, the controller 419 preferably controls operation of such mechanical means. In addition, as described above, the image formation optics may include focus control mechanisms and/or zoom-control mechanisms embodied therein. In this configuration, the controller 419" preferably performs camera control operations that cooperate with such mechanisms to adjust the focus and/or zoom of the image formation optics.

The controller 419" also interfaces to I/O interface circuitry 425", which may provide drive signals to an audio-transducer and/or LED-based status visual indicators (labeled "Status LEDs") used to signal successful image capture operations and successful symbol reading operations to users and the like, and may provide user input via interaction with a keypad, buttons or switches (such as a "Data Communication Switch") as shown. In addition, the I/O interface may also provide for interfacing with a plurality of other accessory devices (such a display device).

The controller 419" also operates the device 400" in accordance with a system control architecture (or scheme). In general, there are various system control architecture that can be embodied by the controller 419". For example, the PLILIM-based illumination and image capture and subsequent image-based bar code symbol detection/decoding and communication of bar code symbol character data to the host system may occur automatically (without the need for human interaction to activate such operations). Alternatively, the PLILIM-based illumination and image capture and subsequent image-based bar code symbol detection/decoding may occur automatically (without the need for human interaction to activate such operation) and the communication to the host system of the symbol data corresponding thereto may be activated by a manually-activated data transmission switch as described in detail in co-pending U.S. patent application Ser. No. 09/204,176 filed Dec. 3, 1998 and co-pending U.S. patent application Ser. No. 09/452,976 filed Dec. 2, 1999 incorporated by reference above in their entirety. In another alternative, the PLILIM-based illumination and image capture and subsequent image-based bar code symbol detection/decoding and communication of bar code symbol character data to the host system may be activated by a manual trigger switch or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798; 5,484,992; 5,468,951; 5,425,525; 5,240,971; 5,340,973; 5,260,553; incorporated herein by reference.

The image processing computer 413" may utilize one or more digital signal processing engines/cores and cache memory that stores (e.g. buffers) instructions/data and provides low latency access to such instructions/data when requested by the processing engine(s). A digital signal processing engine (or like device) is preferable because such devices have low power requirements, high performance levels in image processing applications (because of the microarchitecture employed therein), and low cost.

Preferably, the functionality of the controller 419" and image processing computer 413" (and possibly the memory controller 409", I/O interface circuitry 425" and/or communication interface circuitry 423") are embodied in a single integrated circuit (typically referred to as a "System on a Chip"). An example of such an integrated circuit is the Intel PXA250 applications processor, which includes a high performance microprocessor that is capable of performing the duties of the imaging processing computer 413 and controller 419" as described above along with integrated memory controller (e.g., SDRAM Control/SDRAM Control/DMA Control), integrated I/O interface circuitry (LCD interface, I²S interface, I²C interface) and integrated communication interface circuitry (IRDA interface, UART interfaces, Bluetooth Interface, USB client interface). In addition, it is preferable that controller 419" (and possibly image processing computer 413") embody features commonly found in modern RISC microprocessors, including advanced power management circuitry (which typically operate to temporarily shut down/disable elements of the microprocessor that are being used), pipelined execution stages, speculative instruction execution and speculative data prefetching (which requires branch prediction mechanisms), and out-of-order instruction execution. Many of these features are embodied in the Intel PXA250 applications processor. In addition, the functionality of the timing signal generator 405", possibly some of the functionality of the memory controller 409" (such as buffering data produced by the analog-to-digital conversion circuitry 407" and/or memory access/DMA control), and possibly some of the image processing operations described herein as part of the Image Velocity Detection Routine (such as edge extraction/analysis or correlation as described herein), Bar Code Detection Routine, or other image processing operations may be embodied in dedicated hardware, such as one or more programmable gate arrays (e.g., Spartan II line of FPGAs available from Xilinx Inc. of San Jose, Calif.), one or more programmable logic devices (e.g., CPLD line available from Xilinx Inc. of San Jose, Calif.), and/or or one or more ASICs.

FIG. 13B2A through 13B3 are flow charts illustrating two different exemplary methodologies carried out by the PLILIM-based imaging device 400" of FIGS. 13A1–13A4 and 13B1 in accordance with the present invention. In the methodology of FIGS. 13B2A and 13B2B, image velocity is derived from distance (e.g., row offset) between corresponding features in the two images. And in the methodology of FIGS. 13B3A and 13B3B image velocity is derived from distance (e.g. row offset) between a selected row in one image and a correlation result between the selected row and multiple rows of the other image.

Referring now to the exemplary operations of FIGS. 13B2A and 13B2B, in blocks 1301 and 1303, planar light illumination (e.g., a composite planar light illumination beam provided by $PLIA_1$ and $PLIA_2$) is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to $LA_A$ and $LA_B$, respectively). Such operations are repeated over successive rows (e.g., lines) to form the multiple composite 2-D images in the image buffers.

Blocks 1305 through 1313, which represent an exemplary embodiment of the Image Velocity Detection routine executed by the image processing computer 413" in accordance with the present invention, access the two composite 2-D images stored in the image buffer A and B and process the two composite 2-D images to: i) identify features in the two composite images (blocks 1305, 1307); ii) match (e.g. identify correspondence between) such features (block 1309); and iii) identify a row offset value between matched features and derive relative image velocity metrics for rows of a select one of the two images (the image stored in buffer A or the image stored in buffer B) from such row offset values (block 1311).

The image velocity metric for one or more rows (produced in block 1311) is used by the image processing computer 413" to calculate in a real time manner the line rate for the third linear array $LA_C$ that compensates for variations in image velocity such that the image capture operations of the third linear array $LA_C$ maintain a constant aspect ratio over the scan lines captured by the third linear array $LA_C$ (block 1317). The variable line rate of the third linear array $LA_C$ is initialized (block 1315) and periodically updated in a real time manner to the match the calculated line rate (block 1317).

In block 1318, the variable line rate of the third linear array $LA_C$ (calculated in block 1317) is used to calculate the illumination time period(s) and/or optical power level(s) for the illumination that overlaps the FOV of the third linear array $LA_C$ (and possibly the illumination time period(s) and/or optical power level(s) for the illumination that overlaps the FOV of the other linear arrays, e.g., $LA_A$ and $LA_B$) such that the average optical power level of such illumination over the photo-integration time periods of the third linear array $LA_C$ is substantially constant (to provide a uniform white level in the image pixels captured by the third linear array $LA_C$) and does not exceed a recommended maximum level (to avoid saturation of the third linear array $LA_C$). For example, the calculations of block 1318 can be performed in two steps. In the first step, the photo-integration time period of the third linear array $LA_C$ is calculated using the formula: photo-integration time period= 1/Line Rate. In the second step, the illumination time period(s) for a set of one or more output power levels of a given illumination source (e.g. VLD or LED) is computed using the formula: (Σ(output power level×illumination time period) over the set of power levels)=(constant×photo-integration time period from step 1). The illumination time period(s) and/or optical power level(s) for such illumination is periodically updated in a real time manner to the match the calculated illumination time period(s) and/or optical power level(s) (block 1317).

Each scan line (e.g., row pixel data values in analog form) produced by the third linear array $LA_C$ is output therefrom, converted into digital form, preprocessed and stored in memory (block 1319). Such operations build up a third composite 2-D image C of the target object that has substantially constant aspect ratio. In other words, the aspect ratio of the third composite 2-D image C is substantially constant, thereby substantially reducing or eliminating any image distortion (e.g., compression/stretching) that would result from variations in relative image velocity if the scan line rate was not adjusted. In addition, the white level of the pixel data values that make up the third composite 2-D image C is substantially uniform, thereby substantially reducing or eliminating variations in white levels that would result from changing the variable line rate of the linear imaging array $LA_C$ if the power level of illumination was not adjusted.

The third composite 2-D image C is optionally processed (for example, sharpened) by the image processing computer (block 1321), and is saved (or output) for subsequent processing (block 1323). Such processing may involve, for example, outputting the third composite 2-D image C (or processed image) for display, ID and/or 2D bar code detection operations on the composite 2-D image C (or processed image), and OCR or other imaging operations on the composite 2-D image C (or processed image).

The features identified in blocks 1305 and 1307 may be raw intensity values, edge attributes, contour attributes, point (or corner or center of a region) attributes, statistical features or any other feature type that carries information that differentiates the portion of the image corresponding to the feature from noise. Details of exemplary feature types are described in: i) Brown, "A Survey of Image Registration Techniques", ACM Computing Surveys, 24(4), pgs. 325–376, 1992; Weng et al., "Motion and Structure from Two Perspective Views: Algoritbms, Error Analysis and Error Estimation," IEEE Transactions on Pattern Analysis and machine Intelligence, Vol. 11, No. 5, May 1989; and Huang et al., "Motion and Structure from Feature Correspondence: A Review," Proceedings of IEEE, Vol. 82, No. 2, February 1994; herein incorporated by reference in their entirety. Exemplary image processing operations that identify statistical features of the raw intensity values over the rows of a given composite 2-D image is described above with respect to blocks 601–609 (labeled 505') and blocks 611–619 (labeled 507') of FIG. 6A. Similar exemplary image processing operations that identify edge attributes (e.g., local extrema of row edge count values) over the rows of a given composite 2-D image is described below with respect to blocks 601'–609' (labeled 505") and blocks 611'–619' (labeled 507") of FIGS. 6B1A and 6B1B.

The location of a given feature is specified in a predetermined coordinate system (labeled R). The coordinate system R is preferably a 2-dimensional Cartesian system that is local in nature—it characterizes location of a given feature in a reference frame internal to the scanner housing, such as the pixel space of the composite 2-D image buffer. However, any other arbitrary 2-dimensional (or three-dimensional coordinate system) may be employed. When using a three-dimensional coordinate system, the three dimensions of the feature are typically derived from height (or range) of the feature with respect to the internal reference frame. This height may be estimated utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, herein incorporated by reference in its entirety.

In Block 1309, features (from the feature sets identified in block 1305 and 1307) are matched (e.g., registered) to generate a list of corresponding features. For example, in the case where a pair of composite images are formed and processed, the list of corresponding features may identify corresponding feature pairs wherein each feature pair identifies a feature from one composite 2-D image that corresponds to a feature from the other composite 2-D image as noted in block 1309. In a more general case where multiple composite 2-D images are formed and processed, the list of corresponding features may comprise tuples each identifying at least one feature from each composite 2-D image, wherein the features of the a given tuple correspond to one another. Generally, the feature matching process of block 1309 measures a degree of similarity (or dissimilarity) between features over the multiple composite 2-D images and maximizes this similarity measure (or minimizes the dissimilarity measure) to derive the list of corresponding features for the multiple composite 2-D images. An exemplary feature matching process is described above with respect to FIGS. 6B8(i), 6B8(ii), 6B9, 6B10, 6B11(i) and 6B11(ii).

In block 1311, for a select one of the multiple composite 2-D images (for example, the first composite 2-D image stored in image buffer 411A"), an image velocity metric is derived for each row of the selected composite 2-D image. The image velocity metric for a given row, which characterizes an estimate of the velocity of the scanner housing relative to the target object for the given row, is based upon distance between corresponding features in the list generated in block 1309. The distance between corresponding features is given by the distance between locations of corresponding features in the coordinate system R (such locations are generated in block 1305/1307 as discussed above). Exemplary image processing operations that generate such image velocity metrics utilizing interpolation over the rows (or subrow intervals) of the selected composite 2-D image is described above with respect to blocks 623 and 625 (labeled block 511') of FIGS. 6A and 6B.

In block 1317, the image velocity metric for one or more rows (produced in block 1311) is used to calculate the line rate for the third linear array $LA_C$ that compensates for variations in image velocity such that the image capture operations of the third linear array $LA_C$ maintain a constant aspect ratio over the scan lines captured by the third linear array $LA_C$, and the variable line rate of the third linear array $LA_C$ is automatically updated in a dynamic real time manner to the match the calculated line rate, to thereby compensate for distortions produced by image velocity variation.

And in block 1318, the variable line rate of the third linear array $LA_C$ (calculated in block 1317) is used to calculate illumination time period(s) and/or optical power level(s) of illumination that provide a uniform white level in the image pixels captured by the third linear array $LA_C$ and avoid saturation of the third linear array $LA_C$, and the illumination time period(s) and optical power level(s) of illumination is automatically updated in a dynamic real time manner to the match the calculated illumination time period(s) and/or optical power level(s), to thereby compensate for changes in white levels that would occur from variations in line rate of the third linear array $LA_C$.

Referring now to the exemplary operations of FIGS. 13B3A and 13B3B, the operations in blocks 1301, 1303 and 1315–1321 are analogous to those carried out in FIGS. 13B2A and 13B2B and described above in detail, and thus will be omitted here for the sake of simplicity of description. The operations differ in the approach to image velocity detection as noted above.

More specifically, Blocks 1331 through 1339, which represent an exemplary embodiment of the Image Velocity Detection routine executed by the image processing computer 413'' in accordance with the present invention access the rows of the two composite 2-D images stored in the image buffer A and B and process such rows as follows.

In block 1331, a row in one of the two composite 2-D images (e.g., a row from the first 2D buffer) is selected.

In block 1333, the pixel data values of the selected row is correlated to the pixel data values of a group of rows in the other composite 2-D image (e.g., a group of rows from the second 2D buffer. Preferably, such correlation is performed as a template matching process whereby the selected row from the first 2D image buffer is overlaid onto a given row in the group of rows from the second 2D image buffer, the pixel data values that are overlaid are multiplied together, and the total of such multiplications (the correlation result) is stored for the given row. This template matching process is performed for each row in the group of rows to store a correlation result for each row in the group.

In block 1335, the correlation results produced in block 1333 are analyzed to identify the peak (e.g., maximum correlation value) therein.

In block 1337, an image velocity metric for the selected row is derived from the row offset between the peak (identified in block 1335) and the selected row. For example, an image velocity metric $S_{row}(n)$ for a given row n may be calculated as follows:

$$S_{row}(n) = (\delta/p)/D \text{ where}$$

$\delta$ is the center-to-center spacing between the linear image sensor rows from which corresponding rows are derived (e.g., center-to-center spacing between the linear image sensor $LA_A$ and $LA_B$);

p is the pixel dimensions along the scan direction (given in the same units as $\delta$); and D is the row offset (e.g., number of rows) between the peak and the selected row.

In block 1339, operation returns to the block 1331 to process the next row (and derive an image velocity metric for the next row) unless there are no more rows to process and the operations end.

Note that the image velocity metric for one or more rows (produced in block 1337) is used in block 1317 to calculate the line rate for the third linear array $LA_C$ that compensates for variations in image velocity such that the image capture operations of the third linear array $LA_C$ maintain a constant aspect ratio over the scan lines captured by the third linear array $LA_C$, and the variable line rate of the third linear array $LA_C$ is automatically updated in a dynamic real time manner to the match the calculated line rate, to thereby compensate for distortions produced by image velocity variation. In addition, the variable line rate of the third linear array $LA_C$ (calculated in block 1317) is used in block 1318 to calculate/ update the illumination time period(s) and/or optical power level(s) for the illumination that overlaps the FOV of the third linear array $LA_C$ (and possibly for the illumination that overlaps the FOV of the other linear arrays, e.g., $LA_A$ and $LA_B$) such that the average optical power level of such illumination over the photo-integration time periods of the third linear array $LA_C$ is substantially constant (to provide a uniform white level in the image pixels captured by the third linear array $LA_C$) and does not exceed a recommended maximum level (to avoid saturation of the third linear array $LA_C$).

Each scan line (e.g., row pixel data values in analog form) produced by the third linear array $LA_C$ is output therefrom, converted into digital form, preprocessed and stored in memory (block 1319). Such operations build up a third composite 2-D image C of the target object that has substantially constant aspect ratio and uniform white levels. The third composite 2-D image C is optionally processed (for example, sharpened) by the image processing computer (block 1321), and is saved (or output) for subsequent processing (block 1323). Such processing may involve, for example, outputting the third composite 2-D image C (or processed image) for display, 1D and/or 2D bar code detection operations on the composite 2-D image C (or processed image), and OCR or other imaging operations on the composite 2-D image C (or processed image).

FIGS. 11E(i) and 11E(ii) is a flow chart of an exemplary illumination control mechanism (which is preferably realized as a programmed set of instructions executing on controller 419'' of FIG. 13B1) that controls the white level of the third composite 2-D image in a real time manner to provide a substantially constant white pixel level over varying line rates of the third linear imaging array $LA_C$. Note that such operations are used in conjunction with a VLD modulation scheme (for despeckling) as described above with respect to FIGS. 11A through 11D. In such a modulation scheme, each VLD (of $PLIA_1$ and $PLIA_2$) is operated at multiple optical power levels over corresponding illumination time periods within the integration time period $t_{exposure}$ of the third linear imaging array $LA_C$. For example, each VLD may be operated at two different optical power levels $P_1$ and $P_2$ over corresponding illumination time periods $t_1$ and $t_2$ within the integration time period $t_{exposure}$ of the third linear imaging array $LA_C$ as described above. In this configuration, the illumination control mechanism cooperates with illumination control circuitry 421" to dynamically vary/update the illumination time periods (e.g., illumination timer periods $t_1$ and $t_2$) corresponding to the multiple optical power levels of the VLDs, to thereby control the white level of the third composite 2-D image.

The illumination control mechanism begins operations in block 1101 by initializing the illumination time periods corresponding to the multiple optical power levels of the VLD modulation scheme. In block 1103, the device automatically measures a parameter that characterizes the amount of light that is being collected by the imaging device. Preferably, this parameter is derived from the highest pixel data value (commonly referred to as "white level") of a set of pixel data value rows, in digital form, that are derived from the output of the third linear array $LA_C$ and stored in memory.

In block 1105, it is determined whether the parameter measured in block 1103 is less than a minimum threshold (indicating that too little light is being collected); if so, the operation continues proceeds to block 1107; otherwise, the operation proceeds to block 1113.

In block 1107, it is determined whether the illumination time periods are set to a maximum period (indicating that increasing the illumination time periods would cause the illumination time periods to exceed the integration time period $t_{exposure}$ of the third linear imaging array $LA_C$). If not, the operation continues to block 1109 to increase the illumination time periods for the opticallevels of the VLDs and the operation proceeds to block 1117. If so, the operation continues to block 1111 to reduce the line rate of the third linear imaging array $LA_C$ and the operation proceeds to block 1117.

In block 1113, it is determined whether the parameter measured in block 1103 is greater than a maximum threshold (indicating that too much light is being collected); if so, the operation proceeds to block 1115 to decrease the illumination time periods for the optical levels of the VLDs and the operation proceeds to block 1117.

In block 1117, the line rate of the third linear imaging array $LA_C$ is calculated/updated based upon the estimated image velocity as described herein.

Finally, in block 1119, the illumination time periods for the optical levels of the VLDs are updated in response to the new line rate of the third linear imaging array $LA_C$ (set in block 1119). In the event that the line rate is decreased, the illumination time periods increase; in the event that the line rate is increased, the illumination time periods decrease. The operations then return to block 1103 to repeat the control scheme to provide for automatic adjust the illumination time periods/white level over varying operating conditions.

Note that PLILIM-based systems embodying the "Planar Light Illumination and Linear Imaging" and "image velocity detection and compensation" principles of the present invention as described above with respect to FIGS. 13A1 through 13B3B are well suited for a hand-held scanner (such as the hand-supportable PLILIM-based imaging device shown in FIG. 12A and described herein with the addition of a third linear imaging array integrated into the image capture engine 1202. Moreover, the planar light illumination produced by the PLIAs 1215-1 and 1215-2 produce a composite PLIB that illuminates the fields of view of the three linear image detection arrays. In addition, the system architecture of the hand-supportable imaging device is modified (for example, in accordance with the system architecture of FIG. 13B1) to support the image capture and storage of the composite 2-D image formed by the third linear image array, and the processing for image velocity detection, line rate adjustment of the third linear imaging array, and illumination power adjustment to thereby capture an image at the third linear imaging array with substantially constant aspect ratio and substantially uniform white levels as described herein.

Addition of Height Data to Image Velocity Estimation

The accuracy of the image velocity estimated by the methodologies described herein (and the level of distortion remaining in the "constant aspect ratio" image derived therefrom) is dependent upon the accuracy of the location data for (or the displacement between) the features. In some cases, specifying the location/displacement in a local 2-dimensional coordinate system as described above (which does take into account the height (range) of features) provides satisfactory results. However, in other cases, it is required that the location/displacement of features take into account the height (range) of the feature.

FIGS. 14A1 through 14A4 illustrate the effect of height/range variation during the swiping motion on the composite 2-D image acquired by a PLILIM-based imaging device as described herein. Note that when the target object is tilted at an angle_with respect to the imaging plane, the magnification of the target object in the image varies over the image. In the example shown, the target object is tilted at an angle_with respect to the imaging plane in a manner such that the letter A on the top portion of the surface is located at a height/range value that is greater than the height/range value of the letter A on the bottom portion of the surface as best shown in FIGS. 14A1 and 14A2. This tilt causes the magnification of the letter A on the top portion of the composite 2-D image to be smaller as compared to the magnification of the letter A on the bottom portion of the composite 2-D image as best shown in FIG. 14A3. If such height variations (and resulting magnification variations) are significant, the height/magnification variations can lead to inaccuracies when estimating image velocity without taking into account and compensating for such variations in height/magnification.

FIG. 14A4 is a vector diagram that illustrates the relationship between relative image velocity V and relative image velocity V' for a portion of the image. The relative image velocity V assumes there are no variations in height/range of the object, while the relative image velocity V' compensates for variations in height/range of the object. Note that by geometry the compensated relative image velocity V' can be estimated by multiplying the uncompensated relative image velocity V by the trigonometric function $\sin(\theta)$. If the height/magnification variation is small, the angle $\theta$ is close to 90 degrees (for example, 65 degrees<$\theta$<115 degrees), and the difference between the uncompensated image velocity V and compensated image velocity V' is small (e.g., within about 10% for 65 degrees<$\theta$<115 degrees). In this case, it may not be necessary to compensate for such variations in height/range of the object. In contrast, if the height/magnification variation is large, the angle $\theta$ is significantly less than (or significantly greater than) 90 degrees (for example, 65 degrees>$\theta$>115 degrees), and the difference between the uncompensated image velocity V and compensated image velocity V' is large (e.g., greater than about 10% for 65 degrees>$\theta$<115 degrees). In this case, it is necessary to compensate for such variations in height/range of the object to obtain accurate image velocity estimations. Such compensation is accomplished by estimating the angle θ (by detecting the height/range of the object during the swiping motion) and multiplying the image velocity V by the trigonometric function $\sin(\theta)$ (or by an equivalent expression that estimates the function $\sin(\theta)$).

FIGS. 14A5(1) through 14A5(4) illustrate exemplary methodologies for deriving image velocity V' that compensates for variations in height/range of the object. All of the methodologies estimate the height/range of the object over rows of the image, derive an estimate for angle θ based on such height values, and multiply the uncompensated image velocity V for a given row i by the trigonometric function $\sin(\theta)$ (or by an equivalent expression that estimates the function $\sin(\theta)$) to generate the compensated image velocity V' for the given row i.

In the methodology of FIG. 14A5(1), the angle θ is "global" in nature in that it is assigned to multiple rows of the image. More specifically, the height for a row x near the top of the image is estimated, and the height for a row y near the bottom of the image is estimated. Such height estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. The difference between such height estimates (labeled Δh) and the parameters ds and Nxy are used to estimate the $\sin(\theta)$, where:

ds is distance between rows assuming constant image velocity and given by (p×F), where p is the pixel dimension (same dimension as Δh) along the swipe/scan direction, and F is a magnification factor based on height of row x; and Nxy is the number of rows between row x and row y.

Finally, for each row i between row x and row y, the uncompensated image velocity V for the given row i is multiplied by the global estimate of the $\sin(\theta)$ to generate the compensated image velocity V' for the given row i.

In the methodology of FIG. 14A5(2), the angle θ is "local" in nature in that it is assigned to a single row i. More specifically, the height for the previous row (i−1), the current row (i) and the next row (i+1) are estimated. Such height estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. The difference between such height estimates (labeled Δh) and the parameter ds is used to estimate the $\sin(\theta_i)$, where:

ds is distance between rows assuming constant image velocity and given by (p×F), where p is the pixel dimension (same dimension as Δh) along the swipe/scan direction, and F is a magnification factor based on height of the current row i.

Finally, the uncompensated image velocity V for the given row i is multiplied by the estimate of the $\sin(\theta_i)$ to generate the compensated image velocity V' for the given row i.

In the methodology of FIG. 14A5(3), the angle θ is "local" in nature in that it is assigned to a single row i. More specifically, the height for the previous row (i−1) and the current row (i) are estimated. Such height estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. The difference between such height estimates (labeled Δh) and the parameter ds is used to estimate the $\sin(\theta_i)$, where:

ds is distance between rows assuming constant image velocity and given by (p×F), where p is the pixel dimension (same dimension as Δh) along the swipe/scan direction, and F is a magnification factor based on height of the current row i.

Finally, the uncompensated image velocity V for the given row i is multiplied by the estimate of the $\sin(\theta_i)$ to generate the compensated image velocity V' for the given row i.

In the methodology of FIG. 14A5(4), the angle θ is "local" in nature in that it is assigned to a single row i. More specifically, the height for the current row (i) and next row (i+1) and are estimated. Such height estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. The difference between such height estimates (labeled Δh) and the parameter ds is used to estimate the $\sin(\theta_i)$, where:

ds is distance between rows assuming constant image velocity and given by (p×F), where p is the pixel dimension (same dimension as Δh) along the swipe/scan direction, and F is a magnification factor based on height of the current row i.

Finally, the uncompensated image velocity V for the given row i is multiplied by the estimate of the $\sin(\theta_i)$ to generate the compensated image velocity V' for the given row i.

FIG. 14A6 depicts data structures that may be used in conjunction with any one of the exemplary methodologies described above with respect to FIGS. 14A5(1) through 14A5(4) in deriving the image velocity V' that compensates for variations in height/range of the object. Note that the compensated image velocity V' for a given row i is derived by multiplying the uncompensated image velocity metric V by the estimate of the $\sin(\theta_i)$—which is derived from the height values of rows stored in the Height Data Array.

Having described techniques/mechanisms to derive image velocity V' that compensates for variations in height/range of the object, FIGS. 14A7A through 14A10 are flow charts that embody such image velocity compensation techniques/mechanisms as part of the Aspect Ratio Compensation routines and Image Velocity Detection routines carried out by any one of the PLILIM-based imaging devices described herein.

FIGS. 14A7A and 14A7B set forth a flow chart that depicts such image velocity compensation techniques/mechanisms as part of the Aspect Ratio Routine of FIG. 5A. The operations in blocks 501 through 509, and 513 through 515, are analogous to those carried out in FIG. 5A and described above in detail, and thus will be omitted here for the sake of simplicity of description. The operations differ in the approach to image velocity detection as noted above.

More specifically, in block 510, the height values for the rows of the selected 2D image buffer (e.g., the first 2D image buffer) is estimated. Such height value estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. Such height value estimates may be derived from a height measurement that is synchronous (or nearly synchronous) to the image capture operations of the row image data from which or one or more rows of the first 2D image buffer is derived. In the event that such height value estimates are derived from a height measurement that is synchronous (or nearly synchronous) to the image capture operations of the row image data from which multiple rows (such as the leading row, trailing row, and possibly intermediate rows) of the first 2D image buffer are derived, interpolation operations may be used to estimate the height values over the rows of the first 2D image buffer.

In block 511-1, for the selected 2D image buffer (e.g., the first 2D image buffer), a first image velocity metric is derived for each row (or subrow intervals within each row) of the selected composite 2-D image stored therein. The first image velocity metric for a given row (or subrow interval), which characterizes an "uncompensated" estimate of the velocity of the scanner housing relative to the target object for the given row (or subrow interval), is based upon distance between corresponding features in the list generated in block 509. The distance between corresponding features is given by the distance between locations of corresponding features as discussed above.

In block 511-2, for each row i in the first 2D image buffer, an estimate for angle θ is derived based on such height values produced in step 510, and the uncompensated first image velocity metric produced in step 511-1 for the given row i is multiplied by the trigonometric function sin(θ) (or by an equivalent expression that estimates the function sin(θ)) to generate the second image velocity metric for the given row i, which is compensated for variations in height of the object.

The operation continues to step 513 to transform the image data stored in the selected 2D image buffer based upon the compensated second image velocity metrics produced in step 511-2.

FIGS. 14A8A and 14A8B set forth a flow chart that depicts such image velocity compensation techniques/mechanisms as part of the Aspect Ratio Routine of FIG. 5B. The operations in blocks 501, 503, 531 through 535 and 513 through 515 are analogous to those carried out in FIG. 5B and described above in detail, and thus will be omitted here for the sake of simplicity of description. The operations differ in the approach to image velocity detection as noted above.

More specifically, in block 510, the height values for the rows of the selected 2D image buffer (e.g., the first 2D image buffer) is estimated. Such height value estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. Such height value estimates may be derived from a height measurement that is synchronous (or nearly synchronous) to the image capture operations of the row image data from which or one or more rows of the first 2D image buffer is derived. In the event that such height value estimates are derived from a height measurement that is synchronous (or nearly synchronous) to the image capture operations of the row image data from which multiple rows (such as the leading row, trailing row, and possibly intermediate rows) of the first 2D image buffer are derived, interpolation operations may be used to estimate the height values over the rows of the first 2D image buffer.

In block 537-1, an uncompensated first image velocity metric for the selected row is derived from the row offset between the peak (identified in block 535) and the selected row.

In block 537-2, for the selected row, an estimate for angle θ is derived based on the height values produced in step 510, and the uncompensated first image velocity metric produced in step 537-1 for the selected row is multiplied by the trigonometric function sin(θ) (or by an equivalent expression that estimates the function sin(θ)) to generate the second image, velocity metric for the given row i, which is compensated for variations in height of the object.

The operation continues to step 513 to transform the image data stored in the selected 2D image buffer based upon the compensated second image velocity metrics produced in step 537-2.

FIGS. 14A9A and 14A9B set forth a flow chart that depicts such image velocity compensation techniques/mechanisms as part of the Image Velocity Detection Routine of FIGS. 13B2A and 13B2B. The operations in blocks 1301 through 1309, and 1313 through 1323 are analogous to those carried out in FIGS. 13B2A and 13B2B and described above in detail, and thus will be omitted here for the sake of simplicity of description. The operations differ in the approach to image velocity detection as noted above.

More specifically, in block 1310, the height values for the rows of the selected 2D image buffer (e.g., the first 2D image buffer) is estimated. Such height value estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. Such height value estimates may be derived from a height measurement that is synchronous (or nearly synchronous) to the image capture operations of the row image data from which or one or more rows of the first 2D image buffer is derived. In the event that such height value estimates are derived from a height measurement that is synchronous (or nearly synchronous) to the image capture operations of the row image data from which multiple rows (such as the leading row, trailing row, and possibly intermediate rows) of the first 2D image buffer are derived, interpolation operations may be used to estimate the height values over the rows of the first 2D image buffer.

In block 1311-1, for the selected 2D image buffer (e.g., the first 2D image buffer), a first image velocity metric is derived for each row (or subrow intervals within each row) of the selected composite 2-D image stored therein. The first image velocity metric for a given row (or subrow interval), which characterizes an "uncompensated" estimate of the velocity of the scanner housing relative to the target object for the given row (or subrow interval), is based upon distance between corresponding features in the list generated in block 1309. The distance between corresponding features is given by the distance between locations of corresponding features as discussed above.

In block 1311-2, for each row i in the first 2D image buffer, an estimate for angle θ is derived based on such height values produced in step 1310, and the uncompensated first image velocity metric produced in step 1311-1 for the given row i is multiplied by the trigonometric function sin(θ) (or by an equivalent expression that estimates the function sin(θ)) to generate the second image velocity metric for the given row i, which is compensated for variations in height of the object.

The operation continues to step 1317 wherein the compensated second image velocity metrics for one or more rows (produced in block 1311-2) is used to calculate the line rate for the third linear array $LA_C$ that compensates for variations in image velocity such that the image capture operations of the third linear array $LA_C$ maintain a constant aspect ratio over the scan lines captured by the third linear array $LA_C$, and the variable line rate of the third linear array $LA_C$ is automatically updated in a dynamic real time manner to the match the calculated line rate, to thereby compensate for distortions produced by image velocity variation. In block 1318, the variable line rate of the third linear array $LA_C$ (calculated in block 1317) is used to calculate the illumination time period(s) and/or optical power level(s) for the illumination that overlaps the FOV of the third linear array $LA_C$ (and possibly for the illumination that overlaps the FOV of the other linear arrays, e.g., $LA_A$ and $LA_B$) such that the average optical power level of such illumination over the photo-integration time periods of the third linear array $LA_C$ is substantially constant (to provide a uniform white level in the image pixels captured by the third linear array $LA_C$) and does not exceed a recommended maximum level (to avoid saturation of the third linear array $LA_C$).

FIGS. 14A10A and 14A10B set forth a flow chart that depicts such image velocity compensation techniques/mechanisms as part of the Image Velocity Detection Routine FIGS. 13B3A and 13B3B. The operations inblocks 1301, 1303, 1331, 1333, 1335, 1339 and 1315 through 1323 are analogous to those carried out in FIGS. 13B3A and 13B3B and described above in detail, and thus will be omitted here for the sake of simplicity of description. The operations differ in the approach to image velocity detection as noted above.

More specifically, in block 1336, the height values for the rows of the selected 2D image buffer (e.g., the first 2D image buffer) is estimated. Such height value estimates can be made utilizing any one of a number of well known range finding techniques well known in the non-contact inspection arts. For example, the structured light based techniques and TOF-based techniques described herein can be used, as well as other techniques summarized in "Selected papers on Laser Distance Measurement", Edited by Bosch et al., SPIE Optical Engineering Press, 1995, incorporated by reference above in its entirety. Such height value estimates may be derived from a height measurement that is synchronous (or nearly synchronous) to the image capture operations of the row image data from which or one or more rows of the first 2D image buffer is derived. In the event that such height value estimates are derived from a height measurement that is synchronous (or nearly synchronous) to the image capture operations of the row image data from which multiple rows (such as the leading row, trailing row, and possibly intermediate rows) of the first 2D image buffer are derived, interpolation operations may be used to estimate the height values over the rows of the first 2D image buffer.

In block 1337-1, for the selected 2D image buffer (e.g., the first 2D image buffer), a first image velocity metric is derived for each row (or subrow intervals within each row) of the selected composite 2-D image stored therein. The first image velocity metric for a given row (or subrow interval), which characterizes an "uncompensated" estimate of the velocity of the scanner housing relative to the target object for the given row (or subrow interval), is based upon distance between corresponding features in the list generated in block 1309. The distance between corresponding features is given by the distance between locations of corresponding features as discussed above.

In block 1337-2, for each row i in the first 2D image buffer, an estimate for angle θ is derived based on such height values produced in step 1336, and the uncompensated first image velocity metric produced in step 1337-1 for the given row i is multiplied by the trigonometric function sin(θ) (or by an equivalent expression that estimates the function sin(θ)) to generate the second image velocity metric for the given row i, which is compensated for variations in height of the object.

The operation continues to step 1317 wherein the compensated second image velocity metrics for one or more rows (produced in block 1337-2) is used to calculate the line rate for the third linear array $LA_C$ that compensates for variations in image velocity such that the image capture operations of the third linear array $LA_C$ maintain a constant aspect ratio over the scan lines captured by the third linear array $LA_C$, and the variable line rate of the third linear array $LA_C$ is automatically updated in a dynamic real time manner to the match the calculated line rate, to thereby compensate for distortions produced by image velocity variation. In block 1318, the variable line rate of the third linear array $LA_C$ (calculated in block 1317) is used to calculate the illumination time period(s) and/or optical power level(s) for the illumination that overlaps the FOV of the third linear array $LA_C$ (and possibly for the illumination that overlaps the FOV of the other linear arrays, e.g., $LA_A$ and $LA_B$) such that the average optical power level of such illumination over the photo-integration time periods of the third linear array $LA_C$ is substantially constant (to provide a uniform white level in the image pixels captured by the third linear array $LA_C$) and does not exceed a recommended maximum level (to avoid saturation of the third linear array $LA_C$).

Any one of a number of range finding techniques well known in the non-contact inspection arts may be used to estimate the height of the object. Such techniques are summarized in "Selected papers on Laser Distance Measurement", Edited by Bosch et al., SPIE Optical Engineering Press, 1995, incorporated by reference above in its entirety. An exemplary approach utilizing structured light and a linear imaging detector is illustrated in FIG. 14B1. In this approach, a point source (such as a focused laser beam) is directed into the field of view of the linear imaging detector/focusing optics at a predetermined angle with respect to the optical axis of the linear imaging detector/focusing optics. Utilizing well known triangulation techniques, the height of the object $D_O$ (e.g., the distance between the focusing optics and the object) is proportional to the distance $D_S$ of the detected point source from the geometric center of the linear imaging detector (in pixel space). Alternatively, the point source can be scanned for object profiling as described in U.S. Pat. Nos. 4,627,734 and 4,787,748 to Rioux, herein incorporated by reference in their entirety. In other alternatives utilizing structured light, displacement of a light strip (e.g., produced by a laser light generator) as imaged onto an area array detector is analyzed to derive the height profile of the object.

FIGS. 14B2 and 14B3 depict the range finding approach of FIG. 14B1 as part of the exemplary system architecture for the PLILIM-based imaging device described above with respect to FIGS. 4A. The system components in blocks $403_A$, $403_B$, $404_1$, $404_2$, 405, 407, 409, $411_A$, $411_B$, $411_C$, 415, 417, 419 421, 423 are analogous to those shown in FIG. 4A and described above in detail, and thus will be omitted here for the sake of simplicity of description. In addition, the imaging device includes a VLD, labeled $LS_3$ (471), and focusing optics that produce a focused laser beam that is directed into the field of view (labeled $FOV_D$) of a linear imaging detector $LA_D$ (473)/focusing optics at a predetermined angle with respect to the optical axis of the linear imaging detector $LA_D$/focusing optics as shown. Preferably, the linear imaging detector $LA_D$ is oriented orthogonally with respect to the first and second linear arrays $LA_A$ and $LA_B$, respectively, as shown. The linear imaging array $LA_D$ may be a CCD-type linear image device (for example, the model ILX554B linear CCD image array (2048 imaging elements) available from Sony Electronics. Alternatively, the linear imaging array $LA_D$ may be a CMOS-type linear image device.

As described above, the height of the object (e.g., the distance between the focusing optics and the object) is proportional to the distance $D_S$ of the detected point source from the geometric center of the linear imaging detector $LA_D$ (in pixel space). This height measurement is made by reading out the pixel data values produced by the linear array $LA_D$ (473) in response to timing signals produced by Timing Signal Generation circuitry 405. Such row image data is derived from the energy detected by the imaging elements of the linear imaging array $LA_D$ over an integration time period of the device and is typically read out from the linear image array $LA_D$ in a serial manner. Such row image data is supplied to analog-to-digital conversion circuitry 407, which optionally filters the row data image signal supplied thereto (to remove unwanted noise components) and converts the row image data supplied thereto into digital form. The analog-to-digital conversion circuitry 407 operably cooperates with memory controller 409 to add such row image data (in digital form) into a memory buffer 475 corresponding to the linear imaging array $LA_D$ from which the row image data was derived. The image processing circuitry (e.g., image processing computer 413) includes a "Height Data Generation" routine 477 that accesses the pixel data values (in digital form) stored in buffer 475, and utilizes well known triangulation techniques to derive height data values 479 (which represent the height/range of the object) based upon the distance of the detected laser beam from the geometric center of the linear imaging array $LA_D$ (in pixel space). Such height data values are subsequently stored/accessed in order to derive image velocity that compensates for variations in object distance as described above.

FIGS. 14B4 and 14B5 depict the range finding approach of FIG. 14B1 as part of the exemplary system architecture for the PLILIM-based imaging device described above with respect to FIGS. 13B1. The system components in blocks $403_A"$, $403_B"$, $403_C"$, $404_1"$, $404_2"$, 405", 407", 409", $411_A"$, $411_B"$, 413", 414", 416", 417", 419", 420", 421", 423" and 424" are analogous to those shown in FIG. 13B1 and described above in detail, and thus will be omitted here for the sake of simplicity of description. In addition, the imaging device includes a VLD, labeled LS3 (471"), and focusing optics that produce a focused laser beam that is directed into the field of view (labeled $FOV_D$) of a linear imaging detector $LA_D$ (473")/focusing optics at a predetermined angle with respect to the optical axis of the linear imaging detector $LA_D$/focusing optics as shown. Preferably, the linear imaging detector $LA_D$ is oriented orthogonally with respect to the first, second and third linear arrays $LA_A$, $LA_B$, $LA_C$ respectively, as shown. The linear imaging array $LA_D$ may be a CCD-type linear image device (for example, the model ILX554B linear CCD image array (2048 imaging elements) available from Sony Electronics. Alternatively, the linear imaging array $LA_D$ may be a CMOS-type linear image device.

As described above, the height of the object (e.g., the distance between the focusing optics and the object) is proportional to the distance $D_S$ of the detected point source from the geometric center of the linear imaging detector $LA_D$ (in pixel space). This height measurement is made by reading out the pixel data values produced by the linear array $LA_D$ (473") in response to timing signals produced by Timing Signal Generation circuitry 405". Such row image data is derived from the energy detected by the imaging elements of the linear imaging array $LA_D$ over an integration time period of the device and is typically read out from the linear image array $LA_D$ in a serial manner. Such row image data is supplied to analog-to-digital conversion circuitry 407", which optionally filters the row data image signal supplied thereto (to remove unwanted noise components) and converts the row image data supplied thereto into digital form. The analog-to-digital conversion circuitry 407" operably cooperates with memory controller 409" to add such row image data (in digital form) into a memory buffer 475" corresponding to the linear imaging array $LA_D$ from which the row image data was derived. The image processing circuitry (e.g. image processing computer 413") includes a "Height Data Generation" routine 477" that accesses the pixel data values (in digital form) stored in buffer 475", and utilizes well known triangulation techniques to derive height data values 479" (which represent the height/range of the object) based upon the distance of the detected laser beam from the geometric center of the linear imaging array $LA_D$ (in pixel space). Such height data values are subsequently stored/accessed in order to derive image velocity that compensates for variations in object distance as described above.

An exemplary approach utilizing TOF principles is illustrated in FIG. 14C1. In this approach, a modulated electromagnetic source, which produces a continuous wave (such as an AM modulated wave or FM modulated wave) or pulsed wave of modulated electromagnetic radiation, is directed into the field of view of the imaging device (or proximate thereto). A phase detector receives the scattered electromagnetic radiation produced when the wave returns thereto and detects the phase difference between a reference phase signal (corresponding to the phase of the wave produced at the transmitter) and the phase of the returned scattered wave(s). Such phase difference is proportional to the height (or range) of the object.

FIG. 14C2 depicts the range finding approach of FIG. 14C1 as part of the exemplary system architecture for the PLILIM-based imaging device described above with respect to FIG. 4A. The system components in blocks $403_A$, $403_B$, $404_1$, $404_2$, 405, 407, 409, $411_A$, $411_B$, $411_C$, 415, 417, 419, 421, and 423 are analogous to those shown in FIG. 4A and described above in detail, and thus will be omitted here for the sake of simplicity of description. In addition, the imaging device includes a modulated electromagnetic source 471 which produces a continuous wave (such as an AM modulated wave or FM modulated wave) or pulsed wave of modulated electromagnetic radiation, that is directed into the field of view of the imaging device (or proximate thereto).

A phase detector 493 receives the scattered electromagnetic radiation produced when the wave returns thereto and detects the phase difference between a reference phase signal (corresponding to the phase of the wave produced at the transmitter) and the phase of the returned scattered wave(s).

As described above, the phase difference detected by the phase detector is proportional to the height (or range) of the object. A height data signal derived from the detected phase difference is output from the phase detector and supplied to analog-to-digital conversion circuitry 407, which optionally filters the signal supplied thereto (to remove unwanted noise components) and converts the height data supplied thereto into digital form. The analog-to-digital conversion circuitry 407 operably cooperates with memory controller 409 to add such height data (in digital form) into a memory buffer 495. Such height data values are subsequently accessed in order to derive image velocity that compensates for variations in object distance as described above.

FIG. 14C3 depicts the range finding approach of FIG. 14C1 as part of the exemplary system architecture for the PLILIM-based imaging device described above with respect to FIG. 13B1. The system components in blocks $403_A''$, $403_B''$, $403_C''$, $404_1''$, $404_2''$, $405''$, $407''$, $409''$, $411_A''$, $411_B''$, 413", 414", 416", 417", 419", 420", 421", 423" and 424" are analogous to those shown in FIG. 13B1 and described above in detail, and thus will be omitted here for the sake of simplicity of description. In addition, the imaging device includes a modulated electromagnetic source 471" which produces a continuous wave (such as an AM modulated wave or FM modulated wave) or pulsed wave of modulated electromagnetic radiation, that is directed into the field of view of the imaging device (or proximate thereto). A phase detector 493" receives the scattered electromagnetic radiation produced when the wave returns thereto and detects the phase difference between a reference phase signal (corresponding to the phase of the wave produced at the transmitter) and the phase of the returned scattered wave(s).

As described above, the phase difference detected by the phase detector 493" is proportional to the height (or range) of the object. A height data signal derived from this detected phase difference is output from the phase detector 493" and supplied to analog-to-digital conversion circuitry 407", which optionally filters the signal supplied thereto (to remove unwanted noise components) and converts the height data supplied thereto into digital form. The analog-to-digital conversion circuitry 407" operably cooperates with memory controller 409" to add such height data (in digital form) into a memory buffer 495. Such height data values are subsequently accessed in order to derive image velocity that compensates for variations in object distance as described above.

Note that PLILIM-based imaging techniques and system architectures embodying "Planar Light Illumination and Linear Imaging" and "image velocity detection that compensates for variations in object height/range" techniques/mechanisms as described above with respect to FIGS. 14A1 through 14C3 are well suited for a hand-held scanner. In such devices, the image capture and image processing techniques/system architectures described above with respect to FIGS. 14A1 through 14C3 are embodied in an image capture module and image processing platform that are disposed within a hand-holdable system housing (for example, as shown in FIG. 12A).

Jitter Compensation

Another source of distortion in the images captured by the PLILIM-based imaging devices described herein is motion of the object relative to device in a direction transverse to the intended swipe direction (in other words, in a direction parallel to the longitudinal axis that runs along the imaging elements of each linear imaging array of the device). Such transverse motion is referred to herein as "transverse jitter" or "horizontal jitter". FIG. 15A illustrates the distortion causes by such horizontal jitter. If such horizontal jitter is significant, the resulting image distortions can degrade the quality of the images captured by the device and lead to errors/inaccuracies in subsequent image analysis operations (such as bar code symbol detections operations and/or OCR operations) performed on these images.

In accordance with the present invention, the plurality of linear imaging arrays (e.g., first and second linear imaging arrays) of a PLILIM-based imaging module as described herein are used to simultaneously build up multiple composite 2-D images of the target object. Image processing circuitry (which may be realized by one or more programmed computer processing modules, such as a microprocessor, digital signal processor or other image processing engine) accesses and processes the multiple 2D images stored in buffer memory to: i) derive estimates of horizontal jitter of the imaging device relative to the target object(s) during image capture operations (e.g., a swipe of the imaging device relative to the target object(s)), as shown in FIG. 15B; ii) derive an image of such object(s) with substantially uniform aspect ratio and white level (by transforming a select one of the multiple composite 2-D images based upon estimated image velocity, or by controlling the line rate of another linear imaging array (e.g., third linear imaging array) in addition to the output power of illumination, as described herein in great detail; and iii) transform the resultant image (which has substantially uniform aspect ratio and white level) utilizing shift operations (which may be pixel or sub-pixel shift operations) based upon the horizontal jitter estimates, to thereby generate a 2D image that compensates for the estimated horizontal jitter of the imaging device relative to the target object(s), as shown in FIG. 15C.

FIG. 15D illustrates an exemplary system architecture for a PLILIM-based imaging device that carries out such horizontal jitter estimation and compensation. Preferably, the device is also capable of performing bar code detection operations and image lift operations suitable for OCR and other imaging applications. Note that the device employs PLILIM-based illumination and image capture methods (and apparatus) of the present invention as discussed above with respect to FIGS. 2A–2G3 and FIG. 3; yet the details of such methods and apparatus are omitted from FIG. 15D for the sake of simplicity of illustration and description.

As shown therein, the PLILIM-based imaging device 1500 includes a plurality of linear imaging arrays (for example, two shown as Linear Array A (1506-A) and Linear Array B (1506-B)) that cooperate with image formation optics (not shown) to image substantially planar field of views (FOVs) that are displaced (offset) from one another along the direction of intended motion of the target object relative to the system housing. The linear imaging arrays may be CCD-type linear image devices (for example, the model ILX554B linear CCD image array (2048 imaging elements) available from Sony Electronics. Alternatively, the linear imaging arrays may be CMOS-type linear image devices. A pair of planar light illumination arrays ($PLIA_1$ (1515-1) and $PLIA_2$ (1515-2) project planar light illumination that substantially overlaps (and may encompasses and extends beyond) the FOVs of the plurality of linear image detectors (e.g., Linear Array A and Linear Array B) along a substantial portion of the range of working distances of the device, while images of the illuminated target object are formed on and detected by the plurality of linear imaging arrays (Linear Array A and Linear Array B). Timing Signal Generation circuitry 1505 supplies timing signals to the linear imaging arrays in order to read out the row image data produced by such devices. Such row image data is derived from the energy detected by the imaging elements of the linear imaging arrays over an integration time period of such devices and is typically read out from the linear image arrays in a serial manner. Such row image data is supplied to analog-to-digital conversion circuitry 1507, which optionally filters the row data image signal supplied thereto (to remove unwanted noise components) and converts the row image data supplied thereto into digital form. The analog-to-digital conversion circuitry 1507 operably cooperates with memory controller 1509 to add such row image data (in digital form) into memory buffers corresponding to the linear imaging array from which the row image data was derived.

Such operations build up and store in given memory buffer a composite 2-D image (in digital form) derived from the row image data output from the corresponding to linear imaging array. In this manner, memory buffer 1511A stores a composite 2-D image (in digital form) derived from the row image data output from the linear imaging array A, and memory buffer 1511B stores a composite 2-D image (in digital form) derived from the row image data output from the linear imaging array B. As shown, the memory buffers that store the composite 2-D images are preferably realized as allocated portions (e.g., address space) in one or more memory modules (one shown) 1512, which may be SDRAM, SRAM or other types of memory; however, alternative data buffering designs (such as dedicated data buffer/cache modules) can be used.

As described above in detail, if the velocity of relative motion between the target object and system housing varies during the time that the composite 2-D images are being built up, then different regions of the composite 2-D images will have different aspect ratios. An image processing computer 1513 (which is preferably realized using a digital signal processor as shown) executes a set of programmed instructions 1515 (labeled "Aspect Ratio Compensation") that access the multiple composite 2-D images stored in the image buffers (1511A and 1511B) and perform image processing operations utilizing such composite 2-D images that estimate the variations in the velocity of such relative motion and generate reconstructed images (corresponding to the multiple composite 2-D images) that compensate for such estimated velocity variations (i.e., has a more uniform aspect ratio). The image processing computer 1513 stores the reconstructed images in memory buffers 1511C1 and 1511C2, respectively, for subsequent processing. As shown, the memory buffers 1511C1 and 1511C2 that store the multiple reconstructed images are preferably realized as allocated portions (e.g., address space) in memory module(s) 1512, which may be SDRAM, SRAM or other types of memory; however, alternative data buffering designs (such as dedicated data buffer/cache modules) can be used.

In addition, the image processing computer 1513 executes a set of programmed instructions 1581 (labeled "Jitter Estimation") that access the reconstructed images stored in the image buffers 1511C1 and 1511C2, respectively, and performs image processing operations utilizing such reconstructed images to estimate horizontal jitter (in the relative motion between the device and the target object(s)) for rows of a select one of the reconstructed images. The image processing computer 1513 also executes a set of programmed instructions 1583 (labeled "Jitter Compensation") that transforms the select one reconstructed image (which has substantially uniform aspect ratio) utilizing shift operations (which may be pixel or sub-pixel shift operations) based upon the horizontal jitter estimates generated by the Jitter Estimation routine 1581, to thereby generate a 2D image that compensates for the estimated horizontal jitter of the imaging device relative to the object(s) being imaged. The image processing computer 1513 stores the resultant image (which is generated by the Jitter Compensation Routine 1583, an example of which is shown in as shown in FIG. 15C) in memory buffer 1585 for subsequent processing. As shown, the memory buffer 1585 that stores the resultant image is preferably realized as allocated portions (e.g., address space) in memory module(s) 1512; however, alternative data buffering designs (such as dedicated data buffer/cache modules) can be used.

In addition, the image processing computer 1513 preferably executes a set of programmed instructions 1517 (labeled "Bar Code Detection") that accesses one or more of the composite 2-D images stored in the memory buffers (1511A, 1511B), one or more of the reconstructed images stored in the memory buffers (1511C1, 1511C2) and/or the resultant image stored in memory buffer 1585 and carries out image-based bar code symbol detection and decoding operations on such image(s). These imaging processing operations preferably detect and decode one-dimensional bar code symbols (and possibly two-dimensional bar code symbols) within the image and generate symbol character data representative thereof. Moreover, such imaging processing operations preferably carry out image-based omni-directional bar code detection and decoding whereby bar code symbol(s) at varying spatial orientation within the image are detected and decoded. For example, such image-based bar code symbol detection and decoding operations can be realized with SwiftDecode™ Bar Code Decode software, available from Omniplanar, Inc. of Princeton, N.J. (http://www.omniplanar.com). The image processing computer 1513 may also execute additional image processing routines that carry out OCR operations, handwriting/signature recognition operations or other imaging operations.

The programmed set of instructions which carry out the image processing operations as described above (labeled "Aspect Ratio Compensation", "Jitter Estimation", "Jitter Compensation" and "Bar Code Detection") are typically written in a high-level programming language (i.e., a programming language readable by those skill in the art, such as the "C" programming language) and compiled by a software tool (called a compiler) into a set of instructions that are suitable for execution by the image processing computer 1513. The compiled set of instructions together with a system control program (e.g., a real-time operating system) are then stored in non-volatile memory (not shown) of the device 1500 for access and execution by the image processing computer 1513 as described above.

Bar code symbol character data (generated via execution of the Bar Code Detection routine on the image processing computer 1513) is transferred, under control of controller 1519, to communication interface circuitry 1523, which communicates the bar code symbol character data to a host system over a communication link there between, which, for example, may be a wireless data link (such as an infra-red link, Bluetooth RF link, IEEE802.11a RF link or IEEE 802.11b RF link) or wired serial data link (such as keyboard wedge link—for example supporting XT-, AT- and PS/2- style keyboard protocols, an RS-232 link, USB link, a Firewire (or IEEE 1394) link, an RS-422 link, RS-485 link, or Ethernet link), a wired parallel data bus, or other common wired interface links (such as an OCIA link, an IBM 46XX link, a Light Pen Emulation link, a LTPN link)).

In addition, the resultant image (generated via execution of the Jitter Compensation routine on the image processing computer 1513) is preferably transferred, under control of controller 1519, to communication interface circuitry 1523, which communicates the resultant image to a host system over the communication link there between. Alternatively, the resultant image can be compressed (for example, into a TIFF, GIFF, JPEG compressed format) and the resultant image (in compressed form) can be transferred, under control of controller 1519, to the communication interface circuitry 1523, which communicates the resultant image (in compressed form) to a host system over the communication link there between. Such compression can be performed, for example, by the image processing computer 1513, controller 1519, or circuitry in the communication interface circuitry 1523. In this illustrative configuration, the host system receives the resultant image (or decompresses its compressed form) and performs image processing operations that carry out OCR of textual symbologies (and possibly other symbologies) on the reconstructed image, thereby outputting a text-based document that is suitable for editing by a standard word processing/text editing program.

A system bus 1518 (which may be a simple bus structure has shown, or alternatively may be more complicated and hierarchical in nature) provides the data/signal paths over which the memory controller 1509, memory module(s) 1512, image processing computer 1513 and controller 1519 communicate. The controller 1519 (which performs system control operations for the device 1500) interfaces to illumination control circuitry 1521, which operates (under control of controller 1519) to provide power (e.g., current) to the illumination sources (e.g., VLDs or LEDs) of $PLIA_1$ (1515-1) and $PLIA_2$ (1515-2) during planar light illumination and image capture operations. In the event that coherent laser illumination sources (e.g., VLDs) are used to illuminate the FOVs of the linear imaging arrays, the current levels provided to such laser illumination sources are preferably modulated in manner that reduces the temporal coherence of the planar laser illumination as described above in great detail, which advantageously reduces the RMS power of the speckle noise detected by the PLILIM-based illumination and image capture module. Moreover, the device 1500 may employ mechanical means (i.e., oscillating optical elements) that reduces the spatial coherence of the planar laser illumination as set forth below, which advantageously reduces the RMS power of the speckle noise detected by the PLILIM-based illumination and image capture module. In this configuration, the controller 1519 preferably controls operation of such mechanical means. In addition, as described above, the image formation optics may include focus control mechanisms and/or zoom-control mechanisms embodied therein. In this configuration, the controller 1519 preferably performs camera control operations that cooperate with such mechanisms to adjust the focus and/or zoom of the image formation optics.

The controller 1519 also interfaces to I/O interface circuitry 1525, which may provide drive signals to an audio-transducer and/or LED-based status visual indicators (labeled "Status LEDs") used to signal successful symbol reading operations to users and the like, and may provide user input via interaction with a keypad, buttons or switches (such as a "Data Communication Switch") as shown. In addition, the I/O interface circuitry 1525 may also provide for interfacing with a plurality of other accessory devices (such a display device).

The controller 1519 also operates the device 1500 in accordance with a system control architecture (or scheme). In general, there are various system control architectures that can be embodied by the controller 1519. For example, the PLILIM-based illumination and image capture and subsequent image-based bar code symbol detection/decoding and communication of bar code symbol character data to the host system may occur automatically (without the need for human interaction to activate such operations). Alternatively, the PLILIM-based illumination and image capture and subsequent image-based bar code symbol detection/decoding may occur automatically (without the need for human interaction to activate such operation) and the communication to the host system of the symbol data corresponding thereto may be activated by a manually-activated data transmission switch as described in detail in co-pending U.S. patent application Ser. No. 09/204,176 filed Dec. 3, 1998 and co-pending U.S. patent application Ser. No. 09/452,976 filed Dec. 2, 1999; incorporated by reference above in their entirety. In another alternative, the PLILIM-based illumination and image capture and subsequent image-based bar code symbol detection/decoding and communication of bar code symbol character data to the host system may be activated by a manual trigger switch or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798; 5,484,992; 5,468,951; 5,425,525; 5,240,971; 5,340,973; 5,260,553; incorporated herein by reference.

The image processing computer 1513 may utilize one or more digital signal processing engines/cores and cache memory that stores (e.g. buffers) instructions/data and provides low latency access to such instructions/data when requested by the processing engine(s). A digital signal processing engine (or like device) is preferable because such devices have low power requirements, high performance levels in image processing applications (because of the microarchitecture employed therein), and low cost.

Preferably, the functionality of the controller 1519 and image processing computer 1519 (and possibly the memory controller 1509, I/O interface circuitry 1525 and/or communication interface circuitry 1523) are embodied in a single integrated circuit (typically referred to as a "System on a Chip"). An example of such an integrated circuit is the Intel PXA250 applications processor, which includes a high performance microprocessor that is capable of performing the duties of the imaging processing computer 1513 and controller 1519 as described above along with integrated memory controller (e.g., SDRAM Control/SDRAM Control/DMA Control), integrated I/O interface circuitry (LCD interface, $I^2S$ interface, $I^2C$ interface) and integrated communication interface circuitry (IRDA interface, UART interfaces, Bluetooth Interface, USB client interface). In addition, it is preferable that controller 1519 (and possibly image processing computer 1513) embody features commonly found in modern RISC microprocessors, including advanced power management circuitry (which typically operate to temporarily shut down/disable elements of the microprocessor that are being used), pipelined execution stages, speculative instruction execution and speculative data prefetching (which requires branch prediction mechanisms), and out-of-order instruction execution. Many of these features are embodied in the Intel PXA250 applications processor. In addition, the functionality of the timing signal generator 1505, possibly some of the functionality of the memory controller 1509 (such as buffering data produced by the analog-to-digital conversion circuitry 1507 and/or memory access/DMA control), and possibly some of the image processing operations described herein as part of the Aspect Ratio Compensation Routine (such as edge detection as described below), Jitter Estimation Routine, Jitter Compensation Routine, Bar Code Detection Routine, or other image processing operations may be embodied in dedicated hardware, such as one or more programmable gate arrays (e.g., e.g., Spartan II line of FPGAs available from Xilinx Inc. of San Jose, Calif.), one or more programmable logic devices (e.g., CPLD line available from Xilinx Inc. of San Jose, Calif.), and/or one or more ASICs.

FIGS. 15E(i)–15E(ii) and 15F(i)–15F(ii) are flow charts illustrating two different exemplary methodologies carried out by the PLILIM-based imaging device of FIG. 15D in accordance with the present invention. In the methodology of FIGS. 15E(i)–15E(ii), horizontal jitter is derived from correlation of corresponding (i.e., matching) rows in the two reconstructed imaged stored in the buffer memories 1511C1 and 1511C2, respectively. And in the methodology of FIGS. 15F(i)–15F(ii), horizontal jitter is derived from analysis of a difference image (which is based upon pixel by pixel difference between the two reconstructed imaged stored in the buffer memories 1511C1 and 1511C2, respectively).

Referring now to the exemplary operations of FIGS. 15E(i)–15E(ii), in blocks 1551 and 1553, planar light illumination (e.g., a composite planar light illumination beam provided by $PLIA_1$ and $PLIA_2$) is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to $LA_A$ and $LA_B$, respectively). Such operations are repeated over successive rows (e.g., lines) to form the multiple composite 2-D images in the image buffers 1511A and 1511B, respectively.

Blocks 1555 through 1559, which represent an exemplary embodiment of the Aspect Ratio Compensation routine 1515 executed by image processing computer 1513 in accordance with the present invention, access the multiple composite 2-D images stored in the image buffers 1511A and 1511B, and process such composite 2-D images to: i) estimate variations in the velocity of relative motion between the device and target object during image capture operation, and ii) transform the multiple composite 2-D images (utilizing the estimated velocity variations) to form reconstructed images (corresponding to the composite 2-D images) that compensate for such estimated variations (i.e., has a more uniform aspect ratio). The reconstructed images are stored in memory (e.g., first and second buffer memories 1511C1 and 1511C2) for subsequent processing.

In block 1555, the multiple composite 2-D images stored in the image buffers 1511A and 1511B are analyzed (e.g., processed) to derive an estimate of the relative velocity between the imaging device and target object(s) over the rows (or sub-row intervals) of a select one of the composite 2-D images (e.g., the first 2D image stored in image buffer 1511A). Any of the image velocity detection techniques/mechanisms described herein (including the feature-based image velocity detection techniques/mechanisms, correlation-based image velocity detection techniques/mechanisms or optical-flow based image velocity detection techniques/mechanisms described herein) may be used to derive an estimate of the relative velocity between the imaging device and target object.

In block 1557, the selected composite 2-D image is transformed (utilizing copy, compression and expansion operations that are based upon the relative image velocity estimates assigned to the rows (or subrow intervals) of the selected composite 2-D image in block 1555) to generate a first reconstructed image that compensates for variations in image velocity (as provided by the relative image velocity estimates). Exemplary image processing operations that perform transform operations (such as copy, compression and expansion) sequentially over portions of the selected composite 2-D image to build up corresponding portions of the first reconstructed image is described above with respect to FIGS. 7A–7C. The first reconstructed image is then stored in first buffer memory 1511C1 for subsequent processing.

In block 1559, the other composite 2-D image is transformed (utilizing analogous copy, compression and expansion operations that are performed on corresponding image data of the selected composite 2-D image in block 1557) to generate a second reconstructed image that compensates for variations in image velocity (as provided by the relative image velocity estimates). The correspondence between rows of image data in the two reconstructed images is dictated by the physical separation of the two linear imaging arrays and the dimension of the pixel element dimension (of the two linear imaging arrays) along the scan direction. For example, consider the case where the pixel dimension in the scan direction is 14 μm and the two linear imaging arrays are separated by 112 μm. In this case, the sensor rows are separated by 8 pixel dimensions and the corresponding rows in the first and second reconstructed images are offset (leading or trailing) by 8 rows. Exemplary image processing operations that perform transform operations (such as copy, compression and expansion) sequentially over portions of the other composite 2-D image to build up corresponding portions of the second reconstructed image is described above with respect to FIGS. 7A–7C. The second reconstructed image is then stored in second buffer memory 1511C2 for subsequent processing.

Blocks 1561 through 1569, which represent an exemplary embodiment of the Jitter Estimation routine 1581 executed by image processing computer 1513 in accordance with the present invention, accesses the reconstructed images generated and stored in the image buffers 1511C1 and 1511C2, respectively (in blocks 1557 and 1559) and performs cross-correlation operations on such reconstructed images to estimate horizontal jitter (in the relative motion between the device and the target object(s)) for rows of a select one of the reconstructed images.

In block 1561, a row in the first image buffer 1511C1 is selected.

In block 1563, a set of pixel data values of the row selected in block 1561 is correlated with the pixel data values of the corresponding (e.g., matching) row in the second image buffer 1511C2. As described above, correspondence between rows of image data in the two reconstructed images is dictated by the physical separation of the two linear imaging arrays and the dimension of the pixel element dimension (of the two linear imaging arrays) along the scan direction. Preferably, such correlation is performed as a template matching process whereby a set of pixel data values of the selected row from the first buffer memory 1511C1 is overlaid onto the corresponding row in the second buffer memory 1511C2 starting a given column index, the pixel data values that are overlaid are multiplied together, and the total of such multiplications (the correlation result) is stored for the given column index. This template matching process is performed for multiple column indices (or multiple sub-pixel column indices) in the corresponding row to generate and store a correlation result for each column index (or sub-pixel column index) in the group.

In block 1565, the correlation results produced in block 1563 are analyzed to identify the peak (e.g., maximum correlation value) therein.

In block 1567, a horizontal jitter estimate for the selected row is derived from the offset between the column index (or sub-pixel column index) of the peak (identified in block 1565) and the column index (or sub-pixel column index) of the set of pixels in the row selected in block 1561. For example, a horizontal jitter estimate $H_{row}(n)$ for a given row n may be calculated as follows:

$$H_{row}(n) = Col_p - Col_s$$

where $Col_p$ is the column index (or sub-pixel column index) of the peak (identified in block 1565), and $Col_s$ is the column index (or sub-pixel column index) of the set of pixels in the row selected in block 1561.

In block 1569, the operations return back to block 1561 to select and process another row in the first buffer memory, unless no more rows exist and the operations continue to block 1571.

Block 1571, which represents an exemplary embodiment of the Jitter Compensation Routine 1583 executed by image processing computer 1513 in accordance with the present invention, accesses a select one of the reconstructed images (which are generated and stored in the image buffers 1511C1 and 1511C2, respectively in blocks 1557 and 1559) and transforms the select one reconstructed image utilizing shift operations (which may be pixel or sub-pixel shift operations) based upon the horizontal jitter estimates generated in block 1567, to thereby generate a 2D image that compensates for the estimated horizontal jitter of the imaging device relative to the target object(s). The image processing computer 1513 stores the resultant image (which is generated by the Jitter Compensation Routine 1583, an example of which is shown in as shown in FIG. 15C) in memory buffer 1585 for subsequent processing. For example, if the horizontal jitter estimate for a given row in the select one reconstructed image indicates that the given row is shifted left by 4 full pixel dimensions, the given row is shifted right by 4 full pixel dimensions in block 1571. In another example, if the horizontal jitter estimate for a given row in the select one reconstructed image indicates the given row is shifted right by 8 full pixel dimensions, the given row is shifted left by 8 full pixel dimensions in block 1571. In yet another example, if the horizontal jitter estimate for a given row in the select one reconstructed image indicates the given row is not shifted (shifted by 0 full pixel dimensions), shifting the given row is skipped. In other examples, the rows of the select one reconstructed image may be shifted left or right by sub-pixel shift operations (e.g., where the pixel data value for a given pixel in the resultant image is contributed by the pixel data values of neighboring pixels in the select one reconstructed image based upon sub-pixel displacement dictated by the sub-pixel shift operation).

In block 1573, the resultant image produced by the Jitter Compensation Routine 1583 is optionally sharpened (which increases the visibility of image structures with high spatial frequencies such as details, edges, fine textures). An example of image sharpening operations suitable for use in block 1573 is described above with respect to FIG. 7D.

Finally, in block 1575, the resultant image produced in bock 1571 (or sharpened resultant image produced in block 1573) is output and saved (for example, in image buffer 1585) for subsequent processing (e.g., output data for display, 1D and/or 2D bar code sensing on data derived therefore, and/or OCR on data derived there from).

Referring now to the exemplary operations of FIGS. 15F(i)–15F(ii), in blocks 1551 and 1553, planar light illumination (e.g., a composite planar light illumination beam provided by $PLIA_1$ and $PLIA_2$) is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to $LA_A$ and $LA_B$, respectively). Such operations are repeated over successive rows (e.g., lines) to form the multiple composite 2-D images in the image buffers 1511A and 1511B, respectively.

Blocks 1555 through 1559, which represent an exemplary embodiment of the Aspect Ratio Compensation routine 1515 executed by image processing computer 1513 in accordance with the present invention, access the multiple composite 2-D images stored in the image buffers 1511A and 1511B and process such composite 2-D images to: i) estimate variations in the velocity of relative motion between the device and target object(s) during image capture operation, and ii) transform the multiple composite 2-D images (utilizing the estimated velocity variations) to form reconstructed images (corresponding to the composite 2-D images) that compensate for such estimated variations (i.e., has a more uniform aspect ratio). The reconstructed images are stored in memory (e.g., first and second buffer memories 1511C1 and 1511C2) for subsequent processing. Details of such operations are described above with respect to FIGS. 15E(i) and 15E(ii).

Blocks 1591 through 1598, which represent an alternate embodiment of the Jitter Estimation routine 1581' executed by image processing computer 1513 in accordance with the present invention, accesses the reconstructed images generated and stored in the image buffers 1511C1 and 1511C2, respectively (in blocks 1557 and 1559); calculates a difference image—pixel by pixel difference between such reconstructed images; and performs image processing operations on the difference image to estimate horizontal jitter (in the relative motion between the device and the target object(s)) for rows of the difference image.

In block 1591, the difference image is generated by calculating, on a pixel by pixel basis, the difference between the two reconstructed images.

In block 1592, the difference values are scaled (e.g., normalized) into a predetermined range of integer values (such as between 0 and 255).

In block 1593, the scaled difference values produced in block 1592 are binarized whereby: if a given scaled difference value is above a threshold level, the corresponding pixel is set to a white level; yet, if the given scaled difference value is below a threshold level, the corresponding pixel is set to black level.

In block 1594, a row of pixel values generated in block 1593 (e.g., binarized scaled difference values) is selected.

In block 1595, the row is analyzed to identify regions (which comprise one or more consecutive white pixels that are surrounded by black pixels) in the selected row in addition to the number of white pixels in each region. For example, consider the row of binarized scaled difference values shown in FIG. 15G. This row has 5 regions. Region 1 has 2 white pixels. Region 2 has 3 white pixels. Region 3 has 2 white pixels. Region 4 has 2 white pixels. And Region 5 has 1 white pixel.

In block 1596, the mean value of the selected row (which is the average number of white pixels over the regions of the selected row) and/or the mode value of the selected row (which is the number of white pixels with most occurrences over the regions of the selected row) is calculated. In the example shown in FIG. 15G, the mean value of the row is (2+3+2+2+1)/5=2 and the mode value of th row is 2.

In block 1597, a horizontal jitter estimate for the selected row is derived from the mean value and/or mode value of the selected row as calculated in block 1596.

In block 1598, the operations return back to block 1594 to select and process another row of binarized scaled difference values, unless no more rows exist and the operations continue to block 1571.

In Block 1571, which represents an exemplary embodiment of the Jitter Compensation routine 1583 executed by image processing computer 1513 in accordance with the present invention, a select one of the reconstructed images (which are generated and stored in the image buffers 1511C1 and 1511C2, respectively in blocks 1557 and 1559) is accessed and transformed utilizing shift operations (which may be pixel or sub-pixel shift operations) based upon the horizontal jitter estimates generated in block 1597, to thereby generate a 2D image that compensates for the estimated horizontal jitter of the imaging device relative to the target object(s). The image processing computer 1513 stores the resultant image (which is generated by the Jitter Compensation Routine 1583, an example of which is shown in as shown in FIG. 15C) in memory buffer 1585 for subsequent processing. For example, if the horizontal jitter estimate for a given row in the select one reconstructed image indicates that the given row is shifted left by 4 full pixel dimensions, the given row is shifted right by 4 full pixel dimensions in block 1571. In another example, if the horizontal jitter estimate for a given row in the select one reconstructed image indicates the given row is shifted right by 8 full pixel dimensions, the given row is shifted left by 8 full pixel dimensions in block 1571. In yet another example, if the horizontal jitter estimate for a given row in the select one reconstructed image indicates the given row is not shifted (shifted by 0 full pixel dimensions), shifting the given row is skipped. In other examples, the rows of the select one reconstructed image may be shifted left or right by sub-pixel shift operations (e.g., where the pixel data value for a given pixel in the resultant image is contributed by the pixel data values of neighboring pixels in the select one reconstructed image based upon sub pixel displacement dictated by the sub-pixel shift operation).

In block 1573, the resultant image (produced by the Jitter Compensation Routine 1583) is optionally sharpened (which increases the visibility of image structures with high spatial frequencies such as details, edges, fine textures). An example of image sharpening operations suitable for use in block 1573 is described above with respect to FIG. 7D.

Finally, in block 1575, the resultant image produced in block 1571 (or sharpened resultant image produced in block 1573) is output and saved (for example, in image buffer 1585) for subsequent processing (e.g., output data for display, 1D and/or 2D bar code sensing on data derived therefore, and/or OCR on data derived there from).

FIG. 15H illustrates an alternative system architecture for a PLILIM-based imaging device that carries out such horizontal jitter estimation and compensation. Preferably, the device is also capable of performing bar code detection operations and image lift operations suitable for OCR and other imaging applications. Note that the device employs PLILIM-based illumination and image capture methods (and apparatus) of the present invention as discussed above with respect to FIGS. 13A1–13A4; yet the details of such methods and apparatus are omitted from FIG. 15H for the sake of simplicity of illustration and description.

As shown therein, the PLILIM-based imaging device 1500' includes three or more linear imaging arrays (for example, three shown as Linear Array A (1506-A'), Linear Array B (1506-B') and Linear Array C (1506-C')) that cooperate with image formation optics (not shown) to image substantially planar field of views (FOVs) that are displaced (offset) from one another along the direction of intended motion of the target object relative to the system housing. The linear imaging arrays may be CCD-type linear image devices (for example, the model ILX554B linear CCD image array (2048 imaging elements) available from Sony Electronics. Alternatively, the linear imaging arrays may be CMOS-type linear image devices. A pair of planar light illumination arrays (PLIA$_1$ (1515-1') and PLIA$_2$ (1515-2')) project planar light illumination that substantially overlaps (and may encompasses and extends beyond) the FOVs of the plurality of linear image detectors (e.g., Linear Array A (1506-A'), Linear Array B (1506-B') and Linear Array C (1506-C')) along a substantial portion of the range of working distances of the device, while images of the illuminated target object are formed on and detected by the plurality of linear imaging arrays. Timing Signal Generation circuitry 1505' supplies timing signals to the linear imaging arrays in order to read out the row image data produced by such devices. Such row image data is derived from the energy detected by the imaging elements of the linear imaging arrays over an integration time period of such devices and is typically read out from the linear image arrays in a serial manner. The timing signals supplied to Linear Array A (1506-A') and Linear Array B (1506-B') control the two linear arrays to read out the row image data produced by such devices at a substantially constant line rate over the image capture operations that build ups the first and second composite 2-D images as described herein. However, the timing signals supplied to Linear Array C (1506-C') controls the Linear Array C to read out the row image data produced by such device at a variable line rate over the image capture operations that build ups the third composite 2-D image as described herein. The variable line rate for linear array C (as controlled by the timing signals supplied thereto) is adjusted to compensate for variations in image velocity such that the image capture operations of linear array C maintain a constant aspect ratio over the scan lines captured by linear array C in building up the third composite 2-D image. In addition, the optical power of illumination that overlaps the FOV of linear imaging array C (1206-C') (and possibly the optical power level of illumination that overlaps the FOV of the other linear arrays, e.g., linear arrays A and B) is controlled by illumination control circuitry such that the average optical power level of such illumination over the photo-integration time periods of linear array C is substantially constant (to provide a uniform white level in the image pixels captured by the linear imaging array C) and does not exceed a recommended maximum level (to avoid saturation of linear array C).

The row image data produced by the plurality of linear imaging arrays (e.g., Linear Array A, Linear Array B and Linear Array C) is supplied to analog-to-digital conversion circuitry 1507', which optionally filters the row data image signal supplied thereto (to remove unwanted noise components) and converts the row image data supplied thereto into digital form. The analog-to-digital conversion circuitry 1507' operably cooperates with memory controller 1509' to add such row image data (in digital form) into memory buffers corresponding to the linear imaging array from which the row image data was derived.

Such operations build up and store in given memory buffer a composite 2-D image (in digital form) derived from the row image data output from the corresponding to linear imaging array. In this manner, memory buffer 1511A' stores a composite 2-D image (in digital form) derived from the row image data output from the linear imaging array A, memory buffer 1511B' stores a composite 2-D image (in digital form) derived from the row image data output from the linear imaging array B, and memory buffer 1511C' stores a composite 2-D image (in digital form) derived from the row image data output from the linear imaging array C. As shown, the memory buffers that store the composite 2-D images are preferably realized as allocated portions (e.g., address space) in one or more memory modules (one shown) 1512', which may be SDRAM, SRAM or other types of memory; however, alternative data buffering designs (such as dedicated data buffer/cache modules) can be used.

As described above in detail, if the velocity of relative motion between the target object and system housing varies during the time that the first and second composite 2-D images are being built up, then different regions of the first and second composite 2-D images will have different aspect ratios. An image processing computer 1513' (which is preferably realized using a digital signal processor as shown) executes a set of programmed instructions 1515' (labeled "Aspect Ratio Compensation") that access the multiple composite 2-D images stored in the image buffers (1511A' and 1511B') and perform image processing operations utilizing such composite 2-D images that estimate the variations in the velocity of such relative motion and generate reconstructed images (corresponding to the multiple composite 2-D images) that compensate for such estimated velocity variations (i.e., has a more uniform aspect ratio). The image processing computer 1513' stores the reconstructed images in memory buffers 1511C1' and 1511C2', respectively, for subsequent processing. As shown, the memory buffers 1511C1' and 1511C2' that store the multiple reconstructed images are preferably realized as allocated portions (e.g., address space) in memory module(s) 1512', which may be SDRAM, SRAM or other types of memory; however, alternative data buffering designs (such as dedicated data buffer/cache modules) can be used.

Image velocity data representing the image velocity estimates generated by execution of the Aspect Ratio Compensation routine on the image processing computer 1513' is provided to a line rate adjustment module 1520' (which is preferably realized as a programmed set of instructions executing on controller 1519' as shown). The line rate adjustment module 1520' utilizes the image velocity data supplied thereto to calculate in a real time manner the line rate for linear array C (1506-C') that compensates for variations in image velocity such that the image capture operations of the linear array C maintain a substantially constant aspect ratio over the scan lines captured by linear array C, and supplies signals to the timing signal generator 1505' that cause the timing signalgenerator to periodically adjust the variable line rate for linear array C to the line rate calculated by module 1520'.

In addition, the line rate data calculated by line rate adjustment module 1520' is provided to an optical power level adjustment module 1524' (which is preferably realized as a programmed set of instructions executing on controller 1519' as shown). The optical power level adjustment module 1524' utilizes the line rate data supplied thereto to calculate in a real time manner the illumination time period(s) and/or optical power level(s) for the illumination that overlaps the FOV of the linear imaging C (1506-C') and possibly for illumination that overlaps the FOV of the other linear arrays, e.g., $LA_A$ and $LA_B$) such that the average optical power level of such illumination over the photo-integration time periods of the linear array C is substantially constant (to provide a uniform white level in the image pixels captured by the linear imaging array C) and does not exceed a recommended maximum level (to avoid saturation of the linear array C). In addition, module 1520' supplies signals to illumination control circuitry 1521' that cause illumination control circuitry 1521' to periodically adjust the illumination time period(s) and/or optical power level(s) for such illumination to match the values calculated by module 1524'. The illumination control circuitry 1521' preferably adjusts the optical power level of such illumination by varying the current levels supplied to the VLD(s) or LED(s) in $PLIA_1$ (1515-1') and/or $PLIA_2$ (1515-2'), and preferably adjusts the illumination time period at a given optical power level by in response to signals provided thereto (which dictate such time periods).

Such operations build up and store in the third 2D image buffer 1511C' a third composite 2-D image C of the target object that has substantially constant aspect ratio. In other words, the third composite 2-D image (in digital form) derived from the row image data output from the linear imaging array C has a substantially constant aspect ratio. Thus, any image distortion (e.g., compression/stretching) that would result from variations in relative image velocity if the scan line rate was not adjusted is substantially reduced or eliminated.

In addition, the white level of the pixel data values that make up the third composite 2-D image C is substantially uniform. Thus, any variations in white levels that would result from changing the variable line rate of the linear imaging array $LA_C$ if the power level of illumination was not adjusted is substantially reduced or eliminated.

In addition, the image processing computer 1513' executes a set of programmed instructions 1581' (labeled "Jitter Estimation") that access the reconstructed images stored in the image buffers 1511C1' and 1511C2', respectively, and performs image processing operations utilizing such reconstructed images to estimate horizontal jitter (in the relative motion between the device and the target object(s)) for rows of a select one of the reconstructed images. The image processing computer 1513' also executes a set of programmed instructions 1583' (labeled "Jitter Compensation") that transforms the third composite 2-D image stored in the third 2D image buffer 1511C' (which has substantially uniform aspect ratio and white level) utilizing shift operations (which may be pixel or sub-pixel shift operations) based upon the horizontal jitter estimates generated by the Jitter Estimation routine 1581', to thereby generate a 2D image that compensates for the estimated horizontal jitter of the imaging device relative to the object(s) being imaged. The image processing computer 1513' stores the resultant image (which is generated by the Jitter Compensation Routine 1583', an example of which is shown in as shown in FIG. 15C) in memory buffer 1585' for subsequent processing. As shown, the memory buffer 1585' that stores the resultant image is preferably realized as allocated portions (e.g., address space) in memory module(s) 1512'; however, alternative data buffering designs (such as dedicated data buffer/cache modules) can be used.

In addition, the image processing computer 1513' preferably executes a set of programmed instructions 1517' (labeled "Bar Code Detection") that accesses one or more of the composite 2-D images stored in the memory buffers (1511A', 1511B', 1511C'), one or more of the reconstructed images stored in the memory buffers (1511C1', 1511C2') and/or the resultant image stored in memory buffer 1585' and carries out image-based bar code symbol detection and decoding operations on such image(s). These imaging processing operations preferably detect and decode one-dimensional bar code symbols (and possibly two-dimensional bar code symbols) within the image and generate symbol character data representative thereof. Moreover, such imaging processing operations preferably carry out image-based omni-directional bar code detection and decoding whereby bar code symbol(s) at varying spatial orientation within the image are detected and decoded. For example, such image-based bar code symbol detection and decoding operations can be realized with SwiftDecode™ Bar Code Decode software, available from Omniplanar, Inc. of Princeton, N.J. (http://www.omniplanar.com). The image processing computer 1513' may also execute additional image processing routines that carry out OCR operations, handwriting/signature recognition operations or other imaging operations.

The programmed set of instructions which carry out the image processing operations as described above (labeled "Aspect Ratio Compensation", "Jitter Estimation", "Jitter Compensation" and "Bar Code Detection") are typically written in a high-level programming language (i.e., a programming language readable by those skill in the art, such as the "C" programming language) and compiled by a software tool (called a compiler) into a set of instructions that are suitable for execution by the image processing computer 1513'. The compiled set of instructions together with a system control program (e.g., a real-time operating system) are then stored in non-volatile memory (not shown) of the device 1500' for access and execution by the image processing computer 1513' as described above.

Bar code symbol character data (generated via execution of the Bar Code Detection routine on the image processing computer 1513') is transferred, under control of controller 1519', to communication interface circuitry 1523', which communicates the bar code symbol character data to a host system over a communication link there between, which, for example, may be a wireless data link (such as an infra-red link, Bluetooth RF link, IEEE802.11a RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, RS-485 link, or Ethernet link), a wired parallel data bus, or other common wired interface links (such as an OCIA link, an IBM 46XX link, a Light Pen Emulation link, a LTPN link)).

In addition, the resultant image generated by the Jitter Compensation Routine 1583' (or an image derived from the processing of the resultant image) is preferably transferred, under control of controller 1519', to communication interface circuitry 1523', which communicates this image to a host system over the communication link there between. Alternatively, this image can be compressed (for example, into a TIFF, GIFF, JPEG compressed format) and the compressed image can be transferred, under control of controller 1519', to the communication interface circuitry 1523', which communicates the compressed image to a host system over the communication link there between. Such compression can be performed, for example, by the image processing computer 1513', controller 1519', or circuitry in the communication interface circuitry 1523'. In this illustrative configuration, the host system receives the image (or decompresses its compressed form) and processes the image. Such processing may involve OCR of textual symbologies (and possibly other symbologies) on the image, thereby outputting a text-based document that is suitable for editing by a standard word processing/text editing program. Alternatively, such processing may involve handwriting/signature recognition on the image, thereby outputting data that characterizes handwritten characters in the image. In another alternative, such processing may involve displaying the image on a display device for view by a user(s).

A system bus 1518' (which may be a simple bus structure has shown, or alternatively may be more complicated and hierarchical in nature) provides the data/signal paths over which the memory controller 1509', memory module(s) 1512', image processing computer 1513' and controller 1519' communicate. The controller 1519' (which performs system control operations for the device 1500') interfaces to illumination control circuitry 1521', which operates (under control of controller 1519') to provide power (e.g., current) to the illumination sources (e.g., VLDs or LEDs) of $PLIA_1$ and $PLIA_2$ during planar light illumination and image capture operations. In the event that the illumination sources embodied therein produce coherent laser light, the current levels provided to such laser illumination sources are modulated in manner that reduces the temporal coherence of the planar laser illumination as described below in great detail, which advantageously reduces the RMS power of the speckle noise detected by the PLILIM-based illumination and image capture module. Moreover, the device 1500' may employ mechanical means (i.e., oscillating optical elements) that reduces the spatial coherence of the planar laser illumination as set forth below, which advantageously reduces the RMS power of the speckle noise detected by the PLILIM-based illumination and image capture module. In this configuration, the controller 1519' preferably controls operation of such mechanical means. In addition, as described above, the image formation optics may include focus control mechanisms and/or zoom-control mechanisms embodied therein. In this configuration, the controller 1519' preferably performs camera control operations that cooperate with such mechanisms to adjust the focus and/or zoom of the image formation optics.

The controller 1519' also interfaces to I/O interface circuitry 1525', which may provide drive signals to an audio-transducer and/or LED-based status visual indicators (labeled "Status LEDs") used to signal successful image capture operations and successful symbol reading operations to users and the like, and may provide user input via interaction with a keypad, buttons or switches (such as a "Data Communication Switch") as shown. In addition, the I/O interface may also provide for interfacing with a plurality of other accessory devices (such a display device).

The controller 1519' also operates the device 1500' in accordance with a system control architecture (or scheme). In general, there are various system control architecture that can be embodied by the controller 1519'. For example, the PLILIM-based illumination and image capture and subsequent image-based bar code symbol detection/decoding and communication of bar code symbol character data to the host system may occur automatically (without the need for human interaction to activate such operations). Alternatively, the PLILIM-based illumination and image capture and subsequent image-based bar code symbol detection/decoding may occur automatically (without the need for human interaction to activate such operation) and the communication to the host system of the symbol data corresponding thereto may be activated by a manually-activated data transmission switch as described in detail in co-pending U.S. patent application Ser. No. 09/204,176 filed Dec. 3, 1998; and co-pending U.S. patent application Ser. No. 09/452,976 filed Dec. 2, 1999 incorporated by reference above in their entirety. In another alternative, the PLILIM-based illumination and image capture and subsequent image-based bar code symbol detection/decoding and communication of bar code symbol character data to the host system may be activated by a manual trigger switch or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798; 5,484,992; 5,468,951; 5,425,525; 5,240,971; 5,340,973; 5,260,553; incorporated herein by reference.

The image processing computer 1513' may utilize one or more digital signal processing engines/cores and cache memory that stores (e.g. buffers) instructions/data and provides low latency access to such instructions/data when requested by the processing engine(s). A digital signal processing engine (or like device) is preferable because such devices have low power requirements, high performance levels in image processing applications (because of the microarchitecture employed therein), and low cost.

Preferably, the functionality of the controller 1519' and image processing computer 1513' (and possibly the memory controller 1509', I/O interface circuitry 1525' and/or communication interface circuitry 1523') are embodied in a single integrated circuit (typically referred to as a "System on a Chip"). An example of such an integrated circuit is the Intel PXA250 applications processor, which includes a high performance microprocessor that is capable of performing the duties of the imaging processing computer 1513' and controller 1519' as described above along with integrated memory controller (e.g., SDRAM Control/SDRAM Control/DMA Control), integrated I/O interface circuitry (LCD interface, I$^2$S interface, I$^2$C interface) and integrated communication interface circuitry (IRDA interface, UART interfaces, Bluetooth Interface, USB client interface). In addition, it is preferable that controller 1519' (and possibly image processing computer 1513') embody features commonly found in modern RISC microprocessors, including advanced power management circuitry (which typically operate to temporarily shut down/disable elements of the microprocessor that are being used), pipelined execution stages, speculative instruction execution and speculative data prefetching (which requires branch prediction mechanisms), and out-of-order instruction execution. Many of these features are embodied in the Intel PXA250 applications processor. In addition, the functionality of the timing signal generator 1505', possibly some of the functionality of the memory controller 1509' (such as buffering data produced by the analog-to-digital conversion circuitry 1507' and/or memory access/DMA control), and possibly some of the image processing operations described herein as part of the Aspect Ratio Compensation routine (such as edge extraction/analysis or correlation as described herein), Bar Code Detection routine, or other image processing operations may be embodied in dedicated hardware, such as one or more programmable gate arrays (e.g., Spartan II line of FPGAs available from Xilinx Inc. of San Jose, Calif.), one or more programmable logic devices (e.g., CPLD line available from Xilinx Inc. of San Jose, Calif.), and/or one or more ASICs.

FIGS. 15I1 and 15I2 set forth a flow chart illustrating exemplary methodology carried out by the PLILIM-based imaging device of FIG. 15H in accordance with the present invention. In blocks 1551' and 1553', planar light illumination (e.g., a composite planar light illumination beam provided by PLIA$_1$ and PLIA$_2$) is generated that overlaps the FOVs (e.g., FOV$_A$ and FOV$_B$) of a plurality of linear imaging arrays (e.g., LA$_A$ and LA$_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. in addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to LA$_A$ and LA$_B$, respectively). Such operations are repeated over successive rows (e.g., lines) to form the multiple composite 2-D images in the image buffers 1511A' and 1511B', respectively.

Blocks 1555' through 1559', which represent an exemplary embodiment of the Aspect Ratio Compensation routine 1515' executed by image processing computer 1513' in accordance with the present invention, access the multiple composite 2-D images stored in the image buffers 1511A' and 1511B' and process such composite 2-D images to: i) estimate variations in the velocity of relative motion between the device and target object(s) during image capture operation, and ii) transform the multiple composite 2-D images (utilizing the estimated velocity variations) to form reconstructed images (corresponding to the composite 2-D images) that compensate for such estimated variations (i.e., has a more uniform aspect ratio). The reconstructed images are stored in memory (e.g., first and second buffer memories 1511C1' and 1511C2') for subsequent processing.

In block 1555', the multiple composite 2-D images stored in the image buffers 1511A' and 1511B' are analyzed (e.g., processed) to derive an estimate of the relative velocity between the imaging device and target object(s) over the rows (or sub-row intervals) of a select one of the composite 2-D images (e.g., the first 2D image stored in image buffer 1511A'). Any of the image velocity detection techniques/ mechanisms described herein (including the feature-based image velocity detection techniques/mechanisms, correlation-based image velocity detection techniques/ mechanisms or optical-flow based image velocity detection techniques/mechanisms described herein) may be used to derive an estimate of the relative velocity between the imaging device and target object.

In block 1557', the selected composite 2-D image is transformed (utilizing copy, compression and expansion operations that are based upon the relative image velocity estimates assigned to the rows (or subrow intervals) of the selected composite 2-D image in block 1555') to generate a first reconstructed image that compensates for variations in image velocity (as provided by the relative image velocity estimates). Exemplary image processing operations that perform transform operations (such as copy, compression and expansion) sequentially over portions of the selected composite 2-D image to build up corresponding portions of the first reconstructed image is described above with respect to FIGS. 7A–7C. The first reconstructed image is then stored in first buffer memory 1511C1' for subsequent processing.

In block 1559', the other composite 2-D image is transformed (utilizing analogous copy, compression and expansion operations that are performed on corresponding image data of the selected composite 2-D image in block 1557') to generate a second reconstructed image that compensates for variations in image velocity (as provided by the relative image velocity estimates). The correspondence between rows of image data in the two reconstructed images is dictated by the physical separation of the two linear imaging arrays and the dimension of the pixel element dimension (of the two linear imaging arrays) along the scan direction. For example, consider the case where the pixel dimension in the scan direction is 14 μm and the two linear imaging arrays are separated by 112 μm. In this case, the sensor rows are separated by 8 pixel dimensions and the corresponding rows in the first and second reconstructed images are offset (leading or trailing) by 8 rows. Exemplary image processing operations that perform transform operations (such as copy, compression and expansion) sequentially over portions of the other composite 2-D image to build up corresponding portions of the second reconstructed image is described above with respect to FIGS. 7A–7C. The second reconstructed image is then stored in second buffer memory 1511C2' for subsequent processing.

In block 1560', which represents an exemplary embodiment of the Jitter Estimation routine 1581' executed by image processing computer 1513 in accordance with the present invention, accesses the reconstructed images generated and stored in the image buffers 1511C1' and 1511C2', respectively (in blocks 1557 and 1559) and analyzes such reconstructed images to estimate horizontal jitter (in the relative motion between the device and the target object(s)) for rows of a select one of the reconstructed images. Any of the jitter estimation techniques described above with respect to FIGS. 15E(i) and 15E(ii) and 15F(i) and 15F(ii) may be carried out in block 1560' to derive such horizontal jitter estimates.

The image velocity data for one or more rows (produced in block 1555') is used to calculate in a real time manner the line rate for the third linear array $LA_C$ that compensates for variations in image velocity such that the image capture operations of the third linear array $LA_C$ maintain a constant aspect ratio over the scan lines captured by the third linear array $LA_C$ (block 1517'). The variable line rate of the third linear array $LA_C$ is periodically updated in a real time manner to the match the calculated line rate (block 1517').

In block 1518', the variable line rate of the third linear array $LA_C$ (calculated in block 1517') is used to calculate the illumination time period(s) and/or optical power level(s) for the illumination that overlaps the FOV of the third linear array $LA_C$ (and possibly the illumination time period(s) and/or optical power level(s) for the illumination that overlaps the FOV of the other linear arrays, e.g., $LA_A$ and $LA_B$) such that the average optical power level of such illumination over the photo-integration time periods of the third linear array $LA_C$ is substantially constant (to provide a uniform white level in the image pixels captured by the third linear array $LA_C$) and does not exceed a recommended maximum level (to avoid saturation of the third linear array $LA_C$). For example, the calculations of block 1518' can be performed in two steps. In the first step, the photo-integration time period of the third linear array $LA_C$ is calculated using the formula: photo-integration time period=1/Line Rate. In the second step, the illumination time period(s) for a set of one or more output power levels of a given illumination source (e.g. VLD or LED) is computed using the formula: (Σ(output power level×illumination time period) over the set of power levels)=(constant×photo-integration time period from step 1). The illumination time period(s) and/or optical power level(s) for such illumination is periodically updated in a real time manner to the match the calculated illumination time period(s) and/or optical power level(s).

Each scan line (e.g., row pixel data values in analog form) produced by the third linear array $LA_C$ is output therefrom, converted into digital form, preprocessed and stored in the third 2D image buffer 1511C' (block 1519'). Such operations build up a third composite 2-D image C of the target object that has substantially constant aspect ratio. In other words, the aspect ratio of the third composite 2-D image C is substantially constant, thereby substantially reducing or eliminating any image distortion (e.g., compression/stretching) that would result from variations in relative image velocity if the scan line rate was not adjusted. In addition, the white level of the pixel data values that make up the third composite 2-D image C is substantially uniform, thereby substantially reducing or eliminating variations in white levels that would result from changing the variable line rate of the linear imaging array $LA_C$ if the power level of illumination was not adjusted.

Block 1571', which represent an exemplary embodiment of the Jitter Compensation Routine 1583' executed by image processing computer 1513 in accordance with the present invention, accesses the third composite 2-D image (which is generated and stored in the third 2D image buffer 1511C' in block 1519') and transforms the third composite 2-D image utilizing shift operations (which may be pixel or sub-pixel shift operations) based upon the horizontal jitter estimates generated in block 1560', to thereby generate a 2D image that compensates for the estimated horizontal jitter of the imaging device relative to the target object(s). The image processing computer 1513' stores the resultant image (which is generated by the Jitter Compensation Routine 1583', an example of which is shown in as shown in FIG. 15C) in memory buffer 1585' for subsequent processing. For example, if the horizontal jitter estimate for a given row in the select one reconstructed image indicates that the given row is shifted left by 4 full pixel dimensions, the given row is shifted right by 4 full pixel dimensions in block 1571'. In another example, if the horizontal jitter estimate for a given row in the select one reconstructed image indicates the given row is shifted right by 8 full pixel dimensions, the given row is shifted left by 8 full pixel dimensions in block 1571'. In yet another example, if the horizontal jitter estimate for a given row in the select one reconstructed image indicates the given row is not shifted (shifted by 0 full pixel dimensions), shifting the given row is skipped. In other examples, the rows of the select one reconstructed image may be shifted left or right by sub-pixel shift operations (e.g., where the pixel data value for a given pixel in the resultant image is contributed by the pixel data values of neighboring pixels in the select one reconstructed image based upon sub-pixel displacement dictated by the sub-pixel shift operation).

In block 1573', the resultant image produced by the Jitter Compensation Routine 1583' is optionally sharpened (which increases the visibility of image structures with high spatial frequencies such as details, edges, fine textures). An example of image sharpening operations suitable for use in block 1573' is described above with respect to FIG. 7D.

Finally, in block 1575', the resultant image produced in bock 1571' (or sharpened resultant image produced in block 1573') is output and saved (for example, in image buffer 1585') for subsequent processing (e.g., output data for display, 1D and/or 2D bar code sensing on data derived therefore, and/or OCR on data derived there from).

FIG. 15J illustrates an alternate system architecture for a PLILIM-based imaging device that carries out such horizontal jitter estimation and compensation. Preferably, the device is also capable of performing bar code detection operations and image lift operations suitable for OCR and other imaging applications. Note that the device employs PLILIM-based illumination and image capture methods (and apparatus) of the present invention as discussed above with respect to FIGS. 13A1–13A4; yet the details of such methods and apparatus are omitted from FIG. 15H for the sake of simplicity of illustration and description. Also note that in this exemplary system architecture, horizontal jitter estimation and compensation is carried out in a real-time manner in dedicated hardware (e.g., an FPGA, CPLD or ASIC) and is performed in parallel with the image-based velocity estimation and line rate/output power illumination control operations executed by the image processing and control platform.

As shown therein, the PLILIM-based imaging device 1500" includes three or more linear imaging arrays (for example, three shown as Linear Array A (1506-A"), Linear Array B (1506-B") and Linear Array C (1506-C")) that cooperate with image formation optics (not shown) to image substantially planar field of views (FOVs) that are displaced (offset) from one another along the direction of intended motion of the target object relative to the system housing. The linear imaging arrays may be CCD-type linear image devices (for example, the model ILX554B linear CCD image array (2048 imaging elements) available from Sony Electronics. Alternatively, the linear imaging arrays may be CMOS-type linear image devices. A pair of planar light illumination arrays (PLIA$_1$ (1515-1") and PLIA$_2$ (1515-2")) project planar light illumination that substantially overlaps (and may encompasses and extends beyond) the FOVs of the plurality of linear image detectors (e.g., Linear Array A (1506-A"), Linear Array B (1506-B") and Linear Array C (1506-C")) along a substantial portion of the range of working distances of the device, while images of the illuminated target object are formed on and detected by the plurality of linear imaging arrays. Timing Signal Generation circuitry 1505" supplies timing signals to the linear imaging arrays in order to read out the row image data produced by such devices. Such row image data is derived from the energy detected by the imaging elements of the linear imaging arrays over an integration time period of such devices and is typically read out from the linear image arrays in a serial manner. The timing signals supplied to Linear Array A (1506-A") and Linear Array B (1506-B") control the two linear arrays to read out the row image data produced by such devices at a substantially constant line rate over the image capture operations that build ups the first and second composite 2-D images as described herein. However, the timing signals supplied to Linear Array C (1506-C") controls the Linear Array C to read out the row image data produced by such device at a variable line rate over the image capture operations that build ups the third composite 2-D image as described herein. The variable line rate for linear array C (as controlled by the timing signals supplied thereto) is adjusted to compensate for variations in image velocity such that the image capture operations of linear array C maintain a constant aspect ratio over the scan lines captured by linear array C in building up the third composite 2-D image. In addition, the optical power of illumination that overlaps the FOV of linear imaging array C (1206-C") (and possibly the optical power level of illumination that overlaps the FOV of the other linear arrays. e.g., linear arrays A and B) is controlled by illumination control circuitry such that the average optical power level of such illumination over the photo-integration time periods of linear array C is substantially constant (to provide a uniform white level in the image pixels captured by the linear imaging array C) and does not exceed a recommended maximum level (to avoid saturation of linear array C).

The row image data produced by the plurality of linear imaging arrays (e.g., Linear Array A, Linear Array B and Linear Array C) is supplied to analog-to-digital conversion circuitry 1507", which optionally filters the row data image signal supplied thereto (to remove unwanted noise components) and converts the row image data supplied thereto into digital form. The analog-to-digital conversion circuitry 1507' operably cooperates with memory controller 1509' and a set of multi-line buffers (multi-line buffer A (1508A"), multi-line buffer B (1508B"), and multi-line buffer C (1508C") to add such row image data (in digital form) into memory buffers corresponding to the linear imaging array from which the row image data was derived and into multi-line image buffers corresponding thereto. As a result of such operations, memory buffer 1511A" and multi-line buffer A (1508A") stores a composite 2-D image (in digital form) derived from the row image data output from the linear imaging array A, memory buffer 1511B" and multi-line buffer B (1508B") stores a composite 2-D image (in digital form) derived from the row image data output from the linear imaging array B, and multi-line buffer C (1508C") stores a composite 2-D image (in digital form) derived from the row image data output from the linear imaging array C. The image data stored in multi-line image buffer C (1508C") is subjected to shift operations (based upon control signals provided by jitter estimation and compensation control logic 1510") in a manner that compensates for estimated horizontal jitter and is stored (via memory controller 1509") in resultant image buffer 1511C". As shown, the memory buffers 1511A", 1511B" and 1511C" are preferably realized as allocated portions (e.g., address space) in one or more memory modules (one shown) 1512", which may be SDRAM, SRAM or other types of memory, and the multi-line buffers 1508A", 1508B" and 1508C" are realized as dedicated data buffer/cache modules. However, alternative data buffering designs can be used.

As described above in detail, if the velocity of relative motion between the target object and system housing varies during the time that the first and second composite 2-D images are being built up, then different regions of the first and second composite 2-D images will have different aspect ratios. An image processing computer 1513" (which is preferably realized using a digital signal processor as shown) executes a set of programmed instructions 1516" (labeled "Image Velocity Estimation") that access the multiple composite 2-D images stored in the image buffers (1511A" and 1511B") and perform image processing operations utilizing such composite 2-D images that estimate the variations in the velocity of such relative motion. Image velocity data representing the image velocity estimates generated by execution of the Image Velocity Estimation routine 1516" on the image processing computer 1513" is provided to a line rate adjustment module 1520" which is preferably realized as a programmed set of instructions executing on controller 1519' as shown). The line rate adjustment module 1520" utilizes the image velocity data supplied thereto to calculate in a real time manner the line rate for linear array C (1506-C") that compensates for variations in image velocity such that the image capture operations of the linear array C maintain a substantially constant aspect ratio over the scan lines captured by linear array C, and supplies signals to the timing signal generator 1505" that cause the timing signal generator to periodically adjust the variable line rate for linear array C to the line rate calculated by module 1520".

In addition, the line rate data calculated by line rate adjustment module 1520" is provided to an optical power level adjustment module 1524" (which is preferably realized as a programmed set of instructions executing on controller 1519" as shown). The optical power level adjustment module 1524' utilizes the line rate data supplied thereto to calculate in a real time manner the illumination time period(s) and/or optical power level(s) for the illumination that overlaps the FOV of the linear imaging C (1506-C") and possibly for illumination that overlaps the FOV of the other linear arrays, e.g., $LA_A$ and $LA_B$) such that the average optical power level of such illumination over the photo-integration time periods of the linear array C is substantially constant (to provide a uniform white level in the image pixels captured by the linear imaging array C) and does not exceed a recommended maximum level (to avoid saturation of the linear array C). In addition, module 1520" supplies signals to illumination control circuitry 1521' that cause illumination control circuitry 1521" to periodically adjust the illumination time period(s) and/or optical power level(s) for such illumination to match the values calculated by module 1524". The illumination control circuitry 1521" preferably adjusts the optical power level of such illumination by varying the current levels supplied to the VLD(s) or LED(s) in $PLIA_1$ (1515-1") and/or $PLIA_2$ (1515-2"), and preferably adjusts the illumination time period at a given optical power level by in response to signals provided thereto (which dictate such time periods).

Such operations build up and store in the multi-line buffer C (1508C") a third composite 2-D image C of the target object that has substantially constant aspect ratio. In other words, the third composite 2-D image (in digital form) derived from the row image data output from the linear imaging array C has a substantially constant aspect ratio. Thus, any image distortion (e.g., compression/stretching) that would result from variations in relative image velocity if the scan line rate was not adjusted is substantially reduced or eliminated.

In addition, the white level of the pixel data values that make up the third composite 2-D image C is substantially uniform. Thus, any variations in white levels that would result from changing the variable line rate of the linear imaging array $LA_C$ if the power level of illumination was not adjusted is substantially reduced or eliminated.

Jitter estimation and control logic 1510" operates in parallel to such image velocity estimation operations and aspect ratio/output power illumination control operations to access the composite 2-D images stored in the multi-line buffers 1508A" and 1508B"; perform image processing operations utilizing such images to estimate horizontal jitter (in the relative motion between the device and the target object(s)), and generate control signal(s) that are supplied to the multi-line buffer C (1508C") that cause the multi-line buffer C (1508C") to perform shift operations (which may be pixel or sub-pixel shift operations on row image data stored therein) based upon the estimated horizontal jitter. The memory controller 1509" stores the resultant image data in memory buffer 1511C", to thereby generate a 2D image that compensates for the estimated horizontal jitter of the imaging device relative to the target object(s). An example of such resultant image is shown in as shown in FIG. 15C) As shown, the memory buffer 1511C" that stores the resultant image is preferably realized as allocated portions (e.g., address space) in memory module(s) 1512"; however, alternative data buffering designs (such as dedicated data buffer/cache modules) can be used.

In addition, the image processing computer 1513" preferably executes a set of programmed instructions 1517" (labeled "Bar Code Detection") that accesses one or more of the composite 2-D images stored in the memory buffers (1511A", 1511B") and/or the resultant image stored in memory buffer 1511C" and carries out image-based bar code symbol detection and decoding operations on such image(s). These imaging processing operations preferably detect and decode one-dimensional bar code symbols (and possibly two-dimensional bar code symbols) within the image and generate symbol character data representative thereof. Moreover, such imaging processing operations preferably carry out image-based omni-directional bar code detection and decoding whereby bar code symbol(s) at varying spatial orientation within the image are detected and decoded. For example, such image-based bar code symbol detection and decoding operations can be realized with SwiftDecode™ Bar Code Decode software, available from Omniplanar, Inc. of Princeton, N.J. (http://www.omniplanar.com). The image processing computer 1513" may also execute additional image processing routines that carry out OCR operations, handwriting/signature recognition operations or other imaging operations.

The programmed set of instructions which carry out the image processing operations as described above (labeled "Image Velocity Detection") are typically written in a high-level programming language (i.e., a programming language readable by those skill in the art, such as the "C" programming language) and compiled by a software tool (called a compiler) into a set of instructions that are suitable for execution by the image processing computer 1513". The compiled set of instructions together with a system control program (e.g., a real-time operating system) are then stored in non-volatile memory (not shown) of the device 1500' for access and execution by the image processing computer 1513" as described above.

Bar code symbol character data (generated via execution of the Bar Code Detection routine on the image processing computer 1513") is transferred, under control of controller 1519", to communication interface circuitry 1523", which communicates the bar code symbol character data to a host system over a communication link there between, which, for example, may be a wireless data link (such as an infra-red link, Bluetooth RF link, IEEE802.11a RF link or IEEE 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, RS-485 link, or Ethernet link), a wired parallel data bus, or other common wired interface links (such as an OCIA link, an IBM 46XX link, a Light Pen Emulation link, a LTPN link)).

In addition, the resultant image stored in image buffer 1511C" (or an image derived from the processing of the resultant image stored therein) is preferably transferred, under control of controller 1519", to communication interface circuitry 1523", which communicates this image to a host system over the communication link there between. Alternatively, this image can be compressed (for example, into a TIFF, GIFF, JPEG compressed format) and the compressed image can be transferred, under control of controller 1519", to the communication interface circuitry 1523", which communicates the compressed image to a host system over the communication link there between. Such compression can be performed, for example, by the image processing computer 1513", controller 1519", or circuitry in the communication interface circuitry 1523". In this illustrative configuration, the host system receives the image (or decompresses its compressed form) and processes the image. Such processing may involve OCR of textual symbologies (and possibly other symbologies) on the image, thereby outputting a text-based document that is suitable for editing by a standard word processing/text editing program. Alternatively, such processing may involve handwriting/signature recognition on the image, thereby outputting data that characterizes handwritten characters in the image. In another alternative, such processing may involve displaying the image on a display device for view by a user(s).

A system bus 1518" (which may be a simple bus structure has shown, or alternatively may be more complicated and hierarchical in nature) provides the data/signal paths over which the memory controller 1509", memory module(s) 1512", image processing computer 1513" and controller 1519" communicate. The controller 1519" (which performs system control operations for the device 1500") interfaces to illumination control circuitry 1521", which operates (under control of controller 1519") to provide power (e.g., current) to the illumination sources (e.g., VLDs or LEDs) of PLIA$_1$ and PLIA$_2$ during planar light illumination and image capture operations. In the event that the illumination sources embodied therein produce coherent laser light, the current levels provided to such laser illumination sources are modulated in manner that reduces the temporal coherence of the planar laser illumination as described below in great detail, which advantageously reduces the RMS power of the speckle noise detected by the PLILIM-based illumination and image capture module. Moreover, the device 1500" may employ mechanical means (i.e., oscillating optical elements) that reduces the spatial coherence of the planar laser illumination as set forth below, which advantageously reduces the RMS power of the speckle noise detected by the PLILIM-based illumination and image capture module. In this configuration, the controller 1519" preferably controls operation of such mechanical means. In addition, as described above, the image formation optics may include focus control mechanisms and/or zoom-control mechanisms embodied therein. In this configuration, the controller 1519" preferably performs camera control operations that cooperate with such mechanisms to adjust the focus and/or zoom of the image formation optics.

The controller 1519" also interfaces to I/O interface circuitry 1525", which may provide drive signals to an audio-transducer and/or LED-based status visual indicators (labeled "Status LEDs") used to signal successful image capture operations and successful symbol reading operations to users and the like, and may provide user input via interaction with a keypad, buttons or switches (such as a "Data Communication Switch") as shown. In addition, the I/O interface may also provide for interfacing with a plurality of other accessory devices (such a display device).

The controller 1519" also operates the device 1500" in accordance with a system control architecture (or scheme). In general, there are various system control architecture that can be embodied by the controller 1519". For example, the PLILIM-based illumination and image capture and subsequent image-based bar code symbol detection/decoding and communication of bar code symbol character data to the host system may occur automatically (without the need for human interaction to activate such operations). Alternatively, the PLILIM-based illumination and image capture and subsequent image-based bar code symbol detection/decoding may occur automatically (without the need for human interaction to activate such operation) and the communication to the host system of the symbol data corresponding thereto may be activated by a manually-activated data transmission switch as described in detail in co-pending U.S. patent application Ser. No. 09/204,176 filed Dec. 3, 1998 and co-pending U.S. patent application Ser. No. 09/452,976 filed Dec. 2, 1999; incorporated by reference above in their entirety. In another alternative, the PLILIM-based illumination and image capture and subsequent image-based bar code symbol detection/decoding and communication of bar code symbol character data to the host system may be activated by a manual trigger switch or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798, 5,484,992; 5,468,951; 5,425,525; 5,240,971; 5,340,973; 5,260,553; incorporated herein by reference.

The image processing computer 1513" may utilize one or more digital signal processing engines/cores and cache memory that stores (e.g. buffers) instructions/data and provides low latency access to such instructions/data when requested by the processing engine(s). A digital signal processing engine (or like device) is preferable because such devices have low power requirements, high performance levels in image processing applications (because of the microarchitecture employed therein), and low cost.

Preferably, the functionality of the controller 1519" and image processing computer 1513" (and possibly the memory controller 1509", I/O interface circuitry 1525" and/or communication interface circuitry 1523") are embodied in a single integrated circuit (typically referred to as a "System on a Chip"). An example of such an integrated circuit is the Intel PXA250 applications processor, which includes a high performance microprocessor that is capable of performing the duties of the imaging processing computer 1513" and controller 1519" as described above along with integrated memory controller (e.g., SDRAM Control/SDRAM Control/DMA Control), integrated I/O interface circuitry (LCD interface, I$^2$S interface, I$^2$C interface) and integrated communication interface circuitry (IRDA interface, UART interfaces, Bluetooth Interface, USB client interface). In addition, it is preferable that controller 1519' (and possibly image processing computer 1513") embody features commonly found in modern RISC microprocessors, including advanced power management circuitry (which typically operate to temporarily shut down/disable elements of the microprocessor that are being used), pipelined execution stages, speculative instruction execution and speculative data prefetching (which requires branch prediction mechanisms), and out-of-order instruction execution. Many of these features are embodied in the Intel PXA250 applications processor.

In addition, the functionality of the timing signal generator 1505", multi-line buffer A (1508A"), multi-line buffer B (1508B"), multi-line buffer C with Shift Control (1508C"), and Jitter Estimation and Compensation Control Logic 1510" are embodied in dedicated hardware, such as one or more programmable gate arrays (e.g., Spartan II line of FPGAs available from Xilinx Inc. of San Jose, Calif.), one or more programmable logic devices (e.g., CPLD line available from Xilinx Inc. of San Jose, Calif.), and/or one or more ASICs.

In addition, some of the functionality of the memory controller 1509" (such as memory access/DMA control), and possibly some of the image processing operations described herein as part of the Image Velocity Detection routine (such as edge extraction/analysis or correlation as described herein), Bar Code Detection routine, or other image processing operations may be embodied in dedicated hardware, such as one or more programmable gate arrays (e.g., Spartan II line of FPGAs available from Xilinx Inc. of San Jose, Calif.), one or more programmable logic devices (such as the CPLD line available from Xilinx Inc. of San Jose, Calif.), and/or one or more ASICs. An example of such an alternate embodiment is illustrated in FIG. 15J wherein edge extraction and analysis is embodied in dedicated hardware (one or more programmable gate arrays, one or more programmable logic devices, and/or one or more ASICs) as shown. In this embodiment, line buffer I (1531A") and line buffer II (1531B"), which are operably coupled to analog-to-digital conversion circuitry 1507", store one or more rows of image data derived from the output of first and second linear imaging arrays 1506-A" and 1506-B", respectively. Edge detection logic 1533" analyzes each row of image data stored therein to derive edge count data for the given row (as described herein with respect to FIGS. 6B1 through 6B5 in great detail) and cooperates with memory controller 1509" to store such edge count data ($EC_A$ for $LA_A$, and $EC_B$ for $LA_B$) into corresponding memory buffers (1535A", 1535B"). The Image Velocity Estimation routine 1516" executed by the image processing computer 1516" accesses the edge count data ($EC_A$ for $LA_A$ and $EC_B$ for $LA_B$) stored in memory buffers 1535A", 1535B", respectively, to derive an estimate of object velocity as described herein. Such velocity estimates are used to control the line rate of the third linear imaging array and the output power of illumination as described herein to provide a third composite 2-D image with substantially uniform aspect ratio and substantially uniform white level. The third composite 2-D image is stored in a multi-line buffer C with shift control 1508C" where it is buffered and subjected to shift operations that compensate for estimated horizontal jitter (as estimated and controlled by Jitter Estimation and Control Logic 1510"). The resultant image is stored in memory (1511C') for subsequent processing (such as sharpening, bar code detection analysis, and/or OCR analysis.

FIGS. 15L1 and 15L2 set forth a flow chart illustrating exemplary methodology carried out by the PLILIM-based imaging devices of FIG. 15J and K in accordance with the present invention. In blocks 1551", and 1553", planar light illumination (e.g., a composite planar light illumination beam provided by $PLIA_1$ and $PLIA_2$) is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., image buffer 1511A" (or line buffer 1(1531A")) and multi-line buffer A (1508A") corresponding to $LA_A$, and image buffer 1511B" (or line buffer II (1531B")) and multi-line buffer B (1508B") corresponding to $LA_B$).

Blocks 1541" through 1545", which represent an exemplary embodiment of Jitter Estimation operations that are embodied in dedicated hardware (such as one or more FPGAs, CPLDs or ASICs), access the multiple composite 2-D images generated and stored in multi-line buffers 1508A" and 1508B" (in blocks 1551" and 1553", respectively) and performs cross-correlation operations over rows of the composite 2-D images to derive an estimate of horizontal jitter in the relative motion between the device and the target object(s).

In block 1541", a row in the multi-line buffer A (1531A"), which is referred to as "first image buffer memory" in FIG. 15L, is selected.

In block 1542", a set of pixel data values of the row selected in block 1541" is correlated with the pixel data values of a group of rows in the multi-line buffer B (1531B"), which is referred to "second image buffer memory" in FIGS. 15L1 and 15L2. Preferably, such correlation is performed as a template matching process whereby a set of pixel data values of the selected row from the multi-line image buffer A is overlaid onto a given row in the multi-line buffer B starting a given column index, the pixel data values that are overlaid are multiplied together, and the total of such multiplications (the correlation result) is stored for the given column index. This template matching process is performed for multiple column indices (or multiple sub-pixel column indices) in the given row over multiple rows in the multi-line buffer B to generate and store a correlation result for each column index (or sub-pixel column index)/row in the group.

In block 1543", the correlation results produced in block 1542" are analyzed to identify the peak (e.g., maximum correlation value) therein.

In block 1544', a horizontal jitter estimate is derived from the offset between the column index (or sub-pixel column index) of the peak (identified in block 1543") and the column index (or sub-pixel column index) of the set of pixels in the row selected in block 1541". For example, a horizontal jitter estimate $H_{row}(n)$ for a given row n may be calculated as follows:

$$H_{row}(n) = Col_p - Col_s$$

where $Col_p$ is the column index (or sub-pixel column index) of the peak (identified in block 1543"), and $Col_s$ is the column index (or sub-pixel column index) of the set of pixels in the row selected in block 1541".

The horizontal jitter estimates derived in block 1544" are utilized in block 1571" for horizontal jitter compensation as described below.

In block 1545", the operations return back to block 1541" to select and process another row in the multi-line buffer A, unless no more rows exist and the operations end.

In parallel to the Jitter Estimation operations of Blocks 1541" through 1545", block 1516" is performed whereby the multiple composite 2-D images stored in image buffers 1511A' and 1511B' (or line buffers 1531A", 1531B") are analyzed (e.g., processed) to derive an estimate of the relative velocity between the imaging device and target object(s). Any of the image velocity detection techniques/mechanisms described herein (including the feature-based image velocity detection techniques/mechanisms, correlation-based image velocity detection techniques/ mechanisms or optical-flow based image velocity detection techniques/mechanisms described herein) may be used to derive an estimate of the relative velocity between the imaging device and target object(s).

The image velocity data (produced in block 1516") is used by line rate adjustment module 1520" to calculate in a real time manner the line rate for the third linear array $LA_C$ that compensates for variations in image velocity such that the image capture operations of the third linear array $LA_C$ maintain a constant aspect ratio over the scan lines captured by the third linear array $LA_C$ (block 1517"). The variable line rate of the third linear array $LA_C$ is periodically updated in a real time manner to the match the calculated line rate (block 1517')'.

In block 1518", the variable line rate of the third linear array $LA_C$ (calculated in block 1517") is used by the output power adjustment module 1524" to calculate the illumination time period(s) and/or optical power level(s) for the illumination that overlaps the FOV of the third linear array $LA_C$ (and possibly the illumination time period(s) and/or optical power level(s) for the illumination that overlaps the FOV of the other linear arrays, e.g., $LA_A$ and $LA_B$) such that the average optical power level of such illumination over the photo-integration time periods of the third linear array $LA_C$ is substantially constant (to provide a uniform white level in the image pixels captured by the third linear array $LA_C$) and does not exceed a recommended maximum level (to avoid saturation of the third linear array $LA_C$). For example, the calculations of block 1518" can be performed in two steps. In the first step, the photo-integration time period of the third linear array $LA_C$ is calculated using the formula: photo-integration time period=1/Line Rate. In the second step, the illumination time period(s) for a set of one or more output power levels of a given illumination source (e.g. VLD or LED) is computed using the formula: ($\Sigma$(output power level×illumination time period) over the set of power levels)=(constant×photo-integration time period from step 1). The illumination time period(s) and/or optical power level(s) for such illumination is periodically updated in a real time manner to the match the calculated illumination time period(s) and/or optical power level(s).

In block 1519", each scan line (e.g., row pixel data values in analog form) produced by the third linear array $LA_C$ is output therefrom, converted into digital form, preprocessed and stored in the multi-line buffer C with shift control 1508C". Such operations build up and store in the multi-line image buffer C (1508C") a third composite 2-D image C of the target object that has substantially constant aspect ratio. In other words, the aspect ratio of the third composite 2-D image C is substantially constant, thereby substantially reducing or eliminating any image distortion (e.g., compression/stretching) that would result from variations in relative image velocity if the scan line rate was not adjusted. In addition, the white level of the pixel data values that make up the third composite 2-D image C is substantially uniform, thereby substantially reducing or eliminating variations in white levels that would result from changing the variable line rate of the linear imaging array $LA_C$ if the power level of illumination was not adjusted.

In block 1571", which carries out Jitter Compensation techniques embodied in dedicated hardware (such as FPGAs, CPLDs, or ASICs), the Jitter Estimation and Control Logic 1510" cooperates with the multi-line buffer C with shift control (1508C") to subject the image data stored in multi-line image buffer C (1508C") to shift operations (which may be pixel or sub-pixel shift operations) in a manner that compensates for estimated horizontal jitter. The resultant image data is stored (via memory controller 1509") in resultant image buffer 1511C".

In block 1573", the resultant image produced in block 1571" is optionally sharpened (which increases the visibility of image structures with high spatial frequencies such as details, edges, fine textures). An example of image sharpening operations suitable for use in block 1573" is described above with respect to FIGS. 7D1 and 7D2.

Finally, in block 1575", the resultant image produced in bock 1571" (or sharpened resultant image produced in block 1573") is output and saved (for example, in image buffer 1585') for subsequent processing (e.g., output data for display, 1D and/or 2D bar code sensing on data derived therefore, and/or OCR on data derived there from).

Note that PLILIM-based imaging techniques and system architectures embodying "Planar Light Illumination and Linear Imaging" and "Jitter Estimation and Compensation" techniques/mechanisms as described above with respect to FIGS. 15A through 15L2 are well suited for a hand-held scanner. In such devices, the image capture and image processing techniques/system architectures described above with respect to FIGS. 15A through 15L2 are embodied in an image capture module and image processing platform that are disposed within a hand-holdable system housing (for example, as shown in FIG. 12A).

In accordance with the present invention, the planar light illumination and linear imaging mechanisms and methodologies as described above may be embodied in a self-contained imaging engine 1600 as shown in FIG. 16A, which includes: an optical-bench 1601 contained as part of the engine housing 1603; and a camera subsystem 1605 that is mounted on the optical bench 1601 and includes a plurality of linear imaging arrays(e.g. 1-D CCD or CMOS image detection arrays, two shown as 1607-A and 1607-B), which preferably have vertically-elongated image detection elements as described herein for speckle-reduction, contained within a light-box 1609 provided with image formation optics 1611 through which light collected from the illuminated object along the field of views (e.g., $FOV_A$ and $FOV_B$) is permitted to pass. A pair of PLIAs 1613-1 and 1613-2 (the details of which are described herein in great detail) are mounted on the optical bench 1601 on opposite sides of the camera subsystem 1605, for producing planar light illumination that substantially overlaps (and preferably overfills) the field of views (e.g., $FOV_A$ and $FOV_B$) along the working range of the engine during illumination and image capture operations as described herein in great detail.

One or more printed circuit boards are integral to the engine housing 1603 and include the following circuit elements realized thereon as shown in FIG. 16B:

i) timing signal generation circuitry 1651, operably coupled to the linear imaging arrays of the engine 1600, that supplies timing signals to the linear imaging arrays in order to read out the row image data produced by such devices; such row image data may be read out at a constant line rate or at a variable line rate as described herein;

ii) illumination control circuitry 1653, operably coupled to the illumination sources (e.g. VLDs or LEDs) in each PLIA of the engine 1600, that supplies current to such illumination sources;

iii) analog-to-digital conversion circuitry 1655, operably coupled to the linear imaging arrays of the engine 1600, which optionally filters row data image signal supplied thereto (to remove unwanted noise components) and converts the row image data supplied thereto into digital form; and iv) data buffering circuitry 1657, operably coupled between the analog-to-digital conversion circuitry 1655 and a data communication bus 1658, for storing the digital row image data generated by the analog-to-digital conversion circuitry 1655 and communicating the row image data stored therein over the data communication bus 1658.

In addition, the one or more printed circuit boards integral to the engine housing 1603 optionally may also include the following circuit elements realized thereon (indicated as dotted lines in FIG. 16B):

v) a line rate adjustment module 1661, realized as part of a programmed controller 1659 and operably coupled to timing signal generation circuitry 1651, that adjusts the line rate of at least one of the linear image arrays (e.g., linear imaging array C) of the engine 1600; preferably, such line rate adjustment compensate for variations in image velocity such that the image capture operations of the at least one linear imaging array maintains a constant aspect ratio over the scan lines captured thereby;

vi) output illumination control module 1663, realized as part of a programmed controller 1659 and operably coupled to the illumination control circuitry 1653, that adjusts the optical power level and/or illumination time period for the illumination that overlaps one or more of the FOVs of the linear imaging arrays of the engine 1600; preferably such output illumination control maintains the average optical power level of such illumination over the photo-integration time periods of at least one linear imaging array (e.g., linear imaging array C) at a substantially constant level(to provide a uniform white level in the image pixels captured by the linear imaging array) and does not exceed a recommended maximum level (to avoid saturation of the linear imaging array); and/or vii) imaging processing circuitry 1665, operably coupled to the data buffering circuitry 1657 over the data communication bus 1658, that realizes portions of any of the image-based mechanisms/techniques for image velocity estimation, aspect ratio compensation, jitter estimation and compensation, bar code detection, OCR, and image lift as described herein; the image processing circuitry 1665 can include portions of the system architectures described herein that carry out image-based mechanisms/techniques for image velocity estimation, aspect ratio compensation, jitter estimation and compensation, bar code detection, OCR, image lift, and data communication to an external host device in accordance with the present invention.

The one or more printed circuit boards that embody such circuitry may be disposed on one or more exterior surfaces (such as the bottom exterior surface, top exterior surface, left side exterior surface, right side exterior surface, or back side exterior surface that is opposite the illumination window) of the engine housing 1603, or may be disposed on one or more interior surfaces (such as the top interior surface, bottom interior surface (which is the optical bench 1601), left side interior surface, right side interior surface, or back side interior surface that is opposite the illumination window) of the engine housing. For example, FIG. 16C illustrates an exemplary embodiment wherein one of the printed circuit boards that embody such circuitry also serves as the optical bench 1601, and the circuit components that realize such circuitry is mounted on the external surface of the printed circuit board, which is the bottom exterior surface of the housing 1603 of engine 1600.

The self-contained imaging engine 1600 as described above with respect to FIGS. 16A and 16B may be readily integrated into a hand-holdable imaging device/image-based bar code reader, presentation imaging device/image-based presentation bar code reader, other data acquisition devices (such as data acquisition terminals, mobile computers, computing tablets), computer peripheral devices (such as pointing devices such as a mouse or joystick) or other computing device (such as personal computers).

Alternate Applications for PLILIM-based Image Velocity Estimation

In another aspect of the present invention, a PLILIM-based imaging device can be used to generate velocity data that estimates velocity of object that is moving relative to the imaging device while passing through the FOVs of the imaging device. The velocity data is output to a camera controller that automatically adjusts the operating parameters of a camera based thereon. More specifically, a plurality of linear imaging arrays (for example, the two linear imaging arrays $LA_A$ and $LA_B$ of the PLILIM-based imaging modules described herein are used to simultaneously build up multiple composite 2-D images of the target object. In order to build up the multiple composite 2-D images, the row of pixel data values (in analog form) from each linear imaging array is output there from, converted into digital form, preprocessed and stored in memory. An image processing computer (which may be realized by one or more programmed computer processing modules, such as a microprocessor, digital signal processor or other image processing engine) accesses and processes the multiple 2D images stored in memory in accordance with any one of the image velocity detection routines described herein to derive image velocity metrics that estimate the velocity of target objects(s) imaged by the linear imaging arrays. The image velocity metrics are supplied to a controller that updates the operating parameters of an illumination source (such as illumination power parameters, duty cycle parameters, etc) and/or the operating parameters of a camera (such as orientation parameters, focus parameters, zoom parameters, exposure parameters, etc) based upon the image velocity metrics supplied thereto to compensate for changes in the relative object velocity as estimated by the image velocity metrics supplied thereto. A pictorial representation of the image capture and processing operations that build and process a pair of composite 2-D images to derive such image velocity metrics (and perform illumination source/camera control operations based upon such image velocity metrics) is shown in FIG. 17A.

FIGS. 17B is a flow chart illustrating exemplary operations carried out by a PLILIM-based imaging device in accordance with the present invention. In blocks 1701 and 1703, planar light illumination is generated that overlaps the FOVs (e.g., $FOV_A$ and $FOV_B$) of a plurality of linear imaging arrays (e.g., $LA_A$ and $LA_B$), and the plurality of linear imaging are activated to capture respective images (row image data) of the FOVs focused thereon by focusing optics. Such row image data in converted into digital form and optionally preprocessed (in the digital domain) to filter out unwanted noise components therein. In addition, filtering operations may be performed on the row image data signal in the analog domain prior to conversion into the digital domain in order to remove unwanted noise components therein. The digital row image data is then added to (e.g., stored in) corresponding image buffers (e.g., first and second image buffers corresponding to $LA_A$ and $LA_B$, respectively). Such operations are repeated over successive rows (e.g., lines) to form the multiple composite 2-D images in the image buffers. In block 1705, any one of the image velocity detection routines described herein may be used to derive image velocity metrics that estimate the velocity of objects(s) imaged by the linear imaging arrays. Finally, in block 1707, the image velocity metrics generated in step 1705 are supplied to a controller that updates the operating parameters of an illumination source (such as illumination power parameters, duty cycle parameters, etc) and/or the operating parameters of a camera (such as orientation parameters, focus parameters, zoom parameters, exposure parameters, etc) based upon the image velocity metrics supplied thereto to compensate for changes in the relative object velocity as estimated by the image velocity metrics supplied thereto.

Modifications of the Illustrative Embodiments

While the illustrative embodiments described above have made reference to the use of multiple VLDs to construct each PLIA, and that the characteristic wavelength of each such VLD is substantially similar, the present invention contemplates providing a novel planar light illumination and linear imaging module (PLILIM) which employs one or more planar light illumination arrays comprising a plurality of visible laser diodes having a plurality of different characteristic wavelengths residing within different portions of the visible band. The present invention also contemplates providing such a novel PLILIM-based system, wherein the visible laser diodes within the PLIA thereof are spatially arranged so that the spectral components of each neighboring visible laser diode (VLD) spatially overlap and each portion of the composite planar light illumination beam (PLIB) along its planar extent contains a spectrum of different characteristic wavelengths, thereby imparting multi-color illumination characteristics to the composite laser illumination beam. The multi-color illumination characteristics of the composite planar light illumination beam will reduce the temporal coherence of the laser illumination sources in the PLIA, thereby reducing the speckle noise pattern produced at the image detection array of the PLILIM.

The present invention also contemplates providing a novel planar light illumination and linear imaging module (PLILIM) which employs a planar light illumination array (PLIA) comprising a plurality of visible laser diodes (VLDs) which intrinsically exhibit high "spectral mode hopping" spectral characteristics which cooperate on the time domain to reduce the temporal coherence of the laser illumination sources operating in the PLIA, and thereby reduce the speckle noise pattern produced at the image detection array in the PLILIM.

The present invention also contemplates providing a novel planar light illumination and linear imaging module (PLILIM) which employs one or more planar light illumination arrays comprising a plurality of visible laser diodes (VLDs) which are "thermally-driven" to exhibit high "mode-hopping" spectral characteristics which cooperate on the time domain to reduce the temporal coherence of the laser illumination sources operating in the PLIA, and thereby reduce the speckle-noise pattern produced at the image detection array in the PLILIM, in accordance with the principles of the present invention.

In some instances, it may also be desirable to use VLDs having characteristics outside of the visible band, such as in the ultra-violet (UV) and infra-red (IR) regions. In such cases, PLILIM-based subsystems will be produced capable of illuminating objects with planar laser illumination beams having IR and/or UV energy characteristics. Such systems can prove useful in diverse industrial environments where dimensioning and/or imaging in such regions of the electromagnetic spectrum are required or desired.

While each embodiment of the PLILIM-based system of the present invention disclosed herein has employed a pair of planar light illumination arrays, it is understood that in other embodiments of the present invention, only a single PLIA may be used, whereas in other embodiments three or more PLIAs may be used depending on the application at hand.

Various types of planar light illumination sources (PLIS) have been described in detail above. In general, each PLIS will employ a plurality of linearly arranged light sources which collectively produce a composite planar light illumination beam. In certain applications, such as hand-held imaging applications, it will be desirable to construct the hand-held unit as compact and as lightweight as possible. Also, in most applications, it will be desirable to manufacture the device as inexpensively as possible. Such design criteria can be addressed by providing a miniature planar laser illumination module (PLIM) on a semiconductor chip that can be fabricated by aligning and mounting a micro-sized cylindrical lens array upon a linear array of surface emitting lasers (SELs) formed on a semiconductor substrate, encapsulating (i.e. encasing) these components in a semiconductor package provided with electrical pins, a light transmission window such that laser emission is emitted in the direction normal to the substrate. The resulting semiconductor chip is designed for installation in any of the PLILIM-based systems disclosed, taught or suggested by the present disclosure, and can be driven into operation using a low-voltage DC power supply. The laser output from the PLIM semiconductor chip is a planar light illumination beam (PLIB) composed of numerous (e.g. 100–400 or more) spatially incoherent laser beams emitted from the linear array of SELs in accordance with the principles of the present invention. Details of the semiconductor chip is described in Application No. PCT/US01/44011, incorporated by reference above in its entirety.

The various embodiments of the PLILIM-based imager described above utilize the velocity metrics (e.g. velocity data) generated therein to control the operation of an imaging system (e.g., aspect ratio compensation, operating parameters of illumination, operating parameters of a camera, etc). However, the PLILIM-based methodologies and mechanisms for image-based velocity estimation as described herein can be used in other applications, such as an optical mouse (to provide the user with the ability to control movement of a pointing cursor based on movement of the PLILIM-based imaging device with respect to a surface), navigation systems, target tracking systems, and non-contact velocimeters.

The various embodiments of the imaging systems/devices hereof have been described in connection with scanning linear (1-D) and 2-D code symbols, graphical images as practiced in the graphical scanning arts, as well as alpha-numeric characters (e.g. textual information) in optical character recognition (OCR) applications. Examples of OCR applications are taught in U.S. Pat. No. 5,727,081 to Burges, et al, incorporated herein by reference.

It is understood that the systems, modules, devices and subsystems of the illustrative embodiments may be modified in a variety of ways which will become readily apparent to those skilled in the art, and having the benefit of the novel teachings disclosed herein. All such modifications and variations of the illustrative embodiments thereof shall be deemed to be within the scope and spirit of the present invention as defined by the claims to Invention appended hereto.

We claim:

1. A self-contained imaging engine comprising:
   a plurality of linear imaging arrays and image formation optics that provide field of views corresponding to the plurality of linear image arrays;

at least one illumination module that produces planar light illumination that substantially overlaps the field of views corresponding to the plurality of linear imaging arrays; and supporting circuitry that operably cooperates with said plurality of linear image arrays and said at least one illumination module during operation of the imaging engine, wherein said plurality of linear imaging arrays, image formation optics, at least one illumination module, and supporting circuitry are embodied within a modular engine housing.

2. The self-contained imaging engine of claim 1, wherein said supporting circuitry includes timing signal generation circuitry that supplies timing signals to the linear imaging arrays in order to read out the row image data produced by such linear imaging arrays.

3. The self-contained imaging engine of claim 1, wherein said supporting circuitry includes illumination control circuitry that supplies current to illumination sources of the at least one illumination module.

4. The self-contained imaging engine of claim 1, wherein said supporting circuitry includes analog-to-digital conversion circuitry, which optionally filters row data image signal supplied thereto (to remove unwanted noise components) and converts the row image data supplied thereto into digital form.

5. The self-contained imaging engine of claim 1, wherein said supporting circuitry includes data buffering circuitry, for storing the digital row image data generated by the analog-to-digital conversion circuitry and communicating the row image data stored therein over a data communication bus.

6. The self-contained imaging engine of claim 1, wherein one linear imaging array has a variable line rate that is controlled by the timing signals supplied thereto such that the image capture operations performed by the one linear imaging array maintains a substantially constant aspect ratio, to thereby compensate for aspect ratio distortions that result from variations in velocity of engine with respect to target object(s).

7. The self-contained imaging engine of claim 6, wherein the he variable line rate is based upon velocity estimates derived from processing of the pixel data values of other linear imaging arrays disposed therein.

8. The self-contained imaging engine of claim 1, wherein said supporting circuitry includes a line rate adjustment module that is operably coupled to timing signal generation circuitry and adjusts the variable line rate of the one linear image device (e.g., linear imaging array C).

9. The self-contained imaging engine of claim 8, wherein said line rate adjustment module is realized as part of a programmed controller.

10. The self-contained imaging engine of claim 1, wherein said supporting circuitry includes an output illumination control module that is operably coupled to the illumination control circuitry and adjusts the optical power level and/or illumination time period for illumination that overlaps one or more of the FOVs of the linear imaging arrays of the engine, to thereby reduce speckle noise and/or provide constant white level.

11. The self-contained imaging engine of claim 10, wherein said output illumination control module is realized as part of a programmed controller.

12. The self-contained imaging engine of claim 1, wherein said supporting circuitry includes imaging processing circuitry, operably coupled to the data buffering circuitry over the data communication bus, that realizes portions of image-based mechanisms for at least one of: image velocity estimation, aspect ratio compensation, jitter estimation and compensation, bar code detection, OCR, and image lift.

13. The self-contained imagine engine of claim 12, wherein said imaging processing circuitry comprises dedicated hardware selected from the group of: one or more FPGAs, one or more CPLDs, one or more ASICs.

14. The self-contained imagine engine of claim 12, wherein said imaging processing circuitry comprises one or more digital signal processing engines and associated memory.

15. The self-contained imaging engine of claim 1, wherein said planar light illumination overfills said field of views over a range of working distances of the engine during sequential image capture operations.

16. The self-contained imaging engine of claim 1, wherein said planar light illumination is produced from at least one source of coherent illumination.

17. The self-contained imaging engine of claim 16, wherein said at least one source comprises at least one visible laser diode.

18. The self-contained imaging engine of claim 17, wherein said at least one source comprises a plurality of visible laser diodes.

19. The self-contained imaging engine of claim 1, wherein said planar light illumination is produced from at least one source of incoherent illumination.

20. The self-contained imaging engine of claim 19, wherein said at least one source comprises at least one light emitting diode.

21. The self-contained imaging engine of claim 20, wherein said at least one source comprises a plurality of light emitting diodes.

22. The self-contained imaging engine of claim 1, wherein said planar light illumination is produced by at least one planar light illumination module comprising an illumination source, at least one focusing lens element, and at least one cylindrical lens element integrated into a modular housing disposed within said engine housing.

23. The self-contained imaging engine of claim 22, wherein said illumination source comprises at least one source of coherent illumination.

24. The self-contained imaging engine of claim 23, wherein said at least one source comprises at least one visible laser diode.

25. The self-contained imaging engine of claim 24, wherein said at least one source comprises a plurality of visible laser diodes.

26. The self-contained imaging engine of claim 22, wherein said illumination source comprises at least one source of incoherent illumination.

27. The self-contained imaging engine of claim 26, wherein said at least one source comprises at least one light emitting diode.

28. The self-contained imaging engine of claim 27, wherein said at least one source comprises a plurality of light emitting diodes.

29. The self-contained imaging engine of claim 22, wherein said planar light illumination is produced by planar light illumination arrays disposed on opposite sides of said plurality of linear imaging arrays, each planar light illumination array comprising at least one planar light illumination module.

30. The self-contained imaging engine of claim 22, wherein said planar light illumination is produced by multiple planar light illumination modules that are spaced apart and oriented on an optical bench in a manner that produces a composite beam of planar light illumination with substantial uniform intensity distribution over a range of working distances of the imaging engine.

31. The self-contained imaging engine of claim 1, wherein said supporting circuitry is disposed on at least on printed circuit board integral to said engine housing.

* * * * *